US012600862B2

(12) United States Patent
Broadbent et al.

(10) Patent No.: US 12,600,862 B2
(45) Date of Patent: Apr. 14, 2026

(54) PROTEIN POLYURETHANE ALLOYS AND LAYERED MATERIALS INCLUDING THE SAME

(71) Applicant: Modern Meadow, Inc., Nutley, NJ (US)

(72) Inventors: Samuel Broadbent, Hazlet, NJ (US); Dale L. Handlin, Jr., Clifton, NJ (US); Shaobo Cai, Oradell, NJ (US); Zhe Tan, Secaucus, NJ (US); Casey Crownhart, Hoboken, NJ (US); Nicholas Yaraghi, Hoboken, NJ (US); David Williamson, Towaco, NJ (US); Alexander Iain Norman, Somerville, NJ (US); Lixin Dai, Livingston, NJ (US)

(73) Assignee: Modern Meadow, Inc., Nutley, NJ (US)

( * ) Notice: Subject to any disclaimer, the term of this patent is extended or adjusted under 35 U.S.C. 154(b) by 772 days.

(21) Appl. No.: 17/819,544

(22) Filed: Aug. 12, 2022

(65) Prior Publication Data

US 2023/0033725 A1    Feb. 2, 2023

Related U.S. Application Data

(63) Continuation of application No. 17/246,044, filed on Apr. 30, 2021.

(Continued)

(51) Int. Cl.
*C08L 89/06* (2006.01)
*C08L 75/04* (2006.01)

(52) U.S. Cl.
CPC .............. *C08L 89/06* (2013.01); *C08L 75/04* (2013.01); *C08L 2201/10* (2013.01)

(58) Field of Classification Search
CPC combination set(s) only.
See application file for complete search history.

(56) References Cited

U.S. PATENT DOCUMENTS

| | | | |
|---|---|---|---|
| 2,059,856 A | 11/1936 | Eastman et al. | |
| 2,673,171 A | 3/1954 | Leon et al. | |
| | (Continued) | | |

FOREIGN PATENT DOCUMENTS

| | | | |
|---|---|---|---|
| CA | 2306346 A1 | 1/1999 | |
| CN | 1163642 A | 10/1997 | |
| | (Continued) | | |

OTHER PUBLICATIONS

Structure and Properties of Blend Films Prepared from Castor Oil based Polyurethane / Soy Protein Derivative, Ind.Eng.Chem.Res. 2008, 47, 9330-9336, Lui et al. (Year: 2008).*

(Continued)

*Primary Examiner* — Peter A Salamon
(74) *Attorney, Agent, or Firm* — Sterne, Kessler, Goldstein & Fox P.L.L.C.

(57) ABSTRACT

Protein polyurethane alloys including one or more proteins dissolved within one or more polyurethanes. The protein polyurethane alloy may have one or more mechanical properties that are superior to the polyurethane in the absence of protein. The protein polyurethane alloys may be incorporated into a layered material including one or more protein polyurethane alloy layers.

14 Claims, 22 Drawing Sheets

Specification includes a Sequence Listing.

Related U.S. Application Data

(60) Provisional application No. 63/110,760, filed on Nov. 6, 2020, provisional application No. 63/018,891, filed on May 1, 2020.

(56) References Cited

U.S. PATENT DOCUMENTS

| | | | |
|---|---|---|---|
| 2,934,446 | A | 4/1960 | Highberger et al. |
| 3,073,714 | A | 1/1963 | Shu-Tung et al. |
| 3,122,599 | A | 2/1964 | Shu-Tung et al. |
| 3,136,682 | A | 6/1964 | Shu-Tung et al. |
| 3,483,016 | A | 12/1969 | McCool et al. |
| 3,497,363 | A | 2/1970 | Fox, Jr. et al. |
| 3,512,993 | A | 5/1970 | Conley et al. |
| 3,537,871 | A | 11/1970 | Kaneko et al. |
| 3,562,820 | A | 2/1971 | Braun et al. |
| 3,656,881 | A | 4/1972 | Hemwall |
| 3,684,732 | A | 8/1972 | Grabauskas et al. |
| 3,707,553 | A * | 12/1972 | Bagley et al. ........ C07C 309/39 516/41 |
| 3,728,207 | A | 4/1973 | Heling et al. |
| 3,811,832 | A | 5/1974 | Briggs |
| 3,873,478 | A | 3/1975 | Comte et al. |
| 3,921,313 | A | 11/1975 | Mahide et al. |
| 3,956,560 | A | 5/1976 | Smith et al. |
| 3,979,532 | A | 9/1976 | Muck et al. |
| 4,089,333 | A | 5/1978 | Utsuo et al. |
| 4,215,051 | A | 7/1980 | Palmer et al. |
| 4,239,856 | A * | 12/1980 | Rowton ............. C08G 18/7671 521/159 |
| 4,247,279 | A | 1/1981 | Masters |
| 4,258,148 | A * | 3/1981 | Chandalia ............. C08G 18/63 521/137 |
| 4,278,770 | A * | 7/1981 | Chandalia .......... C08G 18/4837 521/122 |
| 4,291,992 | A | 9/1981 | Barr et al. |
| 4,294,241 | A | 10/1981 | Miyata |
| 4,295,894 | A | 10/1981 | Cioca et al. |
| 4,312,963 | A * | 1/1982 | Chandalia ............. C08J 9/0004 526/341 |
| 4,359,542 | A * | 11/1982 | Chandalia ................ C08F 4/04 525/445 |
| 4,404,033 | A | 9/1983 | Steffan |
| 4,407,956 | A | 10/1983 | Howell |
| 4,415,628 | A | 11/1983 | Cioca et al. |
| 4,455,206 | A | 6/1984 | Funabashi et al. |
| 4,464,428 | A | 8/1984 | Ebert et al. |
| 4,465,472 | A | 8/1984 | Urbaniak |
| 4,525,169 | A | 6/1985 | Higuchi et al. |
| 4,526,581 | A | 7/1985 | Prentiss et al. |
| 4,532,929 | A | 8/1985 | Mattei et al. |
| 4,536,475 | A | 8/1985 | Anderson |
| 4,564,597 | A | 1/1986 | Lerner et al. |
| 4,585,139 | A | 4/1986 | Bronson et al. |
| 4,594,276 | A | 6/1986 | Relyea |
| 4,640,529 | A | 2/1987 | Katz |
| 4,646,106 | A | 2/1987 | Howkins |
| 4,665,492 | A | 5/1987 | Masters |
| 4,673,304 | A | 6/1987 | Liu et al. |
| 4,684,611 | A | 8/1987 | Schilperoort et al. |
| 4,736,866 | A | 4/1988 | Leder et al. |
| 4,772,141 | A | 9/1988 | Sanders et al. |
| 4,842,575 | A | 6/1989 | Hoffman et al. |
| 4,889,438 | A | 12/1989 | Forsyth et al. |
| 4,896,980 | A | 1/1990 | Sanders et al. |
| 4,921,365 | A | 5/1990 | Sanders et al. |
| 4,931,546 | A | 6/1990 | Tardy et al. |
| 4,945,050 | A | 7/1990 | Sanford et al. |
| 4,948,280 | A | 8/1990 | Sanders et al. |
| 4,969,758 | A | 11/1990 | Sanders et al. |
| 4,970,168 | A | 11/1990 | Tumer |
| 4,980,112 | A | 12/1990 | Masters |
| 4,980,403 | A | 12/1990 | Bateman et al. |
| 5,016,121 | A | 5/1991 | Peddle et al. |
| 5,039,297 | A | 8/1991 | Masters |
| 5,040,911 | A | 8/1991 | Sanders et al. |
| 5,108,424 | A | 4/1992 | Hoffman et al. |
| 5,134,178 | A | 7/1992 | Nishibori |
| 5,134,569 | A | 7/1992 | Masters |
| 5,153,067 | A | 10/1992 | Yoshida et al. |
| 5,157,111 | A | 10/1992 | Pachence |
| 5,171,273 | A | 12/1992 | Silver et al. |
| 5,185,253 | A | 2/1993 | Tumer |
| 5,201,745 | A | 4/1993 | Tayot et al. |
| 5,204,055 | A | 4/1993 | Sachs et al. |
| 5,216,606 | A | 6/1993 | Lentz et al. |
| 5,229,112 | A | 7/1993 | Obukowicz et al. |
| 5,304,730 | A | 4/1994 | Lawson et al. |
| 5,349,124 | A | 9/1994 | Fischhoff et al. |
| 5,362,865 | A | 11/1994 | Austin |
| 5,378,619 | A | 1/1995 | Rogers |
| 5,424,412 | A | 6/1995 | Brown et al. |
| 5,487,992 | A | 1/1996 | Capecchi et al. |
| 5,490,962 | A | 2/1996 | Cima et al. |
| 5,492,937 | A | 2/1996 | Bogentoft et al. |
| 5,495,071 | A | 2/1996 | Fischhoff et al. |
| 5,503,999 | A | 4/1996 | Jilka et al. |
| 5,510,253 | A | 4/1996 | Mitsky et al. |
| 5,534,327 | A | 7/1996 | Nishi et al. |
| 5,546,313 | A | 8/1996 | Masters |
| 5,589,612 | A | 12/1996 | Jilka et al. |
| 5,593,859 | A | 1/1997 | Prockop et al. |
| 5,593,874 | A | 1/1997 | Brown et al. |
| 5,599,695 | A | 2/1997 | Pease et al. |
| 5,602,321 | A | 2/1997 | John |
| 5,605,662 | A | 2/1997 | Heller et al. |
| 5,614,396 | A | 3/1997 | Bradley et al. |
| 5,627,061 | A | 5/1997 | Barry et al. |
| 5,631,152 | A | 5/1997 | Fry et al. |
| 5,633,435 | A | 5/1997 | Barry et al. |
| 5,658,603 | A | 8/1997 | Andersen et al. |
| 5,658,802 | A | 8/1997 | Hayes et al. |
| 5,659,122 | A | 8/1997 | Austin |
| 5,662,731 | A | 9/1997 | Andersen et al. |
| 5,689,052 | A | 11/1997 | Brown et al. |
| 5,697,324 | A | 12/1997 | van der Lely |
| 5,702,717 | A | 12/1997 | Cha et al. |
| 5,714,560 | A | 2/1998 | Denzinger et al. |
| 5,716,837 | A | 2/1998 | Barry et al. |
| 5,739,832 | A | 4/1998 | Heinzl et al. |
| 5,763,241 | A | 6/1998 | Fischhoff et al. |
| 5,763,245 | A | 6/1998 | Greenplate et al. |
| 5,792,933 | A | 8/1998 | Ma |
| 5,797,898 | A | 8/1998 | Santini, Jr. et al. |
| 5,798,779 | A | 8/1998 | Nakayasu et al. |
| 5,804,425 | A | 9/1998 | Barry et al. |
| 5,824,838 | A | 10/1998 | Melmed et al. |
| 5,831,070 | A | 11/1998 | Pease et al. |
| 5,859,347 | A | 1/1999 | Brown et al. |
| 5,866,121 | A | 2/1999 | Coffino et al. |
| 5,869,720 | A | 2/1999 | John |
| 5,929,208 | A | 7/1999 | Heller et al. |
| 5,932,056 | A | 8/1999 | Mark et al. |
| 5,932,439 | A | 8/1999 | Bogosian |
| 5,945,319 | A | 8/1999 | Keogh |
| 5,948,857 | A | 9/1999 | Anderson et al. |
| 5,959,091 | A | 9/1999 | Watrud et al. |
| 5,959,179 | A | 9/1999 | Hinchee et al. |
| 5,981,841 | A | 11/1999 | Santino et al. |
| 6,087,102 | A | 7/2000 | Chenchik et al. |
| 6,103,528 | A | 8/2000 | An et al. |
| 6,109,717 | A | 8/2000 | Kane et al. |
| 6,123,861 | A | 9/2000 | Santini, Jr. et al. |
| 6,132,468 | A | 10/2000 | Mansmann |
| 6,139,831 | A | 10/2000 | Shivashankar et al. |
| 6,171,797 | B1 | 1/2001 | Perbost |
| 6,197,575 | B1 | 3/2001 | Griffith et al. |
| 6,239,273 | B1 | 5/2001 | Pease et al. |
| 6,261,493 | B1 | 7/2001 | Gaylo et al. |
| 6,277,600 | B1 | 8/2001 | Tomita et al. |
| 6,336,480 | B2 | 1/2002 | Gaylo et al. |
| 6,365,650 | B1 | 4/2002 | Chen et al. |
| 6,368,361 | B1 | 4/2002 | Yayabe et al. |
| 6,383,549 | B1 | 5/2002 | Agostinelli |

(56)                References Cited

U.S. PATENT DOCUMENTS

| | | |
|---|---|---|
| 6,387,707 B1 | 5/2002 | Seul et al. |
| 6,394,585 B1 | 5/2002 | Ross |
| 6,402,403 B1 | 6/2002 | Speakman |
| 6,419,883 B1 | 7/2002 | Blanchard |
| 6,428,978 B1 | 8/2002 | Olsen et al. |
| 6,451,346 B1 | 9/2002 | Shah et al. |
| 6,454,811 B1 | 9/2002 | Sherwood et al. |
| 6,455,311 B1 | 9/2002 | Vacanti |
| 6,495,102 B1 | 12/2002 | Suslick et al. |
| 6,497,510 B1 | 12/2002 | Delametter et al. |
| 6,511,958 B1 | 1/2003 | Atkinson et al. |
| 6,514,518 B2 | 2/2003 | Monkhouse et al. |
| 6,517,648 B1 | 2/2003 | Bouchette et al. |
| 6,527,378 B2 | 3/2003 | Rausch et al. |
| 6,536,873 B1 | 3/2003 | Lee et al. |
| 6,536,895 B2 | 3/2003 | Kashiwagi et al. |
| 6,538,089 B1 | 3/2003 | Samra et al. |
| 6,543,872 B2 | 4/2003 | Ohtsuka et al. |
| 6,547,994 B1 | 4/2003 | Monkhouse et al. |
| 6,548,263 B1 | 4/2003 | Kapur et al. |
| 6,550,904 B2 | 4/2003 | Koitabashi et al. |
| 6,561,626 B1 | 5/2003 | Min et al. |
| 6,561,642 B2 | 5/2003 | Gonzalez |
| 6,565,176 B2 | 5/2003 | Anderson et al. |
| 6,596,304 B1 | 7/2003 | Bayon et al. |
| 6,708,531 B1 | 3/2004 | Thanikaivelan et al. |
| 6,733,859 B2 | 5/2004 | Yoneda et al. |
| 6,762,336 B1 | 7/2004 | MacPhee et al. |
| 6,800,384 B2 | 10/2004 | Suzuki et al. |
| 6,835,390 B1 | 12/2004 | Vein |
| 6,942,830 B2 | 9/2005 | Muelhaupt et al. |
| 6,979,670 B1 | 12/2005 | Lyngstadaas et al. |
| 7,004,978 B2 | 2/2006 | Kando et al. |
| 7,051,654 B2 | 5/2006 | Boland et al. |
| 7,056,845 B2 | 6/2006 | Waeber et al. |
| 7,166,464 B2 | 1/2007 | McAllister et al. |
| 7,270,829 B2 | 9/2007 | Van Eelen |
| 7,615,373 B2 | 11/2009 | Simpson et al. |
| 7,625,198 B2 | 12/2009 | Lipson et al. |
| 7,645,818 B2 | 1/2010 | Jong |
| 7,812,075 B2 | 10/2010 | Hong |
| 7,846,005 B2 | 12/2010 | Warren et al. |
| 7,882,717 B2 | 2/2011 | Widdemer |
| 8,076,137 B2 | 12/2011 | McAllister et al. |
| 8,076,385 B2 | 12/2011 | Ohama |
| 8,153,176 B2 | 4/2012 | Etayo Garralda et al. |
| 8,188,230 B2 | 5/2012 | Van Heerde et al. |
| 8,328,878 B2 | 12/2012 | Zhang |
| 8,329,601 B2 | 12/2012 | Shi et al. |
| 8,343,522 B2 | 1/2013 | Pohl et al. |
| 8,378,010 B2 | 2/2013 | Browning et al. |
| 8,491,668 B2 | 7/2013 | Hinestroza et al. |
| 8,519,031 B2 | 8/2013 | Parker et al. |
| 8,628,837 B2 | 1/2014 | Kusuura |
| 8,679,197 B2 | 3/2014 | Hinestroza et al. |
| 8,680,224 B2 | 3/2014 | Zhang et al. |
| 8,703,216 B2 | 4/2014 | Forgacs et al. |
| 8,741,415 B2 | 6/2014 | Kusuura |
| 8,785,195 B2 | 7/2014 | Takeuchi et al. |
| 8,916,263 B2 | 12/2014 | Kusuura |
| 8,916,668 B2 | 12/2014 | Parker et al. |
| 9,023,619 B2 | 5/2015 | De Boer |
| 9,103,066 B2 | 8/2015 | Kusuura |
| 9,156,950 B2 | 10/2015 | Garralda et al. |
| 9,163,205 B2 | 10/2015 | Sivik et al. |
| 9,163,338 B2 | 10/2015 | Schauer et al. |
| 9,181,404 B2 | 11/2015 | Neresini et al. |
| 9,259,455 B2 | 2/2016 | Song et al. |
| 9,332,779 B2 | 5/2016 | Marga |
| 9,416,303 B2 | 8/2016 | Parker et al. |
| 9,428,817 B2 | 8/2016 | Greene |
| 9,439,813 B2 | 9/2016 | Terada |
| 9,518,106 B2 | 12/2016 | Saeidi et al. |
| 9,539,363 B2 | 1/2017 | Shimp |
| 9,683,070 B2 | 6/2017 | Zhang et al. |
| 9,708,757 B2 | 7/2017 | Viladot Petit et al. |
| 9,733,393 B2 | 8/2017 | Liu et al. |
| 9,752,122 B2 | 9/2017 | Marga et al. |
| 9,816,019 B2 | 11/2017 | Parker et al. |
| 9,821,089 B2 | 11/2017 | Haj-Ali et al. |
| 9,909,044 B2 | 3/2018 | Parker et al. |
| 9,913,925 B2 | 3/2018 | Chmielewski |
| 9,988,318 B2 | 6/2018 | Schrader et al. |
| 10,124,543 B1 | 11/2018 | Tymon et al. |
| 10,131,096 B1 | 11/2018 | Tymon et al. |
| 10,138,595 B1 | 11/2018 | Tymon |
| 10,259,191 B2 | 4/2019 | Wijesena et al. |
| 10,273,549 B2 | 4/2019 | Helgason et al. |
| 10,294,611 B2 | 5/2019 | Eryilmaz et al. |
| 10,301,440 B2 | 5/2019 | Purcell et al. |
| 10,370,504 B2 | 8/2019 | Purcell et al. |
| 10,370,505 B2 | 8/2019 | Purcell et al. |
| 10,465,103 B2 | 11/2019 | Parker et al. |
| 10,519,285 B2 | 12/2019 | Purcell et al. |
| 10,526,516 B2 | 1/2020 | Parker et al. |
| 10,745,601 B2 | 8/2020 | Parker et al. |
| 10,913,880 B2 | 2/2021 | Parker et al. |
| 11,001,679 B2 | 5/2021 | Purcell et al. |
| 11,214,844 B2 | 1/2022 | Purcell et al. |
| 11,286,354 B2 | 3/2022 | Purcell et al. |
| 11,352,497 B2 | 6/2022 | Teglia et al. |
| 2002/0031500 A1 | 3/2002 | MacLaughlin et al. |
| 2002/0059049 A1 | 5/2002 | Bradbury et al. |
| 2002/0064808 A1 | 5/2002 | Mutz et al. |
| 2002/0064809 A1 | 5/2002 | Mutz et al. |
| 2002/0084290 A1 | 7/2002 | Materna |
| 2002/0089561 A1 | 7/2002 | Weitzel et al. |
| 2002/0090720 A1 | 7/2002 | Mutz et al. |
| 2002/0106412 A1 | 8/2002 | Rowe et al. |
| 2002/0142391 A1 | 10/2002 | Kivirikko et al. |
| 2002/0160109 A1 | 10/2002 | Yeo et al. |
| 2002/0164319 A1 | 11/2002 | Khaw et al. |
| 2002/0173586 A1 | 11/2002 | Jeong et al. |
| 2002/0182633 A1 | 12/2002 | Chen et al. |
| 2002/0188349 A1 | 12/2002 | McAllister et al. |
| 2003/0012805 A1 | 1/2003 | Chen et al. |
| 2003/0027332 A1 | 2/2003 | Lafrance et al. |
| 2003/0031500 A1 | 2/2003 | Bouveresse |
| 2003/0032203 A1 | 2/2003 | Sabatini et al. |
| 2003/0059537 A1 | 3/2003 | Chilkoti et al. |
| 2003/0100824 A1 | 5/2003 | Warren et al. |
| 2003/0113433 A1 | 6/2003 | Tempesta |
| 2003/0118560 A1 | 6/2003 | Kelly et al. |
| 2003/0129699 A1 | 7/2003 | Perret et al. |
| 2003/0134120 A1 | 7/2003 | Kim et al. |
| 2003/0153078 A1 | 8/2003 | Libera et al. |
| 2003/0175410 A1 | 9/2003 | Campbell et al. |
| 2003/0190438 A1 | 10/2003 | Suzuki et al. |
| 2003/0207638 A1 | 11/2003 | Bowlin et al. |
| 2004/0005663 A1 | 1/2004 | Bell et al. |
| 2004/0018226 A1 | 1/2004 | Wnek et al. |
| 2004/0018592 A1 | 1/2004 | Bell et al. |
| 2004/0037813 A1 | 2/2004 | Simpson et al. |
| 2004/0039727 A1 | 2/2004 | Dessloch et al. |
| 2004/0046277 A1 | 3/2004 | Buerger et al. |
| 2004/0116032 A1 | 6/2004 | Bowlin et al. |
| 2004/0219133 A1 | 11/2004 | Lyles |
| 2004/0237208 A1 | 12/2004 | Day |
| 2005/0084719 A1 | 4/2005 | Yoshimoto et al. |
| 2005/0118326 A1 | 6/2005 | Anfinsen et al. |
| 2005/0129730 A1 | 6/2005 | Pang et al. |
| 2005/0148727 A1 | 7/2005 | Ajbani et al. |
| 2005/0163912 A1 | 7/2005 | White |
| 2005/0202268 A1 | 9/2005 | Kotter et al. |
| 2005/0261427 A1 | 11/2005 | Saito |
| 2005/0276791 A1 | 12/2005 | Hansford et al. |
| 2006/0121006 A1 | 6/2006 | Chancellor et al. |
| 2006/0141479 A1 | 6/2006 | Song et al. |
| 2006/0264135 A1 | 11/2006 | Netravali et al. |
| 2006/0270037 A1 | 11/2006 | Kato et al. |
| 2007/0088341 A1 | 4/2007 | Skiba et al. |
| 2007/0142916 A1 | 6/2007 | Olson, Jr. et al. |
| 2007/0184742 A1 | 8/2007 | Coulson et al. |
| 2007/0231787 A1 | 10/2007 | Voelker |

(56)     References Cited

U.S. PATENT DOCUMENTS

| | | | |
|---|---|---|---|
| 2007/0238167 A1 | 10/2007 | Perez et al. | |
| 2007/0292702 A1 | 12/2007 | Saumweber | |
| 2008/0070304 A1 | 3/2008 | Forgacs et al. | |
| 2008/0103287 A1 | 5/2008 | Chino et al. | |
| 2008/0167436 A1* | 7/2008 | Schilling | C08L 99/00 |
| | | | 527/300 |
| 2008/0171994 A1 | 7/2008 | Williams et al. | |
| 2008/0242822 A1 | 10/2008 | West | |
| 2009/0005867 A1 | 1/2009 | Lefranc et al. | |
| 2009/0041907 A1 | 2/2009 | Etayo et al. | |
| 2009/0069893 A1 | 3/2009 | Paukshto et al. | |
| 2009/0075382 A1 | 3/2009 | Sachlos | |
| 2009/0142307 A1 | 6/2009 | Athanasiou et al. | |
| 2009/0162896 A1 | 6/2009 | Scheibel | |
| 2009/0173356 A1 | 7/2009 | Kano | |
| 2009/0208466 A1 | 8/2009 | Yoo et al. | |
| 2009/0209823 A1 | 8/2009 | Yamane | |
| 2009/0226557 A1 | 9/2009 | Etayo Garralda et al. | |
| 2009/0248145 A1 | 10/2009 | Chan et al. | |
| 2009/0295022 A1 | 12/2009 | Kumar | |
| 2010/0016872 A1 | 1/2010 | Bayon et al. | |
| 2010/0041134 A1 | 2/2010 | Forgacs et al. | |
| 2010/0087854 A1 | 4/2010 | Stopek et al. | |
| 2010/0189712 A1 | 7/2010 | L'Heureux et al. | |
| 2010/0256314 A1 | 10/2010 | Marsden et al. | |
| 2010/0325811 A1 | 12/2010 | Kashiwagura et al. | |
| 2011/0076326 A1 | 3/2011 | Caillard et al. | |
| 2011/0151231 A1 | 6/2011 | Chomarat | |
| 2011/0151563 A1 | 6/2011 | Paukshto et al. | |
| 2011/0165301 A1 | 7/2011 | Blumenthal | |
| 2011/0207671 A1 | 8/2011 | Chang et al. | |
| 2011/0212179 A1 | 9/2011 | Liu | |
| 2011/0212501 A1 | 9/2011 | Yoo | |
| 2011/0250308 A1 | 10/2011 | Jun et al. | |
| 2011/0288274 A1 | 11/2011 | Russell et al. | |
| 2012/0010119 A1 | 1/2012 | Cunningham | |
| 2012/0023777 A1 | 2/2012 | Greene | |
| 2012/0040119 A1 | 2/2012 | Gagnieu et al. | |
| 2012/0053689 A1 | 3/2012 | Martin et al. | |
| 2012/0116053 A1 | 5/2012 | Mirochnitchenko et al. | |
| 2012/0116568 A1 | 5/2012 | Murphy et al. | |
| 2012/0164200 A1 | 6/2012 | Qin et al. | |
| 2012/0190473 A1 | 7/2012 | Swist | |
| 2012/0202722 A1 | 8/2012 | Laudenklos et al. | |
| 2012/0230950 A1 | 9/2012 | Niklason et al. | |
| 2012/0273993 A1 | 11/2012 | Shoseyov et al. | |
| 2012/0276203 A1 | 11/2012 | Selim et al. | |
| 2012/0316646 A1 | 12/2012 | Gretzer et al. | |
| 2013/0029008 A1 | 1/2013 | Forgacs et al. | |
| 2013/0131781 A1 | 5/2013 | Greenhalgh et al. | |
| 2013/0142763 A1 | 6/2013 | Carlson et al. | |
| 2013/0215598 A1 | 8/2013 | Guzan et al. | |
| 2013/0255003 A1 | 10/2013 | Forgacs et al. | |
| 2013/0256064 A1 | 10/2013 | Bongaerts et al. | |
| 2013/0287896 A1 | 10/2013 | Harel et al. | |
| 2013/0337711 A1 | 12/2013 | Wool | |
| 2014/0005663 A1 | 1/2014 | Heard et al. | |
| 2014/0017284 A1 | 1/2014 | Yang et al. | |
| 2014/0021703 A1 | 1/2014 | Scharf et al. | |
| 2014/0093618 A1 | 4/2014 | Forgacs et al. | |
| 2014/0193477 A1 | 7/2014 | Chaikof et al. | |
| 2014/0205729 A1 | 7/2014 | Didzbalis et al. | |
| 2014/0215850 A1 | 8/2014 | Redl et al. | |
| 2014/0264079 A1 | 9/2014 | Tarahomi et al. | |
| 2015/0013299 A1 | 1/2015 | Haj-Ali et al. | |
| 2015/0079238 A1 | 3/2015 | Marga et al. | |
| 2015/0216216 A1 | 8/2015 | Marga | |
| 2015/0306276 A1 | 10/2015 | Shimp | |
| 2015/0343748 A1 | 12/2015 | Broyles et al. | |
| 2016/0097109 A1 | 4/2016 | Forgacs et al. | |
| 2016/0097154 A1 | 4/2016 | Dumbrique et al. | |
| 2016/0106674 A1 | 4/2016 | Scalesciani | |
| 2016/0227831 A1 | 8/2016 | Marga | |
| 2016/0250831 A1 | 9/2016 | Gladish et al. | |
| 2016/0280960 A1 | 9/2016 | Leimer et al. | |
| 2016/0287747 A1 | 10/2016 | Schallenberger | |
| 2016/0348078 A1 | 12/2016 | Forgacs et al. | |
| 2016/0376737 A1 | 12/2016 | Marga et al. | |
| 2017/0152301 A1 | 6/2017 | Koob et al. | |
| 2017/0233536 A1 | 8/2017 | Purcell et al. | |
| 2017/0233537 A1 | 8/2017 | Purcell et al. | |
| 2017/0233836 A1 | 8/2017 | Jakab et al. | |
| 2017/0233943 A1 | 8/2017 | Purcell et al. | |
| 2017/0233944 A1 | 8/2017 | Purcell et al. | |
| 2017/0233945 A1 | 8/2017 | Purcell et al. | |
| 2017/0298565 A1 | 10/2017 | Eryilmaz et al. | |
| 2018/0084792 A1 | 3/2018 | Garcia et al. | |
| 2018/0105659 A1 | 4/2018 | Hu et al. | |
| 2018/0119318 A1 | 5/2018 | Morales | |
| 2018/0230644 A1 | 8/2018 | Purcell et al. | |
| 2018/0237592 A1 | 8/2018 | Celia | |
| 2018/0282937 A1 | 10/2018 | Bainbridge et al. | |
| 2018/0371665 A1 | 12/2018 | Lin et al. | |
| 2019/0024303 A1 | 1/2019 | Lee et al. | |
| 2019/0032275 A1 | 1/2019 | Zhou et al. | |
| 2019/0127907 A1 | 5/2019 | Eryilmaz et al. | |
| 2019/0136060 A1 | 5/2019 | Helgason et al. | |
| 2019/0144957 A1 | 5/2019 | Purcell et al. | |
| 2019/0203000 A1 | 7/2019 | Purcell et al. | |
| 2019/0226141 A1 | 7/2019 | Aydin et al. | |
| 2020/0199695 A1 | 6/2020 | Forgacs et al. | |
| 2020/0207932 A1 | 7/2020 | Purcell et al. | |
| 2020/0231805 A1 | 7/2020 | Teglia et al. | |
| 2020/0370215 A1 | 11/2020 | Marga et al. | |
| 2021/0023764 A1 | 1/2021 | Babin et al. | |
| 2021/0300994 A1 | 9/2021 | Schachtschneider et al. | |
| 2021/0308031 A1 | 10/2021 | Dai et al. | |
| 2021/0355326 A1 | 11/2021 | Broadbent | |
| 2022/0064850 A1 | 3/2022 | Ruschel et al. | |
| 2022/0106733 A1 | 4/2022 | Cai et al. | |
| 2022/0127784 A1 | 4/2022 | Handlin, Jr. et al. | |
| 2022/0153993 A1 | 5/2022 | Teglia et al. | |
| 2023/0033725 A1 | 2/2023 | Broadbent et al. | |
| 2025/0019540 A1 | 1/2025 | De Leeuw et al. | |

FOREIGN PATENT DOCUMENTS

| | | | |
|---|---|---|---|
| CN | 1305546 A | 7/2001 | |
| CN | 1420949 A | 5/2003 | |
| CN | 1488016 A | 4/2004 | |
| CN | 1583884 A | 2/2005 | |
| CN | 1583885 A | 2/2005 | |
| CN | 1298901 C | 2/2007 | |
| CN | 101946852 A | 1/2011 | |
| CN | 102016077 A | 4/2011 | |
| CN | 102105075 A | 6/2011 | |
| CN | 102294048 A | 12/2011 | |
| CN | 102492109 A * | 6/2012 | |
| CN | 102586995 A | 7/2012 | |
| CN | 102781490 A | 11/2012 | |
| CN | 102906318 A | 1/2013 | |
| CN | 203021702 U | 6/2013 | |
| CN | 203021703 U | 6/2013 | |
| CN | 203021840 U | 6/2013 | |
| CN | 203021842 U | 6/2013 | |
| CN | 203021843 U | 6/2013 | |
| CN | 103231577 A | 8/2013 | |
| CN | 103233321 A | 8/2013 | |
| CN | 103233322 A | 8/2013 | |
| CN | 103233324 A | 8/2013 | |
| CN | 103233325 A | 8/2013 | |
| CN | 103233326 A | 8/2013 | |
| CN | 103255504 A | 8/2013 | |
| CN | 103255506 A | 8/2013 | |
| CN | 103255508 A | 8/2013 | |
| CN | 103255509 A | 8/2013 | |
| CN | 103255579 A | 8/2013 | |
| CN | 103255581 A | 8/2013 | |
| CN | 103255586 A | 8/2013 | |
| CN | 103256796 A | 8/2013 | |
| CN | 103263381 A | 8/2013 | |
| CN | 103264552 A | 8/2013 | |
| CN | 103266425 A | 8/2013 | |
| CN | 103276531 A | 9/2013 | |

(56) References Cited

FOREIGN PATENT DOCUMENTS

| | | | |
|---|---|---|---|
| CN | 203174344 U | 9/2013 |
| CN | 203174410 U | 9/2013 |
| CN | 203174411 U | 9/2013 |
| CN | 203174412 U | 9/2013 |
| CN | 203174413 U | 9/2013 |
| CN | 203174414 U | 9/2013 |
| CN | 203174415 U | 9/2013 |
| CN | 203174416 U | 9/2013 |
| CN | 203174417 U | 9/2013 |
| CN | 203174418 U | 9/2013 |
| CN | 203174419 U | 9/2013 |
| CN | 203291935 U | 11/2013 |
| CN | 203295678 U | 11/2013 |
| CN | 203295679 U | 11/2013 |
| CN | 203295689 U | 11/2013 |
| CN | 203295690 U | 11/2013 |
| CN | 203295794 U | 11/2013 |
| CN | 203295796 U | 11/2013 |
| CN | 203298579 U | 11/2013 |
| CN | 203307577 U | 11/2013 |
| CN | 103436168 A | 12/2013 |
| CN | 104119491 A | 10/2014 |
| CN | 104233778 A | 12/2014 |
| CN | 102995165 B | 1/2015 |
| CN | 103252276 B | 1/2015 |
| CN | 204112009 U | 1/2015 |
| CN | 204112011 U | 1/2015 |
| CN | 103014924 B | 2/2015 |
| CN | 103231576 B | 4/2015 |
| CN | 103255653 B | 4/2015 |
| CN | 104603293 A | 5/2015 |
| CN | 104695205 A | 6/2015 |
| CN | 105102711 A | 11/2015 |
| CN | 105503242 A * | 4/2016 | ............. C04B 28/30 |
| CN | 205347859 U | 6/2016 |
| CN | 205361168 U | 7/2016 |
| CN | 105968778 A | 9/2016 |
| CN | 106457761 A | 2/2017 |
| CN | 206034030 U | 3/2017 |
| CN | 106987931 A | 7/2017 |
| CN | 107090172 A | 8/2017 |
| CN | 107722606 A | 2/2018 |
| CN | 107828924 A | 3/2018 |
| CN | 107880534 A | 4/2018 |
| CN | 107938315 A | 4/2018 |
| CN | 207193461 U | 4/2018 |
| CN | 107982580 A | 5/2018 |
| CN | 108219162 A | 6/2018 |
| CN | 108424632 A | 8/2018 |
| CN | 108660607 A | 10/2018 |
| CN | 208419533 U | 1/2019 |
| CN | 109912754 A | 6/2019 |
| CN | 111778635 A | 10/2020 |
| DE | 10059111 A1 | 6/2002 |
| EP | 0067553 A2 | 12/1982 |
| EP | 0078040 A2 | 5/1983 |
| EP | 0089029 A2 | 9/1983 |
| EP | 0388854 A2 | 9/1990 |
| EP | 0421450 A2 | 4/1991 |
| EP | 0426641 A2 | 5/1991 |
| EP | 0470399 A2 | 2/1992 |
| EP | 0531273 A2 | 3/1993 |
| EP | 0578627 A1 | 1/1994 |
| EP | 0388854 B1 | 11/1994 |
| EP | 0709462 A2 | 5/1996 |
| EP | 1319415 A1 | 6/2003 |
| EP | 1589091 A1 | 10/2005 |
| EP | 1589098 A1 | 10/2005 |
| EP | 1232182 B1 | 10/2007 |
| EP | 1785252 B1 | 9/2008 |
| EP | 2003239 A1 | 12/2008 |
| EP | 2090584 A1 | 8/2009 |
| EP | 2148887 A2 | 2/2010 |
| EP | 2319337 A1 | 5/2011 |
| EP | 2576661 A2 | 4/2013 |
| EP | 2618998 A1 | 7/2013 |
| EP | 2148887 B1 | 4/2014 |
| EP | 2721941 A1 | 4/2014 |
| EP | 3165556 A2 | 5/2017 |
| EP | 3205668 A1 | 8/2017 |
| EP | 2464612 B1 | 7/2018 |
| EP | 2880116 B1 | 2/2020 |
| FR | 2188610 A5 | 1/1974 |
| GB | 723214 A | 2/1955 |
| GB | 723215 A | 2/1955 |
| GB | 992585 A | 5/1965 |
| GB | 1024769 A | 4/1966 |
| GB | 1367490 A | 9/1974 |
| GB | 1578461 A | 11/1980 |
| GB | 2426519 A | 11/2006 |
| JP | S5819331 A | 2/1983 |
| JP | S5887153 A | 5/1983 |
| JP | S58146345 A | 8/1983 |
| JP | S60203264 A | 10/1985 |
| JP | H0482974 A | 3/1992 |
| JP | H04146273 A | 5/1992 |
| JP | H05184661 A | 7/1993 |
| JP | H05279966 A | 10/1993 |
| JP | 6017378 A | 1/1994 |
| JP | H0617378 A | 1/1994 |
| JP | H0619880 A | 1/1994 |
| JP | H06158546 A | 6/1994 |
| JP | H06198800 A | 7/1994 |
| JP | H0711073 A | 1/1995 |
| JP | H0770600 A | 3/1995 |
| JP | H08217933 A | 8/1996 |
| JP | 9047502 A | 2/1997 |
| JP | H09273080 A | 10/1997 |
| JP | H11269708 A | 10/1999 |
| JP | 2012097157 A | 5/2012 |
| JP | 3184405 U | 6/2013 |
| JP | 2014504264 A | 2/2014 |
| JP | 3218907 U | 11/2018 |
| JP | 2019511339 A | 4/2019 |
| KR | 100716015 B1 | 5/2007 |
| KR | 20110133893 A | 12/2011 |
| RU | 2235744 C2 | 9/2004 |
| RU | 2575263 C2 | 2/2016 |
| RU | 2617360 C2 | 4/2017 |
| TW | I573838 B | 3/2017 |
| WO | WO-8303224 A1 | 9/1983 |
| WO | WO-9119806 A1 | 12/1991 |
| WO | WO-9412563 A1 | 6/1994 |
| WO | WO 9601912 A2 | 1/1996 |
| WO | WO-9717459 A1 | 5/1997 |
| WO | WO-9730582 A1 | 8/1997 |
| WO | WO-9748814 A2 | 12/1997 |
| WO | WO-9808962 A1 | 3/1998 |
| WO | WO-9831812 A1 | 7/1998 |
| WO | WO-9845457 A1 | 10/1998 |
| WO | WO-9858069 A1 | 12/1998 |
| WO | WO-9907206 A1 | 2/1999 |
| WO | WO-9916890 A2 | 4/1999 |
| WO | WO-9931222 A1 | 6/1999 |
| WO | WO-9931223 A1 | 6/1999 |
| WO | WO-9931248 A1 | 6/1999 |
| WO | WO-9940210 A1 | 8/1999 |
| WO | WO-0160922 A1 | 8/2001 |
| WO | WO-0168811 A2 | 9/2001 |
| WO | WO-2005081970 A2 | 9/2005 |
| WO | WO-2006132504 A1 | 12/2006 |
| WO | WO-2007124023 A2 | 11/2007 |
| WO | WO-2008155125 A1 | 12/2008 |
| WO | WO-2009066635 A1 | 5/2009 |
| WO | WO-2009070720 A1 | 6/2009 |
| WO | WO-2009149181 A2 | 12/2009 |
| WO | WO-2010008905 A1 | 1/2010 |
| WO | WO-2010021738 A2 | 2/2010 |
| WO | WO-2010048281 A1 | 4/2010 |
| WO | WO-2010091251 A2 | 8/2010 |
| WO | WO-2011051983 A1 | 5/2011 |
| WO | WO-2012054195 A2 | 4/2012 |
| WO | WO-2012108907 A1 | 8/2012 |
| WO | WO-2013039118 A1 | 3/2013 |

(56)                    References Cited

FOREIGN PATENT DOCUMENTS

| WO | WO-2013072063 A1 | 5/2013 |
| WO | WO-2013149083 A1 | 10/2013 |
| WO | WO-2014039938 A1 | 3/2014 |
| WO | WO-2014195426 A1 | 12/2014 |
| WO | WO-2014201406 A1 | 12/2014 |
| WO | WO-2016073453 A1 | 5/2016 |
| WO | WO-2017053433 A1 | 3/2017 |
| WO | WO-2017131196 A1 | 8/2017 |
| WO | WO-2017142892 A1 | 8/2017 |
| WO | WO-2017177281 A1 | 10/2017 |
| WO | WO-2018058874 A1 | 4/2018 |
| WO | WO-2018110819 A1 | 6/2018 |
| WO | WO-2018137041 A1 | 8/2018 |
| WO | WO-2018164020 A1 | 9/2018 |
| WO | WO-2018164234 A1 | 9/2018 |
| WO | WO-2018185246 A1 | 10/2018 |
| WO | WO-2018211994 A1 | 11/2018 |
| WO | WO-2019007442 A2 | 1/2019 |
| WO | WO-2019017987 A1 | 1/2019 |
| WO | WO-2019065735 A1 | 4/2019 |
| WO | WO-2019110325 A1 | 6/2019 |
| WO | WO-2019110960 A1 | 6/2019 |
| WO | WO-2019117724 A1 | 6/2019 |
| WO | WO-2019149914 A1 | 8/2019 |
| WO | WO-2019158341 A1 | 8/2019 |
| WO | WO-2020226220 A1 | 11/2020 |
| WO | WO-2021084538 A1 | 5/2021 |
| WO | WO-2021119069 A1 | 6/2021 |
| WO | WO-2021222755 A1 | 11/2021 |
| WO | WO-2024040172 A2 | 2/2024 |

OTHER PUBLICATIONS

Is DMF a foam stabilizer? (Year: 2025).*

Abedin, M.Z., et al., "Isolation and Native Characterization of Cysteine-rich Collagens From Bovine Placental Tissues and Uterus and Their Relationship to Types Iv and V Collagens," Bioscience Reports, 2(7):493-502, Portland Press on behalf of the Biochemical Society, England, (Jul. 1982).

Aldhous, Print me a heart and a set of arteries, New Scientist, Apr. 15, 2006, retrieved from the internet on Jun. 3, 2015. Retrieved from the Internet: (http://organprint.missouri.edu/www/news/NewScientistApril2006.pdf).

Apte, S.S., et al., "Cloning of the Human and Mouse Type X Collagen Genes and Mapping of the Mouse Type X Collagen Gene to Chromosome 10," European Journal of Biochemistry, 206(1):217-224, Blackwell Science Ltd. on behalf of the Federation of European Biochemical Societies, England, (May 1992).

Arding, Vegetarian cheese, Culture the word on cheese, 2 pgs, Dec. 3, 2013, retrieved from the internet on Oct. 31, 2014. Retrieved from the Internet: (URL: https://culturecheesemag.com/ask-the-monger/vegetarian-cheese).

Ayad, S., et al., "Bovine Cartilage Types VI and IX Collagens," Biochemical Journal, 262(3):753-761, Published by Portland Press on behalf of the Biochemical Society, England, (Sep. 1989).

Bailey, A.J., et al., "Irradiation-Induced Crosslinking of Collagen," Radiation Research, 22(4):606-621, Kluge Carden Jennnings Pub. Co, United States, (Aug. 1964).

Barnard, N.D., et al., "The Medical Costs Attributable to Meat Consumption," Preventive Medicine, 24(6):646-655, Academic Press, Inc (Nov. 1995).

Basil-Jones, M.M., et al., "Collagen Fibril Orientation in Ovine and Bovine Leather Affects Strength: A Small Angle X-ray Scattering (SAXS) Study," Journal of Agricultural and Food Chemistry, 59(18):9972-9979, American Chemical Society, United States, (Sep. 2011).

Benjaminson, M.A., et al., "In Vitro Edible Muscle Protein Production System (MPPS): Stage 1, Fish," Acta Astronautica, 51(12):879-889, Pergamon Press, England(Dec. 2002).

Bentz, H., et al., "Isolation and Partial Characterization of a New Human Collagen With an Extended Triple-helical Structural Domain,"

Proceedings of the National Academy of Sciences of the United States of America, 80(11):3168-3172, National Academy of Sciences, United States, (Jun. 1983).

Benya, P.D and Padilla, S.R, "Isolation and Characterization of Type VIII Collagen Synthesized by Cultured Rabbit Corneal Endothelial Cells," The Journal of Biological Chemistry, 261(9):4160-4169, American Society for Biochemistry and Molecular Biology, United States, (Mar. 1986).

Berger, P.H., et al. , "Expression in Transgenic Plants of a Viral Gene Product That Mediates Insect Transmission of Potyviruses," Proceedings of the National Academy of Sciences of the United States of America, 86(21):8402-8406, National Academy of Sciences, United States, (Nov. 1989).

Bevan, M, "The Structure and Transcription Start Site of a Major Potato Tuber Protein Gene," Nucleic Acids Research, 14(11):4625-4638, Information Retrieval ltd, England, (Jun. 1986).

Bhat, Z.F and Bhat, H., "Animal-free Meat Biofabrication," American Journal of Food Technology, 6(6):441-459, (Jun. 2011).

Bhat, Z.F and Bhat, H., "Tissue Engineered Meat-Future Meat," Journal of Stored Products and Postharvest Research, 2(1):1-10, (Jan. 2011).

Bian, W. and Bursac, N.,, "Engineered Skeletal Muscle Tissue Networks With Controllable Architecture," Biomaterials, 30(7):1401-1412, IPC Science and Technology Press, Netherlands, (Mar. 2009).

Bitter, G.A, "Heterologous Gene Expression in Yeast," Methods in Enzymology 152:673-684, Academic Press, United States (1987).

Boonen, K.J and Post, M.J., "The Muscle Stem Cell Niche: Regulation of Satellite Cells During Regeneration," Tissue Engineering Part B, 14(4):419-431, Mary Ann Liebert, Inc, United States (Dec. 2008).

Boonen K.J.M., et al., "Essential Environmental Cues From the Satellite Cell Niche: Optimizing Proliferation and Differentiation," American Journal of Physiology-Cell Physiology, 296(6):C1338-C1345, (Jun. 2009).

Bray E.A, "Expression of the β-subunit of β-conglycinin in Seeds of Transgenic Plants," Planta, 172(3):364-370, Springer-Verlag [etc. ], Germany, (Nov. 1987).

Brisson, N., et al., "Plant Virus Vectors: Cauliflower Mosaic Virus," Methods for Plant Molecular Biology, 437-446, New York, Academic Press, (1988).

Broglie, R., et al., "Light-regulated Expression of a Pea Ribulose-1, 5-bisphosphate Carboxylase Small Subunit Gene in Transformed Plant Cells," Science 224(4651): 838-843, Nature Publishing Group, England (May 1984).

Burgeson, R.E and Nimni, M.E, "Collagen Types: Molecular Structure and Tissue Distribution," Clinical Orthopaedics and Related Research, 282:250-272, Wolters Kluwer, United States, (Sep. 1992).

Byers, P.H, "Preparation of Type III Procollagen and Collagen From Rat Skin," Biochemistry, 13(25):5243-5248, American Chemical Society, United States, (Dec. 1974).

Casas A.M., et al., "Transgenic Sorghum Plants via Micro Projectile Bombardment," Proceedings of the National Academy of Sciences of the United States of America, 90(23):11212-11216, National Academy of Sciences, United States, (Dec. 1993).

Chang, L.C., et al., "Comparative Study of Physical Properties of Water-Blown Rigid Polyurethane Foams Extended With Commercial Soy Flour", Journal of Applied Polymer Science 80:10-19, John Wiley & Sons, Inc (2001).

Chen, X., et al., "Effect of the Application of a Dehydrothermal Treatment on the Structure and the Mechanical Properties of Collagen Film," Meterials, 13(2):377, Basel, Switzerland (Jan. 2020).

Chen, Y., et al., "Structure and Properties of Composites Compression-Molded from Polyurethane Prepolymer and Various Soy Products", Industrial & Engineering Chemistry Research, 42(26):6786-6794, American Chemical Society (Dec. 2003).

Christensen A.H., et al., "Maize Polyubiquitin Genes: Structure, Thermal Perturbation of Expression and Transcript Splicing, and Promoter Activity Following Transfer to Protoplasts by Electroporation," Plant Molecular Biology, 18(4):675-689, (Feb. 1992).

Christou, P., et al. , "The Development of a Variety-independent Gene-transfer Method for Rice," Trends in Biotechnology, 10:239-246, Elsevier Inc., (Jul. 1992).

(56) References Cited

OTHER PUBLICATIONS

Chua, J., "Grow Your Own Microbial 'Leather' in Your Kitchen (DIY Tutorial)", Ecouterre, Feb. 23, 2015, [online] , [Retrieved on Sep. 1, 2017], Retrieved from the Internet (URL: www.ecouterre. com/grow-your-own-microbial-leatherin your-kitchen-diy-tutorial).

Cornejo, M.J., et al., "Activity of a Maize Ubiquitin Promoter in Transgenic Rice," Plant Molecular Biology, 23(3):567-581, Kluwer Academic, Netherlands, (Nov. 1993).

Coruzzi, G., et al., "Tissue-specific and Light-regulated Expression of a Pea Nuclear Gene Encoding the Small Subunit of Ribulose-1, 5-Bisphosphate Carboxylase," European Molecular Biology Organization 3(8):1671-1679, PMC, United States National Library of Medicine National Institutes of Health, United States (Aug. 1984).

Covington, A.D ., "Modern Tanning Chemistry," Chemical Society Reviews, 26: 111-126. (1997).

Czlonka, S., et al., "Rigid Polyurethane Foams Reinforced With Industrial Potato Protein", Polymer Testing 68 (2018), 52 pages.

Database WPI, Week 199427, Thomson Scientific, London, GB, 1994-AN 1994-222702.

Datar, I and Betti, M., "Possibilities for an in Vitro Meat Production System," Innovative Food Science and Emerging Technologies, 11(1): 13-22, Elsevier Ltd(Jan. 2010).

De-Deyne, P.G., "Formation of Sarcomeres in Developing Myotubes: Role of Mechanical Stretch and Contractile Activation," American Journal of Physiology—Cell Physiology, 279(6):C1801-C1811, (Dec. 2000).

Dennis, R.G and Kosnik, P.E 2nd., "Excitability and Isometric Contractile Properties of Mammalian Skeletal Muscle Constructs Engineered in Vitro," In Vitro Cellular & Developmental Biology, 36(5):327-335, Springer, Germany (May 2000).

Dennis, R.G., et al., "Excitability and Contractility of Skeletal Muscle Engineered From Primary Cultures and Cell Lines," American Journal of Physiology-Cell Physiology, 280(2):C288-C295, American Physiological Society, United States (Feb. 2001).

Duance, V.C., et al., "Isolation and Characterization of the Precursor of Type M Collagen," Biochemical Journal, 221(3):885-889, Published by Portland Press on behalf of the Biochemical Society, England, (Aug. 1984).

Dublet, B., et al., "The Structure of Avian Type XII Collagen," Journal of Biological Chemistry, 264(22):13150-13156, American Society for Biochemistry and Molecular Biology, United States, (Aug. 1989).

Edelman, E.R. , "Vascular Tissue Engineering: Designer Arteries," Circulation Research 85(12):1115-1117, Lippincott Williams & Wilkins, United States (Dec. 1999).

Edelman, P.D., et al., "Commentary: in Vitro-cultured Meat Production," Tissue Engineering, 11(5-6):659-662, Mary Ann Liebert, Inc, United States (May-Jun. 2005).

Elstow, S.F. and Weiss, J.B, "Extraction, Isolation and Characterization of Neutral Salt Soluble Type V Collagen From Fetal Calf Skin," Collagen and Related Research, 3(3):181-193, Gustav Fischer Verlag, Germany, (May 1983).

Engler, A. J., et al., "Myotubes Differentiate Optimally on Substrates With Tissue-like Stiffness: Pathological Implications for Soft or Stiff Microenvironments," Journal of Cell Biology, 166(6):877-887, Rockefeller University Press, United States (Sep. 2004).

Filler, Definition of Filler by Merriam-Webstaer, Retrieved from the Internet [Aug. 19, 2018], Retrieved from the Internet (URL: http:// www.merriam-webster.com/dictionary/filler).

Fonseca, S., et al., "Slow Fiber Cluster Pattern in Pig Longissimus Thoracic Muscle: Implications for Myogenesis," Journal of Animal Science, 81(4):973-983, American Society of Animal Science, United States (Apr. 2003).

Foucher, A.E., et al., "Purification and Characterization of Native Type XIV Collagen," The Journal of Biological Chemistry, 267(22):15759-15764,American Society for Biochemistry and Molecular Biology, United States, (Aug. 1992).

Fromm, M.E., et al., "Inheritance and Expression of Chimeric Genes in the Progeny of Transgenic Maize Plants," Bio/technology (Nature Publishing Company), 8(9):833-839, Nature Publishing Company, [c1983]-1996, United States, (Sep. 1990).

Future Trends in the World Leather Products Industry and Trade, United Nation Industrial Development Organization, Vienna, 2010.

Gawlitta, D., et al., "The Influence of Serum-free Culture Conditions on Skeletal Muscle Differentiation in a Tissue-engineered Model," Tissue Engineering Part A, 14(1):161-171, (Jan. 2008).

Gordon, et al., "Discovery of a New Collagen, Type XX, Present in Chick Cornea," Investigative Ophthalmology & Visual Science, 39(4):S1128, (Mar. 1998), (Abstract only).

Gordon, et al., "Type XX Collagen, A New Member of the Fibril-Associated (FACIT) Family of Collagens," The FASEB Journal, 13(5):A1119, (Mar. 1999).

Guide to Tensile Strength : Monroe, Accessed at URL : https:// monroeengineering.com/info-general-guide-tensile-strength.php, Accessed on Jul. 21, 2021.

Gurley, W.B., et al., "Upstream Sequences Required for Efficient Expression of a Soybean Heat Shock Gene," Molecular and Cellular Biology 6(2):559-565, American Society for Microbiology, United States (Feb. 1986).

Halim, A,S., et al., "Biologic and Synthetic Skin Substitutes: An Overview," Indian Journal of Plastic Surgery 43(Suppl): S23-S28, Thieme, Germany (Sep. 2010).

Harris, J.R., et al., "In Vitro Fibrillogenesis of Collagen Type I in Varying Ionic and Ph Conditions," Micron, 49:60-68, Pergamon Press, c1993 , England, (Jun. 2013).

Hinchee, M.A.W., et al., "Production of Transgenic Soybean Plants Using Agrobacterium-mediated DNA Transfer," Bio/Technology, 6:915-922, (Aug. 1988).

Hopkins, P.D and Dacey, A., A vegetarian meat: could technology save animals and satisfy meat eaters?, Journal of Agricultural and Environmental Ethics, 21(6):579-596, Springer, 2008, retrieved from the internet on Jun. 2, 2015 (http://foodethics.univie.ac.at/ fileadmin/user.sub.--upload/inst.sub.--et-hik.sub.--wiss.sub.--dialog/ Hopkins.sub.--P..sub.--2008.sub.--Veg.sub.--Me-at.sub.--and.sub.-- In.sub.--Meat.pdf).

Housley, T., et al., "Collagen Crosslinking: Isolation of Hydroxyaldoi-histidine, a Naturally-occurring Crosslink," Biochemical and Biophysical Research Communications, 67(2):824-830, (Dec. 1975).

Huebner, K., et al., "Chromosomal Assignment of a Gene Encoding a New Collagen Type (col. 15a1) to 9q21-7 Q22," Genomics, 14(2):220-224, Academic Press, [c1987, United States, (Oct. 1992).

Hum, H and Boccaccini., "Collagen as Coating Material for 45S5 Bioactive Glass-Based Scaffolds for Bone Tissue Engineering," International Journal of Molecular Sciences, 19(6):1807, Switzerland : MDPI (Jun. 2018).

Inoguchi, K, "The mRNA for Alpha 1(Xix) Collagen Chain, a New Member of Facits, Contains a Long Unusual 3' Untranslated Region and Displays Many Unique Splicing Variants.," Journal of Biochemistry, 117(1):137-146, Oxford University Press, England, (Jan. 1995).

Inouye, S., et al., "Up-Promoter Mutations in the Ipp Gene of *Escherichia coli*," Nucleic Acids Research 13(9):3101-3110, Oxford University Press, England (1985).

International Search Report and Written Opinion for Application No. PCT/US2021/030180, ISA/US, Unites States, mailed on Aug. 25, 2021, 9 pages.

ISO 3376:2020 [IULTCS/IUP 6], "Leather—Physical and Mechanical Tests—Determination of Tensile Strength and Percentage Elongation," Technical Committee : IULTCS International Union of Leather Technologists and Chemists Societies, 4th Edition, 6 pages (May 2020).

Isolate, Definition of. Merriam-Webster, Retrieved on [Dec. 22, 2017], Retrieved from the Internet (URL: http://merriam-webster. com/dictionary/isolate).

Jakab, K., et al., "Engineering Biological Structures of Prescribed Shape Using Self-assembling Multicellular Systems," Proceedings of the National Academy of Sciences of the United States of America 101(9):2864-2869, National Academy of Sciences, United States (Mar. 2004).

Jakab, K., et al., "Tissue Engineering by Self-assembly and Bio-printing of Living Cells," Bio Fabrication 2(2):022001, IOP Publishing, England (Jun. 2010).

(56) References Cited

OTHER PUBLICATIONS

Jenkins, C.L., et al., "Effect of 3-hydroxyproline Residues on Collagen Stability," Journal of the American Chemical Society, 125(21):6422-6427, American Chemical Society, United States, (May 2003).

Jus, S., et al., "Tyrosinase-Catalysed Coating of Wool Fibres With Different Protein-Based Biomaterials," Journal of Biomaterials Science 20(2):253-269, Taylor and Francis, England (2009).

Juvonen, M., et al., "Patterns of Expression of the Six Alternatively Spliced Exons Affecting the Structures of the col. 1 and NC2 Domains of the a1 (XIII) Collagen Chain in Human Tissues and Cell Lines," The Journal of Biological Chemistry, 267 (34):24700-24707, (Dec. 1992).

Kapoor, R, "Type VIII Collagen From Bovine Descemet's Membrane: Structural Characterization of a Triple-helical Domain," Biochemistry, 25(13):3930-3937, American Chemical Society, United States, (Jul. 1986).

Katsumata, M., "Promotion of Intramuscular Fat Accumulation in Porcine Muscle by Nutritional Regulation," Animal Science Journal, 82(1):17-25, Wiley, Australia(Feb. 2011).

Kay, R., et al., "Duplication of Camv 35S Promoter Sequences Creates a Strong Enhancer for Plant Genes," Science, 236(4806):1299-1302, American Association for the Advancement of Science, United States, (Jun. 1987).

Kielty, C.M., et al., "Isolation and Ultrastructural Analysis of Microfibrillar Structures From Foetal Bovine Elastic Tissues," Journal of cell science, 99(4):797-807, Company of Biologists, England, (Aug. 1991).

Kielty, C.M., et al., "The Collagen Family: Structure, Assembly and Organization in the Extracellular Matrix," Connective Tissue and Its Heritable Disorders: Molecular, Genetic, and Medical Aspects, 159-221, (2002).

Kivirikko, S., et al., "Primary Structure of the Alpha 1 Chain of Human Type Xv Collagen and Exon-intron Organization in the 3' Region of the Corresponding Gene," The Journal of biological chemistry, 269(7):4773-4779, American Society for Biochemistry and Molecular Biology, (Feb. 1994).

Klemm, D., et al., "Cellulose: Fascinating Biopolymer and Sustainable Raw Material," Angewandte Chemie International Edition, 44(22):3358-3393, (May 2005).

Koide, T., "Application of Collagen-like Triple-helical Peptides to Biochemical Studies Elucidating the Collagen Structure and Functions," Seikagaku. The Journal of Japanese Biochemical Society 82(6):474-483, Nippon Seikagakkai, Japan (Jun. 2010).

Kosnik, P.E., et al., "Tissue Engineering Skeletal Muscle," Functional Tissue Engineering, 377-392, Springer-Verlag, United States, (2003).

Langelaan M.L.P., et al.,, "Meet the New Meat: Tissue Engineered Skeletal Muscle," Trends in Food Science & Technology, 21(2):59-66, Elsevier, (Feb. 2010).

Langer, R. and Vacanti, J.P.,, "Tissue Engineering; Science," Science, 260(5110):920-926, American Association for the Advancement of Science, (May 1993).

Langrock, T., et al., "Analysis of Hydroxyproline Isomers and Hydroxylysine by Reversed-Phase HPLC and Mass Spectrometry," Journal of Chromatography B 847(2):282-288, Elsevier, Netherlands (Mar. 2007).

Lanza., et al., "Principles of Tissue Engineering; 3rd. Ed.; Chapter 12 Principles of Tissue Culture and Bioreactor Design (III. Principles of Bioreactor Design)," Academic Press, 165-166, (Aug. 2007).

Lee, N., et al., "Efficient Transformation and Regeneration of Rice Small Cell Groups," Proceedings of the National Academy of Sciences of the United States of America, 88(15):6389-6393, National Academy of Sciences, United States, (Aug. 1991).

Lee, W., et al., "Multi-layered Culture of Human Skin Fibroblasts and Keratinocytes Through Three-dimensional Freeform Fabrication," Biomaterials 30(8):1587-1595, Elsevier Science, Netherlands (Mar. 2009).

Levenberg, S., et al., "Engineering Vascularized Skeletal Muscle Tissue," Nature Biotechnology, 23(7):879-884, Nature America Publishing, United States (Jul. 2005).

Li, K., et al., "Cloning of Type XVII Collagen," The Journal of biological chemistry, 268(12):8825-8834, American Society for Biochemistry and Molecular Biology, United States, (Apr. 1993).

Li, M., et al., "Electrospun Protein Fibers as Matrices for Tissue Engineering," Biomaterials, 26(30):5999-6008, IPC Science and Technology Press, Netherlands, (Oct. 2005).

Li, M., et al., "Soy Protein-Modified Waterborne Polyurethane Biocomposites With Improved Functionality", RSC advances, 6(16):12837-12849, Royal Society of Chemistry (2016).

Li, Z., et al., "Mechanical Behaviour of Natural Cow Leather in Tension," Acta Mechanica Solida Sinica 22(1):37-44, AMSS Press, China (2009).

Lin, Y., et al., "Physical, Mechanical, and Thermal Properties of Water-Blown Rigid Polyurethane Foam Containing Soy Protein Isolate", Cereal Chemistry 73(2):189-196, American Association of Cereal Chemists, Inc (1996).

Lin, Y., et al., "Water-Blown Flexible Polyurethane Foam Extended with Biomass Materials", Journal of Applied Polymer Science 65(4):695-703, John Wiley & Sons, Inc (Jul. 1997).

Liu, D., et al., "Structure and Properties of Blend Films Prepared from Castor Oil-Based Polyurethane/Soy Protein Derivative", Industrial & Engineering Chemistry Research 47(23):9330-9336, American Chemical Society (2008).

Liu, H., et al., "Soy-Oil-Based Waterborne Polyurethane Improved Wet Strength of Soy Protein Adhesives on Wood", International Journal of Adhesion and Adhesives, 73:66-74, Elsevier Ltd, (Mar. 2017).

Logan, J., et al., "Adenovirus Tripartite Leader Sequence Enhances Translation of mRNAs Late After Infection," Proceedings of the National Academy of Sciences USA 81(12):3655-3659, National Academy of Sciences, United States (Jun. 1984).

Lucklow, V.A., et al., "High Level Expression of Nonfused Foreign Genes With Autographa Californica Nuclear Polyhedrosis Virus Expression Vectors," Virology 170(1):31-39 (May 1989).

Lunstrum, G.P., et al., "Identification and Partial Purification of a Large, Variant Form of Type XII Collagen," The Journal of biological chemistry, 267(28):20087-20092, American Society for Biochemistry and Molecular Biology, United States, (Oct. 1992).

Lunstrum, G.P., et al., "Large Complex Globular Domains of Type Vii Procollagen Contribute to the Structure of Anchoring Fibrils," The Journal of biological chemistry, 261(19):9042-9048, American Society for Biochemistry and Molecular Biology, United States, (Jul. 1986).

Mackett, M., et al., "General Method for Production and Selection of Infectious Vaccinia Virus Recombinants Expressing Foreign Genes," Journal of Virology 49(3):857-864, American Society for Microbiology, United States (Mar. 1984).

Mackett, M., et al., "Vaccinia Virus: A Selectable Eukaryotic Cloning and Expression Vector," Proceedings of the National Academy of Sciences USA 79(23):7415-7419, National Academy of Sciences, United States (Dec. 1982).

Madbouly, S.A and Lendlein, A., "Degradable Polyurethane/Soy Protein Shape-Memory Polymer Blends Prepared via Environmentally-Friendly Aqueous Dispersions, " Macromolecular Materials and Engineering 297(12):1213-1224, Wiley-VCH Verlag Gmbh & Co. KGaA, Weinheim (Nov. 2012).

Mandal, B, and Majumdar, S.G.,"Nutritional Evaluation of Proteins from three Non-Traditional Seeds with or without Amino Acids Supplementation in Albino Rats," Proceedings of the Indian National Science Academy B50 No. 1:48-56, Nutritional Evaluation of Non-traditional Seed Proteins, Biochemistry Department, Burdwan Medical College, Burdwan (1984).

Marga. F., et al., "Developmental Biology and Tissue Engineering," Birth Defects Research Part C: Embryo Today 81(4):320-328, Wiley Periodicals, Inc, United States (Dec. 2007).

Marga. F., et al., "Toward Engineering Functional Organ Modules by Additive Manufacturing," Biofabrication 4(2):022001, IOP Publishing, England (Jun. 2012).

(56) References Cited

OTHER PUBLICATIONS

Matsuda, N., et al.,, "Tissue Engineering Based on Cell Sheet Technology," Advanced Materials, 19(20):3089-3099, John Wiley & Sons, (Oct. 2007).

McElroy, D., et al., "Isolation of an Efficient Actin Promoter for Use in Rice Transformation," The Plant cell, 2(2): 163-171, American Society of Plant Physiologists, c1989, United States, (Feb. 1990).

McGrath, J.A., et al., "Mutations in the 180-kd Bullous Pemphigoid Antigen (Bpag2), a Hemidesmosomal Transmembrane Collagen (col. 17a1), in Generalized Atrophic Benign Epidermolysis Bullosa," Nature genetics, 11(1):83-86, Nature Pub. Co., c1992, United States, (Sep. 1995).

Mead, P.S., et al.,, "Food-related Illness and Death in the United States," Emerging infectious diseases, 5(5):607-625, National Center for Infectious Diseases, Centers for Disease Control and Prevention (CDC), United States, (Sep. 1999).

Mechanic, G. and Tanzer, M.L., "Biochemistry of Collagen Crosslinking Isolation of a New Crosslink, Hydroxylysinohydroxynorleucine, and its Reduced Precursor, Dihydroxynorleucine, From Bovine Tendon," Biochemical and biophysical research communications, 41(6):1597-1604, Elsevier, United States, (Dec. 1970).

Mechanic, G., et al., "The Nature of Crosslinking in Collagens From Mineralized Tissues," Biochemical and biophysical research communications, 45(3):644-653, Elsevier, United States, (Nov. 1971).

Medberry, S.L., et al., "The Commelina Yellow Mottle Virus Promoter is a Strong Promoter in Vascular and Reproductive Tissues," The Plant cell, 4(2):185-192, American Society of Plant Physiologists, c1989, United States, (Feb. 1992).

Meyer, M., et al., "Collagen Fibres by Theromoplastic and Wet Spinning," Materials Science and Engineering C, 30(8):1266-1271, ResearchGate , (Oct. 2010).

Miller, E.J. and Rhodes, R.K, "[2] Preparation and Characterization of the Different Types of Collagen," Methods in enzymology, 82(A):33-64, Academic Press, United States, (1982).

Mironov., et al., "Biofabrication: a 21st century manufacturing paradigm" Biofabrication 1 (2009) pp. 1-16.

Mironov, V., et al., "Bioprinting Living Structures," Journal of Materials Chemistry 17(20):2054-2060 (May 2007).

Munarin, F., et al.,, "Pectin-based Injectable Biomaterials for Bone Tissue Engineering," Biomacromolecules, 12(3):568-577, American Chemical Society, United States, (Mar. 2011), (Abstract Only).

Muragaki. Y., et al., "The Human Alpha 1(Xv) Collagen Chain Contains a Large Amino-terminal Non-triple Helical Domain With a Tandem Repeat Structure and Homology to Alpha 1(Xviii) Collagen," The Journal of biological chemistry, 269(6):4042-4046, American Society for Biochemistry and Molecular Biology, United States, (Feb. 1994).

Myers, J.C., et al., "Identification of a Previously Unknown Human Collagen Chain, Alpha 1(Xv), Characterized by Extensive Interruptions in the Triple-helical Region," Proceedings of the National Academy of Sciences of the United States of America, 89(21):10144-10148, National Academy of Sciences, United States, (Nov. 1992).

Myers, J.C., et al., "The Triple-helical Region of Human Type Xix Collagen Consists of Multiple Collagenous Subdomains and Exhibits Limited Sequence Homology to Alpha 1(XVI)," The Journal of biological chemistry, 269(28):18549-18557, American Society for Biochemistry and Molecular Biology, United States, (Jul. 1994).

Native collagen, bovine dermis, Retrieved on Oct. 13, 2018], Retrieved from the Internet (https://www.cosmobio.com/products/kou_iac50_50.html).

Niklason, L.E., et al., "Advances in Tissue Engineering of Blood Vessels and Other Tissues," Transplant Immunology 5(4):303-306, Elsevier, Netherlands (Dec. 1997 ).

Norotte, C., et al., "Scaffold-free Vascular Tissue Engineering Using Bioprinting," Biomaterials 30(30):5910-5917, Elsevier Science, Netherlands (Oct. 2009).

Oh, S.P., et al., "Cloning of Cdna and Genomic Dna Encoding Human Type XVIII Collagen and Localization of the Alpha 1(XVIII) Collagen Gene to Mouse Chromosome 10 and Human Chromosome 21," Genomics, 19(3):494-499, Academic Press, [c1987, United States, (Feb. 1994).

Oh, S.P., et al., "Isolation and Sequencing of cDNAs for Proteins With Multiple Domains of Gly-xaa-yaa Repeats Identify a Distinct Family of Collagenous Proteins," Proceedings of the National Academy of Sciences of the United States of America, 91(10):4229-4233, National Academy of Sciences, United States, (May 1994).

Olkkonen, V.M., et al., "Expression of Exogenous Proteins in Mammalian Cells With the Semliki Forest Virus Vector," Methods in cell biology, 43(A):43-53, Academic Press, United States, (1994).

Pan, T.C., et al., "Cloning and Chromosomal Location of Human Alpha 1(XVI) Collagen," Proceedings of the National Academy of Sciences of the United States of America, 89(14):6565-6569, National Academy of Sciences, United States, (Jul. 1992).

Panicali, D., et al., "Construction of Poxviruses as Cloning Vectors: Insertion of the Thymidine Kinase Gene from Herpes Simplex Virus into the DNA of Infectious Vaccinia Virus," Proceedings of the National Academy of Sciences USA 79(16):4927-4931, The National Academy of Sciences of the United States (Aug. 1982).

Park, H., et al.,, "Effects of Electrical Stimulation in C2C12 Muscle Constructs," Journal of tissue engineering and regenerative medicine, 2(5):279-287, John Wiley & Sons, England, (Jul. 2008).

Park, S.K and Hettiarachchy, N.S., "Physical and Mechanical Properties of Soy Protein-Based Plastic Foams", Journal of the American Oil Chemists, Society 76(10):1201-1205, AOCS Press (1999).

Paszkowski, J., et al., "Direct Gene Transfer to Plants," The EMBO journal, 3(12):2717-2722, Wiley Blackwell, England, (Dec. 1984).

Pedersen, K., et al., "Cloning and Sequence Analysis Reveal Structural Variation Among Related Zein Genes in Maize," Cell, 29(3):1015-1026, Cell Press, United States, (Jul. 1982).

Perera, G., et al.,, "Hydrophobic Thiolation of Pectin With 4-aminothiophenol: Synthesis and in Vitro Characterization," American Association of Pharmaceutical Scientists, 11(1):174-180, American Association of Pharmaceutical Scientists, United States, (Mar. 2010).

Perez-Pomares, J.M., et al., "Tissue Fusion and Cell Sorting in Embryonic Development and Disease: Biomedical Implications," Bioessays 28(8):809-821, Wiley, United States (Aug. 2006 ).

Pette D., et al., "What Does Chronic Electrical Stimulation Teach us About Muscle Plasticity?," Muscle & Nerve, 22(6):666-677, John Wiley & Sons, United States (Jun. 1999).

Prockop, D.J. and Kivirikko, K.I, "Collagens: Molecular Biology, Diseases, and Potentials for Therapy," Annual review of biochemistry, 64:403-434, Annual Reviews, United States, (1995).

Purify, Definition of. Merriam-Webster, Retrieved on [Dec. 22, 2017], Retrieved from the Internet (http://merriam-webster.com/dictionary/purify).

Rahman, M.M and Netravali, A.N., "Green Resinfrom Forestry Waste Residue "Karanja (Pongamia pinnata) Seed Cake" for BiobasedComposite Structures," ACS Sustainable Chemistry & Engineering 2(10):2318-2328, American Chemical Society (Oct. 2014).

Rajan, R., et al., "Design and in Vitro Evaluation of Chlorpheniramine Maleate From Different Eudragit Based Matrix Patches: Effect of Platicizer and Chemical Enhancers," ARS Pharmaceutica 50(4):177-194 (2010).

Rehn, M. and Pihlajaniemi, T, "Alpha 1(XVIII), a Collagen Chain With Frequent Interruptions in the Collagenous Sequence, a Distinct Tissue Distribution, and Homology With Type XV Collagen," Proceedings of the National Academy of Sciences of the United States of America, 91(10):4234-4238, National Academy of Sciences, United States, (May 1994).

Rehn, M., et al., "Primary Structure of the Alpha 1 Chain of Mouse Type Xviii Collagen, Partial Structure of the Corresponding Gene, and Comparison of the Alpha 1(Xviii) Chain With Its Homologue, the Alpha 1(Xv) Collagen Chain," The Journal of biological chemistry, 269(19):13929-13935, American Society for Biochemistry and Molecular Biology, United States, (May 1994).

Ren, X., et al., "Engineering ZonalCartilage Through Bioprinting Collagen Type II Hydrogel Constructs WithBiomimetic Chondrocyte Density Gradient," Bmc Musculoskeletal Disorders 17: 301, BioMed Central, England (2016).

(56)           References Cited

OTHER PUBLICATIONS

Riggs, C.D. and Bates, G.W, "Stable Transformation of Tobacco by Electroporation: Evidence for Plasmid Concatenation," Proceedings of the National Academy of Sciences of the United States of America, 83(15):5602-5606, National Academy of Sciences, United States, (Aug. 1986).

Rober, M.B.T., et al., "One of Two Different ADP-glucose Pyrophosphorylase Genes From Potato Responds Strongly to Elevated Levels of Sucrose," Molecular & general genetics, 224(1):136-146, New York Springer-Verlag [1967, Germany, (Oct. 1990).

Rogers, J.C.,, "Two Barley Alpha-amylase Gene Families are Regulated Differently in Aleurone Cells," The Journal of biological chemistry, 260(6):3731-3738, American Society for Biochemistry and Molecular Biology, United States, (Mar. 1985).

Rogers, S.G., et al., "Improved Vectors for Plant Transformation: Expression Cassette Vectors and New Selectable Markers," Methods in Enzymology, 153:253-277, Elsevier Inc, (1987).

Ruther, U. and Muller-Hill, B., "Easy Identification of cDNA Clones," The EMBO Journal 2(10):1791-1794, IRL Press Ltd, England (1983).

Sanger, M., et al., "Characteristics of a Strong Promoter From Figwort Mosaic Virus: Comparison With the Analogous 35s Promoter From Cauliflower Mosaic Virus and the Regulated Mannopine Synthase Promoter," Plant molecular biology, 14(3):433-443, Martinus Nijhoff/Dr. W. Junk, 1981, Netherlands, (Mar. 1990).

Savadogo, P., et al.,, "Effects of Grazing Intensity and Prescribed Fire on Soil Physical and Hydrological Properties and Pasture Yield in the Savanna Woodlands of Burkina Faso," Agriculture, Ecosystems & Environment, 118(1-4):80-92, Elsevier B.V., (Jan. 2007).

Schardl, C.L., et al., "Design and Construction of a Versatile System for the Expression of Foreign Genes in Plants," Gene, 61(1):1-11, Elsevier/North-Holland, 1976, Netherlands, (1987).

Schmitt, F.O., et al., "Electron Microscope Investigations of the Structure of Collagen," Journal of Cellular Physiology, 20(1):11-33, (Aug. 1942).

Schoff, C.K., "Crosslinking and Crosslink Density," Coatings Clinic (Sep. 1, 2010).

Sekine, H., et al., "Myocardial Tissue Reconstruction: the Cell Sheet Engineering Approach," Inflammation and Regeneration, 27 (3):171-176, (May 2007).

Shayegan, M. and Forde, N.F.,, "Microrheological Characterization of Collagen Systems: From Molecular Solutions to Fibrillar Gels," PloS one, 8(8):1-12, Public Library of Science, United States, (Aug. 2013).

Shepherd, J.H., et al., "Effect of Fiber Crosslinking on Collagen-fiber Reinforced Collagen-chondroitin-6-sulfate Materials for Regenerating Load-bearing Soft Tissues," Journal of biomedical materials research. Part A, 101(1):176-184, John Wiley & Sons, United States, (Jan. 2013).

Shoshan, S. and Finkelstein, S.,, "Studies on Collagen Crosslinking in Vivo," Biochimica et biophysica acta, 154(1):261-263, Elsevier Pub. Co., Netherlands, (Jan. 1968).

Siegel, R.C.,, "Biosynthesis of Collagen Crosslinks: Increased Activity of Purified Lysyl Oxidase With Reconstituted Collagen Fibrils," Proceedings of the National Academy of Sciences of the United States of America, 71(12):4826-4830, National Academy of Sciences, United States, (Dec. 1974).

Silva, T.H., et al., "Marine Origin Collagens and its Potential Applications," Marine drugs, 12(12):5881-5901, MDPI, [2003], Switzerland, (Dec. 2014).

Sizeland, K.H., et el.,, "Collagen Orientation and Leather Strength for Selected Mammals," Journal of agricultural and food chemistry, 61(4):887-892, American Chemical Society, United States, (Jan. 2013).

Smith, C.M., et al., "Three-dimensional Bioassembly Tool for Generating Viable Tissue-engineered Constructs," Tissue Engineering 10(9-10):1566-1576, Mary Ann Liebert, Inc, United States (Sep.-Oct. 2004).

Smith, G.E., et al., "Molecular Engineering of the Autographa Californica Nuclear Polyhedrosis Virus Genome: Deletion Mutations within the Polyhedrin Gene," Journal of Virology 46(2):584-593, American Society for Microbiology, United States (May 1983).

Sommer, F., et al., "Ascorbic Acid Modulates Proliferation and Extracellular Matrix Accumulation of Hyalocytes," Tissue engineering, 13(6):1281-1289, Mary Ann Liebert, Inc., United States, (Jun. 2007) abstract only.

Suganya, S., et al., "Naturally Derived Biofunctional Nanofibrous Scaffold for Skin Tissue Regeneration," International Journal of Biological Macromolecules 68:135-143, Elsevier, Netherlands (Jul. 2014).

Takamatsu, N., et al., "Expression of Bacterial Chloramphenicol Acetyltransferase Gene in Tobacco Plants Mediated by TMV-RNA," European Molecular Biology Organization Journal 6(2):307-311, IRL Press Limited, Oxford, England, (Feb. 1987).

Teja, A.S and Koh, P.Y, "Synthesis, Properties, and Applications of Magnetic Iron Oxide Nanoparticles," Progress in Crystal Growth and Characterization of Materials, 55(1-2):22-45, (Mar.-Jun. 2009).

Thelen, M.H., et al., "Electrical Stimulation of C2C12 Myotubes Induces Contractions and Represses Thyroid Hormone-Dependent Transcription of the Fast-type Sarcoplasmic-reticulum Ca2+-ATPase Gene," The Biochemical journal, 321(Pt 3): 845-848, Published by Portland Press on behalf of the Biochemical Society, England, (Feb. 1997).

Thibault, J.F. and Rinaudo, M., "Chain Association of Pectic Molecules During Calcium-Induced Gelation," Biopolymers 25:455-468, John Wiley & Sons (1986). year of pub, sufficiently earlier than effective US filing date and any foreign priority date.

Tian, H., et al., "Improved Flexibility and Water Resistance of Soy Protein Thermoplastics Containing Waterborne Polyurethane," Industrial Crops and Products 32(1):13-20, Elsevier B.V, (Jul. 2010).

Tian, H., et al., "Polyether Polyol-Based Rigid Polyurethane Foams Reinforced With Soy Protein Fillers", Journal of Vinyl & Additive Technology 24(S1): E105-E111, Society of Plastics Engineers (2017).

Tong, X., et al., "Development of Blend Films From Soy Meal Protein and Crudeglycerol-Based Waterborne Polyurethane", Industrial Crops and Products 67:11-17, Elsevier B.V (May 2015).

Tuomisto H.L. et al., "Environmental Impacts of Cultured Meat Production," Environmental Science & Technology, 45(14):6117-6123, American Chemical Society, (Jun. 2011).

UniProt Submission C03A1_Human. Collagen alpha-1 (III) chain (Dec. 5, 2018) [Retrieved from the Internet Apr. 13, 2020:(https://www.uniprot.org/uniprot/P02461.txt?version=212).

Van Heeke, G., et al., "Expression of Human Asparagine Synthetase in *Escherichia coli*," The Journal of Biological Chemistry 264(10):5503-5509, American Society for Biochemistry and Molecular Biology, United States (Apr. 1989).

Wan, Y and Lemaux, P.G.,, "Generation of Large Numbers of Independently Transformed Fertile Barley Plants," Plant physiology, 104(1):37-48, American Society of Plant Biologists, United States, (Jan. 1994).

Wang, G and Zhou, A., "Soy Protein Based Biodegradable Flexible Polyurethane Foam", Advanced Materials Research, 152-153:1862-1865, Trans Tech Publications, Switzerland (2011).

Wang, N and Zhang, L., "Preparation and Characterization of Soy Protein Plastics Plasticized With Waterborne Polyurethane," Polymer International 54(1):233-239, Society of Chemical Industry, (Jan. 2005).

Wang, N., et al., "Mechanical Properties and Biodegradability of Crosslinked Soy Protein Isolate/Waterborne Polyurethane Composites", Journal of Applied Polymer Science 95:465-473, Wiley Periodicals, Inc (2005).

Wang, N., et al., "Properties of Crosslinked Casein/Waterborne Polyurethane Composites," Journal of Applied Polymer Science 91:332-338, John Wiley & Sons, United States (2004).

Wang, Y., et al., "Preparation of Soy-Based Adhesive Enhanced by Waterborne Polyurethane: Optimization by Response Surface Methodology", Advances in Materials Science and Engineering, 2018:8, Article ID 9253670 Hindawi (2018).

Wang, Y., et al., "Properties of Soy-Based Wood Adhesives Enhanced by Waterborne Polyurethane Modification", Journal of Biobased Materials and Bioenergy 11:330-335, American Scientific Publishers (2017).

(56) References Cited

OTHER PUBLICATIONS

Watt, S.L., et al., "Characterization of Collagen Types Xii and XIV From Fetal Bovine Cartilage," The Journal of biological chemistry, 267(28):20093-20099, American Society for Biochemistry and Molecular Biology, United States, (Oct. 1992).

Wells, H.C., et al., "Collagen Fibril Diameter and Leather Strength," Journal of agricultural and food chemistry, 61(47):11524-11531, American Chemical Society, United States, (Nov. 2013).

Wu, B., et al., "The New Development of Modified Collagen Protein Spinning," Leather Science and Engineering 17(4):27-31, China Academic Journal Electronic Publishing House (Aug. 2007).

Wu, J.J., et al., "Type VI Collagen of the Intervertebral Disc," The Biochemical journal, 248(2):373-381, Published by Portland Press on behalf of the Biochemical Society, England, (Dec. 1987).

Wu, S., et al., "Quantitative Analysis on Collagen Morphology in Aging Skin Based on Multiphoton Microscopy," Journal of biomedical optics, 16(4):40502, SPIE—the International Society for Optical Engineering in cooperation with International Biomedical Optics Society, c1996, (Apr. 2011).

Wu, Y., et al.,, "Fiber Formation by Dehydration-induced Aggregation of Albumin," Journal of Applied Polymer Science, 129(6):3591-3600, Wiley Periodicals, (Sep. 2013).

Xie, D.Y., et al., "Roles of Soft Segment Length in Structure and Property of Soy Protein Isolate/Waterborne Polyurethane Blend Films", Journal of Industrial and Engineering Chemistry Research 55(5):1229-1235, American Chemical Society (Jan. 2016).

Xu, N., et al., "Modification of Pa/pu Superfine Non-woven Fiber for "breath" Property Using Collagen and Vegetable Tannins," Journal of Industrial Textiles 48(10):1593-1615, Sage Publishing (2019).

Xu, Y., et al., "Improve the Performance of Soy Protein-Based Adhesives by a Polyurethane Elastomer", Polymers 10(9):1016, MDPI, Switzerland (Sep. 2018).

Yamaguchi, N., et al., "Molecular Cloning and Partial Characterization of a Novel Collagen Chain, Alpha 1(XVI), Consisting of Repetitive Collagenous Domains and Cysteine-containing Non-collagenous Segments," Journal of biochemistry, 112(6):856-863, Oxford University Press, England, (Dec. 1992).

Yang, J. et al., "Cell Sheet Engineering: Recreating Tissues Without Biodegradable Scaffolds," Biomaterials, 26(33):6415-6422, Elsevier Science, Netherlands, (Nov. 2005).

Yeelack, W and Meesane, J., "Preparation and Characterization of Coated Silk Fibroin Films with Mimicked Re-self Assembly Type I Collagen," The 2013 Biomedical Engineering International Conference, National Research University, Russia (2013).

Yin, Y. and Beachy, R.N, "The Regulatory Regions of the Rice Tungro Bacilliform Virus Promoter and Interacting Nuclear Factors in Rice (Oryza sativa L.)," The Plant journal : for cell and molecular biology, 7(6): 969-980, Blackwell Scientific Publishers and BIOS Scientific Publishers in association with the Society for Experimental Biology, c1991, England, (Jun. 1995).

Yoshioka et al., "Synteny between the Loci for a Novel FACIT-like Collagen Locus (D6S228E) and a1 (IX) Collagen (COL9A1) on 6q12-q14 in Humans," Genomics, 13(3):884-886, Academic Press, United States (Jul. 1992).

Yunhui, X.U., et al., "Study of Cotton Fiber Coated by Collagen," Journal of Textile Research 28(5) (May 2007).

Zhang, M., et al., "Development of Soy Protein Isolate/waterborne Polyurethane Blend Films With Improved Properties", Colloids and Surfaces B: Biointerfaces 100:16-21, Elsevier B.V, Netherlands (Dec. 2012).

Zhang, S., et al., "Water-Blown Castor Oil-Based Polyurethane Foams with Soy Protein as a Reactive Reinforcing Filler", Journal of Polymers and the Environment 26:15-22, Springer (2018).

Zhao, S., et al., "Preparation and Demonstration of Poly(Dopamine)-Triggered Attapulgite-Anchored Polyurethane as a High-performance Rod-Like Elastomer to Reinforce Soy Protein-Isolated Composites", Applied Surface Science, 442:537-546, ScienceDirect, Elsevier (Jun. 2018).

Dascalu, M.C., et al., "On the Compatibility of Low Density Polyethylene/Hydrolyzed Collagen Blends. II: New Compatibilizers," European Polymer Journal 41(6):1391-1402, Elsevier, Netherlands (2005).

Hans-Georg, Elias, "Macromolecules II, Synthesis and Materials," pp. 457-461, translated by the Institute of Material Sciences, Fudan University, Shanghai Jijishan Publishing House, China (1977), 15 Pages.

Jianzhong, M.A., et al., "Leather Chemicals," Second Edition, Chemical Industry Press, 4 Pages, (2008).

Na, N., et al., "Preparation and Performance of Hydrolyzed Collagen/low Density Polyethylene Composites," Acta Materia Composita Sinica 31(4):944-948, Beijing University of Aeronautics and Astronautics, China (Aug. 2014).

Salvatore, L., "Potential of Electrospun Poly(3-hydroxybutyrate)/Collagen Blends for Tissue Engineering Applications," Journal of healthcare engineering 6573947: 1-14, Hindawi Publishing, United Kingdom (Apr. 2018).

Shouwu, Y., et al., "Polymer Material Modification-Principles and Technologies," Intellectual Property Publishing House, China, 4 pages (2015).

"Study on the Modification of Performance of the Polyurethane (PU) Films and Coated Fabrics by Superfine Wool Powder," Chinese Doctoral Dissertations & Master's Theses Full-text Database, Engineering Science and Technology B024-B036 (2005).

Wang W., et al., "Synthesis, Characterization and Degradation of Biodegradable Thermoplastic Elastomers from Poly(Ester Urethane)s and Renewable Soy Protein Isolate Biopolymer," Polymer 53(23):5448-5455, Elsevier, Netherlands (Oct. 2010).

Xu, W., et al., "Modification of Polyurethane by Superfine Protein Powder," Polymer Engineering and Science 46(5):617-622, Wiley, United States (2006).

Xue-Chuan, W., et al., "Modification Methods and Applications of Collagen Protein," Journal of Shaanxi University of Science & Technology 31(5):28-38, (Oct. 2013).

Co-pending U.S. Appl. No. 17/783,570. Inventor: Cai, Shaobo.

Bareil et al. Collagen Based Biomaterials for Tissue Engineering Applications, Materials, 2010, 3, 1863-1887.

Paten, Jeffrey A. et al: "Molecular Interactions between Collagen and Fibronectin: A Reciprocal Relationship that Regulates De Novo Fibrillogenesis", Chem, vol. 5, No. 8, Aug. 1, 2019 (Aug. 1, 2019), pp. 2126-2145, ISSN: 2451-9294, DOI: https://doi.org/10.1016/j.chempr.2019.05.011.

The Editorial Board of Patent Literature Bulletin—Textile, Patent Literature Bulletin—Textile, Shanghai: Shanghai Science and Technology Literature Publishing House, Jun. 30, 1981.

Zang et al., Effects of Collagen Treatment on the Structure and Properties of Salt-Shrinked Filaments, Jiangsu Textile, No. 12, Dec. 31, 2008.

Hu et al., Study on the $Ca(NO_3)_2$ Modified Silk Fiber Treated with Chitosan, Silk Research and Technology, China Academic Journal Electronic Publishing House, Dec. 25, 2005.

Chen et al., Study on the Process of Calcium Nitrate Modifying of Mulberry Silk Knitted Fabrics, Journal of Textile Research, vol. 29, No. 1, China Academic Journal Electronic Publishing House, Jan. 15, 2008.

Zadow, G., "Modification of Whey and Whey Components," New Zealand Journal of Dairy Science and Technology, New Zealand Dairy Research Institute, 14(2):131-142, (Jan. 1979).

Herrán, R., et al., "Fabrication of electrospun fibers from a waterborne soy-based polyurethane employing polyethylene oxide as a coformer," (2020), Journal of Applied Polymer Science, 138: e49815.

* cited by examiner

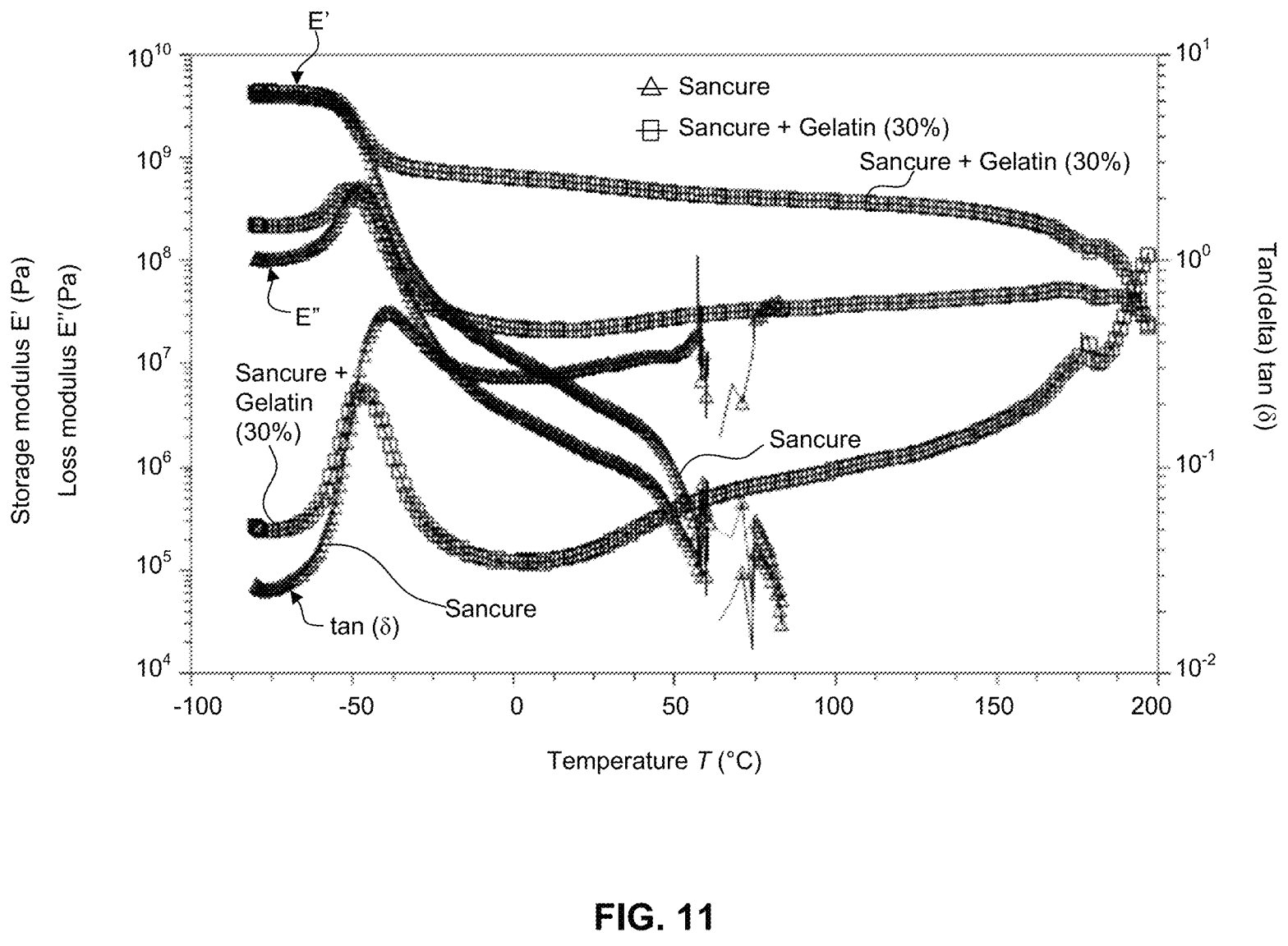

Tan(delta) tan (δ)

△ Sancure
⊞ Sancure + Gelatin (30%)

Sancure + Gelatin (30%)

Sancure + Gelatin (30%)

Sancure

E'

E"

Sancure + Gelatin (30%)

tan (δ)

Sancure

Temperature *T* (°C)

Loss modulus E" (Pa)

Storage modulus E' (Pa)

FIG. 11

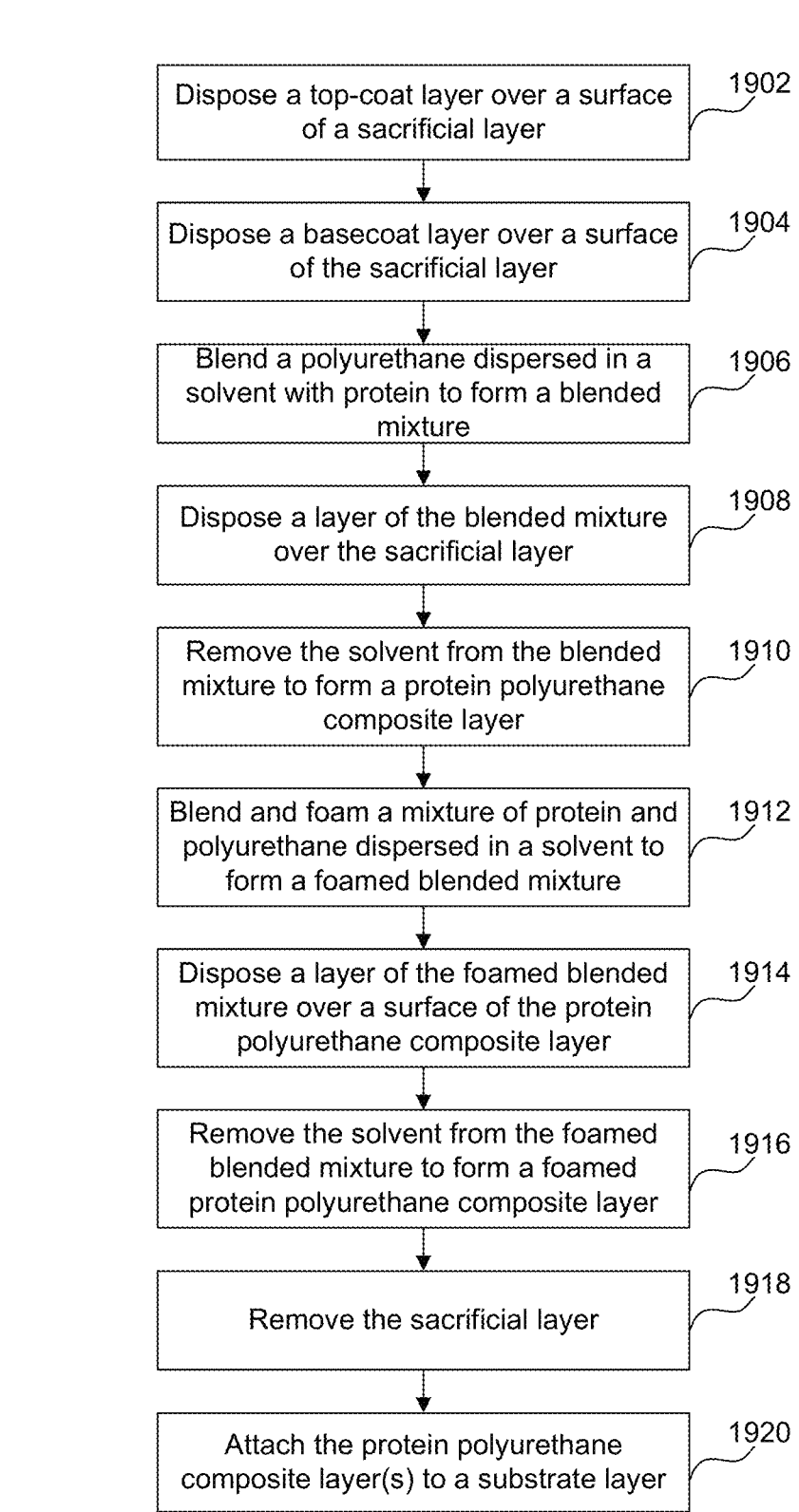

1900

Dispose a top-coat layer over a surface of a sacrificial layer — 1902

Dispose a basecoat layer over a surface of the sacrificial layer — 1904

Blend a polyurethane dispersed in a solvent with protein to form a blended mixture — 1906

Dispose a layer of the blended mixture over the sacrificial layer — 1908

Remove the solvent from the blended mixture to form a protein polyurethane composite layer — 1910

Blend and foam a mixture of protein and polyurethane dispersed in a solvent to form a foamed blended mixture — 1912

Dispose a layer of the foamed blended mixture over a surface of the protein polyurethane composite layer — 1914

Remove the solvent from the foamed blended mixture to form a foamed protein polyurethane composite layer — 1916

Remove the sacrificial layer — 1918

Attach the protein polyurethane composite layer(s) to a substrate layer — 1920

FIG. 19

PROTEIN POLYURETHANE ALLOYS AND LAYERED MATERIALS INCLUDING THE SAME

REFERENCE TO SEQUENCE LISTING SUBMITTED ELECTRONICALLY

The content of the electronically submitted sequence listing in ASCII text file (Name: 4431_0680004_Seqlisting_ST26.xml; Size: 2,930 bytes; and Date of Creation: Aug. 10, 2022) filed with the application is herein incorporated by reference in its entirety.

FIELD

This disclosure relates to protein polyurethane alloys comprising one or more proteins dissolved in a polyurethane. In particular embodiments, this disclosure relates to protein polyurethane alloys including one or more proteins dissolved only in the hard phase of a polyurethane. In some embodiments, the protein polymer alloys can have the look, feel, and aesthetic and/or mechanical properties similar to natural leather, and can be used to make goods and articles previously prepared from natural leather.

BACKGROUND

Leather is a versatile product used across many industries, including the furniture industry, where leather is regularly used as upholstery, the clothing industry, where leather is used to manufacture pants and jackets, the shoe industry, where leather is used to prepare casual and dress shoes, the luggage industry, the handbag and accessory industry, and in the automotive industry. The global trade value for leather is high, and there is a continuing and increasing demand for leather products. However, there are variety of costs, constraints, and social concerns associated with producing natural leather. Foremost, natural leathers are produced from animal skins, and as such, requires raising and slaughtering livestock. Raising livestock requires enormous amounts of feed, pastureland, water, and fossil fuels and contributes to air and waterway pollution, through, for example, greenhouse gases like methane. Leather production also raises social concerns related to the treatment of animals. In recent years, there has also been a fairly well documented decrease in the availability of traditional high quality hides. For at least these reasons, alternative means to meet the demand for leather are desirable.

BRIEF SUMMARY

The present disclosure provides protein polyurethane alloys suitable for use in a variety of applications, including as a replacement for natural leather.

A first embodiment (1) of the present disclosure is directed to a protein polyurethane alloy comprising a protein dissolved within a polyurethane, where the protein is a protein other than a soy protein.

In a second embodiment (2), the protein polyurethane alloy of the first embodiment (1) has a Dynamic Mechanical Analysis (DMA) tan(δ) peak at a temperature ranging from about −60° C. to about 30° C., and a second DMA modulus transition onset temperature ranging from about 120° C. to about 200° C.

In a third embodiment (3), the protein polyurethane alloy of the first embodiment (1) or the second embodiment (2) is transparent.

In a fourth embodiment (4), the polyurethane of the protein polyurethane alloy of any one of embodiments (1)-(3) has a Young's modulus in the absence of protein, and the protein polyurethane alloy has a Young's modulus ranging from about 10% to about 600% greater than the Young's modulus of the polyurethane in the absence of protein.

In a fifth embodiment (5), the polyurethane of the protein polyurethane alloy of any one of embodiments (1)-(3) has a Young's modulus in the absence of protein, and the protein polyurethane alloy has a Young's modulus ranging from about 40% to about 600% greater than the Young's modulus of the polyurethane in the absence of protein.

In a sixth embodiment (6), the polyurethane of the protein polyurethane alloy of any one of embodiments (1)-(5) has a Young's modulus in the absence of protein, and the protein polyurethane alloy has a Young's modulus ranging from about 10 MPa to about 350 MPa greater than the Young's modulus of the polyurethane in the absence of protein.

In a seventh embodiment (7), the polyurethane of the protein polyurethane alloy of any one of embodiments (1)-(5) has a Young's modulus in the absence of protein, and the protein polyurethane alloy has a Young's modulus ranging from about 25 MPa to about 350 MPa greater than the Young's modulus of the polyurethane in the absence of protein.

In an eighth embodiment (8), the polyurethane of the protein polyurethane alloy of any one of embodiments (1)-(5) has a Young's modulus in the absence of protein, and the protein polyurethane alloy has a Young's modulus ranging from about 100 MPa to about 350 MPa greater than the Young's modulus of the polyurethane in the absence of protein.

In a ninth embodiment (9), the protein polyurethane alloy of any one of embodiments (1)-(8) has a Young's modulus ranging from about 50 MPa to about 450 MPa.

In a tenth embodiment (10), the protein polyurethane alloy of any one of embodiments (1)-(8) has a Young's modulus ranging from about 75 MPa to about 450 MPa.

In an eleventh embodiment (11), the polyurethane of the protein polyurethane alloy of any one of embodiments (1)-(10) has a second DMA modulus transition onset temperature in the absence of protein, and the protein polyurethane alloy has a second DMA modulus transition onset temperature in degrees Celsius ranging from about 5% to about 70% greater than the second DMA modulus transition onset temperature of the polyurethane in the absence of protein.

In a twelfth embodiment (12), the polyurethane of the protein polyurethane alloy of any one of embodiments (1)-(10) has a second DMA modulus transition onset temperature in the absence of protein, and the protein polyurethane alloy has a second DMA modulus transition onset temperature in degrees Celsius ranging from about 15% to about 70% greater than the second DMA modulus transition onset temperature of the polyurethane in the absence of protein.

In a thirteenth embodiment (13), the polyurethane of the protein polyurethane alloy of any one of embodiments (1)-(12) has a second DMA modulus transition onset temperature in the absence of protein, and the protein polyurethane alloy has a second DMA modulus transition onset temperature ranging from about 5° C. to about 100° C. greater than the second DMA modulus transition onset temperature of the polyurethane in the absence of protein.

In a fourteenth embodiment (14), the polyurethane of the protein polyurethane alloy of any one of embodiments (1)-(12) has a second DMA modulus transition onset temperature in the absence of protein, and the protein polyurethane alloy has a second DMA modulus transition onset temperature ranging from about 20° C. to about 80° C. greater than the second DMA modulus transition onset temperature of the polyurethane in the absence of protein.

In a fifteenth embodiment (15), the polyurethane of the protein polyurethane alloy of any one of embodiments (1)-(12) has a second DMA modulus transition onset temperature in the absence of protein, and the protein polyurethane alloy has a second DMA modulus transition onset temperature ranging from about 40° C. to about 80° C. greater than the second DMA modulus transition onset temperature of the polyurethane in the absence of protein.

In a sixteenth embodiment (16), the protein polyurethane alloy of any one of embodiments (1)-(15) has a second DMA modulus transition onset temperature ranging from about 130° C. to about 200° C.

In a seventeenth embodiment (17), the protein polyurethane alloy of any one of embodiments (1)-(15) has a second DMA modulus transition onset temperature ranging from about 165° C. to about 200° C.

In an eighteenth embodiment (18), the protein of the protein polyurethane alloy of any one of embodiments (1)-(17) has an isoelectric point ranging from about 4 to about 5 and a lysine weight percent ranging from about 1 wt % to about 100 wt %.

In a nineteenth embodiment (19), the polyurethane of the protein polyurethane alloy of any one of embodiments (1)-(18) has a tensile strength in the absence of protein, and the protein polyurethane alloy has a tensile strength ranging from about 5% to about 55% greater than the tensile strength of the polyurethane in the absence of protein.

In a twentieth embodiment (20), the polyurethane of the protein polyurethane alloy of any one of embodiments (1)-(18) has a tensile strength in the absence of protein, and the protein polyurethane alloy has a tensile strength ranging from about 15% to about 55% greater than the tensile strength of the polyurethane in the absence of protein.

In a twenty-first embodiment (21), the polyurethane of the protein polyurethane alloy of any one of embodiments (1)-(20) has a tensile strength in the absence of protein, and the protein polyurethane alloy has a tensile strength ranging from about 2 MPa to about 8 MPa greater than the tensile strength of the polyurethane in the absence of protein.

In a twenty-second embodiment (22), the polyurethane of the protein polyurethane alloy of any one of embodiments (1)-(20) has a tensile strength in the absence of protein, and the protein polyurethane alloy has a tensile strength ranging from about 5 MPa to about 8 MPa greater than the tensile strength of the polyurethane in the absence of protein.

In a twenty-third embodiment (23), the protein polyurethane alloy of any one of embodiments (1)-(22) has a tensile strength ranging from about 7 MPa to about 21 MPa.

In a twenty-fourth embodiment (24), the protein polyurethane alloy of any one of embodiments (1)-(23) comprises about 10 wt % to about 50 wt % of the protein and about 50 wt % to about 90 wt % of the polyurethane.

In a twenty-fifth embodiment (25), the protein polyurethane alloy of any one of embodiments (1)-(23) comprises about 20 wt % to about 35 wt % of the protein and about 65 wt % to about 80 wt % of the polyurethane.

In a twenty-sixth embodiment (26), the protein of the protein polyurethane alloy of any one of embodiments (1)-(25) is a protein other than collagen.

In a twenty-seventh embodiment (27), the polyurethane of the protein polyurethane alloy of any one of embodiments (1)-(26) has a moisture vapor transmission rate in the absence of protein, and the protein polyurethane alloy has a moisture vapor transmission rate ranging from about 20% to about 600% greater than the moisture vapor transmission rate of the polyurethane in the absence of protein.

In a twenty-eighth embodiment (28), the polyurethane of the protein polyurethane alloy of any one of embodiments (1)-(27) has a moisture vapor transmission rate in the absence of protein, and the protein polyurethane alloy has a moisture vapor transmission rate ranging from about 30 $g/m^2/24$ hr to about 500 $g/m^2/24$ hr greater than the moisture vapor transmission rate of the polyurethane in the absence of protein.

In a twenty-ninth embodiment (29), the protein polyurethane alloy of any one of embodiments (1)-(28) has a moisture vapor transmission rate ranging from about 30 g/m2/24 hr to about 1000 $g/m^2/24$ hr.

A thirtieth embodiment (30) is directed to a soy protein polyurethane alloy comprising a soy protein dissolved within a polyurethane, where the soy protein polyurethane alloy has a Dynamic Mechanical Analysis (DMA) tan(6) peak at a temperature ranging from about −60° C. to about 30° C. and a second DMA modulus transition onset temperature ranging from about 130° C. to about 200° C.

In a thirty-first embodiment (31), the soy protein polyurethane alloy of the thirtieth embodiment (30) is transparent.

In a thirty-second embodiment (32), the polyurethane of the soy protein polyurethane alloy of the thirtieth embodiment (30) or the thirty-first embodiment (31) has a Young's modulus in the absence of soy protein, and the soy protein polyurethane alloy has a Young's modulus ranging from about 60% to about 570% greater than the Young's modulus of the polyurethane in the absence of soy protein.

In a thirty-third embodiment (33), the polyurethane of the soy protein polyurethane alloy of any one of embodiments (30)-(32) has a Young's modulus in the absence of soy protein, and the soy protein polyurethane alloy has a Young's modulus ranging from about 35 MPa to about 340 MPa greater than the Young's modulus of the polyurethane in the absence of soy protein.

In a thirty-fourth embodiment (34), the soy protein polyurethane alloy of any one of embodiments (30)-(33) has a Young's modulus ranging from about 90 MPa to about 400 MPa.

In a thirty-fifth embodiment (35), the polyurethane of the soy protein polyurethane alloy of any one of embodiments (30)-(34) has a second DMA modulus transition onset temperature in the absence of soy protein, and the second DMA modulus transition onset temperature of the soy protein polyurethane alloy ranges from about 15° C. to about 100° C. greater than the second DMA modulus transition onset temperature of the polyurethane in the absence of soy protein.

In a thirty-sixth embodiment (36), the polyurethane of the soy protein polyurethane alloy of any one of embodiments (30)-(35) has a tensile strength in the absence of soy protein, and the soy protein polyurethane alloy has a tensile strength ranging from about 10% to about 45% greater than the tensile strength of the polyurethane in the absence of soy protein.

In a thirty-seventh embodiment (37), the polyurethane of the soy protein polyurethane alloy of any one of embodiments (30)-(36) has a tensile strength in the absence of soy protein, and the soy protein polyurethane alloy has a tensile strength ranging from about 1.5 MPa to about 5.5 MPa greater than the tensile strength of the polyurethane in the absence of soy protein.

In thirty-eighth embodiment (38), the soy protein polyurethane alloy of any one of embodiments (30)-(37) has a tensile strength ranging from about 14 MPa to about 19 MPa.

In a thirty-ninth embodiment (39), the soy protein polyurethane alloy of any one of embodiments (30)-(38) comprises about 10 wt % to about 50 wt % of the soy protein and about 50 wt % to about 90 wt % of the polyurethane.

In a fortieth embodiment (40), the soy protein polyurethane alloy of any one of embodiments (30)-(38) comprises about 20 wt % to about 35 wt % of the soy protein and about 65 wt % to about 80 wt % of the polyurethane.

In a forty-first embodiment (41), the polyurethane of the soy protein polyurethane alloy of any one of embodiments (30)-(40) has a moisture vapor transmission rate in the absence of protein, and the soy protein polyurethane alloy has a moisture vapor transmission rate ranging from about 20% to about 600% greater than the moisture vapor transmission rate of the polyurethane in the absence of protein.

In a forty-second embodiment (42), the polyurethane of the soy protein polyurethane alloy of any one of embodiments (30)-(41) has a moisture vapor transmission rate in the absence of protein, and the soy protein polyurethane alloy has a moisture vapor transmission rate ranging from about 30 g/m$^2$/24 hr to about 500 g/m$^2$/24 hr greater than the moisture vapor transmission rate of the polyurethane in the absence of protein.

In a forty-third embodiment (43), the soy protein polyurethane alloy of any one of embodiments (30)-(42) has a moisture vapor transmission rate ranging from about 30 g/m$^2$/24 hr to about 1000 g/m$^2$/24 hr.

In a forty-fourth embodiment (44), the protein of the soy protein polyurethane alloy of any one of embodiments (30)-(43) is soy protein isolate.

In a forty-fifth embodiment (45), the protein of the soy protein polyurethane alloy of any one of embodiments (40)-(43) is a chemically modified soy protein isolate.

BRIEF DESCRIPTION OF THE FIGURES

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

FIG. 11 is a DMA thermogram comparing SANCURE™ 20025F polyurethane and a gelatin SANCURE™ 20025F polyurethane alloy according to some embodiments.

FIG. 19 is a block diagram illustrating a method for making a layered material according to some embodiments.

DETAILED DESCRIPTION

Figure 1:
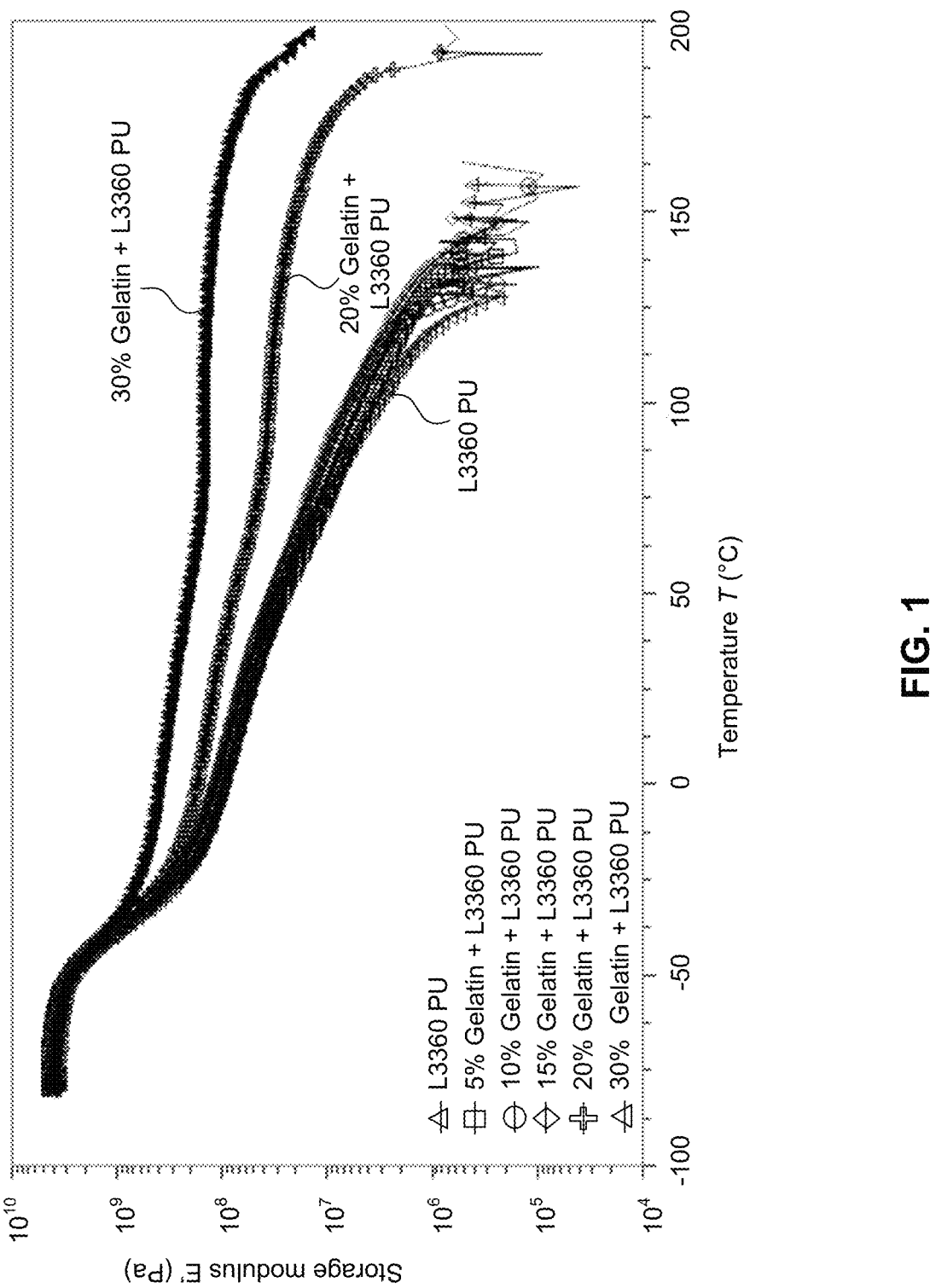
FIG. 1 is a dynamic mechanical analysis (DMA) graph of storage modulus versus temperature for various materials.

The indefinite articles "a," "an," and "the" include plural referents unless clearly contradicted or the context clearly dictates otherwise.

The term "comprising" is an open-ended transitional phrase. A list of elements following the transitional phrase "comprising" is a non-exclusive list, such that elements in addition to those specifically recited in the list can also be present. The phrase "consisting essentially of" limits the composition of a component to the specified materials and those that do not materially affect the basic and novel characteristic(s) of the component. The phrase "consisting of" limits the composition of a component to the specified materials and excludes any material not specified.

Where a range of numerical values comprising upper and lower values is recited herein, unless otherwise stated in specific circumstances, the range is intended to include the endpoints thereof, and all integers and fractions within the range. It is not intended that the disclosure or claims be limited to the specific values recited when defining a range. Further, when an amount, concentration, or other value or parameter is given as a range, one or more ranges, or as list of upper values and lower values, this is to be understood as specifically disclosing all ranges formed from any pair of any upper range limit or value and any lower range limit or value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" refers to a value that is within +10% of the value stated. For example, about 3 MPa can include any number between 2.7 MPa and 3.3 MPa.

As used herein, a first layer described as "attached to" a second layer means that the layers are attached to each other either by direct contact and attachment between the two layers or via one or more intermediate adhesive layers. An intermediate adhesive layer can be any layer that serves to attach a first layer to a second layer.

As used herein, the phrase "disposed on" means that a first component (e.g., layer) is in direct contact with a second component. A first component "disposed on" a second component can be deposited, formed, placed, or otherwise applied directly onto the second component. In other words, if a first component is disposed on a second component, there are no components between the first component and the second component.

As used herein, the phrase "disposed over" means other components (e.g., layers or substrates) may or may not be present between a first component and a second component.

As used herein, a "bio-based polyurethane" is a polyurethane where the building blocks of polyols, such as diols and diacids like succinic acid, are derived from a biological material such as corn starch.

As used herein, the term "substantially free of" means that a component is present in a detectable amount not exceeding about 0.1 wt %.

As used herein, the term "free of" means that a component is not present in a blend or material (e.g., a protein polyurethane alloy), even in trace amounts.

As used herein "collagen" refers to the family of at least 28 distinct naturally occurring collagen types including, but not limited to collagen types I, II, III, IV, V, VI, VII, VIII, IX, X, XI, XII, XIII, XIV, XV, XVI, XVII, XVIII, XIX, and XX. The term collagen as used herein also refers to collagen prepared using recombinant techniques. The term collagen includes collagen, collagen fragments, collagen-like proteins, triple helical collagen, alpha chains, monomers, gelatin, trimers and combinations thereof. Recombinant expression of collagen and collagen-like proteins is known in the art (see, e.g., Bell, EP 1232182B1, Bovine collagen and method for producing recombinant gelatin; Olsen, et al., U.S. Pat. No. 6,428,978 and VanHeerde, et al., U.S. Pat. No. 8,188,230, incorporated by reference herein in their entireties) Unless otherwise specified, collagen of any type, whether naturally occurring or prepared using recombinant techniques, can be used in any of the embodiments described herein. That said, in some embodiments, the collagen described herein can be prepared using bovine Type I collagen. Collagens are characterized by a repeating triplet of amino acids, -(Gly-X-Y)n-, so that approximately one-third of the amino acid residues in collagen are glycine. X is often proline and Y is often hydroxyproline. Thus, the structure of collagen may consist of three intertwined peptide chains of differing lengths. Different animals may produce different amino acid compositions of the collagen, which may result in different properties (and differences in the resulting leather).

In some embodiments, the collagen can be chemically modified to promote solubility in water.

Any type of collagen, truncated collagen, unmodified or post-translationally modified, or amino acid sequence-modified collagen can be used as part of the protein polyurethane alloy.

In some embodiments, the collagen can be plant-based collagen. For example, the collagen can be a plant-based collagen made by CollPlant.

In some embodiments, a collagen solution can be fibrillated into collagen fibrils. As used herein, collagen fibrils refer to nanofibers composed of tropocollagen or tropocollagen-like structures (which have a triple helical structure). In some embodiments, triple helical collagen can be fibrillated to form nanofibrils of collagen.

In some embodiments, a recombinant collagen can comprise a collagen fragment of the amino acid sequence of a native collagen molecule capable of forming tropocollagen (trimeric collagen). A recombinant collagen can also comprise a modified collagen or truncated collagen having an amino acid sequence at least 70, 80, 90, 95, 96, 97, 98, or 99% identical or similar to a native collagen amino acid sequence (or to a fibril forming region thereof or to a segment substantially comprising [Gly-X-Y]n). In some embodiments, the collagen fragment can be a 50 kDa portion of a native collagen. Native collagen sequences include the amino acid sequences of CollA1, CollA2, and Col3A1, described by Accession Nos. NP_001029211.1, NP_776945.1 and NP_001070299.1, which are incorporated by reference. In some embodiments, the collagen fragment can be a portion of human collagen alpha-1(III) (Col3A1; Uniprot #P02461, Entrez Gene ID #1281). In some embodiments, the collagen fragment can comprise the amino acid sequence listed as SEQ ID NO: 1.

Methods of producing recombinant collagen and recombinant collagen fragments are known in the art. For example, U.S. Pub. Nos. 2019/0002893, 2019/0040400, 2019/0093116, and 2019/0092838 provide methods for producing collagen and collagen fragments that can be used to produce the recombinant collagen and recombinant collagen fragments disclosed herein. The contents of these four publications are incorporated by reference in their entirety.

Protein polyurethane alloys described herein can comprise a protein that is miscible with only one of a plurality of phases of a polyurethane, or a plurality of polyurethanes, with which it is blended. For example, in some embodiments, the protein polyurethane alloy can include a protein that is miscible with only the hard phase of the polyurethane, or the plurality of polyurethanes, having both a hard phase and a soft phase. Protein polyurethane alloys described herein can be free of or substantially free of protein in form of particles dispersed in a polyurethane. For example, in some embodiments, the protein polyurethane alloys can be free of or substantially free of protein particles having an average diameter of greater than 1 micron (μm).

In some embodiments, the protein polyurethane alloys can be free of or substantially free of soy protein particles having an average diameter of greater than 1 micron (μm). In some embodiments, the protein polyurethane alloys can be free of or substantially free of collagen particles having an average diameter of greater than 1 micron (μm). In some embodiments, the protein polyurethane alloys can be free of or substantially free of gelatin particles having an average diameter of greater than 1 micron (μm). In some embodiments, the protein polyurethane alloys can be free of or substantially free of bovine serum albumin particles having an average diameter of greater than 1 micron (μm). In some embodiments, the protein polyurethane alloys can be free of or substantially free of pea protein particles having an average diameter of greater than 1 micron (μm). In some embodiments, the protein polyurethane alloys can be free of or substantially free of egg white albumin particles having an average diameter of greater than 1 micron (μm). In some embodiments, the protein polyurethane alloys can be free of or substantially free of casein protein particles having an average diameter of greater than 1 micron (μm). In some embodiments, the protein polyurethane alloys can be free of or substantially free of peanut protein particles having an average diameter of greater than 1 micron (μm). In some embodiments, the protein polyurethane alloys can be free of or substantially free of edestin protein particles having an average diameter of greater than 1 micron (μm). In some embodiments, the protein polyurethane alloys can be free of or substantially free of whey protein particles having an average diameter of greater than 1 micron (μm) In some embodiments, the protein polyurethane alloys can be free of or substantially free of karanja protein particles having an average diameter of greater than 1 micron (μm). In some embodiments, the protein polyurethane alloys can be free of, or substantially free of, cellulase particles having an average diameter of greater than 1 micron (μm). In some embodiments, the protein polyurethane alloys can be free of, or substantially free of, recombinant collagen fragment particles having an average diameter of greater than 1 micron (μm).

In particular embodiments, the present disclosure provides a unique combination of a protein and a polyurethane in which the protein is dissolved in only the hard phase of the polyurethane. The present disclosure also provides methods of making the protein polyurethane alloys described herein. The present disclosure also provides layered materials including one or more of the protein polyurethane alloy layers and methods of making the layered materials. The protein polyurethane alloys and the protein polyurethane alloy layers can include one or more types of protein and one or more polyurethanes.

Proteins suitable for use in the alloys disclosed herein can be un-modified or chemically modified. In some embodiments, the protein can be modified to facilitate miscibility of the protein with the hard phase of the polyurethane. In some embodiments, the protein can be chemically modified to promote solubility in water. In such embodiments, the chemical modification to promote solubility in water can facilitate miscibility of the protein with the hard phase of the polyurethane. In some embodiments, the chemically modified protein can be a partially hydrolyzed protein. In some embodiments, the chemically modified protein can be a protein modified by covalent attachment of hydrophilic polymer chains, such as polyethylene glycol (PEG) chains, to the protein.

Suitable polyurethanes for use in the protein polyurethane alloys described herein include those that comprise at least two phases including a "soft phase" and a "hard phase." The soft phase is formed from polyol segments within the polyurethane that separate from the urethane-containing phase due to differences in polarity. The urethane-containing phase is referred to as the hard phase. This phase separation is well known in the art and is the basis of the many of the properties of polyurethanes.

The soft phase is typically elastomeric at room temperature, and typically has a softening point or glass transition temperature (Tg) below room temperature. The Tg can be measured by Dynamic Mechanical Analysis (DMA) and quantified by either the peak of tan(S) or the onset of the drop in storage modulus. Alternately, Tg can be measured by Differential Scanning Calorimetry (DSC). In some cases, there can be crystallinity in the soft phase, which can be seen as a melting point, typically between 0° C. and about 60° C. For example, the peak in the tan(S) curve at about 35° C. for UD-108 polyurethane in FIG. 13 indicates crystallinity in the soft phase of the polyurethane.

The hard phase typically has a Tg or melting point above room temperature, more typically above about 80° C. The softening of the hard phase can be measured by measuring the onset of the drop in storage modulus (sometimes referred to as stiffness) as measured by DMA.

The "soft phase" for the polyurethane or the protein polyurethane alloy including the polyurethane comprises the polyol component of the polyurethane. Its function is to be soft and flexible at temperatures above its Tg to lend toughness, elongation, and flexibility to the polyurethane. Typical soft segments can comprise polyether polyols, polyester polyols, polycarbonate polyols, and mixtures thereof. They typically range in molecular weight from about 250 daltons to greater than about 5 kiloDaltons. The "hard phase" for the polyurethane or the protein polyurethane alloy including the polyurethane comprises the urethane segments of the polymer that are imparted by the isocyanate(s) used to connect the polyols along with short chain diols such as butane diol, propane diol, and the like. Typical isocyanates useful for the present polyurethanes include, but are not limited to, hexamethylene diisocyanate, isophorone diisocyanate, methylene diisocyanate, phenyl diisocyanate, and the like. These molecules are more polar and stiffer than the polyols used to make the soft segment. Therefore, the hard segment is stiffer and has a higher softening point compared to the soft segment. The function of the hard phase is to provide, among other properties, strength, temperature resistance, and abrasion resistance to the polyurethane.

In some embodiments described herein, the protein can be miscible with only the hard phase, leaving soft phase transitions substantially unaltered. Without wishing to be bound particular theory, it is believed that when the protein is dissolved in the hard phase, it significantly increases the temperature at which the hard phase begins to soften, thus increasing the temperature resistance of the alloy described herein. Protein polyurethane alloys described herein can also have increased stiffness and increased strength relative to the base polyurethane (i.e., the polyurethane by itself, in the absence of protein).

Protein polyurethane alloys and layers described herein can be formed by blending one or more proteins with one or more water-borne polyurethane dispersions in a liquid state and drying the blend. In some embodiments, the protein polyurethane alloys and layers described herein can be formed by blending one or more proteins dissolved or dispersed in an aqueous solution with one or more waterborne polyurethane dispersions in a liquid state and drying the blend. In some embodiments, the polyurethane dispersion can be ionic, and either anionic or cationic. In some embodiments, the polyurethane dispersion can be nonionic. In some embodiments, the blended protein and polyurethane can be formed into a sheet and can, in certain embodiments, be attached to a substrate layer using a suitable attachment process, such as direct coating, a lamination process or a thermo-molding process. In certain embodiments, the lamination process can include attaching the sheet to the substrate layer using an adhesive layer. In some embodiments, the blended protein and polyurethane can be coated or otherwise deposited over a substrate layer to attach the blended protein and polyurethane to the substrate layer. In some embodiments, attaching the blended protein and polyurethane to the substrate layer can result in a portion of the blended protein and polyurethane being integrated into a portion of the substrate layer.

In a protein polyurethane alloy including one or more miscible proteins and polyurethanes, the one or more proteins can be dissolved within the hard phase of the one or more polyurethanes. The protein polyurethane alloy can include at least one protein miscible with the hard phase of one or more polyurethanes in the alloy. In some embodiments, the protein polyurethane alloy can include a plurality of proteins and/or a plurality of polyurethane hard phases that are miscible with each other. In all of these embodiments, and without wishing to be bound by a particular theory, the protein, or plurality of proteins, is believed to be dissolved in the hard phase of the polyurethane, or plurality of polyurethanes.

One or more proteins dissolved within the hard phase of one or more polyurethanes can form a homogenous mixture when blended. In some embodiments, the protein polyurethane alloy can include a plurality of proteins dissolved within or more polyurethanes such that the proteins and the polyurethane(s) form a homogenous mixture when blended and dried. Typically, the protein polyurethane alloy including a homogenous mixture of protein and polyurethane does not include a substantial amount of protein not dissolved in the polyurethane. That said, and in some embodiments, the protein polyurethane alloy can include a fraction of protein dispersed within the polyurethane.

In embodiments described herein, the miscibility of the protein with the hard phase of the polyurethane can increase the DMA modulus transition softening onset temperature of the hard phase in a protein polyurethane alloy without significantly changing one or more other thermo-mechanical properties of the alloy relative to the thermo-mechanical properties of the polyurethane by itself. For example, the miscibility of the protein with the hard phase of the polyurethane can increase the DMA modulus transition onset temperature of the hard phase in the protein polyurethane alloy without significantly changing the DMA transition temperature of the soft phase in the alloy relative to the DMA transition temperature of the soft phase of the polyurethane by itself.

The DMA transition temperature of the soft phase can be referred to as the glass transition temperature (Tg) of a polyurethane or the protein polyurethane alloy. The DMA transition temperature of the soft phase, or Tg, can be quantified as (i) the DMA storage modulus transition onset temperature of the soft phase (referred to herein as the "first DMA modulus transition onset temperature") or (ii) the DMA tan(δ) peak temperature corresponding to the soft phase. The DMA transition temperature of the hard phase can be measured by the onset of the drop in the storage modulus of the polyurethane or the polyurethane protein alloy and can be quantified as the DMA modulus transition onset temperature of the hard phase (referred to herein as the "second DMA modulus transition onset temperature"). In some embodiments, the second DMA modulus transition onset temperature of the protein polyurethane alloy can be above about 80° C. or above about 130° C.

Although many types of proteins are contemplated for use in the protein polyurethane alloys described herein including, for example, collagen and soy proteins, it is understood that for all of the embodiments disclosed herein, the protein can be a protein other than collagen and/or a protein other than a soy protein. Thus, in some embodiments, the protein dissolved in the protein polyurethane alloy can be a protein other than collagen. In other embodiments, the protein dissolved in the protein polyurethane alloy can be a protein other than a soy protein. In some embodiments, the protein dissolved in the protein polyurethane alloy can be a protein other than collagen and a protein other than a soy protein. In some embodiments, the protein polyurethane alloy can be free of or substantially free of collagen. In some embodiments, the protein polyurethane alloy can be free of or substantially free of soy protein. In some embodiments, the protein polyurethane alloy can be free of or substantially free of soy protein and collagen.

As previously discussed, the soft phase and the hard phase of the polyurethane can be measured using Dynamic Mechanical Analysis (DMA). Accordingly, the one or more polyurethanes included in the protein polyurethane alloys described herein can have at least two DMA transition temperatures, one corresponding to the soft phase and one corresponding to the hard phase. The DMA transition temperature of the soft phase can be quantified as a "first DMA modulus transition onset temperature" or DMA tan(S) peak temperature corresponding to the soft phase. The DMA transition temperature of the hard phase can be quantified by a "second DMA modulus transition onset temperature." The first DMA modulus transition onset temperature or a DMA tan(S) peak temperature is a lower DMA transition temperature and the second DMA modulus transition onset temperature is a higher DMA transition temperature.

Similarly, the protein polyurethane alloys described herein can have at least two phases. The at least two phases can include the soft phase and the hard phase. Different phases of the alloys can be measured and quantified in the same manner as described above for the polyurethanes.

The polyurethane or the protein polyurethane alloy having first and second DMA transition temperatures means that it has a first DMA transition temperature that occurs at a lower temperature than the second DMA transition temperature. However, the first and second transition temperatures need not be sequential transition temperatures. Other DMA transition temperatures could occur between the first and second transitions.

In some embodiments, the first DMA modulus transition onset temperature for a polyurethane can be below 30° C. In some embodiments, the first DMA modulus transition onset temperature for a polyurethane can range from about −65° C. to about 30° C., including subranges. For example, in some embodiments, the first DMA modulus transition onset temperature for a polyurethane can be about −65° C., about −60° C., about −55° C., about −50° C., about −45° C., about −40° C., about −35° C., about −30° C., about −25° C., about −20° C., about −15° C., about −10° C., about −5° C., about −1° C., 0° C., about 1° C., about 5° C., about 10° C., about 15° C., about 20° C., about 25° C., or about 30° C., or within a range having any two of these values as endpoints, inclusive of the endpoints. In some embodiments, the first DMA modulus transition onset temperature of a polyurethane can be about −65° C. to about 30° C., about −65° C. to about 25° C., about −65° C. to about 20° C., about −65° C. to about 15° C., about −65° C. to about 10° C., about −65° C. to about 5° C., about −65° C. to about 1° C., about −65° C. to 0° C., about −65° C. to about −1° C., about −65° C. to about −5° C., about −65° C. to about −10° C., about −65° C. to about −15° C., about −65° C. to about −20° C., about −65° C. to about −25° C., about −65° C. to about −30° C., about −65° C. to about −35° C., about −65° C. to about −35° C., about −65° C. to about −40° C., or about −65° C. to about −45° C.

FIGS. 9-15 show DMA thermograms for various exemplary polyurethanes. The first DMA modulus transition onset temperature (Tonseti) for each exemplary polyurethane is the temperature at which the slope of the storage modulus (E') curve begins to decrease significantly for a first time. The methodology of measuring this value is exemplified in FIG. 16. DMA equipment, such a DMA-850 from TA Instruments, can be programed to calculate this temperature automatically. Table 4 lists the first DMA modulus transition onset temperatures automatically calculated from the DMA graphs in FIGS. 9-15 (see Example Nos. 1-7).

In some embodiments, the DMA tan(S) peak temperature corresponding to the soft phase of a polyurethane can be below 30° C. In some embodiments, the DMA tan(S) peak temperature corresponding to the soft phase of a polyurethane can range from about −60° C. to about 30° C., including subranges. For example, in some embodiments, the DMA tan(S) peak temperature corresponding to the soft phase of a polyurethane can be about −60° C., about −55° C., about −50° C., about −45° C., about −40° C., about −35° C., about −30° C., about −25° C., about −20° C., about −15° C., about −10° C., about −5° C., about −1° C., 0° C., about 1° C., about 5° C., about 10° C., about 15° C., about 20° C., about 25° C., or about 30° C., or within a range having any two of these values as endpoints, inclusive of the endpoints. In some embodiments, the DMA tan(S) peak temperature corresponding to the soft phase of a polyurethane can be about −60° C. to about 30° C., about −60° C. to about 25° C., about −60° C. to about 20° C., about −60° C. to about 15° C., about −60° C. to about 10° C., about −60° C. to about 5° C., about −60° C. to about 1° C. about −60° C. to 0° C., about −60° C. to about −1° C., about −60° C. to about −5° C., about −60° C. to about −10° C., about −60° C. to about −15° C., about −60° C. to about −20° C., about −60° C. to about −25° C., about −60° C. to about −30° C., about −60° C. to about −35° C., or about −60° C. to about −40° C.

The DMA thermograms in FIGS. 9-15 show the DMA tan(S) peak temperature corresponding to the soft phase for various exemplary polyurethanes. Like DMA modulus transition onset temperatures, DMA equipment, such a DMA-850 from TA Instruments, can be programed to calculate this temperature automatically. Table 4 lists the DMA tan(S) peak temperature automatically calculated from the DMA graphs in FIGS. 9-15 (see Example Nos. 1-7).

In some embodiments, the second DMA modulus transition onset temperature for a polyurethane can be above 30° C. In some embodiments, the second DMA modulus transition onset temperature for a polyurethane can range from about 45° C. to about 165° C. For example, in some embodiments, the second DMA modulus transition onset temperature for a polyurethane can be about 45° C., about 50° C., about 55° C., about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., about 150° C., about 155° C., about 160° C., or about 165° C., or within any range having any two of these values as endpoints, inclusive of the endpoints. In some embodiments, the second DMA modulus transition onset temperature for a polyurethane can be about 45° C. to about 165° C., about 50° C. to about 160° C., about 55° C. to about 155° C., about 60° C. to about 150° C., about 65° C. to about 145° C., about 70° C. to about 140° C., about 75° C. to about 135° C., about 80° C. to about 130° C., about 85° C. to about 125° C., about 90° C. to about 120° C., about 95° C. to about 115° C., or about 100° C. to about 110° C.

The DMA thermograms in FIGS. 9-15 show the second DMA modulus transition onset temperatures for various exemplary polyurethanes. The second DMA modulus transition onset temperature ($T_{onset2}$) for each exemplary polyurethane is the temperature at which the slope of the storage modulus (E') curve begins decrease significantly for a second time. The methodology of measuring this value is exemplified in FIG. 16. DMA equipment, such a DMA-850 from TA Instruments, can be programed to calculate this temperature automatically. Table 3 lists the second DMA modulus transition onset temperatures automatically calculated from the DMA graphs in FIGS. 9-15 (see Example Nos. 1-7).

In some embodiments, the polyurethane can exhibit crystallinity in the soft phase. This is common in polyether soft segments containing polytetramethylene glycol and some polyester polyols. In such embodiments, the polyurethane can exhibit at least three transitions: the Tg of the soft phase, the melting point of the soft phase, and the modulus transition of the hard phase. Such melting in the soft phase typically occurs between 0° C. and about 60° C., when present. In embodiments exhibiting crystallinity in the soft phase, the protein polyurethane alloy will typically still exhibit the melting in the soft phase because the protein is miscible with the hard phase, leaving the mechanical properties of the soft phase substantially unchanged.

In typical embodiments described herein, the protein polyurethane alloy can have a second DMA modulus transition onset temperature higher than the second DMA modulus transition temperature of the polyurethane in absence of protein (i.e., the polyurethane by itself). It is believed that this increase in the second DMA modulus transition onset temperature in the alloy is due to the miscibility of the protein and the hard phase of the polyurethane. This selective miscibility of the protein is indicated by an increase in the second DMA modulus transition onset temperature without a similar increase in DMA transition temperature of the soft phase (quantified by a first DMA modulus transition onset temperature or the DMA tan(S) peak temperature corresponding to the soft phase). This selective miscibility can be utilized to control properties of the protein polyurethane alloy, for example mechanical and thermal properties.

In some embodiments, the protein polyurethane alloys and/or the layered materials described herein can have a look and feel, as well as mechanical properties, similar to natural leather. For example, the protein polyurethane alloy layer or the layered material including the protein polyurethane alloy layer can have, among other things, haptic properties, aesthetic properties, mechanical/performance properties, manufacturability properties, and/or thermal properties similar to natural leather. Mechanical/performance properties that can be similar to natural leather include, but are not limited to, tensile strength, tear strength, elongation at break, resistance to abrasion, internal cohesion, water resistance, breathability (quantified in some embodiments by a moisture vapor transmission rate measurement), and the ability to be dyed with reactive dyes and to retain color when rubbed (color fastness). Haptic properties that can be similar to natural leather include, but are not limited to, softness, rigidity, coefficient of friction, and compression modulus. Aesthetic properties that can be similar to natural leather include, but are not limited to, dyeability, embossability, aging, color, color depth, and color patterns. Manufacturing properties that can be similar to natural leather include, but are not limited to, the ability to be stitched, cut, skived, and split. Thermal properties that can be similar to natural leather include, but are not limited to, heat resistance and resistance to stiffening or softening over a significantly wide temperature range, for example 25° C. to 100° C.

Desirable properties for the protein polyurethane alloy described herein, include but are not limited to, optical properties, haptic properties, aesthetic properties, thermal properties, mechanical properties, and/or breathability properties. Exemplary thermal properties include heat resistance and resistance to melting, and can be quantified by, for example, measuring the second modulus transition onset temperature ($T_{onset2}$) of a material. Exemplary mechanical properties include abrasion resistance, maximum tensile stress (also referred to as "tensile strength"), and Young's modulus. Unless otherwise specified, maximum tensile stress values and Young's modulus values disclosed herein are measured according the methods provided by ASTM D638. Exemplary breathability properties include moisture vapor transmission rate (MVTR) measured in $g/m^2/24$ hr (grams per meters squared per 24 hours). Unless otherwise specified, moisture vapor transmission rates disclosed herein are measured according to the methods provided by ASTM E96—Method B.

In some embodiments, the protein polyurethane alloy can be transparent. In some embodiments, a transparent protein polyurethane alloy can indicate that the protein is miscible with the hard phase of the polyurethane in the alloy. As used herein, a "transparent" material means material having an opacity of about 50% or less. Opacity is measured by placing a sample of material over a white background to measure the Y tristimulus value ("Over white Y") in reflectance with a spectrometer using the D65 10 degree illuminant. The same sample is then placed over a black background and the measurement is repeated, yielding "Over black Y". Percent opacity is calculated as "Over black Y" divided by "Over white Y" times 100. 100% opacity is defined as lowest transparency and 0% opacity is defined as the highest transparency.

In some embodiments, the protein polyurethane alloy can be transparent and can have an opacity ranging from 0% to about 50%, including subranges. For example, the transparent protein polyurethane alloy, can have an opacity ranging from 0% to about 40%, 0% to about 30%, 0% to about 20%, 0% to about 10%, or 0% to about 5%. The transparency of the protein polyurethane alloy is evaluated before dying or otherwise coloring the protein polyurethane alloy.

A transparent protein polyurethane alloy can be created by selecting and blending the appropriate combination of one or more proteins and one or more polyurethanes. While not all combinations of protein and polyurethane will result in a transparent protein polyurethane alloy, it is within the skill of the ordinarily skilled artisan to identify whether a given blend results in a transparent protein polyurethane alloy in view of this disclosure. In embodiments directed to a layered material including a transparent protein polyurethane alloy layer described herein, the transparent protein polyurethane alloy layer can provide unique characteristics for the layered material. For example, compared to a non-transparent layer, the transparent protein polyurethane alloy layer can provide unique depth of color when dyed. Likewise, the transparent protein polyurethane alloy layer can provide its mechanical properties to the layered material without significantly influencing the aesthetic properties of the material.

In some embodiments, the protein polyurethane alloy can include one or more coloring agents. In some embodiments, the coloring agent can be a dye, for example a fiber reactive dye, a direct dye, or a natural dye. Exemplary dyes, include but are not limited to, Azo structure acid dyes, metal complex structure acid dyes, anthraquinone structure acid dyes, and azo/diazo direct dyes. In some embodiments, the coloring agent can be pigment, for example a lake pigment.

Suitable polyurethanes for blending with one or more proteins according to embodiments described herein include, but are not limited to, aliphatic polyurethanes, aromatic polyurethanes, bio-based polyurethanes, or acrylic acid modified polyurethanes. Suitable polyurethanes are commercially available from manufacturers including Lubrizol, Hauthaway, Stahl, and the like. In some embodiments, a polyurethane for a protein polyurethane alloy can be bio-polyurethane. In some embodiments, the polyurethane is a water-dispersible polyurethane. In some embodiments, the polyurethane can be a polyester polyurethane. In some embodiments, the polyurethane can be a polyether polyurethane. In some embodiments, the polyurethane can be a polycarbonate-based polyurethane. In some embodiments, the polyurethane can be an aliphatic polyester polyurethane. In some embodiments, the polyurethane can be an aliphatic polyether polyurethane. In some embodiments, the polyurethane can be an aliphatic polycarbonate polyurethane. In some embodiments, the polyurethane can be an aromatic polyester polyurethane. In some embodiments, the polyurethane can be an aromatic polyether polyurethane. In some embodiments, the polyurethane can be an aromatic polycarbonate polyurethane.

In some embodiments, the polyurethane can have a soft segment selected from the group consisting of: polyether polyols, polyester polyols, polycarbonate polyols, and mixtures thereof. In some embodiments, the polyurethane can have a hard segment comprising diisocyanates and optionally short chain diols. Suitable diisocyanates can be selected from the group consisting of: aliphatic diicocyanates such as hexamethylene diisocyanate, isophorone diisocyanate; aromatic diisocyanates such as 4,4' diphenyl methylene diisocyanate, toluene diisocyanate, phenyl diisocyanate, and mixtures thereof. Suitable short chain diols include ethylene glycol, propane diol, butane diol, 2,2 methyl 1,3 propane diol, pentane diol, hexane diol and mixtures thereof. In some embodiments crosslinkers such as multifunctional alcohols, for example, trimethylol propane triol, or diamines such as ethylene diamine or 4,4' diamino, diphenyl diamine.

Exemplary commercial polyurethanes, include but are not limited to L3360 and Hauthane HD-2001 available from C. L. Hauthaway & Sons Corporation, SANCURE™ polyurethanes available from Lubrizol Corporation, BONDTHANE™ polyurethanes, for example UD-108, UD-250, and UD-303 available from Bond Polymers International, and EPOTAL® ECO 3702 and EPOTAL® P100 ECO from BASF. L3360 is a aliphatic polyester polyurethane polymer aqueous dispersion having a 35% solids content, a viscosity of 50 to 500 cps (centipoise), and a density of about 8.5 lb/gal (pounds per gallon). HD-2001 is an aliphatic polyester polyurethane polymer aqueous disperson having a 40% solids content, a viscosity of 50 to 500 cps, and a density of about 8.9 lb/gal. BONDTHANE™ UD-108 is an aliphatic polyether polyurethane polymer aqueous dispersion having a 33% solids content, a viscosity of 300 cps, and a density of 8.7 lb/gal. BONDTHANE™ UD-250 is an aliphatic polyester polyurethane polymer aqueous dispersion having a 35% solids content, a viscosity of 200 cps, and a density of 8.8 lb/gal. BONDTHANE™ UD-303 is an aliphatic polyether polyurethane polymer aqueous dispersion having a 35% solids content, a viscosity of less than 500 cps, and a density of 8.7 lb/gal. EPTOAL® P100 ECO is a polyester polyurethane elastomer aqueous dispersion having approximately 40% solids and a viscosity of about 40 mPas.

Exemplary bio-based polyurethanes include, but are not limited to, L3360 available from C. L. Hauthaway & Sons Corporation, IMPRANIL® Eco DLS, IMPRANIL® Eco DL 519, IMPRANIL® Eco DLP-R, and IMPRAPERM®® DL 5249 available from Covestro. IMPRANIL® Eco DLS is an anionic, aliphatic polyester polyurethane polymer aqueous dispersion having approximately 50% solids content, a viscosity of less than 1,200 MPa s, and a density of about 1.1 g/cc. IMPRANIL® Eco DL 519 is an anionic, aliphatic polyester polyurethane polymer aqueous dispersion. IMPRANIL® Eco DLP-R is an anionic, aliphatic polyester polyurethane polymer aqueous dispersion. IMPRAPERM® DL 5249 is an anionic aliphatic polyester-polyurethane polymer aqueous dispersion.

In some embodiments, the polyurethane can include reactive groups that can be crosslinked with a protein. Exemplary reactive groups include, but are not limited to, a sulfonate, an aldehyde, a carboxylic acid or ester, a blocked isocyanate, or the like, and combinations thereof. In such embodiments, the polyurethane can be crosslinked to the protein in the protein polyurethane alloy through the reaction of a reactive group on the protein with the reactive group present in the polyurethane.

Suitable proteins for blending with one or more polyurethanes according to embodiments described herein include, but are not limited to, collagen, gelatin, bovine serum albumin (BSA), soy proteins, pea protein, egg white albumin, casein, peanut protein, edestin protein, whey protein, karanja protein, and cellulase. Suitable collagens include, but are not limited to, recombinant collagen (r-Collagen), a recombinant collagen fragment, and extracted collagens. Suitable soy proteins include, but are not limited to, soy protein isolate (SPI), soymeal protein, and soy protein derivatives. In some embodiments, the soy protein isolate can be partially hydrolyzed soy protein isolate. Suitable pea proteins include, but are not limited to, pea protein isolate, and pea protein derivatives. In some embodiments, the pea protein isolate can be partially hydrolyzed pea protein isolate.

Table 1 below lists some exemplary proteins and properties of the proteins. The gelatin is gelatin from porcine skin, Type A (Sigma Aldrich G2500). The collagen is extracted bovine collagen purchased from Wuxi BIOT Biology-technology Company. The bovine serum albumin Sigma Aldrich 5470 bovine serum albumin. The r-Collagen is recombinant collagen from Modern Meadow. The soy protein isolate is soy protein isolate purchased from MP Medicals (IC90545625). The pea protein is pea protein powder purchased from Bobs Red Mills (MTX5232). The egg white albumin protein is albumin from chicken egg white (Sigma Aldrich A5253). The casein protein is casein from bovine milk (Sigma Aldrich C7078). The peanut protein is peanut protein powder purchased from Tru-Nut. The whey protein is whey from bovine milk (Sigma Aldrich W1500). Other suitable soy protein isolates include, but are not limited to, soy protein isolate purchased from AMD (Clarisoy 100, 110, 150, 170, 180), or DuPont (SUPRO® XT 55, SUPRO® XT 221D, and SOBIND® Balance). Other suitable pea protein powders include, but are not limited to, pea protein powder purchased from Puris (870 and 870H).

Karanja protein is a protein found in Karanja seeds harvested from *Pongamia pinnata* trees (also known as *Pongamia glabra* trees). See Rahman, M M., and Netravali, "Green Resin from Forestry Waste Residue 'Karanja (*Pongamia pinnata*) Seed Cake' for Biobased Composite Structures," ACS Sustainable Chem. Eng., 2: 2318-2328 (2014); see also Mandal et al., "Nutritional Evaluation of Proteins from three Non-traditional Seeds with or without Amino Acids Supplementation in Albino Rats," Proc. Indian natn. Sci. Acad., B50, No. 1, 48-56 (1984). The protein can be extracted from Karanja seeds using a solvent extraction process. Id. In some embodiments, the karanja protein can be karanja protein isolate. In such embodiments, karanja protein isolate can be obtained by alkaline extraction and acid precipitation of defatted karanja seed cake. See Rahman, M M., and Netravali, "Green Resin from Forestry Waste Residue 'Karanja (*Pongamia pinnata*) Seed Cake' for Biobased Composite Structures," ACS Sustainable Chem. Eng., 2: 2318-2328 (2014).

Suitable cellulase proteins are listed below in Table 1. The "Cellulase-RG" protein is Native *Trichoderma* sp. Cellulase available from CREATIVE ENZYMES®. The "Cellulase-IG" protein is laboratory grade cellulase available from Carolina Biological Supply Company.

The 50 KDa recombinant collagen fragment (50 KDa r-Collagen fragment) in Table 1 is a collagen fragment comprising the amino acid sequence listed as SEQ ID NO: 1.

The "dissolution method" listed in Table 1 is an exemplary aqueous solvent in which the protein can be dissolved in a solution that is miscible with the hard phase of the polyurethane as described herein. Proteins that can be at least partly dissolved in an aqueous solution are suitable for forming protein polyurethane alloys with polyurethane dispersions.

TABLE 1

| | | | | | Amino Acid Comp.: | |
| Protein Name | Protein Source | Dissolution Method | Molecular Weight | Isoelectric Point | Lysine (g/100 g) | Protein Thermostability up to 200° C. |
|---|---|---|---|---|---|---|
| | | | Example Proteins | | | |
| Gelatin | Porcine | Water | ~100 KDa | ~4.8 | 2.6 | Yes |
| Collagen | Bovine | Water | ~120 KDa | — | 2.2 | — |
| BSA (Bovine Serum Albumin) | Bovine | Water | ~66 KDa | ~4.7 | 11.98 | — |

TABLE 1-continued

Example Proteins

| Protein Name | Protein Source | Dissolution Method | Molecular Weight | Isoelectric Point | Amino Acid Comp.: Lysine (g/100 g) | Protein Thermostability up to 200° C. |
|---|---|---|---|---|---|---|
| r-Collagen | Yeast | Water | ~100 KDa | — | 3.6 | — |
| Soy protein isolate | Soy | Water + NaOH | ~30 to 60 KDa | ~4.0 to 5.0 | 5.6 | Yes |
| Pea Protein | Pea | Water + NaOH | ~ 60 to 80 KDa | ~4.5 | 7.6 | Yes |
| Egg White Albumin | Chicken Egg | Water | ~40 KDa | ~4.8 | 5.7 | Yes |
| Casein | Bovine Milk | Water + NaOH | ~24 KDa | ~4.6 | 7.4 | — |
| Peanut Protein | Peanut | Water + NaOH | ~60 KDa | ~4.5 | 2.5 | Yes |
| Whey | Bovine Milk | Water | ~18 KDa | ~4.5 to 5.2 | 9.7 | No |
| Karanja protein isolate | Karanja Seed | Water | — | — | 14.6 | — |
| 50 KDa r-Collagen fragment | Yeast | Water | ~50 KDa | ~9.3 | 3.9 | — |
| Cellulase-RG | Trichoderma reesei | Water | ~20 to 90 KDa | ~4.6 to 6.9 | — | — |
| Cellulase-IG | Trichoderma reesei | Water | — | — | — | — |

In some embodiments, the protein can have one or more of the following properties: (i) a molecular weight within a range described herein (ii) an isoelectric point within a range described below, (iii) an amino acid composition measured in grams of lysine per 100 grams of protein in a range described below, and (iv) protein thermo-stability up to 200° C.

Protein Molecular Weight

In some embodiments, the protein can have a molecular weight ranging from about 1 KDa (kilodaltons) to about 700 KDa, including subranges. For example, the protein can have a molecular weight ranging from about 1 KDa to about 700 KDa, about 10 KDa to about 700 KDa, about 20 KDa to about 700 KDa, about 50 KDa to about 700 KDa, about 100 KDa to about 700 KDa, about 200 KDa to about 700 KDa, about 300 KDa to about 700 KDa, about 400 KDa to about 700 KDa, about 500 KDa to about 700 KDa, about 600 KDa to about 700 KDa, about 1 KDa to about 600 KDa, about 1 KDa to about 500 KDa, about 1 KDa to about 400 KDa, about 1 KDa to about 300 KDa, about 1 KDA to about 200 KDa, about 1 KDa to about 100 KDa, about 1 KDa to about 50 KDa, about 1 KDa to about 20 KDa, or about 1 KDa to about 10 KDa, or within a range having any two of these values as endpoints, inclusive of the endpoints.

Protein Isoelectric Point

In some embodiments, the protein can have an isoelectric point ranging from about 4 to about 10, including subranges. For example, the protein can have an isoelectric point ranging from about 4 to about 10, about 4.5 to about 9.5, about 5 to about 9, about 5.5 to about 8.5, about 6 to about 8, about 6.5 to about 7.5, or about 6.5 to about 7, or within a range having any two of these values as endpoints, inclusive of the endpoints. In some embodiments, the protein can have an isoelectric point ranging from about 4 to about 5.

Protein Amino Acid Composition

In some embodiments, the protein can have an amino acid composition measured in grams of lysine per 100 grams of protein (as referred to as a "lysine weight percent") ranging from about 0.5 wt % to about 100 wt %, including subranges. For example, the protein can have a lysine weight percent ranging from about 0.5 wt % to about 100 wt %, about 1 wt % to about 100 wt %, about 5 wt % to about 100 wt %, about 10 wt % to about 100 wt %, about 20 wt % to about 100 wt %, about 30 wt % to about 100 wt %, about 40 wt % to about 100 wt %, about 50 wt % to about 100 wt %, about 60 wt % to about 100 wt %, about 70 wt % to about 100 wt %, about 80 wt % to about 100 wt %, or about 90 wt % to about 100 wt %, or within a range having any two of these values as endpoints, inclusive of the endpoints. In some embodiments, the protein can be a polylysine.

In some embodiments, the protein can have a lysine weight percent ranging from about 0.5 wt % to about 20 wt %, including subranges. For example, the protein can have a lysine weight percent ranging from about 0.5 wt % to about 20 wt %, about 1 wt % to about 19 wt %, about 2 wt % to about 18 wt %, about 3 wt % to about 17 wt %, about 4 wt % to about 16 wt %, about 5 wt % to about 15 wt %, about 6 wt % to about 14 wt %, about 7 wt % to about 13 wt %, about 8 wt % to about 12 wt %, about 9 wt % to about 11 wt %, or about 9 wt % to about 10 wt %, or within a range having any two of these values as endpoints, inclusive of the endpoints. In some embodiments, the protein can have a lysine weight percent ranging from about 1 wt % to about 20 wt %. In some embodiments, the protein can have a lysine weight percent ranging from about 5 wt % to about 20 wt %. In some embodiments, the protein can have a lysine weight percent ranging from about 1 wt % to about 12 wt %. In some embodiments, the protein can have a lysine weight percent ranging from about 5 wt % to about 12 wt %. In some embodiments, the protein can have a lysine weight percent ranging from about 1 wt % to about 15 wt %. In some embodiments, the protein can have a lysine weight percent ranging from about 5 wt % to about 15 wt %.

In some embodiments, the protein can be thermo-stable. In some embodiments, the protein can be non-thermo-stable. As described herein, protein thermo-stability is determined by a differential scanning calorimetry (DSC), where a predried protein powder (with moisture less than 3%) is scanned from 0° C. to 200° C. In the protein's DSC curves, an endothermic peak larger than 10 mW/mg is determined to be a "denaturation peak", and the temperature corresponding to the endothermic "denaturation peak" is defined as the "denaturation temperature" of the protein. A protein that is "thermo-stable" means that the protein has denaturation temperature of 200° C. or more. For purposes of the present disclosure, a protein with a denaturation temperature below 200° C. is considered "non-thermo-stable." For example, it was found that the whey from bovine milk listed in Table 1 has a denaturation temperature at 158° C. according to DSC, and therefore the whey is considered non-thermo-stable.

Protein Dissolution

In some embodiments, before blending with one or more polyurethanes, one or more proteins can be dissolved in an aqueous solution to form an aqueous protein mixture. In some embodiments, dissolving the protein in an aqueous solution before blending the protein with one or more polyurethanes can facilitate miscibility of the protein with the hard phase of the one or more polyurethanes. For example, dissolving the protein in an aqueous solution before blending the protein with one or more polyurethanes can facilitate miscibility of the protein with the hard phase of the polyurethane(s). Not all proteins are naturally miscible with any phase of a polyurethane. For example, and as exemplified in Examples 33 and 34, casein is not necessarily miscible with a polyurethane. As shown in these two examples, casein is immiscible with L3360 if casein, water, and L3360 are mixed. The obtained film had an opaque look with numerous optically visible granules in the film. However, casein is miscible with L3360's hard phase if casein is dissolved in a sodium hydroxide solution before mixing with L3360. The film obtained by blending these components had a transparent and uniform look with no optically visible granules in the film.

Suitable aqueous solutions include, but are not limited to, water, an aqueous alkali solution, an aqueous acid solution, an aqueous solution including an organic solvent, a urea solution, and mixtures thereof. In some embodiments, the aqueous alkali solution can be a basic solution such as a sodium hydroxide, ammonia or ammonium hydroxide solution. In some embodiments, examples of an acidic aqueous solution can be an acetic acid or hydrochloric acid (HCl) solutions. Suitable organic solvents include, but are not limited to, ethanol, isopropanol, acetone, ethyl acetate, isopropyl acetate, glycerol, and the like. In some embodiments, the protein concentration in the aqueous protein mixture can range from about 10 g/L to about 300 g/L, including subranges. For example, the protein concentration in the aqueous protein mixture can be about 10 g/L, about 20 g/L, about 30 g/L, about 40 g/L, about 50 g/L, about 60 g/L, about 70 g/L, about 80 g/L, about 90 g/L, about 100 g/L, about 150 g/L, about 200 g/L, about 250 g/L, or about 300 g/L, or within a range having any two of these values as endpoints, inclusive of the endpoints. In some embodiments, the protein concentration in the aqueous protein mixture can range from about 10 g/L to about 300 g/L, about 20 g/L to about 250 g/L, about 30 g/L to about 200 g/L, about 40 g/L to about 150 g/L, about 50 g/L to about 100 g/L, about 60 g/L to about 90 g/L, or about 70 g/L to about 80 g/L.

In some embodiments, the protein can be pretreated and/or purified to improve solubility in water. Suitable pretreatments include, but are not limited to, an acid treatment, an alkaline treatment, enzyme hydrolysis, and a salt treatment. An exemplary acid treatment is acid hydrolysis with suitable acid such as acetic acid or HCl. An exemplary alkaline treatment is alkaline hydrolysis with suitable base such as ammonium hydroxide, NaOH, KOH, or a mixture thereof. Exemplary enzymes for hydrolysis include, but are not limited to, papain, bromelain, trypsin, alkaline proteases, and the like. Suitable purification treatments include, but are not limited to, removal of phytate with calcium salt, diafiltration, ultrafiltration, centrifugation, and the like.

In some embodiments, adding lysine or other hydrophilic amino acids to the protein before blending with one or more polyurethanes can facilitate miscibility of the protein with the hard phase of the one or more polyurethanes.

Protein Hydrolysis

In some embodiments, the protein can be partially-hydrolyzed. Partial hydrolysis of the protein can promote dissolution of the protein in water and/or facilitate miscibility of the protein with the hard phase of the polyurethane. Partial-hydrolysis of the protein can be accomplished using enzymes or strong to moderate base. Hydrolysis can be followed by a reduction in viscosity and/or reduction in protein molecular weight. Characterization methods for determining a reduction in protein molecular weight, and thus a level of protein hydrolysis, include but are not limited to, light scattering, gel electrophoresis, size exclusion chromatography, solution viscosity measurement, terminal amino group detection with trinitrobenzene sulfonic acid or ninhydrin, or particle size measurement with laser diffraction. Example 21 describes partially-hydrolyzed soy protein prepared using sodium hydroxide according to some embodiments.

PEG-Modification of Proteins

In some embodiments, the protein can be chemically modified by covalent attachment of PEG polyethylene glycol (PEG) to the protein. PEG-modification of the protein can promote dissolution of the protein in water and/or facilitate miscibility with the protein with the hard phase of the polyurethane. PEG-modification of a protein can be accomplished using a method that covalently attaches hydrophilic polyethylene glycol (PEG) chains to the protein.

In some embodiments, the amount of protein in the protein polyurethane alloy can range from about 10 wt % to about 50 wt % of protein, including subranges. For example, in some embodiments, the amount of protein in the protein polyurethane alloy range from about 10 wt % to about 50 wt %, about 15 wt % to about 50 wt %, about 20 wt % to about 50 wt %, about 25 wt % to about 50 wt %, about 30 wt % to about 50 wt %, about 35 wt % to about 50 wt %, about 40 wt % to about 50 wt %, about 45 wt % to about 50 wt %, about 10 wt % to about 45 wt %, about 10 wt % to about 40 wt %, about 10 wt % to about 35 wt %, about 10 wt % to about 30 wt %, about 10 wt % to about 25 wt %, about 10 wt % to about 20, or about 10 wt % to about 15%, or within a range having any two of these values as endpoints, inclusive of the endpoints. In some embodiments, the amount of protein in the protein polyurethane alloy can range from about 20 wt % to about 35 wt %.

In some embodiments, the amount of polyurethane in the protein polyurethane alloy can range from about 50 wt % to about 90 wt %, including subranges. For example, in some embodiments, the amount of polyurethane in the protein polyurethane alloy can range from about 50 wt % to about 90 wt %, about 55 wt % to about 90 wt %, about 60 wt % to about 90 wt %, about 65 wt % to about 90 wt %, about 70 wt % to about 90 wt %, about 75 wt % to about 90 wt %, about 80 wt % to about 90 wt %, about 85 wt % to about 90 wt %, about 50 wt % to about 85 wt %, about 50 wt % to about 80 wt %, about 50 wt % to about 75 wt %, about 50 wt % to about 70 wt %, about 50 wt % to about 65 wt %, about 50 wt % to about 60 wt %, or about 50 wt % to about 55 wt %, or within a range having any two of these values as endpoints, inclusive of the endpoints. In some embodiments, the amount of polyurethane in the protein polyurethane alloy can range from about 65 wt % to about 80 wt %.

In some embodiments, the above-listed weight percent values and ranges can be based on the total weight of the protein polyurethane alloy or protein polyurethane alloy layer. In some embodiments, the above-listed weight percent values and ranges can be based on the total weight of only protein and polyurethane in a protein polyurethane alloy or protein polyurethane alloy layer. Unless otherwise specified, a weight percent value or range for the polyurethane and the protein is based on the total weight of only protein and polyurethane in a protein polyurethane alloy or protein polyurethane alloy layer.

In some embodiments, the sum of the amount of protein plus the amount of polyurethane in the protein polyurethane alloy can be about 80 wt % or more. For example, in some embodiments, the sum of the amount of protein plus the amount of polyurethane in the protein polyurethane alloy can range from about 80 wt % to 100 wt %, about 82 wt % to 100 wt %, about 84 wt % to 100 wt %, about 86 wt % to 100 wt %, about 88 wt % to 100 wt %, about 90 wt % to 100 wt %, about 92 wt % to 100 wt %, about 94 wt % to 100 wt %, about 96 wt % to 100 wt %, or about 98 wt % to 100 wt %.

In some embodiments, the protein polyurethane alloy can include water making up a portion of the total weight percent of the material. In some embodiments, the amount of water in the protein polyurethane alloy can range from about 1 wt % to about 10 wt %, including subranges. For example, in some embodiments, the amount of water in the protein polyurethane alloy can range from about 1 wt % to about 10 wt %, about 2 wt % to about 10 wt %, about 3 wt % to about 10 wt %, about 4 wt % to about 10 wt %, about 5 wt % to about 10 wt %, about 6 wt % to about 10 wt %, about 7 wt % to about 10 wt %, about 8 wt % to about 10 wt %, about 1 wt % to about 9 wt %, about 1 wt % to about 8 wt %, about 1 wt % to about 7 wt, about 1 wt % to about 6 wt %, about 1 wt % to about 5 wt %, about 1 wt % to about 4 wt %, or about 1 wt % to about 3 wt %, or within a range having any two of these values as endpoints, inclusive of the endpoints.

A protein polyurethane alloy described herein can have one or more of (i) a second Dynamic Mechanical Analysis (DMA) modulus transition onset temperature greater than the second DMA modulus transition onset temperature of the unalloyed polyurethane (ii) a first Dynamic Mechanical Analysis (DMA) modulus transition onset temperature substantially the same as the first DMA modulus transition onset temperature of the unalloyed polyurethane, (iii) a DMA tan(S) peak at a temperature substantially the same as the temperature of the DMA tan(S) peak corresponding to the soft phase of the unalloyed polyurethane, (iv) a Young's modulus greater than the Young's modulus of the unalloyed polyurethane, (v) a tensile strength greater than the tensile strength of the unalloyed polyurethane, or (vi) a moisture vapor transmission rate (MVTR) greater than the MVTR of the unalloyed polyurethane.

FIGS. 1-15 illustrate the effects of dissolving various amounts of different proteins in different polyurethanes to form polyurethane alloys according to some embodiments. Tables 3-6 list thermal and mechanical properties for various protein polyurethane alloys according to some embodiments, as well as thermal and mechanical properties for various polyurethanes. The samples tested were prepared by blending the listed protein with an aqueous dispersion of the listed polyurethane, casting the mixture as a flat film, drying in oven at 45° C. overnight (16 to 24 hours), and conditioning at standard reference atmosphere (230 C, 50% humidity) for 24 hours before testing. The weight percent values in the figures and Tables 3-6 are the relative weight percent of solids added to the blend used to create the samples. For example, 0.825 grams of gelatin and 5.5 g of L3360 (35 wt % solids) were blended to create the sample for Example No. 9 having 30 wt % gelatin and 70 wt % L3360. The weight percentages in the figures and Tables 3-6 can closely approximate the weight percentages of protein and polyurethane in the dried samples of Example Nos. 1-44, based on the total weight of the dried samples. The dried samples included water making up a small portion (for example, about 5% to about 10 wt %) of the total weight percent of the sample.

Table 7 lists moisture vapor transmission rates for various protein polyurethane alloys according to some embodiments. The samples tested were prepared as described in Example Nos. 45-56. The weight percent values in Table 7 are the relative weight percent of solids added to the blend used to create the samples. These weight percentages can closely approximate the weight percentages of protein and polyurethane in the dried samples of Example Nos. 45-56, based on the total weight of the dried samples. The dried samples included water making up a small portion (for example, about 5% to about 10 wt %) of the total weight percent of the sample.

The DMA temperatures in Tables 3 and 4 were measured using a DMA-850 from TA Instruments. For testing, a 1 cm×2.5 cm strip was cut from a sample film using a metal die. The cut film samples were loaded into the film and fiber tension clamp for testing. During testing, a pre-load of 0.01 newtons (N) was applied to the cut film samples. The instrument was cooled to –80° C., held for 1 minute, then the temperature was ramped at 4° C./minute to 200° C., or until the sample was too weak to be held in tension. During the temperature ramp, the sample was oscillated 0.1% strain at a frequency of 1 Hz. The resulting storage modulus, loss modulus, and tan(S) values were plotted with temperature for each test. Unless otherwise specified, all DMA test data reported herein was measured using this test methodology. The tensile strength values and Young's modulus values in Tables 5 and 6 were measured according the method provided by ASTM D638. The tensile strength values and Young's modulus values are an average of at least three sample specimens tested.

The DMA graph shown in FIG. 1 shows the measured storage modulus (E') for 100% L3360 (Example No. 1) and gelatin dissolved within L3360 at various weight percentages, namely 5 wt %, 10 wt %, 15 wt %, 20%, and 30 wt % (Example Nos. 9 and 25-28). This graph illustrates that blending gelatin with L3360 can create an alloy with a second DMA modulus transition onset temperature greater than the second DMA modulus transition onset temperature of 100% L3360. Without wishing to be bound by a particular theory, it is believed that as the hard phase comprising gelatin and the hard segment of the polyurethane become continuous at higher gelatin content, the increase in the second DMA modulus transition onset temperature becomes more apparent in this test. This trend indicates that the gelatin is miscible with the hard phase of L3360.

Figure 3:
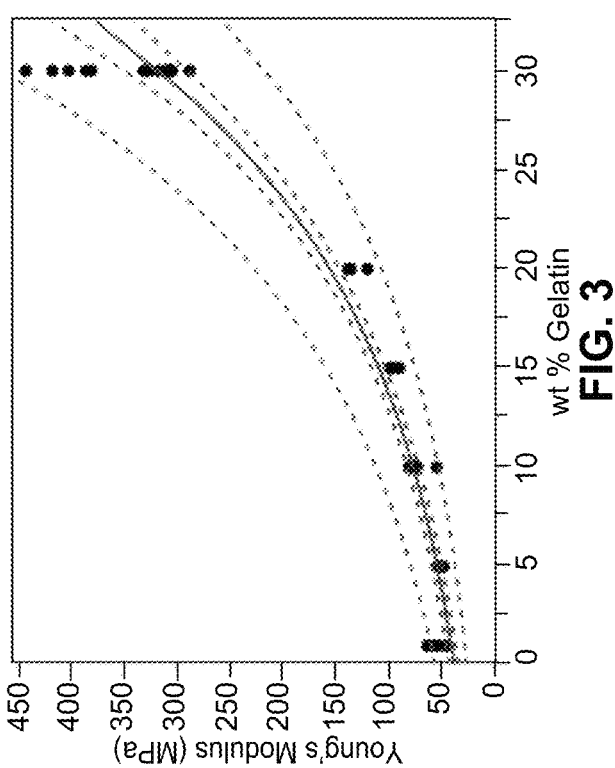
FIG. 3 is a graph showing the relationship between Young's modulus and gelatin weight percent for gelatin polyurethane alloys according to some embodiments.
Figure 2:
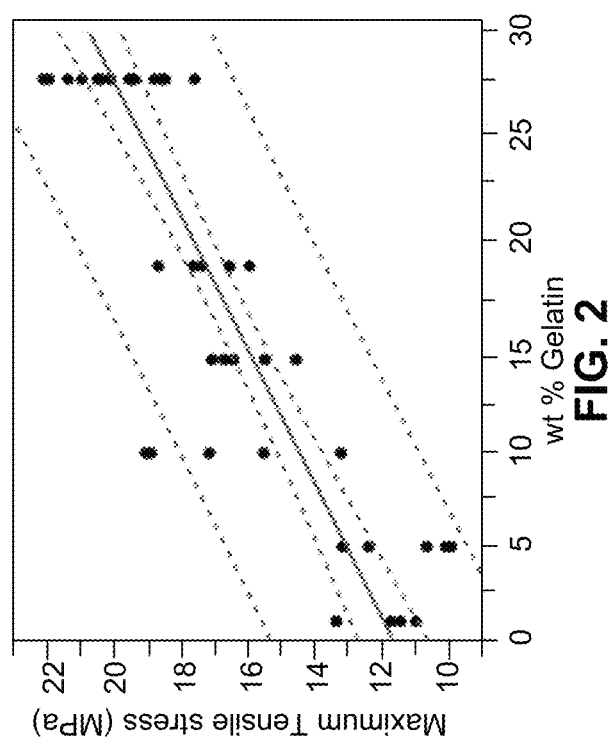
FIG. 2 is a graph showing the relationship between maximum tensile stress and gelatin weight percent for gelatin polyurethane alloys according to some embodiments.

This miscibility of gelatin with the hard phase L3360 is further exemplified in the mechanical property graphs of FIG. 2 and FIG. 3, which compare two different mechanical properties of Example No. 1 and Example Nos. 9 and 25-28. As shown in FIG. 2, the maximum tensile stress ("tensile strength") of the protein polyurethane alloys tested is greater than the maximum tensile stress of 100% L3360. This increase in maximum tensile stress is particularly significant at gelatin weight percentages of 10 wt % or more. As shown in FIG. 3, the Young's modulus of the protein polyurethane alloys tested is greater than the Young's modulus of 100% L3360. This increase in Young's modulus is particularly significant at gelatin weight percentages of 15 wt % or more.

Figure 4:
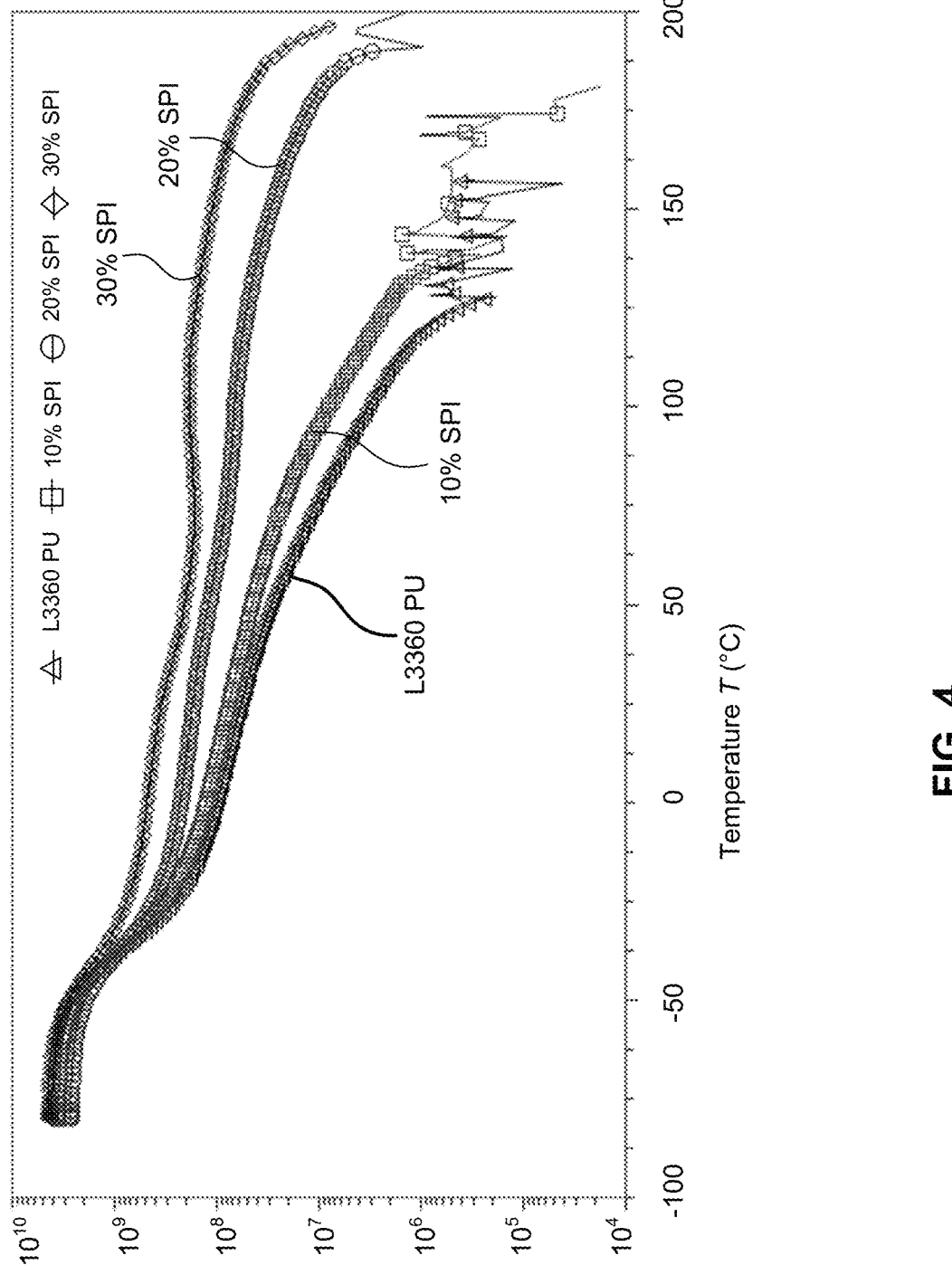
FIG. 4 is a DMA graph of storage modulus versus temperature for various materials.

The DMA graph shown in FIG. 4 shows the measured storage modulus (E') for 100% L3360 (Example No. 1) and SPI dissolved within L3360 at various weight percentages, namely 10 wt %, 20%, and 30 wt % (Example Nos. 21, 30, and 31). This thermogram illustrates that blending SPI with L3360 can create a protein polyurethane alloy with a second DMA modulus transition onset temperature greater than the second DMA modulus transition onset temperature of 100% L3360. As more SPI is added, the increase in the second DMA modulus transition onset temperature increases. This trend indicates that the SPI in miscible with the hard phase of L3360.

Figure 6:
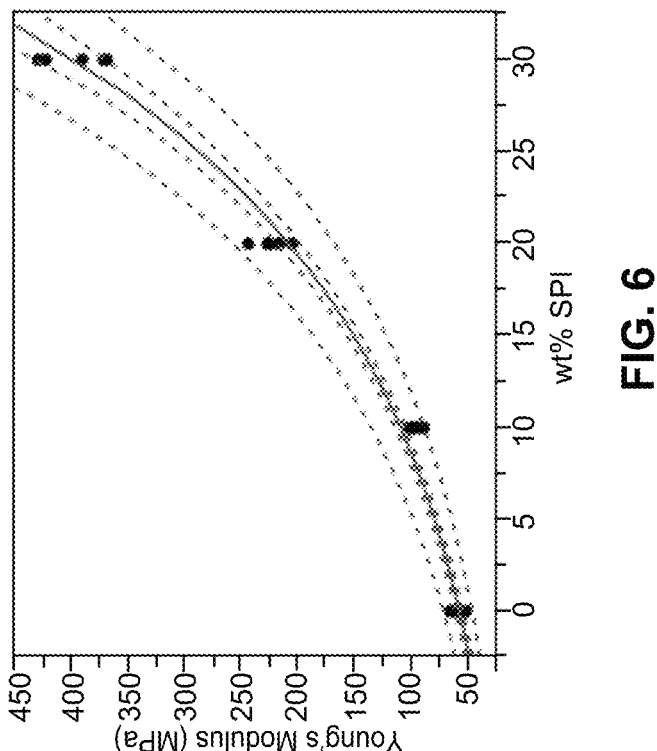
FIG. 6 is a graph showing the relationship between Young's modulus and SPI weight percent for SPI polyurethane alloys according to some embodiments.
Figure 5:
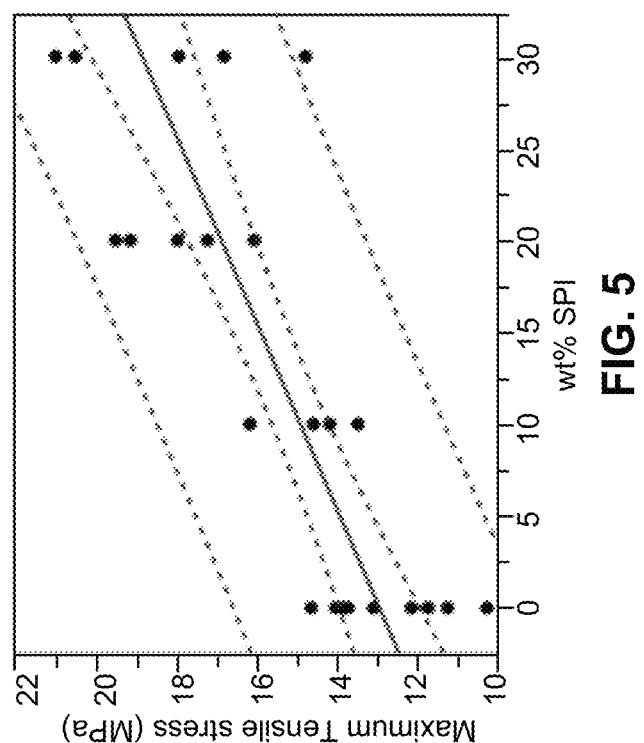
FIG. 5 is a graph showing the relationship between maximum tensile stress and soy protein isolate (SPI) weight percent for SPI polyurethane alloys according to some embodiments.

This miscibility of SPI with the hard phase L3360 is further exemplified in the mechanical property graphs of FIG. 5 and FIG. 6, which compare two different mechanical properties of Example No. 1 and Example Nos. 21, 30, and 31. As shown in FIG. 5, the maximum tensile stress ("tensile strength") of the protein polyurethane alloys tested is greater than the maximum tensile stress of 100% L3360. This increase in maximum tensile stress is particularly significant at SPI weight percentages of 10 wt % or more. As shown in FIG. 6, the Young's modulus of the protein polyurethane alloys tested is greater than the Young's modulus of 100% L3360. This increase in Young's modulus is particularly significant at SPI weight percentages of 15 wt % or more.

Figure 7:
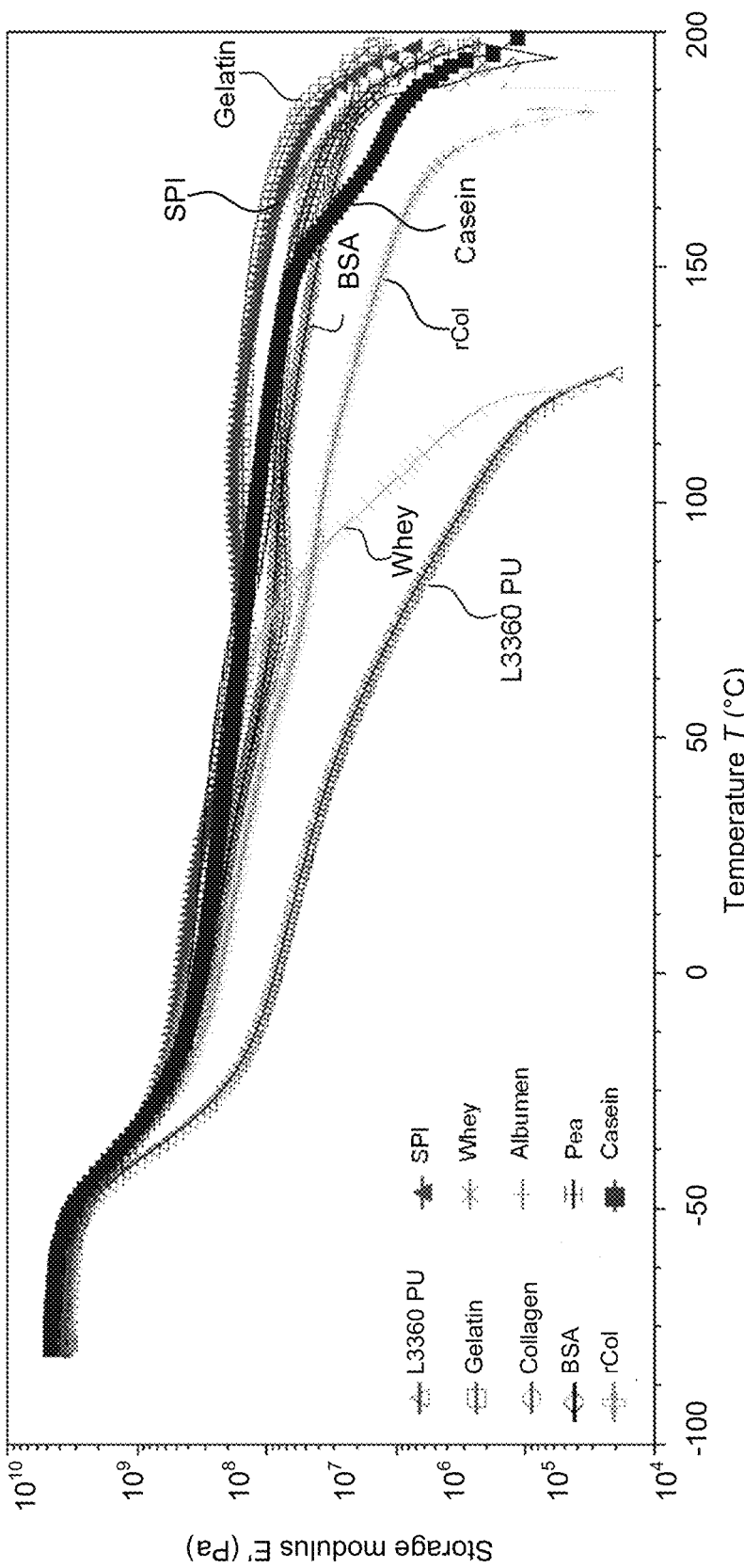
FIG. 7 is a DMA graph of storage modulus versus temperature for various materials.

The DMA graph shown in FIG. 7 shows the measured storage modulus (E') for 100% L3360 (Example No. 1) and various proteins dissolved within L3360 at 30 wt % (Example Nos. 9 and 17-23). This graph illustrates that gelatin, SPI, and other proteins can be blended with L3360 to create a protein polyurethane alloy with a second DMA modulus transition onset temperature greater than the second DMA modulus transition onset temperature of 100% L3360. All the proteins, except Whey, produced protein polyurethane alloys with a second DMA modulus transition onset temperature greater than that of 100% L3360. It is believed Whey is miscible with L3360's hard phase due to its ability to improve mechanical properties of a protein polyurethane alloy relative to 100% L3360. But it is believed that Whey did not increase the second DMA modulus transition onset temperature because Whey has a low denaturation temperature as determined by DSC.

Further, the graph of FIG. 7 shows that dissolving the various proteins within L3360 did not result in a protein polyurethane alloy having a DMA transition temperature of the soft phase significantly different from the DMA transition temperature of the soft phase for 100% L3360. As shown in Table 4, the Delta 1$^{st}$ Modulus Transition Onset for all of Example Nos. 9 and 17-23 was less than 10° C. Relatedly, the Delta Tan(S) Peak Temperature for all of Example Nos. 9 and 17-23 was less than 10° C. These results indicate the proteins were not miscible with L3360's soft phase.

Figure 8A:
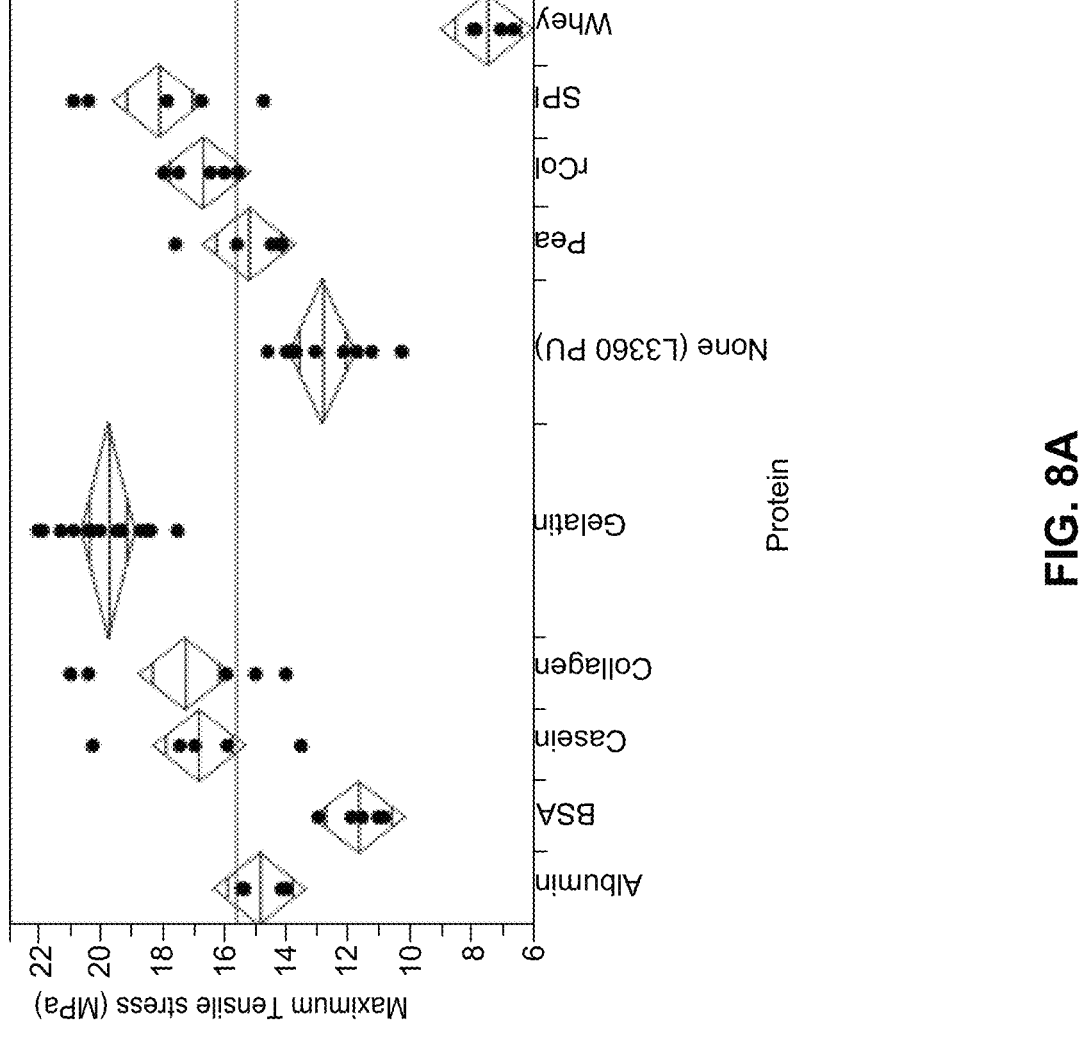
FIG. 8A is a graph comparing the maximum tensile stress of various protein polyurethane alloys according to some embodiments.
Figure 8B:
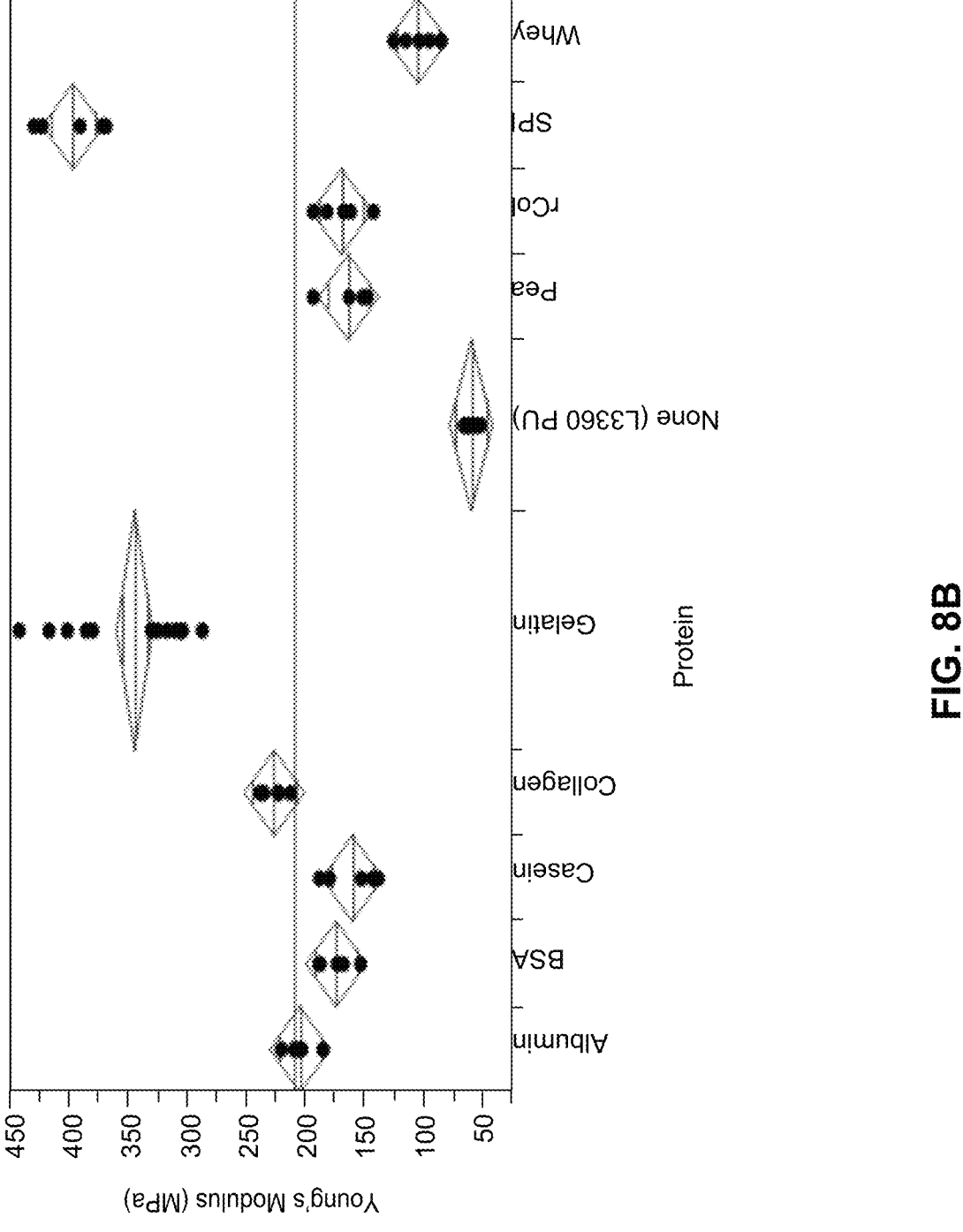
FIG. 8B is a graph comparing the Young's modulus of various protein polyurethane alloys according to some embodiments.

This selective miscibility of the proteins with the hard phase L3360 is further exemplified in the mechanical property test results plotted in the graphs of FIG. 8A and FIG. 8B, and reported in Tables 5 and 6. The graphs of FIG. 8A and FIG. 8B compare the tensile strength and Young's modulus of Example No. 1 and Example Nos. 9 and 17-23. An increase in tensile strength and/or an increase in Young's modulus can indicate that a protein is miscible with the hard phase of L3360. Tables 5 and 6 report the tensile strength and Young's modulus of the materials.

Figure 9:
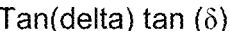
FIG. 9 is a DMA thermogram comparing L3360 and a gelatin L3360 alloy according to some embodiments.
Figure 10:
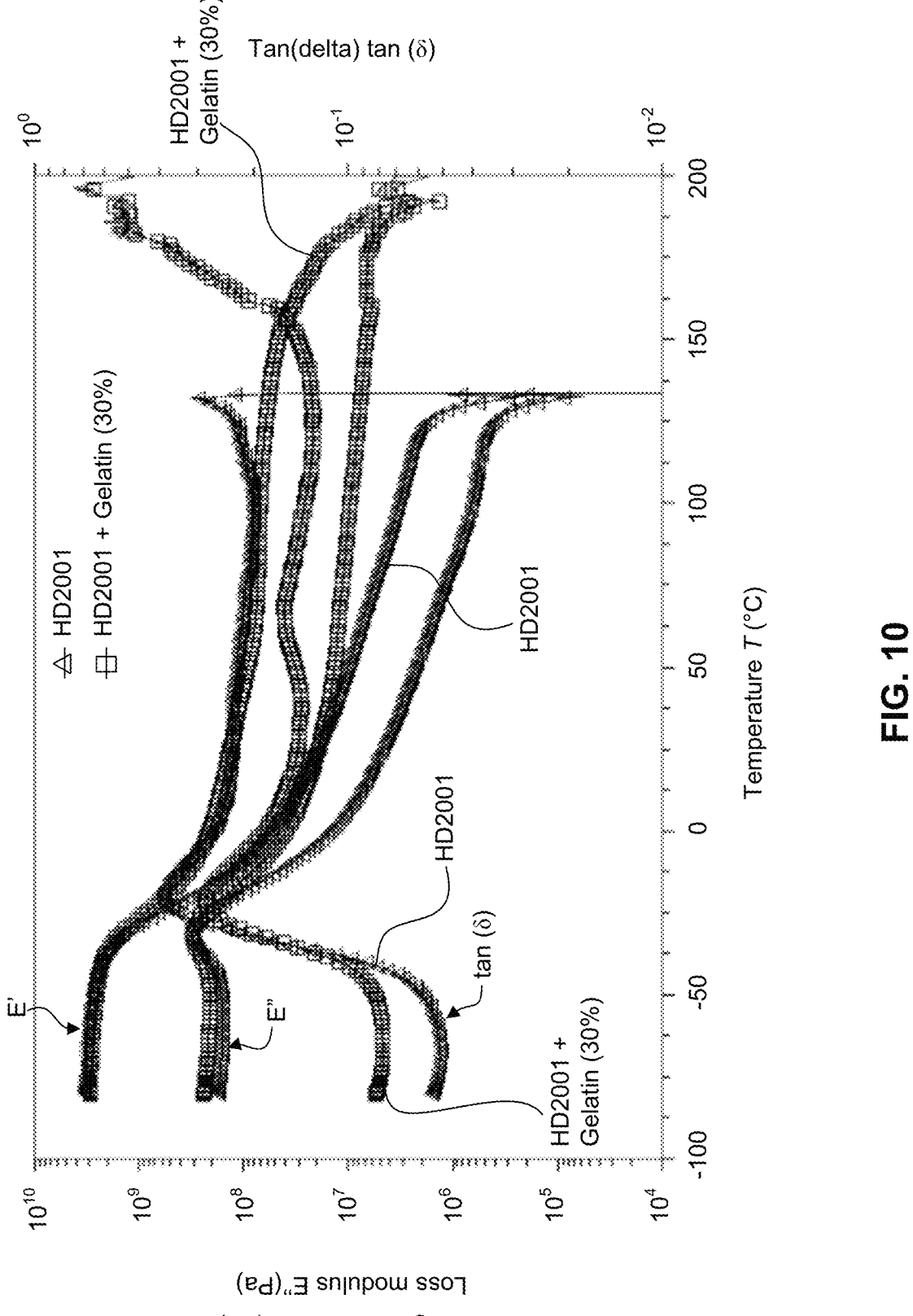
FIG. 10 is a DMA thermogram comparing Hauthane HD-2001 polyurethane and a gelatin Hauthane HD-2001 polyurethane alloy according to some embodiments.
Figure 12:
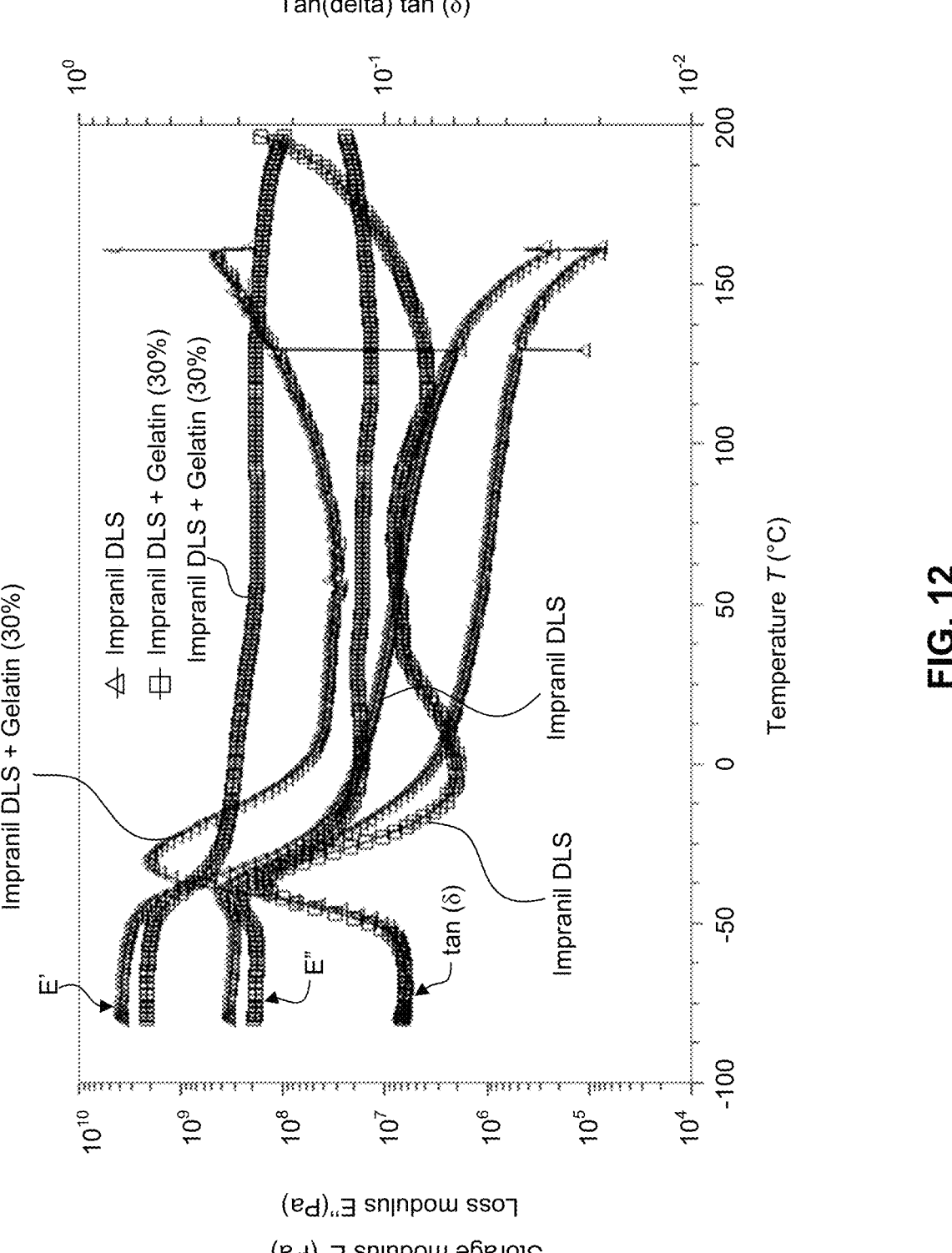
FIG. 12 is a DMA thermogram comparing IMPRANIL® DLS polyurethane and a gelatin IMPRANIL® DLS polyurethane alloy according to some embodiments.
Figure 13:
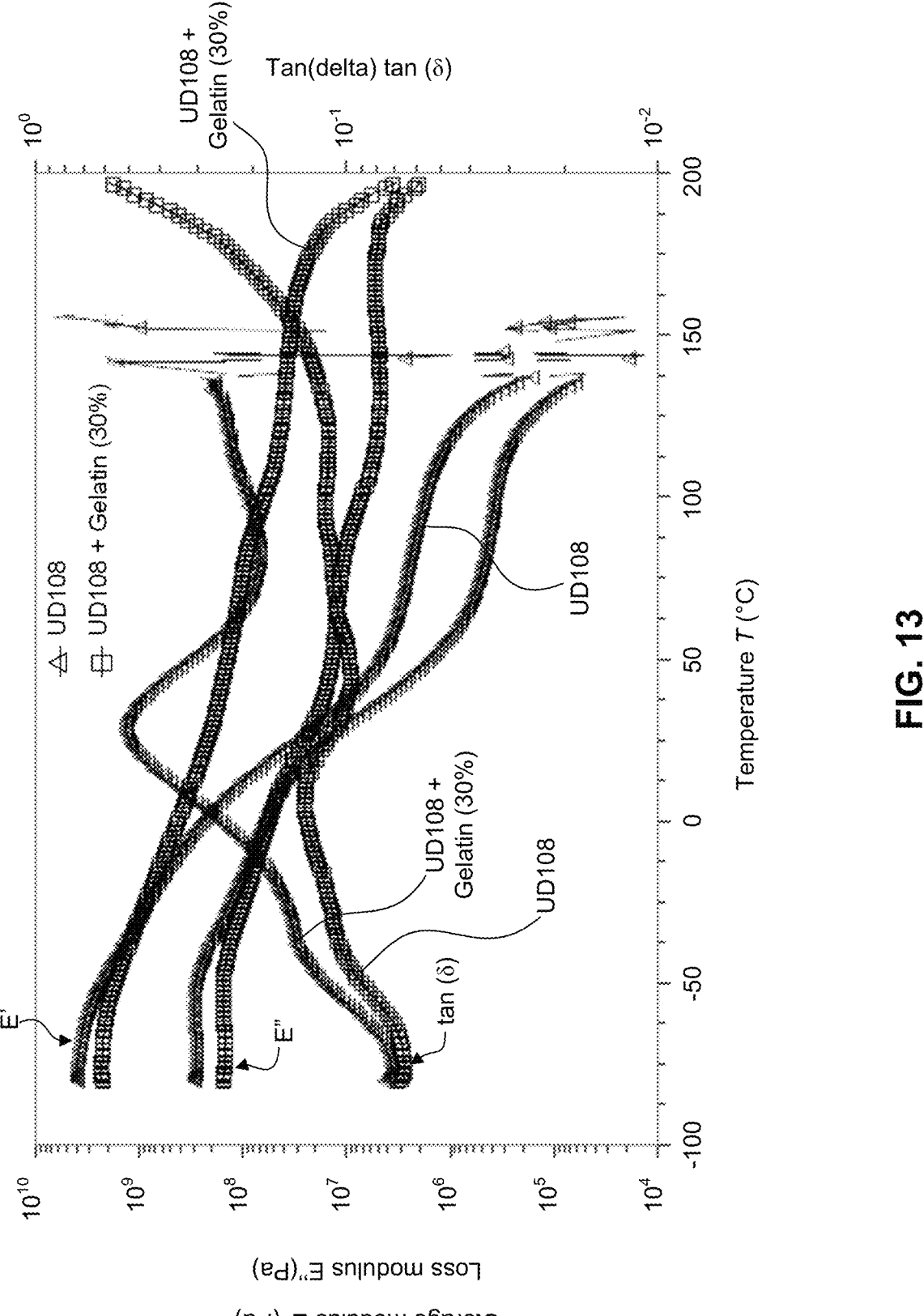
FIG. 13 is a DMA thermogram comparing BONDTHANE™ UD-108 polyurethane and a gelatin BONDTHANE™ UD-108 polyurethane alloy according to some embodiments.
Figure 14:
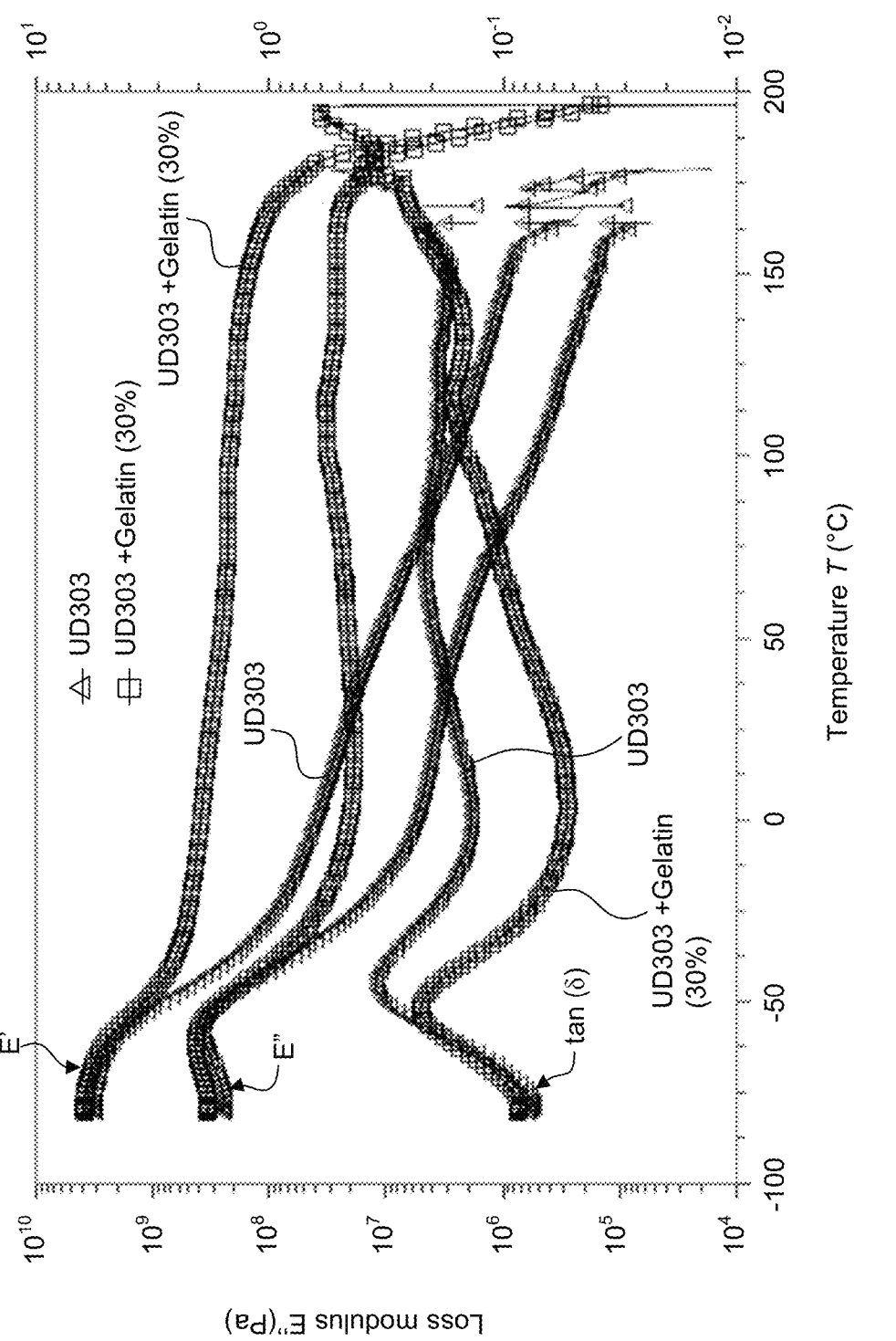
FIG. 14 is a DMA thermogram comparing BONDTHANE™ UD-303 polyurethane and a gelatin BONDTHANE™ UD-303 polyurethane alloy according to some embodiments.
Figure 15:
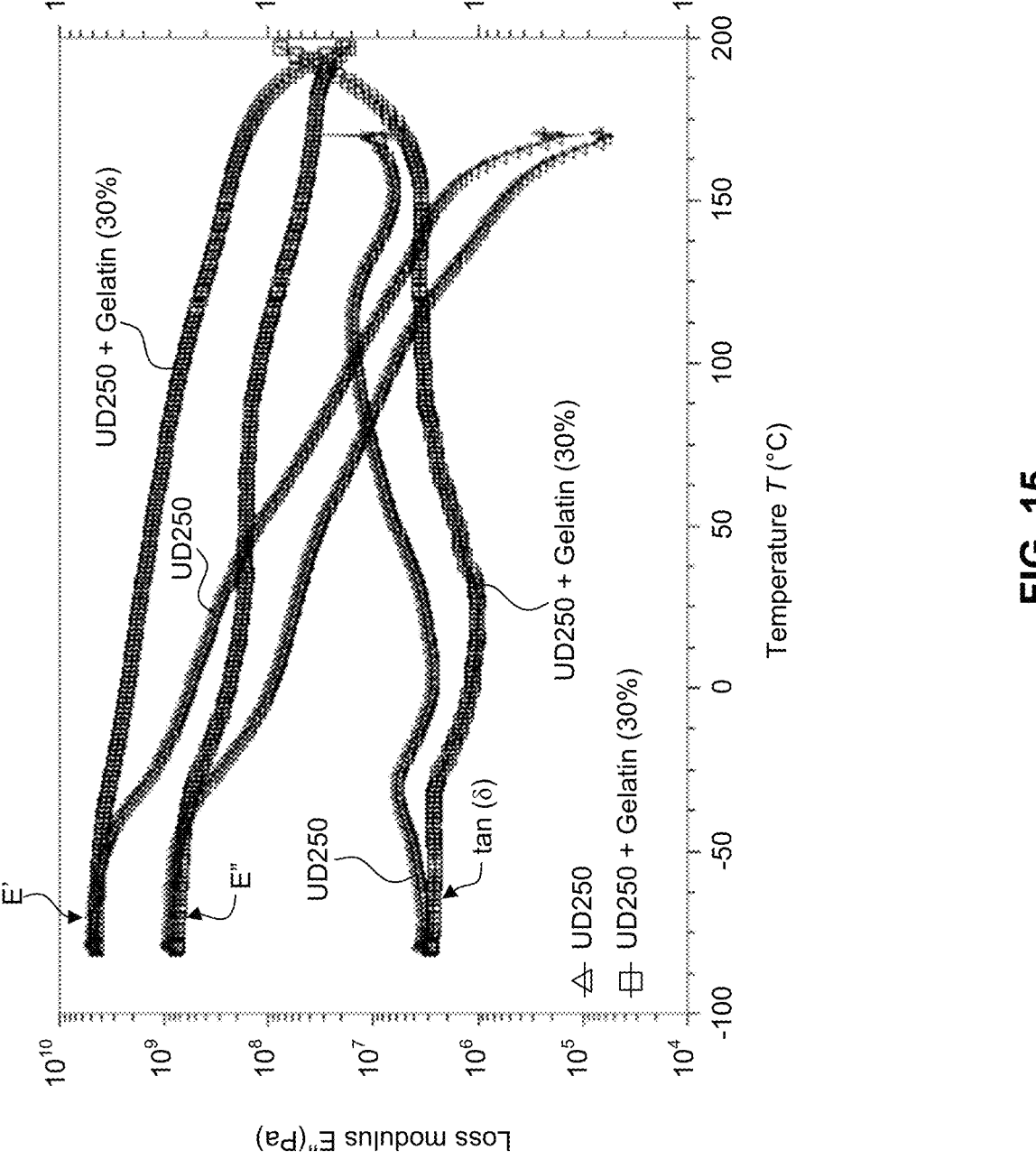
FIG. 15 is a DMA thermogram comparing BONDTHANE™ UD-250 polyurethane and a gelatin BONDTHANE™ UD-250 polyurethane alloy according to some embodiments.
Figure 16:
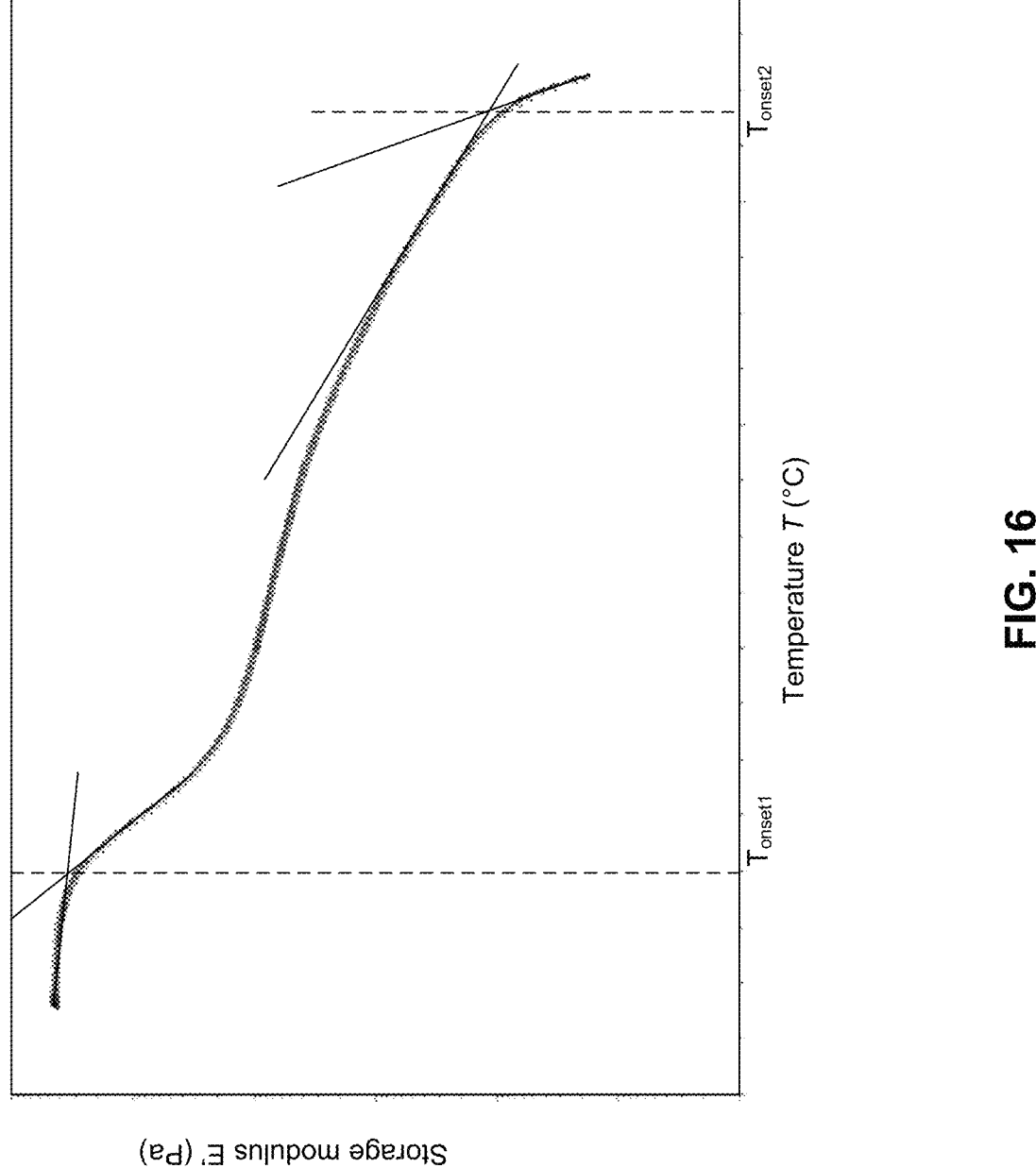
FIG. 16 is a representative DMA graph illustrating the methodology of measuring first and second DMA modulus transition onset temperatures.

To further illustrate the selective miscibility of proteins with the hard phase of a polyurethane having both a soft phase and a hard phase, gelatin was blended with various exemplary polyurethanes. FIGS. 9-15 show DMA thermograms for these exemplary blends as well as thermograms for the polyurethanes in the absence of gelatin. FIG. 9 compares the DMA data for a protein polyurethane alloy made of 30 wt % gelatin and 70 wt % L3360 (Example No. 9) and 100% L3360 (Example No. 1). FIG. 10 compares the DMA data for a protein polyurethane alloy made of 30 wt % gelatin and 70 wt % HD-2001 (Example No. 15) and 100% HD-2001 (Example No. 7). FIG. 11 compares the DMA data for a protein polyurethane alloy made of 30 wt % gelatin and 70 wt % Sancure (Example No. 14) and 100% Sancure (Example No. 6). FIG. 12 compares the DMA data for a protein polyurethane alloy made of 30 wt % gelatin and 70 wt % Impranil DLS (Example No. 12) and 100% Impranil DLS (Example No. 5). FIG. 13 compares the DMA data for a protein polyurethane alloy made of 30 wt % gelatin and 70 wt % UD-108 (Example No. 10) and 100% UD-108 (Example No. 2). FIG. 14 compares the DMA data for a protein polyurethane alloy made of 30 wt % gelatin and 70 wt % UD-303 (Example No. 13) and 100% UD-303 (Example No. 4). FIG. 15 compares the DMA data for a protein polyurethane alloy made of 30 wt % gelatin and 70 wt % UD-250 (Example No. 11) and 100% UD-250 (Example No. 3).

Figure 22:
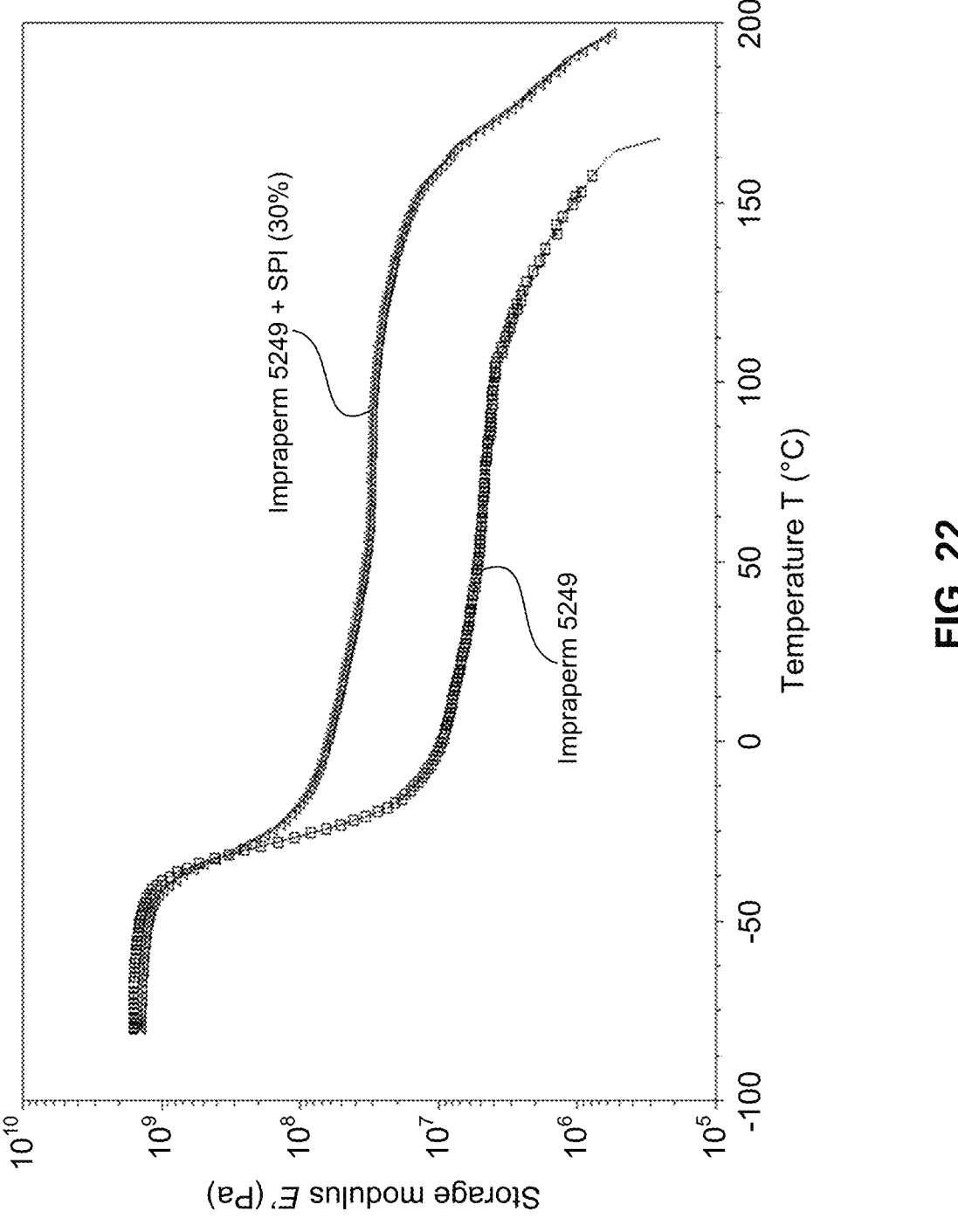
FIG. 22 is a DMA thermogram comparing IMPRAP-ERM® DL 5249 polyurethane and a soy protein isolate IMPRAPERM® DL 5249 alloy according to some embodiments.

FIG. 22 compares the DMA data for a protein polyurethane alloy made of 30 wt % soy protein isolate (SPI) and 70 wt % IMPRAPERM® DL 5249 and a 100% IMPRAPERM® DL 5249 polyurethane sample. Three samples of the 30 wt % soy protein isolate (SPI) and 70 wt % IMPRAPERM®® DL 5249 alloy of FIG. 22 having a mean thickness of 0.44 mm had an average Young's modulus of 65.80 MPa. Three samples of the 100% IMPRAPERM® DL 5249 polyurethane of FIG. 22 having a mean thickness of 0.7 mm had an average Young's modulus of 10.13 MPa. The DMA data shown in FIG. 22 and the results of this mechanical testing for the protein polyurethane alloy illustrate the selective miscibility of the SPI with the hard phase of IMPRAPERM® DL 5249.

Tables 3 and 4 report DMA data for the various exemplary polyurethanes and those same polyurethanes blended with 30 wt % gelatin. Tables 5 and 6 report the tensile strength and Young's modulus data for the various exemplary polyurethanes and those same polyurethanes blended with 30 wt % gelatin. The results indicate selective miscibility of proteins tested with the hard phase of polyurethanes tested.

In some embodiments, the protein polyurethane alloy can comprise a polyurethane having a second DMA modulus transition onset temperature in the absence of protein. That same protein polyurethane alloy can have a second DMA modulus transition onset temperature ranging from about 5° C. to about 100° C. greater than the second DMA modulus transition onset temperature of the polyurethane in the absence of protein. This relative increase in the second DMA modulus transition onset temperature can be referred to as "Delta 2$^{nd}$ Modulus Transition Onset." In some embodiments, the Delta 2$^{nd}$ Modulus Transition Onset can be about 5° C. or more. In some embodiments, the Delta 2$^{nd}$ Modulus Transition Onset can range from about 5° C. to about 100° C., about 5° C. to about 95° C., about 5° C. to about 90° C., about 5° C. to about 85° C., about 5° C. to about 80° C., about 5° C. to about 75° C., about 5° C. to about 70° C., about 5° C. to about 65° C., about 5° C. to about 60° C., about 5° C. to about 55° C., about 5° C. to about 50° C., about 5° C. to about 45° C., about 5° C. to about 40° C., about 5° C. to about 35° C., about 5° C. to about 30° C., about 5° C. to about 25° C., about 5° C. to about 20° C., about 5° C. to about 15° C., about 5° C. to about 10° C., about 10° C. to about 100° C., about 15° C. to about 100° C., about 20° C. to about 100° C., about 25° C. to about 100° C., about 30° C. to about 100° C., about 35° C. to about 100° C., about 40° C. to about 100° C., about 45° C. to about 100° C., about 50° C. to about 100° C., about 55° C. to about 100, about 60° C. to about 100° C., about 65° C. to about 100° C., about 70° C. to about 100° C., about 75° C. to about 100° C., about 80° C. to about 100° C., about 85° C. to about 100° C., about 90° C. to about 100° C., or about 95° C. to about 100° C., or within an range having any two of these values as endpoints, inclusive of the endpoints.

In some embodiments, the Delta $2^{nd}$ Modulus Transition Onset can range from about 5° C. to about 80° C. In some embodiments, the Delta $2^{nd}$ Modulus Transition Onset can range from about 20° C. to about 80° C. In some embodiments, the Delta $2^{nd}$ Modulus Transition Onset can range from about 40° C. to about 80° C. In some embodiments, the Delta $2^{nd}$ Modulus Transition Onset can be greater than about 100° C. For example, the Delta $2^{nd}$ Modulus Transition Onset can range from about 100° C. to about 150° C.

In some embodiments, a soy protein polyurethane alloy can comprise a polyurethane having a second DMA modulus transition onset temperature in the absence of soy protein. That same soy protein polyurethane alloy can have a second DMA modulus transition onset temperature ranging from about 15° C. to about 100° C. greater than the second DMA modulus transition onset temperature of the polyurethane in the absence of soy protein. In some embodiments, the Delta $2^{nd}$ Modulus Transition Onset for the soy protein polyurethane alloy can be about 15° C. or more. In some embodiments, the Delta $2^{nd}$ Modulus Transition Onset for a soy protein polyurethane alloy can range from about 15° C. to about 100° C., about 15° C. to about 95° C., about 15° C. to about 90° C., about 15° C. to about 85° C., about 15° C. to about 80° C., about 15° C. to about 75° C., about 15° C. to about 70° C., about 15° C. to about 65° C., about 15° C. to about 60° C., about 15° C. to about 55° C., about 15° C. to about 50° C., about 15° C. to about 45° C., about 15° C. to about 40° C., about 15° C. to about 35° C., about 15° C. to about 30° C., about 15° C. to about 25° C., about 15° C. to about 20° C., about 20° C. to about 100° C., about 25° C. to about 100° C., about 30° C. to about 100° C., about 35° C. to about 100° C., about 40° C. to about 100° C., about 45° C. to about 100° C., about 50° C. to about 100° C., about 55° C. to about 100, about 60° C. to about 100° C., about 65° C. to about 100° C., about 70° C. to about 100° C., about 75° C. to about 100° C., about 80° C. to about 100° C., about 85° C. to about 100° C., about 90° C. to about 100° C., or about 95° C. to about 100° C., or within an range having any two of these values as endpoints, inclusive of the endpoints.

In some embodiments, the protein polyurethane alloy can have a second DMA modulus transition onset temperature ranging from about 100° C. to about 200° C., including subranges. For example, in some embodiments, the protein polyurethane alloy can have a second DMA modulus transition onset temperature ranging from about 100° C. to about 200° C., about 100° C. to about 195° C., about 100° C. to about 190° C., about 100° C. to about 185° C., about 100° C. to about 180° C., about 100° C. to about 175° C., about 100° C. to about 170° C., about 100° C. to about 165° C., about 100° C. to about 160° C., about 100° C. to about 155°

C., about 100° C. to about 150° C., about 100° C. to about 145° C., about 100° C. to about 140° C., about 100° C. to about 135° C., about 100° C. to about 130° C., about 100° C. to about 125° C., or about 100 to about 120° C., about 105° C. to about 200° C., about 110° C. to about 200° C., about 115° C. to about 200° C., about 120° C. to about 200° C., about 125° C. to about 200° C., about 130° C. to about 200° C., about 135° C. to about 200° C., about 140° C. to about 200° C., about 145° C. to about 200° C., about 150° C. to about 200° C., about 155° C. to about 200° C., about 160° C. to about 200° C., about 165° C. to about 200° C., about 170° C. to about 200° C., about 175° C. to about 200° C., or about 180° C. to about 200° C., or within a range having any two of these values as endpoints, inclusive of the endpoints. In some embodiments, the protein polyurethane alloy can have a second DMA modulus transition onset temperature ranging from about 120° C. to about 200° C. In some embodiments, the protein polyurethane alloy can have a second DMA modulus transition onset temperature ranging from about 130° C. to about 200° C. In some embodiments, the protein polyurethane alloy can have a second DMA modulus transition onset temperature ranging from about 165° C. to about 200° C.

In some embodiments, the soy protein polyurethane alloy can have a second DMA modulus transition onset temperature ranging from about 130° C. to about 200° C., including subranges. For example, in some embodiments, the soy protein polyurethane alloy can have a second DMA modulus transition onset temperature ranging from about 130° C. to about 200° C., about 130° C. to about 195° C., about 130° C. to about 190° C., about 130° C. to about 185° C., about 130° C. to about 180° C., about 130° C. to about 175° C., about 130° C. to about 170° C., about 130° C. to about 165° C., about 130° C. to about 160° C., about 130° C. to about 155° C., about 130° C. to about 150° C., about 130° C. to about 145° C., about 130° C. to about 140° C., about 135° C. to about 200° C., about 140° C. to about 200° C., about 145° C. to about 200° C., about 150° C. to about 200° C., about 155° C. to about 200° C., about 160° C. to about 200° C., about 165° C. to about 200° C., about 170° C. to about 200° C., about 175° C. to about 200° C., about 180° C. to about 200° C., about 185° C. to about 200° C., or about 190° C. to about 200° C., or within a range having any two of these values as endpoints, inclusive of the endpoints.

In some embodiments, the protein polyurethane alloy can have a first DMA modulus transition temperature below 30° C. In some embodiments, the protein polyurethane alloy can have a first DMA modulus transition onset temperature ranging from about −65° C. to about 30° C., including subranges. For example, in some embodiments, the first DMA modulus transition onset temperature for the protein polyurethane alloy can range from about −65° C. to about 30° C., about −65° C. to about 25° C., about −65° C. to about 20° C., about −65° C. to about 15° C., about −65° C. to about 10° C., about −65° C. to about 5° C., about −65° C. to about 1° C., about −65° C. to 0° C., about −65° C. to about 1° C., about −65° C. to about −5° C., about −65° C. to about −10° C., about −65° C. to about −15° C., about −65° C. to about −20° C., about −65° C. to about −25° C., about −65° C. to about −30° C., about −65° C. to about −35° C., about −65° C. to about −35° C., about −65° C. to about −40° C., or about −65° C. to about −45° C., or within a range having any two of these values as endpoints, inclusive of the end points.

In some embodiments, the protein polyurethane alloy can comprise a polyurethane having a first DMA modulus transition onset temperature in the absence of protein. That same protein polyurethane alloy can have a first DMA modulus transition onset temperature that is +/−X ° C. the first DMA modulus transition onset temperature of the polyurethane in the absence of protein. This relative increase or decrease in the first DMA modulus transition onset temperature can be referred to as "Delta $1^{st}$ Modulus Transition Onset." In some embodiments, X can be 1, 2, 3, 4, 5, 6, 7, 8, 9, or 10.

In some embodiments, the protein polyurethane alloy can have a DMA tan(δ) peak temperature below 30° C. In some embodiments, the protein polyurethane alloy can have a DMA tan(δ) peak temperature ranging from about −60° C. to about 30° C., including subranges. For example, in some embodiments, the DMA tan(S) peak temperature for the protein polyurethane alloy can range from about −60° C. to about 30° C., about −60° C. to about 25° C., about −60° C. to about 20° C., about −60° C. to about 15° C., about −60° C. to about 10° C., about −60° C. to about 5° C., about −60° C. to about 1° C., about −60° C. to 0° C., about −60° C. to about 1° C., about −60° C. to about −5° C., about −60° C. to about −10° C., about −60° C. to about −15° C., about −60° C. to about −20° C., about −60° C. to about −25° C., about −60° C. to about −30° C., about −60° C. to about −35° C., or about −60° C. to about −40° C., or within a range having any two of these values as endpoints.

In some embodiments, the protein polyurethane alloy can include a polyurethane having a DMA tan(S) peak temperature corresponding to the soft phase of the polyurethane in the absence of protein. That same the protein polyurethane alloy can have a DMA tan(S) peak temperature that is +/−Y ° C. the DMA tan(S) peak temperature corresponding to the soft phase of the polyurethane in the absence of protein. This relative increase or decrease in the DMA tan(S) peak temperature can be referred to as "Delta Tan(S) Peak Temperature." In some embodiments, Y can be 1, 2, 3, 4, 5, 6, 7, 8, 9, or 10.

In some embodiments, the protein polyurethane alloy can comprise a polyurethane having a tensile strength in the absence of protein. That same protein polyurethane alloy can have a tensile strength about 5% to about 55% greater than the tensile strength of the polyurethane in the absence of protein. This relative percent increase in tensile strength can be referred to as "% Delta Tensile Strength." In some embodiments, % Delta Tensile Strength can be 5% or more. In some embodiments, % Delta Tensile Strength can range from about 5% to about 55%, about 10% to about 55%, about 15% to about 55%, about 20% to about 55%, about 25% to about 55%, about 30% to about 55%, about 35% to about 55%, about 40% to about 55%, about 45% to about 55%, about 50% to about 55%, about 5% to about 50%, about 5% to about 45%, about 5% to about 40%, about 5% to about 35%, about 5% to about 30%, about 5% to about 25%, about 5% to about 20%, about 5% to about 15%, or about 5% to about 10%, or within a range having any two of these values as endpoints, inclusive of the endpoints. In some embodiments, % Delta Tensile Strength can range from about 15% to about 55%. In some embodiments, % Delta Tensile Strength can be greater than about 55%. For example, % Delta Tensile Strength can range from about 55% to about 1000%.

In some embodiments, the soy protein polyurethane alloy can comprise a polyurethane having a tensile strength in the absence of soy protein. That same soy protein polyurethane alloy can have a tensile strength about 10% to about 45% greater than the tensile strength of the polyurethane in the absence of soy protein. In some embodiments, % Delta Tensile Strength for the soy protein polyurethane alloy can be 10% or more. In some embodiments, % Delta Tensile Strength for the soy protein polyurethane alloy can range from about 10% to about 45%, about 15% to about 45%, about 20% to about 45%, about 25% to about 45%, about 30% to about 45%, about 35% to about 45%, about 40% to about 45%, about 10% to about 40%, about 10% to about 35%, about 10% to about 30%, about 10% to about 25%, about 10% to about 20%, or about 10% to about 15%, or within a range having any two of these values as endpoints, inclusive of the endpoints.

In some embodiments, the protein polyurethane alloy can comprise a polyurethane having a tensile strength in the absence of protein. That same protein polyurethane alloy can have a tensile strength ranging from about 2 MPa (megapascals) to about 8 MPa greater than the tensile strength of the polyurethane in the absence of protein. This relative increase in tensile strength can be referred to as "Delta Tensile Strength." In some embodiments, Delta Tensile Strength can be 2 MPa or more. In some embodiments, Delta Tensile Strength can range from about 2 MPa to about 8 MPa, about 3 MPa to about 8 MPa, about 4 MPa to about 8 MPa, about 5 MPa to about 8 MPa, about 6 MPa to about MPa, about 7 MPa to about 8 MPa, about 2 MPa to about 7 MPa, about 2 MPa to about 6 MPa, about 2 MPa to about 5 MPa, about 2 MPa to about 4 MPa, or about 2 MPa to about 3 MPa, or within a range having any two of these values as endpoints, inclusive of the endpoints. In some embodiments, Delta Tensile Strength can range from about 5 MPa to about 8 MPa. In some embodiments, Delta Tensile Strength can be greater than about 8 MPa. For example, Delta Tensile Strength can range from about 8 MPa to about 15 MPa.

In some embodiments, the soy protein polyurethane alloy can comprise a polyurethane having a tensile strength in the absence of soy protein. That same soy protein polyurethane alloy can have a tensile strength ranging from about 1.5 MPa to about 5.5 MPa greater than the tensile strength of the polyurethane in the absence of soy protein. In some embodiments, Delta Tensile Strength for the soy protein polyurethane alloy can be 1.5 MPa or more. In some embodiments, Delta Tensile Strength for the soy protein polyurethane alloy can range from about 1.5 MPa to about 5.5 MPa, about 2 MPa to about 5.5 MPa, about 3 MPa to about 5.5 MPa, about 4 MPa to about 5.5 MPa, about 1.5 MPa to about 5 MPa, about 1.5 MPa to about 4 MPa, or about 1.5 MPa to about 3 MPa, or within a range having any two of these values as endpoints, inclusive of the endpoints.

In some embodiments, the protein polyurethane alloy can have a tensile strength ranging from about 7 MPa to about 21 MPa, including subranges. For example, in some embodiments, the protein polyurethane alloy can have a tensile strength ranging from about 7 MPa to about 21 MPa, about 10 MPa to about 21 MPa, about 15 MPa to about 21 MPa, about 7 MPa to about 15 MPa, or about 7 MPa to about 10 MPa, or within a range having any of these values as endpoints, inclusive of the endpoints. In some embodiments, the protein polyurethane alloy can have a tensile strength greater than about 21 MPa. For example, the protein polyurethane alloy can have a tensile strength ranging from about 21 MPa to about 25 MPa.

In some embodiments, the soy protein polyurethane alloy can have a tensile strength ranging from about 14 MPa to about 19 MPa or about 16 MPa to about 19 MPa.

In some embodiments, the polyurethane in the absence of protein can have a tensile strength of about 2 MPa or more. In some embodiments, the polyurethane in the absence of protein can have a tensile strength ranging from about 2 MPa to about 35 MPa, including subranges. For example, in some embodiments, the polyurethane in the absence of protein can have a tensile strength ranging from about 2 MPa to about 35 MPa, about 5 MPa to about 30 MPa, about 10 MPa to about 25 MPa, or about 15 MPa to about 20 MPa, or within a range having any two of these values as endpoints, inclusive of the endpoints. In some embodiments, the polyurethane in the absence of protein can have a tensile strength ranging from about 10 MPa to about 15 MPa. In some embodiments, the polyurethane in the absence of protein can have a tensile strength ranging from about 1 MPa to about 35 MPa.

In some embodiments, the protein polyurethane alloy can comprise a polyurethane having a Young's modulus in the absence of protein. That same protein polyurethane alloy can have a Young's modulus ranging from about 10% to about 600% greater than the Young's modulus of the polyurethane in the absence of protein. This relative percent increase in Young's modulus can be referred to as "% Delta Young's Modulus." In some embodiments, the % Delta Young's Modulus can be about 10% or more. In some embodiments, the % Delta Young's Modulus can range from about 10% to about 600%, about 20% to about 600%, about 30% to about 600%, about 40% to about 600%, about 50% to about 600%, about 60% to about 600%, about 70% to about 600%, about 80% to about 600%, about 90% to about 600%, about 100% to about 600%, about 200% to about 600%, about 300% to about 600%, about 400% to about 600%, or about 500% to about 600%, or within a range having any two of these values as endpoints, inclusive of the end points. In some embodiments, the % Delta Young's Modulus can range from about 40% to about 600%. In some embodiments, the % Delta Young's Modulus can greater than about 600%. For example, the % Delta Young's Modulus can range from about 600% to about 2400%.

In some embodiments, the soy protein polyurethane alloy can comprise a polyurethane having a Young's modulus in the absence of soy protein. That same soy protein polyure- thane alloy can have a Young's modulus ranging from about 60% to about 570% greater than the Young's modulus of the polyurethane in the absence of soy protein. In some embodi- ments, the % Delta Young's Modulus for the soy protein polyurethane alloy can be about 60% or more. In some embodiments, the % Delta Young's Modulus for the soy protein polyurethane alloy can range from about 60% to about 570%, about 100% to about 570%, about 200% to about 570%, about 300% to about 570%, about 400% to about 570%, or about 500% to about 570%, or within a range having any two of these values as endpoints, inclusive of the end points.

In some embodiments, the protein polyurethane alloy can comprise a polyurethane having a Young's modulus in the absence of protein. That same protein polyurethane alloy can have a Young's modulus ranging from about 10 MPa to about 350 MPa greater than the Young's modulus of the polyurethane in the absence of protein. This relative increase in Young's modulus can be referred to as "Delta Young's Modulus." In some embodiments, the Delta Young's Modu- lus can be greater than 10 MPa. In some embodiments, the Delta Young's Modulus can range from about 10 MPa to about 350 MPa, about 25 MPa to about 350 MPa, about 50 MPa to about 350 MPa, about 100 MPa to about 350 MPa, about 150 MPa to about 350 MPa, about 200 MPa to about 350 MPa, about 250 MPa to about 350 MPa, about 300 MPa to about 350 MPa, about 10 MPa to about 300 MPa, about 10 MPa to about 250 MPa, about 10 MPa to about 200 MPa, about 10 MPa to about 150 MPa, about 10 MPa to about 100 MPa, about 10 MPa to about 50 MPa, or about 10 MPa to about 25 MPa, or within a range having any two of these values as endpoints, inclusive of the endpoints. In some embodiments, the Delta Young's Modulus can range from about 25 MPa to about 350 MPa. In some embodiments, the Delta Young's Modulus can range from about 100 MPa to about 350 MPa.

In some embodiments, the soy protein polyurethane alloy can comprise a polyurethane having a Young's modulus in the absence of soy protein. That same soy protein polyure- thane alloy can have a Young's modulus ranging from about 35 MPa to about 340 MPa greater than the Young's modulus of the polyurethane in the absence of soy protein. In some embodiments, the Delta Young's Modulus for the soy pro- tein polyurethane alloy can be greater than 35 MPa. In some embodiments, the Delta Young's Modulus for the soy pro- tein polyurethane alloy can range from about 35 MPa to about 340 MPa, about 50 MPa to about 340 MPa, about 100 MPa to about 340 MPa, about 150 MPa to about 340 MPa, about 200 MPa to about 340 MPa, about 250 MPa to about 340 MPa, about 300 MPa to about 340 MPa, about 35 MPa to about 300 MPa, about 35 MPa to about 250 MPa, about 35 MPa to about 200 MPa, about 35 MPa to about 150 MPa, about 35 MPa to about 100 MPa, or about 35 MPa to about 50 MPa, or within a range having any two of these values as endpoints, inclusive of the endpoints.

In some embodiments, the protein polyurethane alloy can have a Young's modulus ranging from about 50 MPa to about 450 MPa, including subranges. For example, in some embodiments, the protein polyurethane alloy can have a Young's modulus ranging from about 50 MPa to about 450 MPa, about 75 MPa to about 450 MPa, about 100 MPa to about 450 MPa, about 150 MPa to about 450 MPa, about 200 MPa to about 450 MPa, about 250 MPa to about 450 MPa, about 300 MPa to about 450 MPa, about 350 MPa to about 450 MPa, about 400 MPa to about 450 MPa, about 50 MPa to about 400 MPa, about 50 MPa to about 350 MPa, about 50 MPa to about 300 MPa, about 50 MPa to about 250 MPa, about 50 MPa to about 200 MPa, about 50 MPa to about 150 MPa, about 50 MPa to about 100 MPa, or about 50 MPa to about 75 MPa, or within a range having any two of these values as endpoints, inclusive of the endpoints. In some embodiments, the protein polyurethane alloy can have a Young's modulus ranging from about 75 MPa to about 450 MPa. In some embodiments, the protein polyurethane alloy can have a Young's modulus greater than about 450 MPa. For example, the protein polyurethane alloy can have a Young's modulus ranging from about 450 MPa to about 580 MPa.

In some embodiments, the soy protein polyurethane alloy can have a Young's modulus ranging from about 90 MPa to about 400 MPa, including subranges. For example, in some embodiments, the soy protein polyurethane alloy can have a Young's modulus ranging from about 90 MPa to about 400 MPa, about 100 MPa to about 400 MPa, about 150 MPa to about 400 MPa, about 200 MPa to about 400 MPa, about 250 MPa to about 400 MPa, about 300 MPa to about 400 MPa, about 350 MPa to about 400 MPa, about 90 MPa to about 350 MPa, about 90 MPa to about 300 MPa, about 90 MPa to about 250 MPa, about 90 MPa to about 200 MPa, about 90 MPa to about 150 MPa, or about 90 MPa to about 100 MPa, or within a range having any two of these values as endpoints, inclusive of the endpoints.

In some embodiments, the polyurethane in the absence of protein can have a Young's modulus of about 10 MPa or more. In some embodiments, the polyurethane in the absence of protein can have a Young's modulus ranging from about 10 MPa to about 600 MPa, including subranges. For example, in some embodiments, the polyurethane in the absence of protein can have a Young's modulus ranging from about 10 MPa to about 600 MPa, about 10 MPa to about 500 MPa, about 10 MPa to about 400 MPa, about 10 MPa to about 300 MPa, about 10 MPa to about 200 MPa, about 10 MPa to about 100 MPa, or about 10 MPa to about 50 MPa, or within a range having any two of these values as endpoints, inclusive of the endpoints. In some embodiments, the polyurethane in the absence of protein can have a Young's modulus ranging from about 50 MPa to about 100 MPa.

In some embodiments, the protein polyurethane alloy can comprise a polyurethane having a moisture vapor transmission rate in the absence of the protein. That same protein polyurethane alloy can have a moisture vapor transmission rate about 20% or more greater than the moisture vapor transmission rate in the absence of the protein. In some embodiments, the protein polyurethane alloy can have a moisture vapor transmission rate about 20% to about 600% greater than the moisture vapor transmission rate of the polyurethane in the absence of protein. This relative percent increase in moisture vapor transmission rate can be referred to as "% Delta MVTR." In some embodiments, % Delta MVTR can be about 20% or more. In some embodiments, % Delta MVTR can range from about 20% to about 600%, about 30% to about 600%, about 40% to about 600%, about 50% to about 600%, about 75% to about 600%, about 100% to about 600%, about 125% to about 600%, about 150% to about 600%, about 200% to about 600%, about 20% to about 500%, about 20% to about 400%, about 20% to about 300%, about 20% to about 200%, about 20% to about 150%, about 20% to about 125%, or about 20% to about 100%, or within a range having any two of these values as endpoints, inclusive of the endpoints.

In some embodiments, the soy protein polyurethane alloy can comprise a % Delta MVTR of about 20% or more. In some embodiments, % Delta MVTR for the soy protein polyurethane alloy can range from about 20% to about 600%, about 30% to about 600%, about 40% to about 600%, about 50% to about 600%, about 75% to about 600%, about 100% to about 600%, about 125% to about 600%, about 150% to about 600%, about 200% to about 600%, about 20% to about 500%, about 20% to about 400%, about 20% to about 300%, about 20% to about 200%, about 20% to about 150%, about 20% to about 125%, or about 20% to about 100%, or within a range having any two of these values as endpoints, inclusive of the endpoints.

In some embodiments, the protein polyurethane alloy can comprise a polyurethane having a moisture vapor transmission rate in the absence of protein. That same protein polyurethane alloy can comprise a moisture vapor transmission rate ranging from about 30 $g/m^2/24$ hr to about 500 $g/m^2/24$ hr greater than the moisture vapor transmission rate of the polyurethane in the absence of protein. This relative increase in moisture vapor transmission rate can be referred to as "Delta MVTR." In some embodiments, the Delta MVTR can be greater than or equal to 30 $g/m^2/24$ hr. In some embodiments, the Delta MVTR can range from about 30 $g/m^2/24$ hr to about 500 $g/m^2/24$ hr, about 40 $g/m^2/24$ hr to about 500 $g/m^2/24$ hr, about 50 $g/m^2/24$ hr to about 500 $g/m^2/24$ hr, about 75 $g/m^2/24$ hr to about 500 $g/m^2/24$ hr, about 100 $g/m^2/24$ hr to about 500 $g/m^2/24$ hr, about 150 $g/m^2/24$ hr to about 500 $g/m^2/24$ hr, about 200 $g/m^2/24$ hr to about 500 $g/m^2/24$ hr, about 300 $g/m^2/24$ hr to about 500 $g/m^2/24$ hr, about 30 $g/m^2/24$ hr to about 400 $g/m^2/24$ hr, about 30 $g/m^2/24$ hr to about 300 $g/m^2/24$ hr, about 30 $g/m^2/24$ hr to about 200 $g/m^2/24$ hr, about 30 $g/m^2/24$ hr to about 150 $g/m^2/24$ hr, about 30 $g/m^2/24$ hr to about 100 $g/m^2/24$ hr, about 30 MPa to about 75 $g/m^2/24$ hr, or about 30 $g/m^2/24$ hr to about 50 $g/m^2/24$ hr, or within a range having any two of these values as endpoints, inclusive of the endpoints.

In some embodiments, the soy protein polyurethane alloy can comprise a Delta MVTR greater than or equal to 30 $g/m^2/24$ hr. In some embodiments, the Delta MVTR for the soy protein polyurethane alloy can range from about 30 $g/m^2/24$ hr to about 500 $g/m^2/24$ hr, about 40 $g/m^2/24$ hr to about 500 $g/m^2/24$ hr, about 50 $g/m^2/24$ hr to about 500 $g/m^2/24$ hr, about 75 $g/m^2/24$ hr to about 500 $g/m^2/24$ hr, about 100 $g/m^2/24$ hr to about 500 $g/m^2/24$ hr, about 150 $g/m^2/24$ hr to about 500 $g/m^2/24$ hr, about 200 $g/m^2/24$ hr to about 500 $g/m^2/24$ hr, about 300 $g/m^2/24$ hr to about 500 $g/m^2/24$ hr, about 30 $g/m^2/24$ hr to about 400 $g/m^2/24$ hr, about 30 $g/m^2/24$ hr to about 300 $g/m^2/24$ hr, about 30 $g/m^2/24$ hr to about 200 $g/m^2/24$ hr, about 30 $g/m^2/24$ hr to about 150 $g/m^2/24$ hr, about 30 $g/m^2/24$ hr to about 100 $g/m^2/24$ hr, about 30 MPa to about 75 $g/m^2/24$ hr, or about 30 $g/m^2/24$ hr to about 50 $g/m^2/24$ hr, or within a range having any two of these values as endpoints, inclusive of the endpoints.

In some embodiments, the protein polyurethane alloy can comprise a moisture vapor transmission rate ranging from about 30 $g/m^2/24$ hr to about 1000 $g/m^2/24$ hr, including subranges. For example, in some embodiments, the protein polyurethane alloy can comprise a moisture vapor transmission rate ranging from about 30 $g/m^2/24$ hr to about 1000 $g/m^2/24$ hr, about 60 $g/m^2/24$ hr to about 1000 $g/m^2/24$ hr, about 100 $g/m^2/24$ hr to about 1000 $g/m^2/24$ hr, about 200 $g/m^2/24$ hr to about 1000 $g/m^2/24$ hr, about 250 $g/m^2/24$ hr to about 1000 $g/m^2/24$ hr, about 300 $g/m^2/24$ hr to about 1000 $g/m^2/24$ hr, about 400 $g/m^2/24$ hr to about 1000 $g/m^2/24$ hr, about 500 $g/m^2/24$ hr to about 1000 $g/m^2/24$ hr, about 30 $g/m^2/24$ hr to about 900 $g/m^2/24$ hr, about 30 $g/m^2/24$ hr to about 800 $g/m^2/24$ hr, about 30 $g/m^2/24$ hr to about 700 $g/m^2/24$ hr, about 30 $g/m^2/24$ hr to about 600 $g/m^2/24$ hr, about 30 $g/m^2/24$ hr to about 500 $g/m^2/24$ hr, about 30 $g/m^2/24$ hr to about 400 $g/m^2/24$ hr, about 30 $g/m^2/24$ hr to about 300 $g/m^2/24$ hr, about 30 $g/m^2/24$ hr to about 250 $g/m^2/24$ hr, about 30 $g/m^2/24$ hr to about 200 $g/m^2/24$ hr, or about 30 $g/m^2/24$ hr to about 100 $g/m^2/24$ hr, or within a range having any two of these values as endpoints, inclusive of the endpoints. In some embodiments, the protein polyurethane alloy can comprise a moisture vapor transmission rate of greater than or equal to about 250 $g/m^2/24$ hr. For example, in some embodiments, the protein polyurethane alloy can comprise a moisture vapor transmission rate ranging from about 250 $g/m^2/24$ hr to about 1000 $g/m^2/24$ hr, about 250 $g/m^2/24$ hr to about 700 $g/m^2/24$ hr, or about 250 $g/m^2/24$ hr to about 500 $g/m^2/24$ hr.

In some embodiments, the soy protein polyurethane alloy can comprise a moisture vapor transmission rate ranging from about 30 $g/m^2/24$ hr to about 1000 $g/m^2/24$ hr, including subranges. For example, in some embodiments, the soy protein polyurethane alloy can comprise a moisture vapor transmission rate ranging from about 30 $g/m^2/24$ hr to about 1000 $g/m^2/24$ hr, about 60 $g/m^2/24$ hr to about 1000 $g/m^2/24$ hr, about 100 $g/m^2/24$ hr to about 1000 $g/m^2/24$ hr, about 200 $g/m^2/24$ hr to about 1000 $g/m^2/24$ hr, about 250 $g/m^2/24$ hr to about 1000 $g/m^2/24$ hr, about 300 $g/m^2/24$ hr to about 1000 $g/m^2/24$ hr, about 400 $g/m^2/24$ hr to about 1000 $g/m^2/24$ hr, about 500 $g/m^2/24$ hr to about 1000 $g/m^2/24$ hr, about 30 $g/m^2/24$ hr to about 900 $g/m^2/24$ hr, about 30 $g/m^2/24$ hr to about 800 $g/m^2/24$ hr, about 30 $g/m^2/24$ hr to about 700 $g/m^2/24$ hr, about 30 $g/m^2/24$ hr to about 600 $g/m^2/24$ hr, about 30 $g/m^2/24$ hr to about 500 $g/m^2/24$ hr, about 30 $g/m^2/24$ hr to about 400 $g/m^2/24$ hr, about 30 g/m$^2$/24 hr to about 300 g/m$^2$/24 hr, about 30 g/m$^2$/24 hr to about 250 g/m$^2$/24 hr, about 30 g/m$^2$/24 hr to about 200 g/m$^2$/24 hr, or about 30 g/m$^2$/24 hr to about 100 g/m$^2$/24 hr, or within a range having any two of these values as endpoints, inclusive of the endpoints. In some embodiments, the soy protein polyurethane alloy can comprise a moisture vapor transmission rate of greater than or equal to about 250 g/m$^2$/24 hr. For example, in some embodiments, the soy protein polyurethane alloy can comprise a moisture vapor transmission rate ranging from about 250 g/m$^2$/24 hr to about 1000 g/m$^2$/24 hr, about 250 g/m$^2$/24 hr to about 700 g/m$^2$/24 hr, or about 250 g/m$^2$/24 hr to about 500 g/m$^2$/24 hr.

Figure 17:
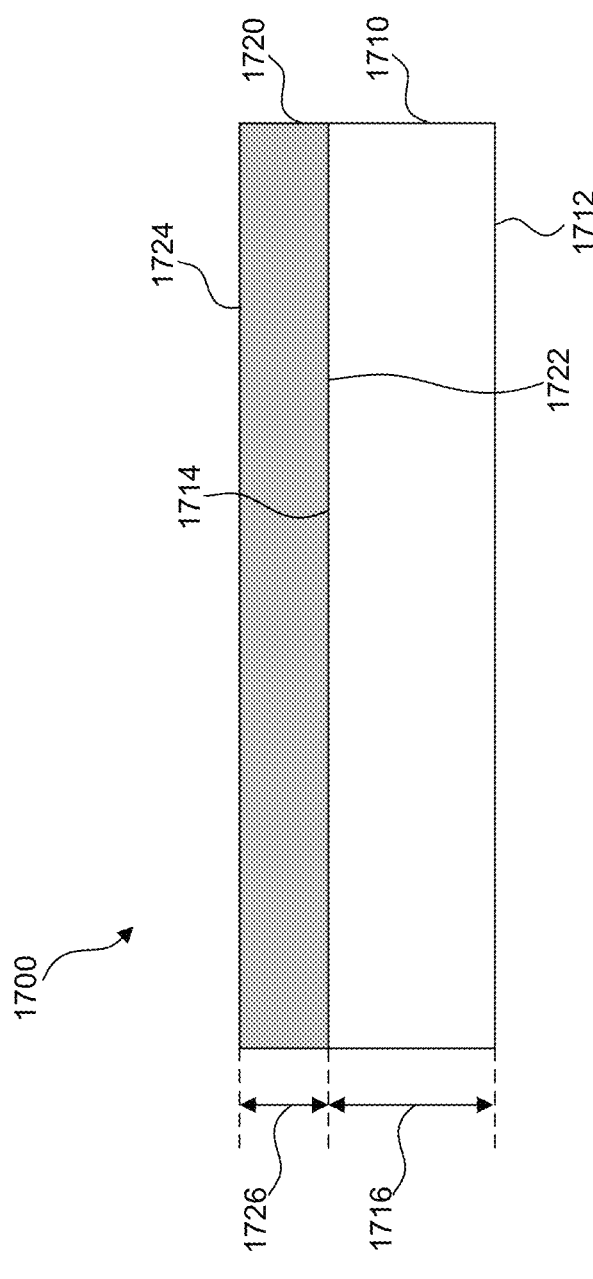
FIG. 17 illustrates a layered material according to some embodiments.

FIG. 17 shows a layered material 1700 according to some embodiments. Layered material 1700 includes a polyurethane protein alloy layer 1720 attached to a substrate layer 1710. Polyurethane protein alloy layer 1720 can be directly attached to a surface of substrate layer 1710 or attached to a surface of substrate layer 1710 via an intermediate layer, for example an adhesive layer. Direct attachment can be achieved using, for example, a thermal bonding process or a stitching. Polyurethane protein alloy layer 1720 can be referred to as a "first polyurethane protein alloy layer."

Polyurethane protein alloy layer 1720 can include one or more types of protein and one or more polyurethanes. In some embodiments, polyurethane protein alloy layer 1720 can include one or more proteins dissolved within one or more polyurethanes. In some embodiments, polyurethane protein alloy layer 1720 can be transparent. The transparency of a polyurethane protein alloy layer is evaluated before dying or otherwise coloring a polyurethane protein alloy layer.

A transparent protein polyurethane alloy layer can provide unique characteristics for a layered material. For example, compared to a non-transparent layer, a transparent protein polyurethane alloy layer can provide unique depth of color when dyed. Likewise, a transparent protein polyurethane alloy layer can provide its mechanical properties to a layered material without significantly influencing the aesthetic properties of the material.

Protein polyurethane alloy layer 1720 includes a bottom surface 1722, a top surface 1724, and thickness 1726 measured between bottom surface 1722 and top surface 1724. In some embodiments, thickness 1726 can range from about 25 microns to about 400 microns (micrometers, μm), including subranges. For example, thickness 1726 can be about 25 microns, about 50 microns, about 100 microns, about 125 microns, about 150 microns, about 175 microns, about 200 microns, about 250 microns, about 300 microns, about 350 microns, or about 400 microns, or within a range having any two of these values as endpoints, inclusive of the endpoints. In some embodiments, thickness 1726 can range from about 50 microns to about 350 microns, about 75 microns to about 300 microns, about 100 microns to about 250 microns, about 125 microns to about 200 microns, or about 150 microns to about 175 microns.

Protein polyurethane alloy layer 1720 can have a dry weight, measured in grams per square meter (gsm, g/m$^2$), ranging from about 25 g/m$^2$ to about 125 g/m$^2$, including subranges. For example, protein polyurethane alloy layer 1720 can have a dry weight of about 25 g/m$^2$, about 50 g/m$^2$, about 75 g/m$^2$, about 100 g/m$^2$, or about 125 g/m$^2$, or within a range having any two of these values as endpoints, inclusive of the endpoints. In some embodiments, protein polyurethane alloy layer 1720 can have a dry weight ranging from about 25 g/m$^2$ to about 125 g/m$^2$, about 25 g/m$^2$ to about 100 g/m$^2$, or about 50 g/m$^2$ to about 100 g/m$^2$.

Unless specified otherwise, the dry weight of a layer is measured during the process of making a material using the following method. First, before applying the layer in question to the material, a first sample (about 10 centimeters in diameter) of the material is cut, and the weight and dimensions are measured to calculate a first dry weight. If a sacrificial layer is present, it is removed before measuring the weight and dimensions. Second, after applying and drying the layer in question, a second sample of the same size is cut from the material, and the weight and dimensions are measured to calculate a second dry weight. If a sacrificial layer is present, it is removed before measuring the weight and dimensions. Third, the first dry weight is subtracted from the second dry weight to obtain the dry weight of the layer in question. All the weight and dimension measurements are performed at the same humidity level, typically the humidity level of the manufacturing environment in which the material is made. For purposes of calculating a dry weight, three separate dry weight tests are performed, and the average dry weight is reported as the dry weight of the layer.

In some embodiments, protein polyurethane alloy layer 1720 can be a non-foamed layer. A "non-foamed" layer means a layer having a density, measured in the percent void space for the layer, of 5% void space or less, for example 0% void space to 5% void space. In some embodiments, protein polyurethane alloy layer 1720 can be a foamed layer. In such embodiments, protein polyurethane alloy layer 1720 can have a density, measured in the percent void space for layer 1720, ranging from about 5% void space to about 70% void space, including subranges. For example, protein polyurethane alloy layer 1720 can have about 5% void space, about 10% void space, about 20% void space, about 30% void space, about 35% void space, about 40% void space, about 45% void space, about 50% void space, about 55% void space, about 60% void space, about 65% void space, or about 70% void space, or within a range having any two of these values as endpoints, inclusive of the endpoints. In some embodiments, protein polyurethane alloy layer 1720 can have a percent void space ranging from about 10% to about 65%, about 20% to about 60%, about 30% to about 55%, about 35% to about 50%, or about 40% to about 45%.

A percent void space (which can also be referred to as a "percent porosity") can be measured by image analysis of a cross-section of a layer or by measuring the bulk density of sample of a layer using a pycnometer. Unless specified otherwise, a percent void space reported herein is measured by image analysis of a cross-section of a layer. The images are analyzed using ImageJ software (or equivalent software) at 37× magnification. The ImageJ software uses a trainable Weka segmentation classifier to calculate the percent void space in the layer. For purposes of calculating a percent void space, three to five separate images of a cross-section are evaluated, and the average percent void space is reported as the percent void space for the layer. In some embodiments, protein polyurethane alloy layer 1720 can include one or more foaming agents and/or foam stabilizers. Suitable foaming agents and foam stabilizers include those discussed herein for layers 1730 and 1740.

Substrate layer 1710 includes a bottom surface 1712, a top surface 1714, and a thickness 1716 measured between bottom surface 1712 and top surface 1714. In some embodiments, thickness 1716 can range from about 50 microns to about 1000 microns, including subranges. For example, thickness 1716 can be about 50 microns, about 100 microns, about 150 microns, about 200 microns, about 250 microns, about 300 microns, about 350 microns, about 400 microns, about 500 microns, about 600 microns, about 700 microns, about 800 microns, about 900 microns, or about 1000 microns, or within a range having any two of these values as endpoints, inclusive of the endpoints. In some embodiments, thickness 1716 can range from about 100 microns to about 900 microns, about 150 microns to about 800 microns, about 200 microns to about 700 microns, about 250 microns to about 600 microns, about 300 microns to about 500 microns, or about 350 microns to about 400 microns.

Substrate layer 1710 can have a dry weight, measured in grams per square meter (g/m$^2$), ranging from about 50 g/m$^2$ to about 600 g/m$^2$, including subranges. For example, substrate layer 110 can have a dry weight of about 50 g/m$^2$, about 75 g/m$^2$, about 100 g/m$^2$, about 125 g/m$^2$, about 150 g/m$^2$, about 175 g/m$^2$, about 200 g/m$^2$, about 300 g/m$^2$, about 400 g/m$^2$, about 500 g/m$^2$, or about 600 g/m$^2$, or within a range having any two of these values as endpoints. In some embodiments, substrate layer 1710 can have a dry weight ranging from about 75 g/m$^2$ to about 500 g/m$^2$, about 100 g/m$^2$ to about 400 g/m$^2$, about 125 g/m$^2$ to about 300 g/m$^2$, about 150 g/m$^2$ to about 200 g/m$^2$, or about 175 g/m$^2$ to about 200 g/m$^2$.

Substrate layer 1710 can include one or more textile layers. The one or more textile layers can be, for example, a woven layer, a non-woven layer, a knit layer, a mesh fabric layer, or a leather layer. The one or more textile layer can be comprised of recycled or virgin fibers, filaments or yarns. In some embodiments, substrate layer 1710 can be, or can include, a polyester knit layer, a polyester cotton spandex blend knit layer, or a suede layer. In some embodiments, substrate layer 1710 can be made from one or more natural fibers, for example fibers made from cotton, linen, silk, wool, kenaf, flax, cashmere, angora, bamboo, bast, hemp, soya, seacell, milk or milk proteins, spider silk, chitosan, mycelium, cellulose including bacterial cellulose, or wood. Mycelium is the vegetative part of a fungus or fungus-like bacterial colony, composed of a mass of branching, thread-like hyphae. Fungi are composed primarily of a cell wall that is constantly being extended at the apex of the hyphae. Unlike the cell wall of a plant, which is composed primarily of cellulose, or the structural component of an animal cell, which relies on collagen, the structural oligosaccharides of the cell wall of fungi rely primarily on chitin and beta glucan. Chitin is a strong, hard substance, also found in the exoskeletons of arthropods.

In some embodiments, substrate layer 1710 can be made from one or more synthetic fibers, for example fibers made from polyesters, nylons, aromatic polyamides, polyolefin fibers such as polyethylene, polypropylene, rayon, lyocell, viscose, antimicrobial yarn (A.M.Y.), Sorbtek, nylon, elastomers such as LYCRA®, spandex, or ELASTANE®, polyester-polyurethane copolymers, aramids, carbon including carbon fibers and fullerenes, glass, silicon, minerals, metals or metal alloys including those containing iron, steel, lead, gold, silver, platinum, copper, zinc, and titanium, or mixtures thereof.

In some embodiments, non-woven substrate layer 1710 can be a staple non-woven, melt-blown non-woven, spunlaid non-woven, flashspun non-woven, or a combination thereof. In some embodiments, non-woven substrate layer 1710 can be made by carding, can be air-laid, or can be wet-laid. In some embodiments, the carded, air-laid, or wet-laid substrates can be bonded by, for example, needle-punch, hydroentanglement, lamination, or thermal bonding. In some embodiments, non-woven substrate layer 1710 can include one or more natural fibers, for example fibers made from cotton, linen, silk, wool, kenaf, flax, cashmere, angora, bamboo, bast, hemp, soya, seacell, milk or milk proteins, spider silk, chitosan, mycelium, cellulose including bacterial cellulose, or wood.

In some embodiments, non-woven substrate layer 1710 can include polymeric fibers with functional particles in the polymer. Exemplary functional particles include ceramic particles mixed in a polymeric resin during an extrusion process for making the polymeric fibers. Such ceramic particles can provide the polymeric fibers with desirable heat dissipation and flame resistance properties. In some embodiments, non-woven substrate layer 1710 can include fibers made of fruit pulp (e.g., grape pulp or apple pulp) or pineapple fibers. In some embodiments, non-woven substrate layer 1710 can include fibers made from recycled materials, for example recycled plastics. In some embodiments, non-woven substrate layer 1710 can include algae fibers. In some embodiments, a non-woven substrate layer 1710 can include cork fibers.

Figure 21:
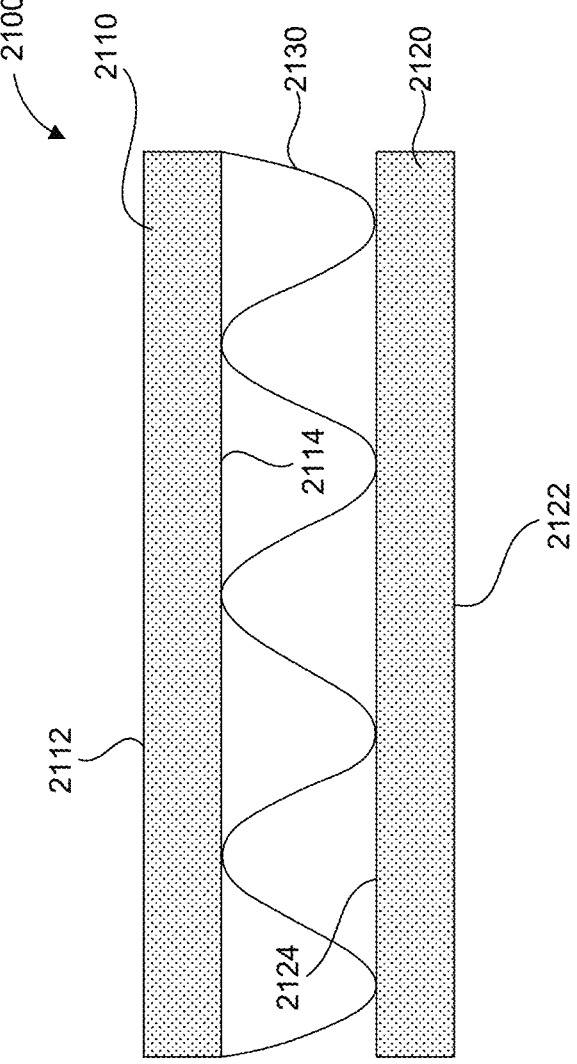
FIG. 21 illustrates a spacer fabric according to some embodiments.

In some embodiments, substrate layer 1710 can be, or can include, a spacer fabric, for example spacer fabric 2100, shown in FIG. 21. Spacer fabric 2100 includes a first fabric layer 2110 and a second fabric layer 2120 connected by one or more spacer yarns 2130. Spacer yarn(s) 2130 are disposed between first fabric layer 2110 and second fabric layer 2120 and define a distance between an interior surface 2114 of first fabric layer 2110 and an interior surface 2124 of second fabric layer 2120. Exterior surface 2112 of first fabric layer 2110 and exterior surface 2122 of second fabric layer 2120 can define top surface 1714 and bottom surface 1712 of substrate layer 1710, respectively.

First fabric layer 2110 and second fabric layer 2120 can include one or more layers of fabric material. In some embodiments, first fabric layer 2110 and second fabric layer 2120 can include one or more textile layers made from staple fibers, filaments, or mixtures thereof. As used herein, "staple fibers" are fibers having a short length, between about 0.2 mm to about 5 centimeters (cm). Staple fibers can be naturally occurring or can be cut filaments. As used herein, "filaments" are long fibers having a length of 5 cm or more. In some embodiments, first fabric layer 2110 and second fabric layer 2120 can include one or more layers of a woven material or a knitted material. In some embodiments, exterior surface 2112 of first fabric layer 2110 can be defined by a woven fabric layer or a knitted fabric layer. In some embodiments, exterior surface 2122 of second fabric layer 2120 can be defined by a woven fabric layer or a knitted fabric layer.

In some embodiments, first fabric layer 2110 and second fabric layer 2120 can be made from one or more natural fibers, for example fibers made from cotton, linen, silk, wool, kenaf, flax, cashmere, angora, bamboo, bast, hemp, soya, seacell, milk or milk proteins, spider silk, chitosan, mycelium, cellulose including bacterial cellulose, or wood. In some embodiments, first fabric layer 2110 and second fabric layer 2120 can be made from one or more synthetic fibers, for example fibers made from polyesters, nylons, aromatic polyamides, polyolefin fibers such as polyethylene, polypropylene, rayon, lyocell, viscose, antimicrobial yarn (A.M.Y.), Sorbtek, nylon, elastomers such as LYCRA®, spandex, or ELASTANE®, polyester-polyurethane copolymers, aramids, carbon including carbon fibers and fullerenes, glass, silicon, minerals, metals or metal alloys including those containing iron, steel, lead, gold, silver, platinum, copper, zinc, and titanium, or mixtures thereof. Spacer yarn(s) 2130 can include mono-filament yarn(s) composed of any of the natural or synthetic materials listed above for first fabric layer 2110 and second fabric layer 2120.

In some embodiments, substrate layer 1710 can be colored with a coloring agent. In some embodiments the coloring agent can be a dye, for example an acid dye, a fiber reactive dye, a direct dye, a sulfur dye, a basic dye, or a reactive dye. In some embodiments, the coloring agent can be pigment, for example a lake pigment. In some embodiments, a first coloring agent can be incorporated into one or more protein polyurethane alloy layers and a second coloring agent can be incorporated into substrate layer 1710, depending on the desired aesthetic of a layered material.

A fiber reactive dye includes one or more chromophores that contain pendant groups capable of forming covalent bonds with nucleophilic sites in fibrous, cellulosic substrates in the presence of an alkaline pH and raised temperature. These dyes can achieve high wash fastness and a wide range of brilliant shades. Exemplary fiber reactive dyes, include but are not limited to, sulphatoethylsulphone (Remazol), triazine, vinylsulphone, and acrylamido dyes. These dyes can dye protein fibers such as silk, wool and nylon by reacting with fiber nucleophiles via a Michael addition. Direct dyes are anionic dyes capable of dying cellulosic or protein fibers. In the presence of an electrolyte such as sodium chloride or sodium sulfate, near boiling point, these dyes can have an affinity to cellulose. Exemplary direct dyes include, but are not limited to, azo, stilbene, phthalocyanine, and dioxazine.

In some embodiments, layered material 1700 can include a protein polyurethane alloy layer 1720 attached to top surface 1714 of substrate layer 1710. In some embodiments, bottom surface 1722 of protein polyurethane alloy layer 1720 can be in direct contact with top surface 1714 of substrate layer 1710. In some embodiments, bottom surface 1722 of protein polyurethane alloy layer 1720 can be attached to top surface 1714 of substrate layer 1710 via an adhesive layer (e.g., adhesive layer 1750). In some embodiments, layered material 1700 can include a protein polyurethane alloy layer 1720 attached to bottom surface 1712 of substrate layer 1710. In some embodiments, top surface 1724 of protein polyurethane alloy layer 1720 can be in direct contact with bottom surface 1712 of substrate layer 1710. In some embodiments, top surface 1724 of protein polyurethane alloy layer 1720 can be attached to bottom surface 1712 of substrate layer 1710 via an adhesive layer (e.g., adhesive layer 1750). In some embodiments, layered material 1700 can include a protein polyurethane alloy layer 1720 attached to top surface 1714 of substrate layer 1710 and a protein polyurethane alloy layer 1720 attached to bottom surface 1712 of substrate layer 1710. In such embodiments, layered material 1700 includes protein polyurethane alloy layers 1720 disposed on opposing surfaces of substrate layer 1710.

Figure 18:
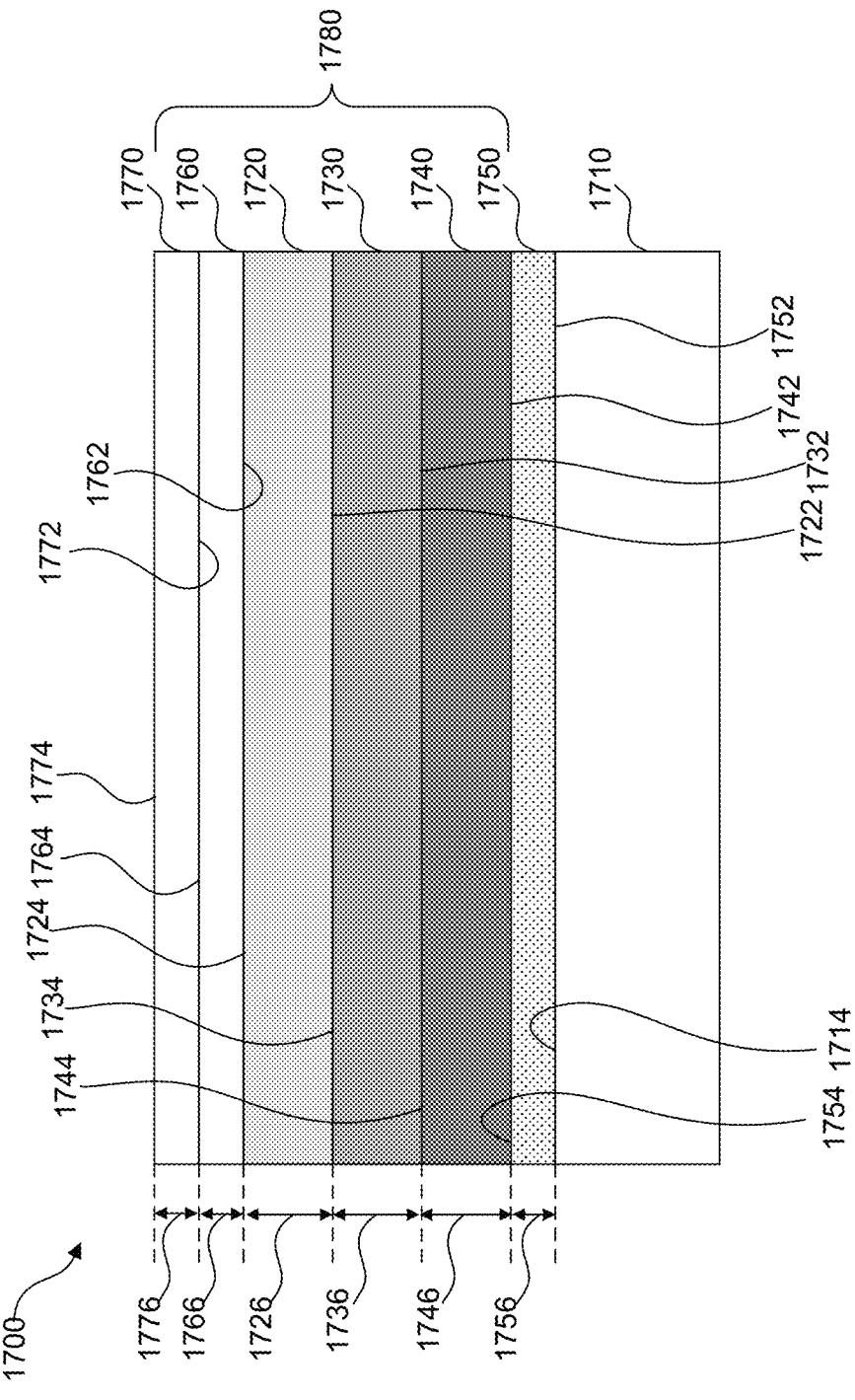
FIG. 18 illustrates a layered material according to some embodiments.

In some embodiments, as shown for example in FIG. 18, layered material 1700 can include a second protein polyurethane alloy layer 1730 disposed between protein polyurethane alloy layer 1720 and substrate layer 1710. In such embodiments, second protein polyurethane alloy layer 1730 is attached to protein polyurethane alloy layer 1720. In some embodiments, bottom surface 1722 of protein polyurethane alloy layer 1720 can be in direct contact with a top surface 1734 of second protein polyurethane alloy layer 1730.

Second protein polyurethane alloy layer 1730 includes a bottom surface 1732, top surface 1734, and a thickness 1736 measured between bottom surface 1732 and top surface 1734. In some embodiments, thickness 1736 can range from about 25 microns to about 600 microns, including subranges. For example, thickness 1736 can be about 25 microns, about 50 microns, about 100 microns, about 125 microns, about 150 microns, about 175 microns, about 200 microns, about 225 microns, about 250 microns, about 275 microns, about 300 microns, about 400 microns, about 500 microns, or about 600 microns, or within a range having any two of these values as endpoints, inclusive of the endpoints. In some embodiments, thickness 1736 can range from about 50 microns to about 500 microns, about 75 microns to about 400 microns, about 100 microns to about 300 microns, about 125 microns to about 275 microns, about 150 microns to about 250 microns, about 175 microns to about 225 microns, or about 200 microns to about 225 microns. In some embodiments, thickness 1736 can be greater than thickness 1726. In some embodiments, thickness 1736 can be less than thickness 1726. In some embodiments, thickness 1736 can be greater than or less than thickness 1726 by 5 microns or more.

Second protein polyurethane alloy layer 1730 can have a dry weight, measured in grams per square meter (g/m$^2$), ranging from about 30 g/m$^2$ to about 600 g/m$^2$, including subranges. For example, second protein polyurethane alloy layer 1730 can have a dry weight of about 30 g/m$^2$, about 40 g/m$^2$, about 60 g/m$^2$, about 80 g/m$^2$, about 100 g/m$^2$, about 120 g/m$^2$, about 140 g/m$^2$, about 150 g/m$^2$, about 200 g/m$^2$, about 300 g/m$^2$, about 400 g/m$^2$, about 500 g/m$^2$, or about 600 g/m$^2$, or within a range having any two of these values as endpoints, inclusive of the endpoints. In some embodiments, second protein polyurethane alloy layer 1730 can have a dry weight ranging from about 40 g/m$^2$ to about 500 g/m$^2$, about 60 g/m$^2$ to about 400 g/m$^2$, about 80 g/m$^2$ to about 300 g/m$^2$, about 100 g/m$^2$ to about 200 g/m$^2$, about 120 g/m$^2$ to about 150 g/m$^2$, or about 140 g/m$^2$ to about 150 g/m$^2$. In some embodiments, protein polyurethane alloy layer 1720 can have a first weight and second protein polyurethane alloy layer 1730 can have a second weight, and the first weight can be less than the second weight. In some embodiments, the first weight can be less than the second weight by 5 g/m$^2$ or more.

In some embodiments, second protein polyurethane alloy layer 1730 can include a foaming agent. In some embodiments, second protein polyurethane alloy layer 1730 can include a foam stabilizer. The foaming agent or foam stabilizer can facilitate the formation of voids in second protein polyurethane alloy layer 1730 during blending of second protein polyurethane alloy layer 1730. Suitable foam stabilizers include, but are not limited to, HeiQ Chemtex 2216-T (a stabilized blend of nonionic and anionic surfactants), HeiQ Chemtex 2241-A (a modified HEUR (hydrophobically-modified ethylene oxide urethane) thickener), HeiQ Chemtex 2243 (a non-ionic silicone dispersion), or HeiQ Chemtex 2317 (a stabilized blend of nonionic and anionic surfactants) foam stabilizers available from HeiQ Chemtex. When used, a foam stabilizer serves to stabilize mechanically created foam (air voids). The mechanically created foam may be created by, for example, a rotor and/or compressed air. When used, a foaming agent can create foam (air voids) within a layer by a chemical reaction and/or via heat generation within the layer.

In some embodiments, second protein polyurethane alloy layer 1730 can be referred to as a "foamed protein polyurethane alloy layer" because either (i) layer 1730 includes one or more foaming agents or foam stabilizers and/or (ii) layer 1730 includes a density less than protein polyurethane alloy layer 1720.

Second protein polyurethane alloy layer 1730 can have a density, measured in the percent void space for layer 1730, ranging from about 5% void space to about 70% void space, including subranges. For example, second protein polyurethane alloy layer 1730 can have about 5% void space, about 10% void space, about 20% void space, about 30% void space, about 35% void space, about 40% void space, about 45% void space, about 50% void space, about 55% void space, about 60% void space, about 65% void space, or about 70% void space, or within a range having any two of these values as endpoints, inclusive of the endpoints. In some embodiments, second protein polyurethane alloy layer 1730 can have a percent void space ranging from about 10% to about 65%, about 20% to about 60%, about 30% to about 55%, about 35%, to about 50%, or about 40% to about 45%. In some embodiments, protein polyurethane alloy layer 1720 can have a first density and second protein polyurethane alloy layer 1730 can have a second density, and the first density can be greater than the second density. In some embodiments, the first density can be greater than the second density by 5% void space or more.

Layering a plurality of protein polyurethane alloy layers having different weights and/or densities can be used to tailor the material properties of a layered material. For example, layers having lighter weights and/or densities can be used to increase the softness and/or flexibility of a layered material. On the other hand, layers having high weights and/or densities can increase the strength of the layered material. Additionally, using one or more layers having relatively lighter weight and/or density can increase the ease in which cutting, stitching, and/or shaping process steps (e.g., skyving) can be performed on a layered material. Layering a plurality of protein polyurethane alloy layers gives lot of freedom in designing of a material.

In some embodiments, second protein polyurethane alloy layer 1730 can further include, in addition to any other components that may be present, such as a foaming agent, a foam stabilizer, or one or more coloring agents. The coloring agent type and content for second protein polyurethane alloy layer 1730 can be any of the types and amounts described herein for protein polyurethane alloy layer 1720. In some embodiments, second protein polyurethane alloy layer 1730 can be free or substantially free of a coloring agent.

In some embodiments, as shown for example in FIG. 18, layered material 1700 can include a third protein polyurethane alloy layer 1740 disposed between second protein polyurethane alloy layer 1730 and substrate layer 1710. In such embodiments, third protein polyurethane alloy layer 1740 is attached to second protein polyurethane alloy layer 1730. In some embodiments, bottom surface 1732 of second protein polyurethane alloy layer 1730 can be in direct contact with a top surface 1744 of third protein polyurethane alloy layer 1740.

Third protein polyurethane alloy layer 1740 includes a bottom surface 1742, top surface 1744, and a thickness 1746 measured between bottom surface 1742 and top surface 1744. In some embodiments, thickness 1746 can range from about 25 microns to about 600 microns, including subranges. For example, thickness 1746 can be about 25 microns, about 50 microns, about 100 microns, about 125 microns, about 150 microns, about 175 microns, about 200 microns, about 225 microns, about 250 microns, about 275 microns, about 300 microns, about 400 microns, about 500 microns, or about 600 microns, or within a range having any two of these values as endpoints, inclusive of the endpoints. In some embodiments, thickness 1746 can range from about 50 microns to about 500 microns, about 75 microns to about 400 microns, about 100 microns to about 300 microns, about 125 microns to about 275 microns, about 150 microns to about 250 microns, about 175 microns to about 225 microns, or about 175 microns to about 200 microns. In some embodiments, thickness 1746 can be greater than thickness 1726. In some embodiments, thickness 1746 can be less than thickness 1726. In some embodiments, thickness 1746 can be greater than or less than thickness 1726 by 5 microns or more. In some embodiments, thickness 1746 can be the same as thickness 1736. In some embodiments, thickness 1746 can be greater than or less than thickness 1736. In some embodiments, thickness 1746 can be greater than or less than thickness 1736 by 5 microns or more.

Third protein polyurethane alloy layer 1740 can have a dry weight, measured in grams per square meter ($g/m^2$), ranging from about 30 $g/m^2$ to about 600 $g/m^2$, including subranges. For example, third protein polyurethane alloy layer 1740 can have a dry weight of about 30 $g/m^2$, about 40 $g/m^2$, about 60 $g/m^2$, about 80 $g/m^2$, about 100 $g/m^2$, about 120 $g/m^2$, about 140 $g/m^2$, about 150 $g/m^2$, about 200 $g/m^2$, about 300 $g/m^2$, about 400 $g/m^2$, about 500 $g/m^2$, or about 600 $g/m^2$, or within a range having any two of these values as endpoints, inclusive of the endpoints. In some embodiments, third protein polyurethane alloy layer 1740 can have a dry weight ranging from about 40 $g/m^2$ to about 500 $g/m^2$, about 60 $g/m^2$ to about 400 $g/m^2$, about 80 $g/m^2$ to about 300 $g/m^2$, about 100 $g/m^2$ to about 200 $g/m^2$, about 120 $g/m^2$ to about 150 $g/m^2$, or about 120 $g/m^2$ to about 140 $g/m^2$. In some embodiments, protein polyurethane alloy layer 1720 can have a first weight and third protein polyurethane alloy layer 1740 can have a third weight, and the first weight can be less than the third weight. In some embodiments, protein polyurethane alloy layer 1720 can have a first weight, second protein polyurethane alloy layer 1730 can have a second weight, and third protein polyurethane alloy layer 1740 can have a third weight, and the first weight can be less than the second weight and the third weight. In some embodiments, the first weight can be less than the second weight and/or the third weight by 5 $g/m^2$ or more.

In some embodiments, third protein polyurethane alloy layer 1740 can include a foaming agent. In some embodiments, third protein polyurethane alloy layer 1740 can include a foam stabilizer. The foaming agent and/or foam stabilizer can facilitate the formation of voids in third protein polyurethane alloy layer 1740 during blending of third protein polyurethane alloy layer 1740. Suitable foaming agents include, but are not limited to, HeiQ Chemtex 2216-T (a stabilized blend of nonionic and anionic surfactants), HeiQ Chemtex 2241-A (a modified HEUR (hydrophobically-modified ethylene oxide urethane) thickener), HeiQ Chemtex 2243 (a non-ionic silicone dispersion), or HeiQ Chemtex 2317 (a stabilized blend of nonionic and anionic surfactants) foam stabilizers available from HeiQ Chemtex.

In some embodiments, third protein polyurethane alloy layer 1740 can be referred to as a "foamed protein polyurethane alloy layer" because either (i) layer 1740 includes one or more foaming agents or foam stabilizers and/or (ii) layer 1740 includes a density less than protein polyurethane alloy layer 120.

Third protein polyurethane alloy layer 1740 can have a density, measured in the percent void space for layer 1740, ranging from about 5% void space to about 70% void space, including subranges. For example, third protein polyurethane alloy layer 1740 can have about 5% void space, about 10% void space, about 20% void space, about 30% void space, about 35% void space, about 40% void space, about 45% void space, about 50% void space, about 55% void space, about 60% void space, about 65% void space, or about 70% void space, or within a range having any two of these values as endpoints, inclusive of the endpoints. In some embodiments, third protein polyurethane alloy layer 1740 can have a percent void space ranging from about 10% to about 65%, about 20% to about 60%, about 30% to about 55%, about 35% to about 50%, or about 40% to about 45%. In some embodiments, protein polyurethane alloy layer 1720 can have a first density and third protein polyurethane alloy layer 1740 can have a third density, and the first density can be greater than the third density. In some embodiments, protein polyurethane alloy layer 1720 can have a first density, second protein polyurethane alloy layer 1730 can have a second density, and third protein polyurethane alloy layer 1740 can have a third density, and the first density can be greater than the second density and third density. In some embodiments, the first density can be greater than the second density and/or the third density by 5% void space or more.

In some embodiments, layered material 1700 can include a plurality of protein polyurethane alloy layers having the same protein and polyurethane. In some embodiments, layered material 1700 can include a plurality of protein polyurethane alloy layers and the different layers can have a different protein and/or a different polyurethane.

In some embodiments, third protein polyurethane alloy layer 1740 can further include, in addition to any other components that may be present, such as a foaming agent, a foam stabilizer, one or more coloring agents. The coloring agent type and content for third protein polyurethane alloy layer 1740 can be any of the types and amounts described herein for protein polyurethane alloy layer 1720. In some embodiments, third protein polyurethane alloy layer 1740 can be free or substantially free of a coloring agent.

In some embodiments, and as shown for example in FIG. 18, layered material 1700 can include a basecoat layer 1760. Basecoat layer 1760 can be disposed over top surface 1724 of protein polyurethane alloy layer 1720. Basecoat layer 1760 can be directly or indirectly attached to protein polyurethane alloy layer 1720. In some embodiments, basecoat layer 1760 can be disposed on top surface 1724 of protein polyurethane alloy layer 1720. In some embodiments, a bottom surface 1762 of basecoat layer 1760 can be in direct contact with top surface 1724 of protein polyurethane alloy layer 1720.

Basecoat layer 1760 includes bottom surface 1762, a top surface 1764, and a thickness 1766 measured between bottom surface 1762 and top surface 1764. In some embodiments, thickness 1766 can range from about 20 microns to about 200 microns, including subranges. For example, thickness 1766 can be about 20 microns, about 30 microns, about 40 microns, about 50 microns, about 60 microns, about 70 microns, about 80 microns, about 90 microns, about 100 microns, about 150 microns, or about 200 microns, or within a range having any two of these values as endpoints, inclusive of the endpoints. In some embodiments, thickness 1766 can range from about 30 microns to about 150 microns, about 40 microns to about 100 microns, about 50 microns to about 90 microns, about 60 microns to about 80 microns, or about 60 microns to about 70 microns.

In embodiments including basecoat layer 1760, basecoat layer 1760 can provide one or more of the following properties for layered material 1700: (i) abrasion performance, color fastness, or hydrolytic resistance. Basecoat layer 1760 may also serve to adhere to a top-coat layer to layered material 1700 in embodiments including a top-coat layer. In some embodiments, basecoat layer 1760 can include one or more polymeric materials. Suitable materials for basecoat layer 1760 include, but are not limited to, polyether polyurethanes, polycarbonate polyurethanes, polyester polyurethanes, acrylic polymers, and cross-linkers such as isocyanate or carbodiimide. In some embodiments, layered material 1700 can include a plurality of basecoat layers 1760. In some embodiments, basecoat layer 1760 can be absent from layered material 1700.

Basecoat layer 1760 can have a dry weight, measured in grams per square meter (g/m$^2$), ranging from about 20 g/m$^2$ to about 100 g/m$^2$, including subranges. For example, basecoat layer 1760 can have a dry weight of about 20 g/m$^2$, about 30 g/m$^2$, about 40 g/m$^2$, about 50 g/m$^2$, about 60 g/m$^2$, about 70 g/m$^2$, about 80 g/m$^2$, about 90 g/m$^2$, or about 100 g/m$^2$, or within a range having any two of these values as endpoints, inclusive of the endpoints. In some embodiments, basecoat layer 1760 can have a dry weight ranging from about 30 g/m$^2$ to about 90 g/m$^2$, about 40 g/m$^2$ to about 80 g/m$^2$, or about 50 g/m$^2$ to about 70 g/m$^2$.

In some embodiments, as shown for example in FIG. 18, layered material 1700 can include a top-coat layer 1770. Top-coat layer 1770 can be disposed over top surface 1724 of protein polyurethane alloy layer 1720. Top-coat layer 1770 can be directly or indirectly attached to protein polyurethane alloy layer 1720. In some embodiments, a bottom surface 1772 of top-coat layer 1770 can be in direct contact with top surface 1724 of protein polyurethane alloy layer 1720. In embodiments including basecoat layer 1760, top-coat layer 1770 can be disposed over top surface 1764 of basecoat layer 1760. In some embodiments, top-coat layer 1770 can be disposed on top surface 1764 of basecoat layer 1760. In some embodiments, a bottom surface 1772 of top-coat layer 1770 can be in direct contact with top surface 1764 of basecoat layer 1760.

Top-coat layer 1770 includes bottom surface 1772, a top surface 1774, and a thickness 1776 measured between bottom surface 1772 and top surface 1774. In some embodiments, thickness 1776 can range from about 10 microns to about 80 microns, including subranges. For example, thickness 1776 can be about 10 microns, about 20 microns, about 30 microns, about 40 microns, about 50 microns, about 60 microns, about 70 microns, or about 80 microns, or within a range having any two of these values as endpoints, inclusive of the endpoints. In some embodiments, thickness 1776 can range from about 20 microns to about 70 microns, about 30 microns to about 60 microns, or about 30 microns to about 50 microns.

In embodiments including top-coat layer 1770, top-coat layer 1770 can provide one or more of the following properties for layered material 1700: surface feel, stain resistance, flame resistance, gloss level, or color appearance. In some embodiments, top-coat layer 1770 can include one or more polymeric materials. Suitable materials for top-coat layer 1770 include but are not limited to, polyurethanes, acrylics, silicone-based feel agents, matte agents, and gloss agents. In some embodiments, layered material 1700 can include a plurality of top-coat layers 1770. In some embodiments, top-coat layer 1770 can be absent from layered material 1700. In some embodiments, top-coat layer 1770 can be transparent or translucent. In some embodiments, top-coat layer 1770 can include one or more dyes, one or more pigments and/or one or more reflective agents to affect appearance.

Top-coat layer 1770 can have a dry weight, measured in grams per square meter (g/m$^2$), ranging from about 10 g/m$^2$ to about 80 g/m$^2$, including subranges. For example, top-coat layer 1770 can have a dry weight of about 10 g/m$^2$, about 20 g/m$^2$, about 30 g/m$^2$, about 40 g/m$^2$, about 50 g/m$^2$, about 60 g/m$^2$, about 70 g/m$^2$, or about 80 g/m$^2$, or within a range having any two of these values as endpoints, inclusive of the endpoints. In some embodiments, top-coat layer 1770 can have a dry weight ranging from about 20 g/m$^2$ to about 70 g/m$^2$, about 30 g/m$^2$ to about 60 g/m$^2$, or about 30 g/m$^2$ to about 50 g/m$^2$.

Together, protein polyurethane alloy layer(s) 1720, 1730, 1740, basecoat layer(s) 1760, and/or top-coat layer(s) 1770 can define a layered assembly 1780 of a layered material 1700. Layered assembly 1780 can include any number of protein polyurethane alloy layers as described herein. For example, layered assembly 1780 can include 2, 3, 4, 5, 6, 7, 8, 9, 10, 11, 12, 13, 14, 15, 16, 17, 18, 19, or 20 protein polyurethane alloy layers. In some embodiments, layered material 1700 can include a layered assembly 1780 attached to bottom surface 1712 of substrate layer 1710. Layered assembly 1780 attached to bottom surface 1712 of substrate layer 1710 can include any of the layers and materials as described herein for a layered assembly 1780 attached to top surface 1714 of substrate layer 1710. In some embodiments, layered material 1700 can include a layered assembly 1780 attached to top surface 1714 of substrate layer 1710 and a layered assembly 1780 attached to bottom surface 1712 of substrate layer 1710. In such embodiments, layered material 1700 includes layered assemblies 1780 disposed over opposing surfaces 1712 and 1714 of substrate layer 1710.

In some embodiments, a protein polyurethane alloy layer of layered material 1700 is attached to a surface of substrate layer 1710 with an adhesive layer 1750. In such embodiments, adhesive layer 1750 includes a bottom surface 1752, a top surface 1754, and a thickness 1756 measured between bottom surface 1752 and top surface 1754. In some embodiments, thickness 1756 can range from about 10 microns to about 50 microns, including subranges. For example, thickness 1756 can be about 10 microns, about 20 microns, about 30 microns, about 40 microns, or about 50 microns, or within a range having any two of these values as endpoints, inclusive of the endpoints. In some embodiments, thickness 1756 can range from about 20 microns to about 40 microns. Suitable adhesives for adhesive layer 1750 include, but are not limited to, polyurethane adhesives, hot melt adhesives, emulsion polymer adhesives, dry web adhesives, dry laminating adhesives, or wet laminating adhesives. Hauthane HD-2001 available from C.L. Hauthaway & Sons Corporation is an exemplary laminating adhesive suitable for adhesive layer 1750. Exemplary polyurethane adhesives include, but are not limited to, L-2183, L-2245, L-2255 from Hauthaway and IMPRANIL® DAH, DAA from Covestro. Exemplary dry web adhesives include, but are not limited to, 9D8D20 from Protechnic. In some embodiments, layered material 1700 does not include an adhesive layer 1750.

Adhesive layer 1750 can have a dry weight, measured in grams per square meter (g/m$^2$), ranging from about 10 g/m$^2$ to about 50 g/m$^2$, including subranges. For example, adhesive layer 1750 can have a dry weight of about 10 g/m$^2$, about 20 g/m$^2$, about 30 g/m$^2$, about 40 g/m$^2$, or about 50 g/m$^2$, or within a range having any two of these values as endpoints, inclusive of the endpoints. In some embodiments, adhesive layer 1750 can have a dry weight ranging from about 20 g/m$^2$ to about 40 g/m$^2$.

Layered material 1700 can be made by attaching one or more protein polyurethane alloy layers, and one or more basecoat and/or top-coat layers described herein, to substrate layer 1710. In some embodiments, the layer(s) may be subsequently layered over a surface of a substrate layer. Layer(s) can be attached to either top surface 1714 and/or bottom surface 1712 of substrate layer 1710. In some embodiments, the layer(s) can be layered over a sacrificial layer that is removed after layering and before or after attaching the one or more layers to substrate layer 1710.

Each protein polyurethane alloy layer of a layered material can be deposited using any suitable coating technique, including, but not limited to, knife over roll coating, gravure coating, slot die coating, multi-layer slot die coating, or curtain coating. Multi-layer slot die coating can allow simultaneous coating of multiple adjacent layers.

In some embodiments, a substrate layer 1710 can be coated with an adhesive layer 1750 and additional layers (e.g., layers 1720, 1730, 1740, 1760, and/or 1770) can be formed over adhesive layer 1750 in any appropriate order. In such embodiments, the layers can be formed over adhesive layer 1750 in the same manner as described below for method 1900 with the layers being formed over the adhesive layer 1750 rather than a sacrificial layer. In some embodiments, a blended mixture as described herein can be applied directly to a surface of a substrate layer 1710, using for example, a coating or pouring process. In such embodiments, the blended mixture can penetrate at least a portion of substrate layer 1710. After application, the blended mixture can be dried to form a protein polyurethane alloy layer (e.g., layer 1720). In some embodiments, after drying, the protein polyurethane alloy layer and the substrate layer 1710 can be heated (e.g., heat pressed) to aid in attaching the layers together. Before or after drying and/or before or after attaching the protein polyurethane alloy layer and substrate layer 1710, other layers (e.g., layers 1730, 1740, 1760, and/or 1770) can be applied over the protein polyurethane alloy layer in any appropriate order. In such embodiments, the other layers can be formed over the protein polyurethane alloy layer in the same manner as described below for method 1900 with the layers being formed over the protein polyurethane alloy layer rather than a sacrificial layer.

In some embodiments, decorative layers can be applied between layers of a layered material during manufacturing. For example, a logo, an artistic pattern, a drawing, or a symbol can be applied to a first layer before disposing another layer over the first layer. Decorative layers can be applied using, for example, screen printing, digital printing, or transfer printing.

In some embodiments, the layers of a layered material can be formed over a sacrificial layer and attached to a substrate layer after formation. FIG. 19 illustrates a method 1900 for making a layered material 1700 according to some embodiments. FIGS. 20A-20F illustrate steps of method 1900. Unless stated otherwise, the steps of method 1900 need not be performed in the order set forth herein. Additionally, unless specified otherwise, the steps of method 1900 need not be performed sequentially. The steps can be performed simultaneously. As one example, method 1900 need not include a solvent removal step after the deposition of each individual protein polyurethane alloy layer; rather the solvent (for example, water) from a plurality of protein polyurethane alloy layers can be removed in a single step. Method 1900 can be used to attach layers to one or both sides of a substrate layer 1710.

Figures 20A, 20B, 20C, 20D, 20E, 20F:
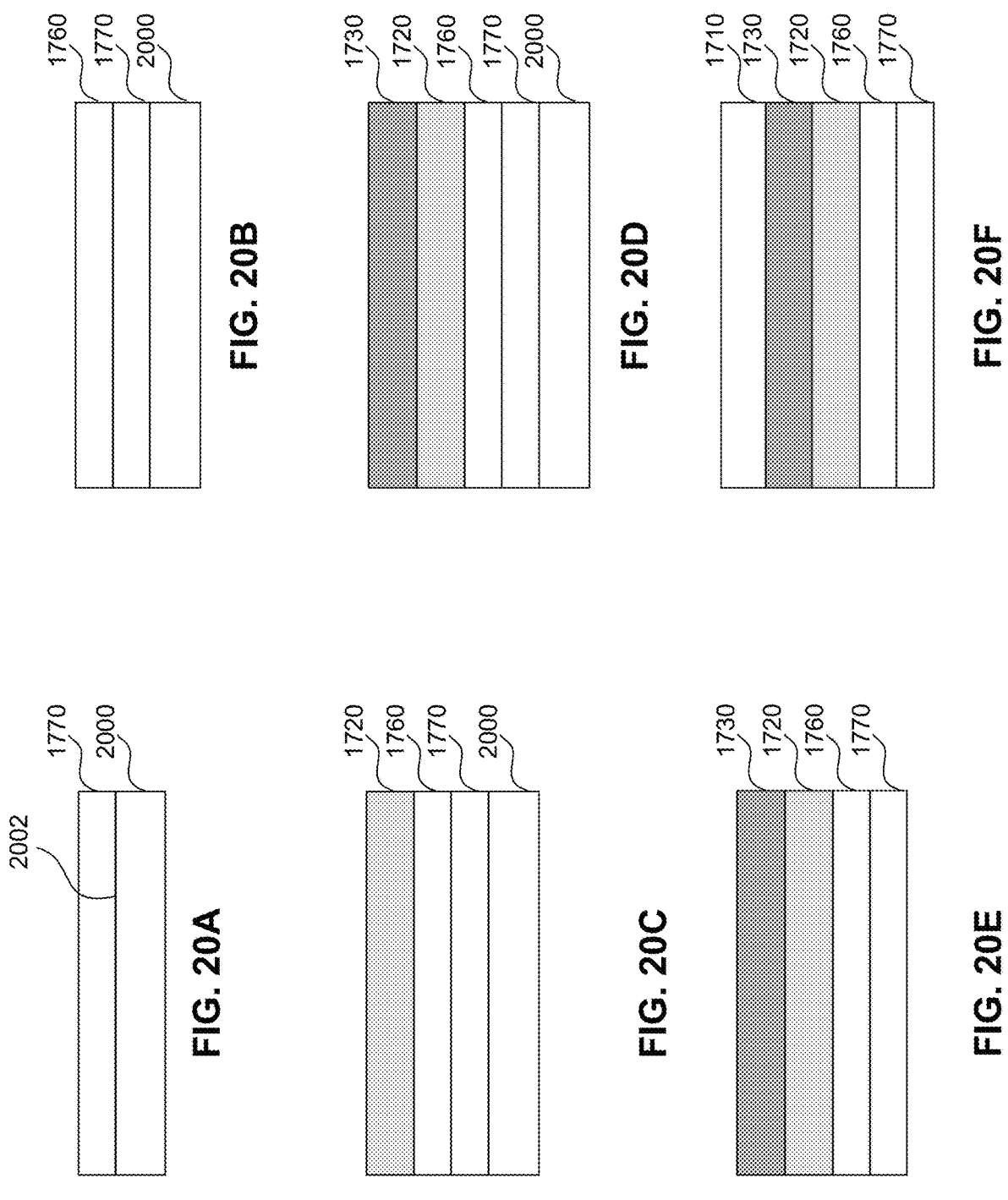
FIGS. 20A-20F illustrate a method of making a layered material according to some embodiments.

In step 1902, a top-coat layer 1770 can be disposed over a top surface 2002 of a sacrificial layer 2000, as illustrated in for example FIG. 20A. Top-coat layer 1770 can be disposed over sacrificial layer 2000 using any suitable coating technique, for example, knife over roll with reverse transfer paper, spraying, or roller coating. Sacrificial layer 2000 is a layer of material that does not define a layer of layered material 1700. Rather, sacrificial layer 2000 is removed during manufacturing of layered material 1700. Sacrificial layer 2000 can be removed mechanically, such as by peeling away, or chemically, for example, by dissolving sacrificial layer 2000. In some embodiments, sacrificial layer 2000 can be a release liner. Suitable materials for sacrificial layer 2000 include but are not limited to grain texture release papers. Exemplary grain texture release papers include, release papers available from Sappi paper, for example, Matte Freeport 189, Freeport 123, or Expresso 904. In some embodiments, method 1900 does not include step 1902. That is, step 1902 is optional. In some embodiments, top-coat layer 1770 can be applied to a layered material 1700 after removing sacrificial layer 2000 in step 1918. In some embodiments, top-coat layer 1770 can be applied to a layered material 1700 after attaching protein polyurethane alloy layer(s) to a substrate layer 1710 in step 1920.

In step 1904, basecoat layer 1760 can be disposed over sacrificial layer 2000, as illustrated in for example FIG. 20B. In embodiments including top-coat layer 1770, basecoat layer 1760 can be disposed over top-coat layer 1770. Basecoat layer 1760 can disposed over sacrificial layer 2000 using any suitable coating technique, for example, knife over roll with reverse transfer paper, spraying, or roller coating. In some embodiments, method 1900 does not include step 1904. Step 1904 is optional. In some embodiments, basecoat layer 1760 can be applied to a layered material 1700 after removing sacrificial layer 2000 in step 1918. In some embodiments, basecoat layer 1760 can be applied to a layered material 1700 after attaching protein polyurethane alloy layer(s) to a substrate layer 1710 in step 1920.

In step 1906, one or more polyurethanes dispersed or dissolved in an aqueous solution can be blended with one or more proteins to form a blended mixture in the aqueous solution. In some embodiments, the one or more polyurethanes can be dispersed or dissolved in an aqueous solution before blending with protein(s). In some embodiments, the one or more polyurethanes can become dispersed or dissolved in an aqueous solution during blending with protein(s). In some embodiments, the one or more polyurethanes and the one or more proteins can be blended in a suitable vessel until a homogenous blend is formed. Suitable blending equipment includes, but is not limited to, a blender, a stand mixer, an in-line mixer, or a high shear mixer.

In some embodiments, protein(s) can be dispersed or dissolved in an aqueous solution before blending with polyurethane in step 1906. Suitable aqueous solutions include, but are not limited to, water, an aqueous alkali solution, an aqueous acid solution, an aqueous solution including an organic solvent, a urea solution, and mixtures thereof. In some embodiments, the aqueous alkali solution can be a basic solution such as a sodium hydroxide, ammonia or ammonium hydroxide solution. In some embodiments, examples of an acidic aqueous solution can be an acetic acid or hydrochloric acid (HCl) solutions. Suitable organic solvents include, but are not limited to, ethanol, isopropanol, acetone, ethyl acetate, isopropyl acetate, glycerol, and the like. In some embodiments, the protein concentration in the aqueous protein mixture can range from about 10 g/L to about 300 g/L, including subranges. For example, the protein concentration in the aqueous protein mixture can be about 10 g/L, about 20 g/L, about 30 g/L, about 40 g/L, about 50 g/L, about 60 g/L, about 70 g/L, about 80 g/L, about 90 g/L, about 100 g/L, about 150 g/L, about 200 g/L, about 250 g/L, or about 300 g/L, or within a range having any two of these values as endpoints, inclusive of the endpoints. In some embodiments, the protein concentration in the aqueous protein mixture can range from about 10 g/L to about 300 g/L, about 20 g/L to about 250 g/L, about 30 g/L to about 200 g/L, about 40 g/L to about 150 g/L, about 50 g/L to about 100 g/L, about 60 g/L to about 90 g/L, or about 70 g/L to about 80 g/L.

The amount of protein in a protein/polyurethane blend can range from about 5 wt % to about 60%, based on the weight of protein and polyurethane, including subranges. For example, the amount of protein in a blend can be about 5 wt %, about 10 wt %, about 15 wt %, about 20 wt %, about 25 wt %, about 30 wt %, about 35 wt %, about 40 wt %, about 45 wt %, about 50 wt %, about 55 wt %, or about 60 wt %, or within a range having any two of these values as endpoints. In some embodiments, the amount of protein in a blend can be about 10 wt % to about 55 wt %, about 15 wt % to about 50 wt %, about 20 wt % to about 45 wt %, about 25 wt % to about 40 wt %, or about 30 wt % to about 35 wt %. In some embodiments, the amount of protein in the protein/polyurethane blend can range from 20 wt % to 40 wt %.

The amount of polyurethane(s) in a protein/polyurethane blend can range from about 10 wt % to about 85 wt %, based on the weight of protein and polyurethane, including subranges. For example, the amount of polyurethane(s) in blend can be about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, or about 85 wt %, or within a range having any two of these values as endpoints, inclusive of the endpoints. In some embodiments, the amount of the polyurethane(s) in a blend can range from about 20 wt % to about 75 wt %, about 30 wt % to about 65 wt %, or about 40 wt % to about 55 wt %.

In some embodiments, the blending temperature can range from about room temperature (18° C.) to about 100° C., including subranges. For example, the blend temperature can be about 18° C., about 30° C., about 40° C., about 50° C., about 60° C., about 70° C., about 80° C., about 90° C., or about 100° C., or within a range having any two of these values as endpoints, inclusive of the endpoints. In some embodiments, the blend temperature can range from about 18° C. to about 90° C., about 18° C. to about 80° C., about 18° C. to about 70° C., about 18° C. to about 60° C., about 18° C. to about 50° C., about 18° C. to about 40° C., or about 18° C. to about 30° C.

In some embodiments, the blending time for step 1906 can range from about 15 minutes to about 3 hours, including subranges. For example, the blending time can be about 30 minutes, about 1 hour, about 90 minutes, about 2 hours, about 150 minutes, or about 3 hours, or within a range having any two of these values as endpoints, inclusive of the endpoints. In some embodiments, the blending time can range from about 15 minutes to about 150 minutes, about 15 minutes to about 2 hours, about 15 minutes to about 90 minutes, or about 15 minutes to about 1 hour. In some embodiments, the blending speed for step 1906 can range from about 150 rpm to about 250 rpm, including subranges. For example, the blending speed can be about 150 rpm, about 175 rpm, about 200 rpm, about 225 rpm, or about 250 rpm. In some embodiments, the blending speed can range from about 150 rpm to about 225 rpm, about 150 rpm to about 200 rpm, or about 150 rpm to about 225 rpm. The blending speed can depend on the size of a blending device (e.g., size of an impeller) and/or the size of the vessel in which the components are blended.

In some embodiments, one or more additives can be added to the blend in step 1906. The additive(s) can influence the final properties of a protein polyurethane alloy layer, and therefore the final properties of a layered material 1700. For example, the additive(s) added can impact one or more of the following material properties: stiffness, elasticity, cohesive strength, tear strength, fire retardancy, chemical stability, or wet stability. Suitable additives include, but are not limited to, cross-linkers, fillers, dyes, pigments, plasticizers, waxes, rheological modifiers, flame retardants, antimicrobial agents, antifungal agents, antioxidants, UV stabilizers, mechanical foaming agents, chemical foaming agents, foam stabilizers, and the like. Suitable dyes include, but are not limited to fiber reactive dyes or natural dyes. Suitable cross-linkers include, but are not limited to, epoxy-based cross-linkers, (for example, poly(ethylene glycol) diglycidyl ether (PEGDE) available from Sigma Aldridge), isocyanate-based cross-linkers (for example, X-TAN® available from Lanxess), and carbodiimide-based cross-linkers. Suitable foaming agents include, HeiQ Chemtex 2216-T (a stabilized blend of nonionic and anionic surfactants), HeiQ Chemtex 2241-A (a modified HEUR (hydrophobically-modified ethylene oxide urethane) thickener), HeiQ Chemtex 2243 (a non-ionic silicone dispersion), or HeiQ Chemtex 2317 (a stabilized blend of nonionic and anionic surfactants) foam stabilizers available from HeiQ Chemtex. Suitable antimicrobial/antifungal agents include Ultra-Fresh DW-56, or other antimicrobial/antifungal agents used in the leather industry. Suitable flame retardants include CETAFLAM® DB9 (organophosphorous compounds containing $C-PO(OH)_2$ or $C-PO(OR)_2$ groups with the carbon chain containing polymers), CETAFLAM® PD3300 (organophosphorous compounds containing $C-PO(OH)_2$ or $C-PO(OR)_2$ groups with the carbon chain containing polymers), or other flame retardants used for coated textiles. Suitable fillers include, but are not limited to, thermoplastic microspheres, for example, EXPANCEL® Microspheres. Suitable rheological modifiers include, but are not limited to, alkali swellable rheological modifiers, hydrophobically-modified ethylene oxide-based urethane (HEUR) rheological modifiers, and volume exclusion thickeners. Exemplary alkali swellable rheological modifiers include but are not limited to, ACRYSOL™ DR-106, ACRYSOL™ ASE-60 from Dow Chemicals, TEXICRYL® 13-3131, and TEXICRYL® 13-308 from Scott-Bader. Exemplary HEUR modifiers include, but are not limited to, RM-4410 from Stahl and Chemtex 2241-A from HeiQ. Exemplary volume exclusion thickeners include, but are not limited to, WALO-CEL™ XM 20000 PV from Dow Chemicals and Methyl-Hydroxyethyl Cellulose from Sigma-Aldrich.

In some embodiments, a blend can include one or more coloring agents. In some embodiments, the coloring agent can be a dye, for example a fiber reactive dye, a direct dye, or a natural dye. Exemplary dyes, include but are not limited to, Azo structure acid dyes, metal complex structure acid dyes, anthraquinone structure acid dyes, and azo/diazo direct dyes. In some embodiments, the coloring agent can be pigment, for example a lake pigment. In some embodiments, a blend can include a coloring agent content of about 2 wt % or less. For example, a blend can include about 0.1 wt %, about 0.5 wt %, about 1 wt %, about 1.5 wt %, or about 2 wt % coloring agent. In some embodiments, a blend can include about 0.1 wt % to about 2 wt %, about 0.5 wt % to about 1.5 wt %, or about 0.1 wt % to about 1 wt % coloring agent. In some embodiments, a blend can be free or substantially free of a coloring agent. In such embodiments, a protein polyurethane alloy layer created from the blend can be free or substantially free of a coloring agent.

In step 1908, a layer of the blended mixture is disposed over top surface 2002 of sacrificial layer 2000. The blended mixture can be coated over top surface 2002 of sacrificial layer 2000. In embodiments not including steps 1902 and 1904, the blended mixture can be coated directly on top surface 2002 of sacrificial layer 2000. In embodiments including step 1904, the blended mixture can be coated directly on a surface of basecoat layer 1760. In embodiments including step 1902 but not step 1904, the blended mixture can be coated directly on a surface of top-coat layer 1770. In some embodiments, the blended mixture can be formed into a sheet by coating it on a surface to a desired thickness. Coating can include pouring, extruding, casting, and the like. In some embodiments, the sheet can be spread to a desired thickness using, for example, a blade, a knife, a roller, a knife over roll, curtain coating, and slot die coating.

In some embodiments, the temperature of the blended mixture during coating can be about 40° C. or higher. For example, the temperature of the blended mixture can range from about 40° C. to about 100° C., including subranges. For example, the temperature can be about 40° C., about 50° C., about 60° C., about 70° C., about 80° C., about 90° C., or about 100° C., or within a range having any two of these values as endpoints, inclusive of the endpoints. In some embodiments, the temperature of the blended mixture during coating can range from about 40° C. to about 90° C., about 40° C. to about 80° C., about 40° C. to about 70° C., about 40° C. to about 60° C., or about 40° C. to about 50° C. Coating at a temperature below about 40° C. can result in the blended mixture being too viscous and can make it difficult to form a layer of uniform thickness.

In step 1910, solvent (for example, water) can be removed from the coated blended mixture to form protein polyurethane alloy layer 1720, as illustrated in for example, FIG. 20C. Suitable solvent removal methods include, but are not limited to tunnel drying, vacuum drying, oven drying with hot air, humidity chamber drying, flotation drying with hot air, and ovens with a combination of medium range IR (infrared) for preheating and then hot air for subsequent drying.

Suitable solvent removal temperatures for step 1910 can range from about room temperature (18° C.) to about 100° C., including subranges. For example, solvent may be removed at a temperature of about 18° C., about 35° C., about 50° C., about 60° C., about 70° C., about 80° C., about 90° C., or about 100° C., or within a range having any two of these values as endpoints, inclusive of the endpoints. In some embodiments, solvent may be removed at a temperature ranging from about 18° C. to about 35° C., about 18° C. to about 50° C., about 18° C. to about 60° C., about 18° C. to about 70° C., about 18° C. to about 80° C., about 18° C. to about 90° C., or about 18° C. to about 100° C. Suitable humidity values for solvent removal in step 1910 include a humidity in a range from 0% RH (relative humidity) to about 65% RH, including subranges. For example, the humidity can be about 10% RH, about 20% RH, about 40% RH, about 50% RH, or about 65% RH, or within a range having any two of these values as endpoints, inclusive of the endpoints. In some embodiments, the humidity can be 0% RH to about 50% RH, 0% RH to about 40% RH, 0% RH to about 20% RH, or 0% RH to about 10% RH. The solvent removal temperature and/or humidity can affect the final properties of a protein polyurethane alloy layer, and therefore a layered material. The solvent removal temperature and/or humidity in step 1910 can impact one or more of the following material properties: stiffness, elasticity, cohesive strength, tear strength, fire retardancy, chemical stability, and wet stability. For example, relatively high humidity and relatively low temperature can result in a material that is softer and more elastic. Conversely, relatively low humidity and relatively high temperature can result in a material that is harder and less elastic.

In some embodiments, steps 1906-1910 can be repeated a plurality of times to form a plurality of protein polyurethane alloy layers 1720 over sacrificial layer 2000. In some embodiments, steps 1906-1910 can be repeated sequentially to form a plurality of protein polyurethane alloy layers 1720 over sacrificial layer 2000. In some embodiments, steps 1906-1910 can be repeated after steps 1912-1916 to form one or more protein polyurethane alloy layers 1720 over one or more foamed protein polyurethane alloy layers 1730/1740. In some embodiments, method 1900 may not include steps 1906-1910.

In step 1912, one or more polyurethanes dispersed or dissolved in an aqueous solution can be blended with protein(s) and foamed to form a foamed blended mixture in the aqueous solution. In some embodiments, the one or more polyurethanes can be dispersed or dissolved in an aqueous solution before blending with protein(s) and foaming. In some embodiments, the one or more polyurethanes can become dispersed or dissolved in an aqueous solution during blending with protein(s) and foaming. In some embodiments, the one or more polyurethanes and the one or more proteins can be blended in a suitable vessel until a homogenous blend is formed. Suitable blending equipment includes, but is not limited to, a blender, a stand mixer, an in-line mixer, or a high shear mixer. The blend may be foamed using, for example, a mechanical foaming process or a chemical foaming process. Exemplary mechanical foaming equipment includes a Hansa Mixer or a GEMATA® foamer. Blending and foaming can be performed separately or concurrently.

Suitable polyurethane(s) for blending and foaming in step 1912 are those discussed herein for protein polyurethane alloy layers. In some embodiments, one or more foaming agents and/or foam stabilizers may be added to the blend in step 1912. Suitable foaming agents and foam stabilizers include those discussed herein for protein polyurethane alloy layers 1730/1740.

In some embodiments, a blend can include a foaming agent or a foam stabilizer content of about 10 wt % or less. For example, a blend can include about 0.1 wt %, about 1 wt %, about 2.5 wt %, about 5 wt %, about 7.5 wt %, or about 10 wt % foaming agent or foam stabilizer. In some embodiments, a blend can include about 0.1 wt % to about 10 wt %, about 1 wt % to about 7.5 wt %, about 2.5 wt % to about 5 wt %, about 0.1 wt % to about 5 wt %, or about 0.1 wt % to about 2.5 wt % foaming agent or foam stabilizer. In some embodiments, a blend can be substantially free or free of a foaming agent and/or a foam stabilizer. In such embodiments, a protein polyurethane alloy layer created from the blend can be substantially free or free of a foaming agent and/or a foam stabilizer.

Foaming in step 1912 can be used to impart a desired density for a foamed protein polyurethane alloy layer. In some embodiments, a foamed blended mixture can have a liquid density, before solvent is removed in step 1916, ranging from about 300 g/L to about 900 g/L, including subranges. For example, a foamed blended mixture formed in step 1912 can have a liquid density of about 300 g/L, about 400 g/L, about 500 g/L, about 600 g/L, about 700 g/L, about 800 g/L, or about 900 g/L, or within a range having any two of these values as endpoints. In some embodiments, the foamed blended mixture can have a liquid density ranging from about 300 g/L to about 800 g/L, about 300 g/L to about 700 g/L, about 400 g/L to about 600 g/L, about 300 g/L to about 500 g/L, or about 300 g/L to about 600 g/L. In some embodiments, a blended mixture formed in step 1906 can have a liquid density, before the solvent is removed from the blended mixture in step 1910 that is greater than the liquid density of the foamed blended mixture formed in step 1912 before solvent is removed in step 1916.

In some embodiments, protein(s) can be dispersed or dissolved in an aqueous solution before blending with polyurethane and foaming in step 1912. Suitable aqueous solutions include those discussed above for step 1906. The protein concentration in the aqueous solution can be any value or range discussed above for step 1906. The amount of protein in a protein/polyurethane blend for step 1912 can be any value or range discussed above for step 1906. The blending temperature for step 1912 can be any temperature or temperature range discussed above for step 1906. The blending time for step 1912 can be any time or time range discussed above for step 1906. The blending speed for step 1912 can be any speed or speed range discussed above for step 1906. In some embodiments, one or more additives can be added to the blend in step 1912. The additive(s) added in step 1912 can be any of the additives discussed above for step 1906.

In step 1914, a layer of the foamed blended mixture is disposed over sacrificial layer 2000. In some embodiments, a layer of the foamed blended mixture is disposed over a surface of a protein polyurethane alloy layer 1720. In some embodiments, the blended and foamed mixture can be coated directly on a surface of a protein polyurethane alloy layer 1720. In some embodiments, the foamed blended mixture can be formed into a sheet by coating it on a surface to a desired thickness. Coating can include pouring, extruding, casting, and the like. In some embodiments, the sheet can be spread to a desired thickness using, for example, a blade, a knife, a roller, a knife over roll, curtain coating, and slot die coating.

In step 1916, solvent (for example, water) can be removed from the coated, foamed blended mixture to form a foamed protein polyurethane alloy layer 1730, as illustrated in for example, FIG. 20D. Suitable solvent removal methods include, but are not limited to tunnel drying, vacuum drying, oven drying with hot air, humidity chamber drying, flotation drying with hot air, and ovens with a combination of medium range IR for preheating and then hot air for subsequent drying. Suitable solvent removal temperatures for step 1916 can any of the temperature or temperature ranges discussed above for step 1910. Humidity values for step 1916 can be any of the humidity values or humidity ranges discussed above for step 1910

In some embodiments, steps 1912-1916 can be repeated a plurality of times to form a plurality of foamed protein polyurethane alloy layers over sacrificial layer 2000, for example, foamed protein polyurethane alloy layers 1730 and 1740. In such embodiments, the foamed blended mixtures formed in separate steps 1912 can have different liquid densities. For example, the liquid density for one foamed blended mixture can be 10 g/L to 300 g/L more or less than the liquid density for another foamed blended mixture. For example, in some embodiments, a first blended mixture can have a liquid density ranging from about 300 g/L to about 500 g/L and a second blended mixture can have a liquid density ranging from about 600 g/L to about 700 g/L. As another example, a first blended mixture can have a liquid density ranging from about 300 g/L to about 400 g/L and a second blended mixture can have a liquid density ranging from about 500 g/L to about 700 g/L.

In some embodiments, steps 1912-1916 can be repeated sequentially to form a plurality of foamed protein polyurethane alloy layers over sacrificial layer 2000. In some embodiments, a foamed and blended mixture formed in step 1912 can be used to form multiple foamed protein polyurethane alloy layers in steps 1914-1916. In some embodiments, steps 1912-1916 can be performed before performing a set of steps 1906-1910 to form one or more foamed protein polyurethane alloy layers between a protein polyurethane alloy layer 1720 and sacrificial layer 2000. In some embodiments, method 1900 may not include steps 1912-1916.

In step 1918, sacrificial layer 2000 is removed from the layer(s) formed in steps 1902-1916, as illustrated in for example FIG. 20E. Sacrificial layer 2000 can be removed by a mechanical process or a chemical process. For example, sacrificial layer 2000 can be removed by peeling sacrificial layer 2000 away from the other layers. As another example, sacrificial layer 2000 can be removed by dissolving sacrificial layer 2000. In some embodiments, sacrificial layer 2000 can be removed in step 1918 before attaching the layer(s) formed in steps 1902-1916 to a substrate layer 1710 in step 1920. In some embodiments, sacrificial layer 2000 can be removed after step 1920.

In step 1920, the layer(s) formed in steps 1902-1916 are attached to a substrate layer 1710, as illustrated in for example FIG. 20F. In step 1920, protein polyurethane alloy layer 1720, and any other protein polyurethane alloy layers formed in steps 1906-1916 are attached to substrate layer 1710. In some embodiments, attaching one or more protein polyurethane alloy layers (e.g., protein polyurethane alloy layer 1720) to substrate layer 1710 in step 1920 includes a heat pressing process. In such embodiments, protein polyurethane alloy layer (e.g., protein polyurethane alloy layer 1720) can be in direct contact with substrate layer 1710. Also, in such embodiments, a protein polyurethane alloy layer can partially melt into substrate layer 1710, and upon cooling the two layers are firmly attached. In some embodiments, attaching one or more protein polyurethane alloy layers (e.g., protein polyurethane alloy layer 1720) to substrate layer 1710 in step 1920 includes a lamination process. In such embodiments, lamination can be accomplished with an adhesive layer 1750. In such embodiments, substrate layer 1710 and/or a protein polyurethane alloy layer can be coated with an adhesive by known techniques such as slot die casting, kiss coating, a drawdown technique, or reverse transfer coating. In some embodiments, the lamination process can include passing substrate layer 1710 and the other layer(s) through rollers under heat.

In some embodiments, step 1920 can be omitted from method 1900. In such embodiments, the layer(s) formed in steps 1902-1916 define a protein polyurethane alloy layer or a layered material without a substrate layer 1710.

In some embodiments, layered materials described herein can have a tear strength that is at least about 1% greater than that of a natural leather of the same thickness. For example, the layered material can have a tear strength that is about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 100%, about 150%, or about 200% greater than that of natural leather of the same thickness. In some embodiments, the layered material can have a tear strength in the range of about 20 N to about 300 N, including subranges. For example, the tear strength of the layered material can be about 20 N, about 30 N, about 40 N, about 50 N, about 60 N, about 70 N, about 80 N, about 90 N, about 100 N, about 125 N, about 150 N, about 175 N, about 200 N, about 225 N, about 250 N, about 275 N, or about 300 N, or within a range having any two of these values as endpoints, inclusive of the endpoints. In some embodiments, the tear strength can range from about 30 N to about 275 N, about 40 N to about 250 N, about 50 N to about 225 N, about 60 N to about 200 N, or about 75 N to about 175 N, about 80 N to about 150 N, about 90 N to about 125 N, or about 100 N to about 125 N.

In some embodiments, a protein polyurethane alloy layer described herein can have a tear strength in the range of about 2 N to about 30 N, including subranges. For example, the tear strength of the protein polyurethane alloy layer can be about 2 N, about 4 N, about 5 N, about 10 N, about 15 N, about 20 N, about 25 N, or about 30 N, or within a range having any two of these values as endpoints, inclusive of the endpoints. In some embodiments, the tear strength can range from about 4 N to about 25 N, about 5 N to about 20 N, or about 10 N to about 15 N.

Tear strength, or tear resistance, is a measure of how well a material can withstand the effects of tearing. Tear resistance can be measured by a variety of methods, for example the method provided by ASTM D 412 or the method provided by ISO 3377 (also called the "Bauman tear"). The method provided by ASTM D 624 can also be used to measure the resistance to the formation of a tear and the resistance to the expansion of a tear. Regardless of the method used, first, a cut is made in the material sample tested to induce a tear. Then, the sample is held between two grips and a uniform pulling force is applied until sample tears in two. Tear resistance is then calculated by dividing the force applied by the thickness of the material. Unless specified otherwise, a tear strength value reported herein is measured by ISO 3377.

In some embodiments, the layered materials described herein can have a tensile strength in the range of about 1 kPa (kilopascal) to about 100 MPa (megapascals), including subranges. For example, the layered material can have a tensile strength of about 1 kPa, about 50 kPa, about 100 kPa, about 200 kPa, about 300 kPa, about 400 kPa, about 500 kPa, about 600 kPa, about 700 kPa, about 800 kPa, about 900 kPa, about 1 MPa, about 5 MPa, about 10 MPa, about 20 MPa, about 30 MPa, about 40 MPa, about 50 MPa, about 60 MPa, about 70 MPa, about 80 MPa, about 90 MPa, or about 100 MPa, or within a range having any two of these values as endpoints, inclusive of the endpoints. In some embodiments, the tensile strength can range from about 50 kPa to about 90 MPa, about 100 kPa to about 80 MPa, about 200 kPa to about 70 MPa, about 300 kPa to about 60 MPa, about 400 kPa to about 50 MPa, about 500 kPa to about 40 MPa, about 600 kPa to about 30 MPa, about 700 kPa to about 20 MPa, about 800 kPa to about 10 MPa, or about 1 MPa to about 5 MPa.

Softness, also referred to as "hand feel" of a material can be determined by ISO 17235. In some embodiments, an exterior surface of a layered material described herein can have a softness ranging from about 2 mm to about 12 mm, including subranges. For example, an exterior surface of a layered material can have a softness of about 2 mm, about 3 mm, about 4 mm, about 5 mm, about 6 mm, about 7 mm, about 8 mm, about 9 mm, about 10 mm, about 11 mm, or about 12 mm, or within a range having any two of these values as endpoints, inclusive of the endpoints. In some embodiments, the softness can be about 3 mm to about 11 mm, about 4 mm to about 10 mm, about 5 mm to about 9 mm, about 6 mm to about 8 mm, or about 6 mm to about 7 mm. Unless specified otherwise, a softness value disclosed herein is determined by ISO 17235.

Flexibility, or strain, of a material can be determined by measuring its elongation at failure when a tensile force is applied, for example using the equation: $\Delta L/L$, where $\Delta L$ is the change in length of the material after the tensile force is applied, and L is the original length of the material. Flexibility can also be measured according to the method provided by ASTM D 412. In some embodiments, the layered materials described herein can have a flexibility in the range of about 100% to about 400%, including subranges. For example, the layered materials can have a flexibility of about 100%, about 200%, about 300%, or about 400%, or within a range having any two of these values as endpoints, inclusive of the endpoints. In some embodiments, the flexibility can be about 100% to about 200%, about 100% to about 300%, about 200% to about 300%, or about 200% to about 400%. Unless specified otherwise, a flexibility value disclosed herein is measured by ASTM D 412. In some embodiments, a protein polyurethane alloy layer described herein can have flexibility value or range as described above for a layered material.

In some embodiments, a layered material as described herein can have a permanent set in a hysteresis experiment of about 8% or less. In some embodiments, a layered material can have a permanent set of about 1%, about 2%, about 3%, about 4%, about 5%, about 6%, about 7%, or about 8%, or within a range having any two of these values as endpoints. In some embodiments, a layered material can have a permanent set of about 1% to about 8%, about 2% to about 7%, about 3% to about 6%, or about 4% to about 5%.

Unless specified otherwise, a permanent set value is measured by the following method. A dog-bone-shaped tensile specimen of a material is cut and the original length of the sample is measured. The samples are cut to have a dog-bone shape with about 110 mm length and 10 mm width (75-100 mm gauge length). Then, the sample is stretched along its length using an INSTRON® machine to 15% strain and returned to 0% strain, both at a constant rate of three millimeters per second. This is repeated five times. Then, the distance between the original sample length and the length of the sample at which the load goes to zero on the last return cycle is measured. The percent difference between the length measured after repeatedly straining the material and the original length is the permanent set %. For purposes of calculating a permanent set value, three separate samples of a material are evaluated, and the average permanent set value is reported as the permanent set value for the material.

In some embodiments, layered materials described herein can have a moisture vapor transmission rate (MVTR) of about 75 g/m²/hr or more. In some embodiments, layered materials described herein can have a MVTR ranging from about 75 g/m²/hr to about 200 g/m²/hr, including subranges. For example, the layered material can have a MVTR of about 80 g/m²/hr to about 190 g/m²/hr, about 90 g/m²/hr to about 180 g/m²/hr, about 100 g/m²/hr to about 170 g/m²/hr, about 110 g/m²/hr to about 160 g/m²/hr, about 120 g/m²/hr to about 150 g/m²/hr, or about 130 g/m²/hr to about 140 g/m²/hr. Unless specified otherwise, a MVTR value disclosed herein is measured using ASTM E96 ("Standard Test Methods for Water Vapor Transmission of Materials")—Procedure B, Water Method, at about 74.3° F., at about 50% relative humidity, and with a ¾ inch air gap.

Layered materials having a moisture vapor transmission rate as reported herein can be suitable for use in a variety of applications where breathability of the material is a desirable property. Exemplary applications where breathability can be desirable include, but are not limited to, footwear, apparel, and upholstery. Layered materials as described herein can have a significantly higher water vapor transmission rate compared to a layered polymeric material having the same number of layers with the same thicknesses and made of the same polymeric material(s), but without protein blended in the polymeric material(s).

In some embodiments, layered materials described herein can have a color fastness of class 4 or higher when measured according to ISO 11640 ("Leather—Tests for color fastness—fastness to cycles of to-and-fro rubbing") wet-rub fastness test. In some embodiments, layered materials described herein can have a color fastness of class 4, class 4.5, or class 5 when measured according to ISO 11640's wet-rub fastness test. A color fastness of class 4 or higher can provide layered materials described herein with desirable wear resistance for a variety of applications.

Layered materials described herein can achieve a color fastness of class 4 or higher without the inclusion of a pigment in the materials. This is a unique characteristic compared to a layered polyurethane material made of the same polyurethane(s) without protein(s) blended in the polyurethane(s). Protein within layered materials described herein can adhere well to a dye used to color the material. To achieve a high color fastness, polyurethane materials are usually colored using a pigment because dyes do not generally adhere to a polyurethane well. Poor adherence between a dye and a polyurethane leads to a relatively low color fastness. Dyed layered materials described herein can have improved depth of color and other aesthetic features not achievable with a polyurethane colored using a pigment.

In some embodiments, a layered material described herein, or an individual layer of a layered material described herein, can be subjected to the same, or similar finishing treatments as those used to treat natural leather. In some embodiments, a layered material described herein can be tumbled or staked to tailor properties of the material, such as the feel of the material. In such embodiments, traditional textile tumbling and staking methods can be used.

In some embodiments, a layered material, or an individual layer of a layered material, can have a rough exterior surface. For example, top surface 1724 of protein polyurethane alloy layer 1720 can have a rough surface, top surface 1774 of top-coat layer 1770 can have a rough surface, top surface 1764 of basecoat layer 1760 can have a rough surface, top surface 1734 of protein polyurethane alloy layer 1730 can have a rough surface, or top surface 1744 of protein polyurethane alloy layer 1740 can have a rough surface. A rough exterior surface can create a surface texture similar in appearance and feel to that of a naturel leather (e.g., the grain of pebbled natural leather). In some embodiments, top surface 2002 of sacrificial layer 2000 can have a rough surface that is transferred onto the surface of a layer disposed directly on top surface 2002 during method 1900.

A rough surface has a surface area per square inch of at least about 1% greater than 1 in². In other words, in some embodiments, a one square inch sample of layered material 1700, including a layer having rough exterior surface, can have a surface area that is at least about 1% greater than a one square inch sample of a material having a perfectly smooth surface. In some embodiments, a rough exterior surface can have a surface area per square inch of at least about 1% greater than 1 in², about 10% greater than 1 in², about 20% greater than 1 in², about 30% greater than 1 in², about 40% greater than 1 in², about 50% greater than 1 in², about 60% greater than 1 in², about 70% greater than 1 in², about 80% greater than 1 in², about 90% greater than 1 in², about 100% greater than 1 in², about 150% greater than 1 in², about 200% greater than 1 in², about 250% greater than 1 in$^2$, about 300% greater than 1 in$^2$, about 350% greater than 1 in$^2$, about 400% greater than 1 in$^2$, about 450% greater than 1 in$^2$, or about 500% greater than 1 in$^2$, or within a range having any two of these values as endpoints, inclusive of the endpoints. In some embodiments, a rough surface can have a surface area per square inch of about 1% greater than 1 in$^2$ to about 500% greater than 1 in$^2$, about 10% greater than 1 in$^2$ to about 450% greater than 1 in$^2$, about 20% greater than 1 in$^2$ to about 400% greater than 1 in$^2$, about 30% greater than 1 in$^2$ to about 350% greater than 1 in$^2$, about 40% greater than 1 in$^2$ to about 300% greater than 1 in$^2$, about 50% greater than 1 in$^2$ to about 250% greater than 1 in$^2$, about 60% greater than 1 in$^2$ to about 200% greater than 1 in$^2$, about 70% greater than 1 in$^2$ to about 150% greater than 1 in$^2$, or about 80% greater than 1 in$^2$ to about 100% greater than 1 in$^2$. Unless specified otherwise, a surface area of material disclosed herein is measured using profilometry. For non-transparent materials, optical profilometry is used. In some embodiments, a layered material, or an individual layer of a layered material, can have a smooth exterior surface. A smooth surface has a surface area per square inch of less than 1% greater than 1 in$^2$. For example, a smooth surface can have a surface area per square inch of 1 in$^2$ to less than 1.01 in$^2$. In some embodiments, top surface 2002 of sacrificial layer 2000 can have a smooth surface that is transferred onto the surface of a layer disposed directly on top surface 2002 during method 1900.

In some embodiments, a layered material, or an individual layer of a layered material, can have a textured exterior surface. In some embodiments, top surface 2002 of sacrificial layer 2000 can have a textured surface that is transferred onto the surface of a layer disposed directly on top surface 2002 during method 1900. In some embodiments, a textured exterior surface can a surface area per square inch, or surface area per square inch range, as discussed above for a rough surface.

In some embodiments, the texture can be a macro-scale texture, for example, any of the many textures used on Sappi/Warren Release Papers that are commercially available under the trademark ULTRACAST® or tradename Classic, manufactured by S.D. Warren Company d/b/a Sappi North America. An example of a macro-scale texture is a replicate of a natural leather grain with feature depths of about 50 to about 300 microns. Any other desired macro-scale texture may also be used. In some embodiments, a macro-scale texture can be a "leather grain texture." As used herein, the term "leather grain texture" is a texture that mimics the look and feel of natural leather. Exemplary "leather grain textures" include but are not limited to, Sappi Matte Freeport 189, Sappi Freeport 123, or Sappi Expresso 904.

In some embodiments, the texture can be a micro-scale texture. In some embodiments, the texture can be a micro-scale texture with surface features having a feature size of less than 50 microns, for example 1000 nanometers to less than 50 microns. An example of a micro-scale texture is referred to in the art as "Sharklet." Sharklet textures can be applied to provide the products with a surface that is structured to impede bacterial growth. The micro-scale texture of the surface replicates sharkskin denticles, which are arranged in a diamond pattern with millions of tiny ribs. Sharklet materials are discussed, for example, in U.S. Pat. Nos. 7,650,848 and 8,997,672, the disclosures of which are incorporated herein by reference.

In some embodiments, the texture can be a nanoscale texture with surface features having a feature size of less than 1000 nanometers, for example 10 nanometers to less than 1000 nanometers. One example of a nanoscale texture is a diffraction grating that has a series of raised ridges about 400 nanometers wide, spaced approximately 800 nanometers apart, with a depth of approximately 100 nanometers.

The embodiments discussed herein will be further clarified in the following examples. It should be understood that these examples are not limiting to the embodiments described above.

Example 1

A sample was prepared by mixing 5.5 g of a waterborne polyurethane dispersion L3360 from Hauthaway, with 10 mL of de-ionized water and stirring at 1000 rpm (rotations per minute) for 30 minutes at 50° C. The solution was then pipetted into a Teflon evaporating dish with a diameter of 10 cm. The dish was dried in an oven at 45° C. overnight. After drying, the dried sample was conditioned at standard reference atmosphere (23° C., 50% humidity) for 24 hours, resulting in a polyurethane film.

The film was tested using a DMA-850 from TA Instruments. A 1 cm×2.5 cm strip was cut from each film using a metal die. The cut film samples were loaded into the film and fiber tension clamp for testing. During testing, a pre-load of 0.01 N was applied to the cut film samples. The instrument was cooled to −80° C., held for 1 minute, then the temperature was ramped at 4° C./minute to 200° C., or until the sample was too weak to be held in tension. During the temperature ramp, the sample was oscillated 0.1% strain at a frequency of 1 Hz. The storage modulus, loss modulus, and tan(S) were plotted with temperature for both films. The resulting second storage modulus transition (taken as the onset point of the last decrease in the storage modulus measured, i.e. second DMA modulus transition onset temperature) was 114.9° C. for the control sample.

Additionally, 5 tensile specimens (according to ASTM D638) were each cut from the dried and conditioned sample film using a metal die. The cut film samples were loaded into an INSTRON® 5960 series machine and pulled in tension at 100 millimeters/minute until break. The average Young's modulus, average tensile strength (maximum tensile stress), and average elongation at break were recorded. The Young's modulus was 59 MPa, the maximum tensile stress was 12.9 MPa, and the elongation at break was 402%.

Examples 2-8

Examples 2-8 were performed using the same method as Example 1 to show a range of polyurethane dispersions. The polyurethanes used and the resulting properties are listed in Tables 3-6.

Example 9

A sample was prepared by dissolving 0.825 g (grams) of gelatin from porcine skin into 10 mL (milliliters) of de-ionized water and stirring with a magnetic stir bar at 1000 rpm (rotations per minute) for 1 hour at 50° C. After the gelatin was fully dissolved, the pH of the solution was adjusted to 7.0 with 0.1 N sodium hydroxide. Then 5.5 g of L3360 was added to the solution and stirred at 1000 rpm for 30 minutes. The polyurethane and gelatin solution was then pipetted into a Teflon evaporating dish with a diameter of 10 cm. The dish was dried in an oven at 45° C. overnight. After drying, the dried sample was conditioned at standard reference atmosphere (23° C., 50% humidity) for 24 hours to create a gelatin polyurethane alloy film.

At the time of pipetting, the gelatin polyurethane solution was milky in appearance, with no particulates visible. After drying, the gelatin polyurethane solution produced a transparent film with uniform look with no optically visible granules. This result, combined with the Examples of 33 and 34, show that when the protein is miscible with the hard phase, the protein polyurethane alloy can be transparent and have enhanced properties.

DMA testing was performed as outlined in Example 1. The resulting second storage modulus transition (taken as the onset point of the last decrease in the storage modulus measured, i.e. second DMA modulus transition onset temperature) for the gelatin polyurethane alloy was 180.6° C., a 65.7° C. increase over the control sample described in Example 1.

Tensile testing was performed as outlined in Example 1. The average Young's modulus was 344 MPa, the average tensile stress measured was 19.8 MPa, and the average elongation at break was 197% for the gelatin polyurethane alloy.

The increase in the second DMA modulus transition onset temperature of this example, along with increased modulus and strength, and decreased elongation, compared to the polyurethane alone in Example 1, indicate that the dissolved gelatin in the gelatin polyurethane alloy is miscible with the hard phase of the polyurethane.

Examples 10-19

Examples 10-19 were performed using the same method as used for Example 9 to show a range of polyurethane dispersions from different manufacturers and different proteins. The resulting properties of these alloys are listed in Tables 3-6.

Example 20

A sample was prepared by dissolving 0.825 g (grams) of Bovine Serum Albumin from Sigma (BSA) into 10 mL (milliliters) of de-ionized water and stirring with a magnetic stir bar at 1000 rpm (rotations per minute) for 1 hour at 20° C. Then 5.5 g of L3360 was added to the solution and stirred at 1000 rpm for 30 minutes. The polyurethane and BSA solution was then pipetted into a Teflon evaporating dish with a diameter of 10 cm. The dish was dried on the benchtop at 25° C. overnight. After drying, the dried sample was conditioned at standard reference atmosphere (23° C., 50% humidity) for 24 hours to create a BSA polyurethane alloy film.

DMA testing was performed as outlined in Example 1. The resulting second storage modulus transition (taken as the onset point of the last decrease in the storage modulus measured, i.e. second DMA modulus transition onset temperature) for the BSA polyurethane alloy was 184.9° C., a 70° C. increase over the control sample described in Example 1.

Tensile testing was performed as outlined in Example 1. The average Young's modulus was 174 MPa, the average tensile stress measured was 11.7 MPa, and the average elongation at break was 123% for the BSA polyurethane alloy.

Example 21

Soy protein isolate (SPI) was dispersed by adding 0.75 g SPI into 15 mL of a sodium hydroxide solution at a 0.05 mol/L concentration. The dispersion was stirred with a magnetic stir bar at 600 rpm for 3 hours at 80° C. Then 5 g of L3360 was added to the solution and stirred at 600 rpm for 30 minutes. The SPI polyurethane solution was then pipetted into a Teflon evaporating dish with a diameter of 10 cm. The dish was dried in an oven at 45° C. overnight. After drying, the dried sample was conditioned at standard reference atmosphere (23° C., 50% humidity) for 24 hours to create a SPI polyurethane alloy film.

DMA testing was performed as outlined in Example 1. The resulting second storage modulus transition (taken as the onset point of the last decrease in the storage modulus measured, i.e. second DMA modulus transition onset temperature) for the SPI polyurethane alloy was 186.6° C., a 72° C. increase over the control in Example 1.

Tensile testing was performed as outlined in Example 1. The average Young's modulus was 396 MPa, the average tensile stress measured was 18 MPa, and the average elongation at break was 151% for the SPI polyurethane alloy.

The increase in the second DMA modulus transition onset temperature, along with increased modulus and strength, and decreased elongation, indicate that the dissolved SPI in the SPI polyurethane alloy is miscible with the hard phase of the polyurethane.

Examples 22-23

Examples 22-23 were preformed using the same method as Example 21. The proteins used and the resulting properties of these protein polymer alloys are listed in Tables 3-6.

Examples 24-29

Samples were prepared by the same method as Example 9. The gelatin and L3360 amounts were varied to achieve various mass ratios of the two components in the alloy samples. The masses of gelatin and PU dispersion, as well as the resulting mass fractions, are summarized below in Table 2.

TABLE 2

| Ex. No. | Gelatin Added (g) | L3360 Dispersion Added (g) | Gelatin Mass Fraction | L3360 Mass Fraction |
|---|---|---|---|---|
| 24 | 1.25 | 3.6 | 50% | 50% |
| 25 | 0.5 | 5.7 | 20% | 80% |
| 26 | 0.375 | 6.1 | 15% | 85% |
| 27 | 0.25 | 6.4 | 10% | 90% |
| 28 | 0.125 | 6.8 | 5% | 95% |
| 29 | 0.025 | 7.1 | 1% | 99% |

Tensile and DMA testing were performed as outlined in Example 1. The resulting properties of the alloys are listed in Tables 3-6.

Example 30

Soy protein isolate (SPI) was dispersed by adding 0.25 g SPI into 15 mL of DI Water. The dispersion was stirred with a magnetic stir bar at 600 rpm for 3 hours at 80° C. Then 6.42 g of L3360 was added to the solution and stirred at 600 rpm for 30 minutes. The SPI polyurethane solution was then pipetted into a Teflon evaporating dish with a diameter of 10 cm. The dish was dried in an oven at 45° C. overnight. After drying, the dried sample was conditioned at standard reference atmosphere (23° C., 50% humidity) for 24 hours to create a SPI polyurethane alloy film.

Tensile and DMA testing were performed as outlined in Example 1. The resulting properties of the alloy are listed in Tables 3-6.

Example 31

Soy protein isolate (SPI) was dispersed by adding 0.5 g SPI into 15 mL of a sodium hydroxide solution at a 0.05 mol/L concentration. The dispersion was stirred with a magnetic stir bar at 600 rpm for 3 hours at 80° C. Then 6.42 g of L3360 was added to the solution and stirred at 600 rpm for 30 minutes. The SPI polyurethane solution was then pipetted into a Teflon evaporating dish with a diameter of 10 cm. The dish was dried in an oven at 45° C. overnight. After drying, the dried sample was conditioned at standard reference atmosphere (23° C., 50% humidity) for 24 hours to create a SPI polyurethane alloy film.

Tensile and DMA testing were performed as outlined in Example 1. The resulting properties of the alloy are listed in Tables 3-6.

Example 32

Whey protein (bovine milk whey W1500 from Sigma) was dispersed by adding 0.75 g Whey into 15 mL of a sodium hydroxide solution at a 0.05 mol/L concentration. The dispersion was stirred with a magnetic stir bar at 600 rpm for 3 hours at 80° C. Then 5 g of L3360 was added to the solution and stirred at 600 rpm for 30 minutes. The whey polyurethane solution was then pipetted into a Teflon evaporating dish with a diameter of 10 cm. The dish was dried in an oven at 45° C. overnight. After drying, the dried sample was conditioned at standard reference atmosphere (23° C., 50% humidity) for 24 hours to create a whey polyurethane alloy film.

DMA testing was performed as outlined in Example 1. The resulting second storage modulus transition (taken as the onset point of the last decrease in the storage modulus measured, i.e. second DMA modulus transition onset temperature) for the whey polyurethane alloy was 100.9° C., a 14° C. decrease compared to the control in Example 1.

Tensile testing was performed as outlined in Example 1. The average Young's modulus was 105 MPa, the average tensile stress measured was 7.6 MPa, and the average elongation at break was 224% for the whey polyurethane alloy.

While the whey appears to be miscible with the hard phase of the polyurethane, it is believed that the second DMA modulus transition temperature did not increase because of the poor thermal stability of the protein itself. As discussed above, the whey had a denaturation temperature at 158° C., and was therefore considered non-thermo-stable.

Example 33

0.75 g of casein (from bovine milk, Sigma, C7078) was added into 15 mL of DI water (pH=7) in a 20 mL glass vial without any other additives, stirred at 600 rpm, heated to 90° C., and maintained for 3 hours.

Then 5 g of L3360 was added into the 20 mL glass vial. The glass vial was capped and vortexed for 1 min at max speed. The mixed casein polyurethane liquid was then transferred into a 10 cm Teflon dish. The dish was dried in an oven at 45° C. overnight (16 to 24 hours).

After drying, the casein polyurethane alloy film had an opaque look with numerous optically visible granules in the film. The tensile properties of this film were measured by measuring five tensile specimens using an INSTRON® 5960 series machine. The samples were pulled in tension at 100 millimeters/minute until break. The average tensile strength for the film was 4.96 MPa. The average elongation at break for the film was 12.03%. The average Young's modulus of the film was 158 MPa. These results, along with the results of Example 39, indicate that casein is insoluble and not dispersible in water at pH 7, and thus does not dissolve in L3360 when mixed.

Example 34

0.75 g of casein (from bovine milk, Sigma, C7078) was dispersed into a 15 mL 0.05 mol/L NaOH DI water solution in a 20 mL glass vial, stirred at 600 rpm, heated to 90° C., and maintained for 3 hours. A uniform dispersion was obtained.

Then 5 g of L3360 was added into the 20 mL glass vial. The glass vial was then capped and vortexed for 1 min at max speed. The mixed casein polyurethane liquid was then transferred into a 10 cm Teflon dish. The dish was dried in an oven at 45° C. overnight (16 to 24 hours).

After drying, the casein polyurethane alloy film had a transparent and uniform look with no optically visible granules in the film. The tensile properties of this film were measured by measuring five tensile specimens using an INSTRON® 5960 series machine. The samples were pulled in tension at 100 millimeters/minute until break. The average tensile strength for the film was 15.5 MPa. The average elongation at break for the film was 160%. The average Young's modulus of the film was 160 MPa. The increase modulus, strength, and elongation compared to Example 33 indicate that the modified casein dissolved within the polyurethane and is miscible with the hard phase of the polyurethane.

Example 35

0.375 g of soy protein isolate (SPI) and 0.375 g r-Collagen were added into 15 mL of a sodium hydroxide solution at a 0.05 mol/L concentration in a 20 mL glass vial. The soy protein isolate was soy protein isolate purchased from MP Medicals (IC90545625). The r-Collagen was recombinant collagen from Modern Meadow. The solution in the vial was mixed with a magnetic stir bar at 600 rpm for 2 hours at 80° C.

Then 5 g of L3360 was added into the 20 mL glass vial. The glass vial was capped and vortexed for 1 min at max speed. The mixed SPI/r-col polyurethane liquid was then transferred into a 10 cm Teflon dish. The dish was dried in an oven at 45° C. overnight. After drying, the dried sample was conditioned at standard reference atmosphere (23° C., 50% humidity) for 24 hours to create a SPI/r-col polyurethane alloy film.

The tensile properties of this film were measured by measuring five tensile specimens using an INSTRON®5960 series machine. The samples were pulled in tension at 100 millimeters/minute until break. The average tensile strength for the film was 15.71 MPa. The average elongation at break for the film was 175.9%. The average Young's modulus of the film was 247.1 MPa. The film was also tested using a DMA-850 from TA Instruments follow the method described in Example 1. The resulting second storage modulus transition (taken as the onset point of the last decrease in the storage modulus measured, i.e. second DMA modulus transition onset temperature) for the SPI/r-col polyurethane alloy was 184.9° C.

Compared with Example No. 1 and Example No. 9, these results show the increase in the second DMA modulus transition onset temperature, along with increased modulus and strength, and decreased elongation, indicate that the blend of SPI and r-col in the polyurethane alloy was miscible with the hard phase of the polyurethane and showed the corresponding enhancement in properties.

Example 37

Using the same method as Example 36, a film was made with 0.375 g pea protein MTX5232 from Bobs Red Mills, 0.375 g r-Collagen (recombinant collagen from Modern Meadow) and 5 g of L3360 polyurethane dispersion.

The resulting protein polyurethane alloy film was tested using the same tensile and DMA testing methods as described for Example 36. The average tensile strength for the film was 15.36 MPa. The average elongation at break for the film was 183.17%. The average Young's modulus of the film was 231.13 MPa. The second DMA modulus transition onset temperature for the pea protein/r-col polyurethane alloy was 189.65° C.

Compared with Example No. 1 and Example No. 9, these results show the increase in the second DMA modulus transition onset temperature, along with increased modulus and strength indicate that the blend of pea protein and r-col in the protein polyurethane alloy was miscible with the hard phase of the polyurethane and showed the corresponding enhancement in properties.

Example 38

A gelatin solution was prepared by dissolving 0.825 g (grams) of gelatin from porcine skin (Sigma Aldrich G2500) into 10 mL (milliliters) of de-ionized water and stirring with a magnetic stir bar at 1000 rpm (rotations per minute) for 1 hour at 50° C. After the gelatin was fully dissolved, the pH of the solution was adjusted to 7.0 with 0.1 N sodium hydroxide. Navy Black #1684 fiber reactive dye was added to the gelatin solution at 4.05 parts per hundred parts of gelatin and mixed for 15 minutes at 45° C. Then 5.5 g of L3360 was added to the solution and stirred at 1000 rpm for 30 minutes. The polyurethane and gelatin solution was then pipetted into a Teflon evaporating dish with a diameter of 10 cm. The dish was dried in an oven at 45° C. overnight. The resulting film was evenly dyed, with no phase separation or difference in color across the sample. A comparable film of the same polyurethane dispersion without protein could not be evenly dyed.

Example 39A

Chemically modified soy protein solutions (chemically modified SUPRO® XT 55 soy protein isolate and chemically modified SUPRO® XT 221D soy protein isolate) were prepared by preparing two 5 mL of 0.1 mol/L sodium hydroxide solutions. Once prepared, 40 milligrams (mg) of DABCO (1,4-diazabicyclo[2.2.2]octane) was added to each solution and allowed to dissolve. Upon dissolution of the DABCO, 300 mg of poly(ethylene glycol) monoglycidyl ether-550 Mn was added to each solution followed by the addition of 0.75 g of SUPRO® XT 55 soy protein isolate to one solution and 0.75 g of SUPRO® XT 221D soy protein isolate to the other solution. The solutions were allowed to stir at 600 rpm for 45 minutes at 65° C. to create chemically modified soy proteins with much higher solubility in an aqueous solution compared to the individual soy proteins in 0.1 mol/L sodium hydroxide alone without modification. The poly(ethylene glycol) monoglycidyl ether modified protein solutions were significantly more transparent compared to identical protein solutions without poly(ethylene glycol) monoglycidyl ether, indicating an increase in solubility. Additionally, size-exclusion chromatography (SEC) data indicated that the soluble modified protein solutions showed minimal hydrolysis, indicating that the protein solubility was due to the protein modification and not due to hydrolysis by the basic conditions that were used Example 39B Chemically modified soy protein solutions (chemically modified SUPRO® XT 55 soy protein isolate and chemically modified SUPRO® XT 221D soy protein isolate) were prepared by preparing two 5 mL of 0.1 mol/L sodium hydroxide solution. Once prepared, 40 mg of DABCO (1,4-diazabicyclo[2.2.2]octane) was added to each solution and allowed to dissolve. Upon dissolution of the DABCO, 300 mg of poly(ethylene glycol) diglycidly ether-550 Mn was added to the solution followed by the addition of 0.75 g SUPRO® XT 55 soy protein isolate to one solution and 0.75 g of SUPRO® XT 221D soy protein isolate to the other solution. The solutions were allowed to stir at 600 rpm for 45 minutes at 65° C. to create soy proteins with much higher solubility in an aqueous solution compared to the individual soy proteins in 0.1 mol/L sodium hydroxide alone without modification. The poly(ethylene glycol) diglycidyl ether modified protein solutions were significantly more transparent compared to identical protein solutions without poly (ethylene glycol) diglycidyl ether indicating an increase in solubility. Additionally, SEC data indicated that the soluble modified soy protein solutions showed minimal hydrolysis, indicating that the protein solubility was due to the protein modification and not due to hydrolysis by the basic conditions that were used.

Example 40

SUPRO® XT55 soy protein isolate (SPI) was dispersed by adding 0.75 g SPI into 5 mL of a sodium hydroxide solution at a 0.1 mol/L concentration. The dispersion was stirred with a magnetic stir bar at 600 rpm for 2 hours at 65° C. HeiQ Chemtex 2317 (an anionic surfactant) was added in an amount of 5 parts per 100 parts protein by mass. Then 5 g of L3360 was added to the solution and stirred at 600 rpm for 30 minutes. The SPI polyurethane solution was then pipetted into a Teflon evaporating dish with a diameter of 10 cm. The dish was dried in an oven at 45° C. overnight. After drying, the dried sample was conditioned at standard reference atmosphere (23° C., 50% humidity) for 24 hours to create a SPI polyurethane alloy film.

Example 41

A gelatin solution was prepared by dissolving 3.885 g of gelatin from porcine skin (Sigma Aldrich G2500) into 22 mL de-ionized water and stirring at 450 rpm using an overhead impeller mixer for 1 hour at 50° C. After the gelatin was fully dissolved, the pH of the solution was adjusted to 7.0 with 1 N sodium hydroxide. After the pH adjustment, antimicrobial Ultra-Fresh DW-56 was added at 1.2 parts per hundred parts of gelatin solution by weight. The solution was then mixed for 10 minutes at 50° C. to assure good dispersion of all the components. After 10 minutes, 15 mL of the solution was aliquoted and Antifoam 204 (a mixture of organic polyether dispersions from Sigma Aldrich) was added at 0.5 parts per hundred parts of the estimated final solution weight. The aliquoted solution was mixed for 10 minutes at 50° C. to assure good dispersion of all the components. Then, 25.885 g L3360 was added to the solution. After the addition of L3360, the solution was mixed until a temperature of 43° C. to 45° C. was reached.

To the other aliquot of the solution, HeiQ Chemtex 2216-T (a stabilized blend of nonionic and anionic surfactants) at 5.5 parts per hundreds parts and HeiQ Chemtex 2317 (a stabilized blend of nonionic and anionic surfactants) at 2.2 parts per hundreds parts of the solution weight were added along with 0.1 parts per hundreds parts of HeiQ Chemtex 2243 (a non-ionic silicone dispersion). The solution was then mechanically frothed cold until wet densities between 650 g/L to 850 g/L at a temperature of 43° C. to 45° C. were reached, thereby forming a foamed blended mixture.

A surface finish comprising a top-coat and basecoat was prepared to create the pre-skin of the protein polyurethane alloy. A top-coat blend was created by blending 9.74 parts of Stahl Melio WF-5227.A LIQ, 100 parts of Stahl WT-42-511, 30 parts of Stahl DI-17-701, 30 parts of Stahl XR-13-820, and 25 parts of water. A basecoat blend was created by blending 450 parts of Stahl RC-43-023, 50 parts of Stahl RU-3901, 150 parts of Stahl RA-30, 50 parts of Stahl FI-1208, 30 parts of Stahl XR-13-820, and 100 parts of Stahl RA-22-063.

The blended non-foamed solution was deposited on the dried pre-skin using a drawdown device at a target wet thickness of 200 gsm and dried for 15 minutes in a Mathis LTE-S Labcoater at 75° C., 2000 rpm air speed, and 70% of the air blowing from underneath the sample to form a protein polyurethane alloy layer. After this first layer was dried, a second layer of the blended foamed solution was deposited on top of the first layer at the target wet thickness of 350 gsm and dried for 15 minutes in a Mathis LTE-S Labcoater with a ramp-like drying procedure starting at 75° C. for 5 minutes, then 100° C. for 5 minutes and lastly, 120° C. for 5 minutes at 700 rpm air speed, and 70% of the air blowing from underneath to form a first foamed protein polyurethane alloy layer. After the foam layer was dried, a third layer of the blended foamed solution was deposited on top of the first foamed layer at the target wet thickness of 350 gsm and dried for 15 minutes in a Mathis LTE-S Labcoater with a ramp-like drying procedure starting at 75° C. for 5 minutes, then 100° C. for 5 minutes and lastly, 120° C., 700 rpm air speed, and 70% of the air blowing from underneath to form a second foamed protein polyurethane alloy layer.

After the sample was fully dried and conditioned for 24 hours in a conditioning chamber at 23° C. and 50% humidity for 24 hours, the sample was cut and tested according to the DMA and tensile mechanical property tests described herein. The resulting second storage modulus transition (taken as the onset point of the last decrease in the storage modulus measured, i.e. second DMA modulus transition onset temperature) was 190° C., the Young's modulus was 88.9 MPa, the tensile stress was 5.4 MPa, and the elongation at break was 110%.

Example 42

A sample was prepared by dissolving 1 g of 50 KDa rCol into 5 mL of de-ionized water and stirring with a magnetic stir bar at 1000 rpm for 1 hour at 20° C. The 50 KDa rCol protein was a collagen fragment prepared by Modern Meadow comprising the amino acid sequence listed as SEQ ID NO: 1. After stirring for 1 hour, 6.7 g of L3360 was added to the solution and stirred at 1000 rpm for 30 minutes. The polyurethane and 50 KDa rCol solution was then pipetted into a Teflon evaporating dish with a diameter of 10 cm. The dish was dried in an oven at 45° C. overnight. After drying, the dried sample was conditioned at standard reference atmosphere (23° C., 50% humidity) for 24 hours to create a 50 KDa rCol polyurethane alloy film.

DMA testing was performed as outlined in Example 1. The resulting second storage modulus transition (taken as the onset point of the last decrease in the storage modulus measured, i.e. second DMA modulus transition onset temperature) for the 50 KDa rCol polyurethane alloy was 177.8° C., a 62.9° C. increase over the control sample described in Example 1.

Tensile testing was performed as outlined in Example 1. The average Young's modulus was 161 MPa, the average tensile stress measured was 17 MPa, and the average elongation at break was 173% for the 50 KDa rCol polyurethane alloy.

Example 43

A sample was prepared by dissolving 1 g of Native *Trichoderma* sp. Cellulase available from CREATIVE ENZYMES® (Cellulase-RG) into 5 mL of de-ionized water and stirring with a magnetic stir bar at 1000 rpm for 1 hour at 20° C. After stirring for 1 hour, 11.4 g of L3360 was added to the solution and stirred at 1000 rpm for 30 minutes. The polyurethane and cellulase solution was then pipetted into a Teflon evaporating dish with a diameter of 10 cm. The dish was dried in an oven at 45° C. overnight. After drying, the dried sample was conditioned at standard reference atmosphere (23° C., 50% humidity) for 24 hours to create a cellulase polyurethane alloy film.

DMA testing was performed as outlined in Example 1. The resulting second storage modulus transition (taken as the onset point of the last decrease in the storage modulus measured, i.e. second DMA modulus transition onset temperature) for the Celluase-RG polyurethane alloy was 153.1° C., a 38.2° C. increase over the control sample described in Example 1.

Tensile testing was performed as outlined in Example 1. The average Young's modulus was 184 MPa, the average tensile stress measured was 14.7 MPa, and the average elongation at break was 252% for the cellulase polyurethane alloy.

Example 44

A sample was prepared by dissolving 1 g of laboratory grade cellulase available from Carolina Biological Supply Company (Cellulase-IG) into 5 mL of de-ionized water and stirring with a magnetic stir bar at 1000 rpm for 1 hour at 20° C. After stirring for 1 hour, 11.4 g of L3360 was added to the solution and stirred at 1000 rpm for 30 minutes. The polyurethane and cellulase solution was then pipetted into a Teflon evaporating dish with a diameter of 10 cm. The dish was dried in an oven at 45° C. overnight. After drying, the dried sample was conditioned at standard reference atmosphere (23° C., 50% humidity) for 24 hours to create a cellulase polyurethane alloy film.

DMA testing was performed as outlined in Example 1. The resulting second storage modulus transition (taken as the onset point of the last decrease in the storage modulus measured, i.e. second DMA modulus transition onset temperature) for the Cellulase-IG polyurethane alloy was 122.1° C., a 7.2° C. increase over the control sample described in Example 1.

Tensile testing was performed as outlined in Example 1. The average Young's modulus was 84 MPa, the average tensile stress measured was 15.1 MPa, and the average elongation at break was 286% for the cellulase polyurethane alloy.

Example 45

Two control samples (Example No. 45a and Example No. 45b) were each prepared according to the following process. 0.4 g of AF-715 (an antifoaming agent available from Quaker Color) was mixed into 38 g of waterborne polyurethane dispersion Hauthane HD-2001 from C.L. Hauthaway & Sons Corporation. The mixture was mixed using an impeller at a rate of 500 rpm and allowed to stir for 5 minutes at room temperature. After the mixture was properly mixed, 0.6 g BORCHI® Gel L 75 N was added to increase the viscosity of the mixture and the mixture was allowed to mix for 5 minutes. The mixture was then coated using a Mathis LTE-S Labcoater coater onto a release paper and was dried at 75° C. for 10 minutes and at 100° C. for 10 minutes. The coating was then removed from the release paper to create a polyurethane film containing no protein.

After drying, the sample for Example 45a had a thickness of 0.4 mm and the sample for Example 45b had a thickness of 0.4 mm. As reported in Table 7, the polyurethane film of Example 45a had a moisture vapor transmission rate of 30 g/m$^2$/24 hr and polyurethane film of Example 45b had a moisture vapor transmission rate of 38 g/m$^2$/24 hr.

Example 46

Two samples (Example No. 46a and Example No. 46b) were each prepared according to the following process. 13.25 g of gelatin from porcine skin was dissolved in a solution of 2 g of antimicrobial Ultra-Fresh DW-56, 0.8 g of AF-715 (an antifoaming agent available from Quaker Color), and 75 mL of water at 50° C. The solution was stirred using an impeller at 500 rpm until the gelatin was fully dissolved. The pH of the solution was then increased using 1M NaOH until a pH of 8-9 was achieved. After adjusting the pH, 77 g of waterborne polyurethane dispersion Hauthane HD-2001 from C.L. Hauthaway & Sons Corporation was added to the gelatin solution and stirred for 15 minutes. After the gelatin and polyurethane solution was properly mixed, 1 g of RM-4410 from Stahl was added to increase the viscosity of the solution and the solution was mixed for 5 minutes. The solution was then coated on a 0.35 mm thick microsuede textile having a surface coated with a thin IMPRANIL® DLS coating layer (thickness of 0.03 mm). The gelatin polyurethane solution was coated on top of the thin IMPRANIL® DLS coating layer using a handheld draw down apparatus and was allowed to dry at standard reference atmosphere (23° C. and 50% humidity) to create a gelatin-polyurethane film with a textile backing. The thin IMPRANIL® DLS coating was used to prevent the gelatin polyurethane coating from deeply penetrating into the microsuede textile.

After drying, the sample for Example No. 46a had a thickness of 0.77 mm (which was the sum of the thicknesses for the gelatin-polyurethane film, the thin IMPRANIL® DLS coating, and the microsuede textile) and the sample for Example 46b had a thickness of 0.82 mm (which was the sum of the thicknesses for the gelatin-polyurethane film, the thin Impranil® DLS coating, and the microsuede textile).

As reported in Table 7, the sample for Example No. 46a had a moisture vapor transmission rate of 180 g/m$^2$/24 hr, which was a 150 g/m$^2$/24 hr increase compared to the sample of Example No. 45a and a 142 g/m$^2$/24 hr increase compared to the sample of Example No. 45b. As also reported in Table 7, the sample for Example No. 46b had a moisture vapor transmission rate of 138 g/m$^2$/24 hr, which was a 108 g/m$^2$/24 hr increase compared to the sample of Example No. 45a and a 100 g/m$^2$/24 hr increase compared to the sample of Example No. 45b.

Neither the thin IMPRANIL® DLS coating nor the microsuede textile had a significant influence on the moisture vapor transmission rates for the samples of Example Nos. 46a or 46b. In other words, the moisture vapor transmission rates reported in Table 7 reflect the moisture vapor transmission rates for only the gelatin-polyurethane films.

Example 47

Two control samples (Example No. 47a and Example No. 47b) were each prepared according to the following process. 0.4 g of AF-715 (an antifoaming agent available from Quaker Color) was mixed into 38 g of waterborne polyurethane dispersion L3360 from Hauthaway. The mixture was mixed using an impeller at a rate of 500 rpm and allowed to stir for 5 minutes at room temperature. After the mixture was properly mixed, 0.6 g BORCHI® Gel L 75 N was added to increase the viscosity of the mixture and the mixture was allowed to mix for 5 minutes. The mixture was then coated using a Mathis LTE-S Labcoater coater onto a release paper and was dried at 75° C. for 10 minutes and at 100° C. for 10 minutes. The coating was then removed from the release paper to create a polyurethane film containing no protein.

After drying, the sample for Example No. 47a had a thickness of 0.32 mm and the sample for Example No. 47b had a thickness of 0.36 mm. As reported in Table 7, the polyurethane film of Example No. 47a had a moisture vapor transmission rate of 23 g/m$^2$/24 hr and polyurethane film of Example No. 47b had a moisture vapor transmission rate of 27 g/m$^2$/24 hr.

Example 48

Two samples (Example No. 48a and Example No. 48b) were each prepared according to the following process. 13.25 g of gelatin from porcine skin was dissolved in a solution of 2 g of antimicrobial Ultra-Fresh DW-56, 0.8 g of AF-715 (an antifoaming agent available from Quaker Color), and 75 mL of water at 50° C. The solution was stirred using an impeller at 500 rpm until the gelatin was fully dissolved. The pH of the solution was then increased using 1M NaOH until a pH of 8-9 was achieved. After adjusting the pH, 77 g of waterborne polyurethane dispersion L3360 from Hauthaway was added to the gelatin solution and stirred for 15 minutes. After the gelatin and polyurethane solution was properly mixed, 1 g of RM-4410 from Stahl was added to increase the viscosity of the solution and the solution was mixed for 5 minutes. The solution was then coated on a 0.35 mm thick microsuede textile having a surface coated with a thin IMPRANIL® DLS coating layer (thickness of 0.03 mm). The gelatin and polyurethane solution was coated on top of the thin IMPRANIL® DLS coating layer using a handheld draw down apparatus and was allowed to dry at standard reference atmosphere (23° C. and 50% humidity) to create a gelatin-polyurethane film with a textile backing. The thin IMPRA-NIL® DLS coating was used to prevent the gelatin poly-urethane coating from deeply penetrating into the microsuede textile.

After drying, the sample for Example No. 48a had a thickness of 0.77 mm (which was the sum of the thicknesses for the gelatin-polyurethane film, the thin IMPRANIL® DLS coating, and the microsuede textile) and the sample for Example No. 48b had a thickness of 0.84 mm (which was the sum of the thicknesses for the gelatin-polyurethane film, the thin Impranil® DLS coating, and the microsuede tex-tile).

As reported in Table 7, the sample for Example No. 48a had a moisture vapor transmission rate of 117 $g/m^2/24$ hr, which was a 94 $g/m^2/24$ hr increase compared to the sample of Example No. 47a and a 90 $g/m^2/24$ hr increase compared to the sample of Example No. 47b. As also reported in Table 7, the sample for Example 48b had a moisture vapor transmission rate of 74 $g/m^2/24$ hr, which was a 51 $g/m^2/24$ hr increase compared to the sample of Example No. 47a and a 47 $g/m^2/24$ hr increase compared to the sample of Example No. 47b.

Neither the thin IMPRANIL® DLS coating nor the microsuede textile had a significant influence on the mois-ture vapor transmission rates for the samples of Example Nos. 46a or 46b. In other words, the moisture vapor trans-mission rates reported in Table 7 reflect the moisture vapor transmission rates for only the gelatin-polyurethane films.

Example 49

Two control samples (Example No. 49a and Example No. 49b) were each prepared according to the following process. 0.2 g of AF-715 (an antifoaming agent available from Quaker Color) was mixed into 38 g of waterborne polyure-thane dispersion L3360 from Hauthaway. The mixture was mixed using an impeller at a rate of 500 rpm for 5 minutes. After the mixture was properly mixed, 0.6 g BORCHI® Gel L 75 N was added to increase the viscosity of the mixture and the mixture was mixed again for 5 minutes. This polyurethane mixture was then coated onto a release paper using a Mathis LTE-S Labcoater and allowed to dry at 75° C. for 10 minutes and at 100° C. for 10 minutes.

Then a foam solution was then prepared by mixing waterborne polyurethane dispersion L3360 from Hauthaway with HeiQ Chemtex 2216-T (3% based on solution weight), HeiQ Chemtex 2317 (3% based on solution weight), HeiQ Chemtex 2241-A (1% based on solution weight), and HeiQ Chemtex 2243 (0.1% based on solution weight). This mix-ture was stirred for 5 minutes at room temperature using an impeller at 500 rpm. The mixture was then frothed to create a foamed mixture having a wet density between 700 g/L and 900 g/L. The foamed mixture was coated on the previously coated polyurethane layer using the Mathis LTE-S Lab-coater and allowed to dry at 75° C. for 10 minutes and at 100° C. for 10 minutes. After this first foamed coating was dried, a second foamed coating layer made of the same foamed mixture was coated on the first foamed coating using identical conditions. After drying of the second foamed layer, the three-layer sample was removed from the release paper.

The three-layer sample for Example No. 49a had a thickness of 0.23 mm and the three-layer sample for Example No. 49b had a thickness of 0.24 mm. As reported in Table 7, the three-layer sample of Example No. 49a had a moisture vapor transmission rate of 83 $g/m^2/24$ hr and the three-layer sample of Example No. 49b had a moisture vapor transmission rate of 87 $g/m^2/24$ hr.

Example 50

Two samples (Example No. 50a and Example No. 50b) were each prepared according to the following process. 5.3 g of SUPRO® XT 221D soy protein isolate was mixed with 30 g of water. The pH of the mixture was then increased using 1M NaOH until a pH of 8-9 was achieved. After adjusting the pH, Ultra-Fresh DW-56 (15 wt % based on the soy protein isolate mass) and AF-715 antifoaming agent (1 wt % based on solution weight) were added and to the mixture, and the mixture was stirred using an impeller at 500 rpm until the soy protein isolate was fully dissolved. Once the soy protein isolate was fully dissolved, 32 g of water-borne polyurethane dispersion L3360 from Hauthaway was added to the protein solution and the solution was stirred using an impeller at a rate of 500 rpm for 10 minutes at room temperature. The protein solution was then coated onto a release paper using a Mathis LTE-S Labcoater and allowed to dry at 75° C. for 10 minutes and at 100° C. for 10 minutes.

Then a foam solution was prepared by mixing 5.3 g SUPRO® XT 221D soy protein isolate with 30 g of water. The pH of the mixture was increased using 1M NaOH until a pH of 8-9 was achieved. After adjusting the pH and once the soy protein isolate was fully dissolved, Ultra-Fresh DW-56 (15 wt % based on the soy protein mass), HeiQ Chemtex 2216-T (3 wt % based on solution weight), HeiQ Chemtex 2317 (3% based on solution weight), HeiQ Chem-tex 2241-A (1% based on solution weight), HeiQ Chemtex 2243 (0.1% based on solution weight), 32 g of waterborne polyurethane dispersion L3360 from Hauthaway were added to the solution, and the solution was stirred for 5 minutes at room temperature using an impeller at 500 rpm. This solu-tion was then frothed to create a foam solution with a wet density between 700 g/L and 900 g/L. The foam solution was coated on the previously coated protein solution layer using the Mathis LTE-S Labcoater and allowed to dry at 75° C. for 10 minutes and at 100° C. for 10 minutes. After this first foamed solution coating was dried, a second foam layer was coated on the first foamed coating using identical conditions After drying of the second foam solution layer, the three-layer sample was removed from the release paper.

The three-layer sample for Example No. 50a had a thickness of 0.24 mm and the three-layer sample for Example No. 50b had a thickness of 0.25 mm. As reported in Table 7, the sample for Example No. 50a had a moisture vapor transmission rate of 268 $g/m^2/24$ hr, which was a 185 $g/m^2/24$ hr increase compared to the sample of Example No. 49a and a 181 $g/m^2/24$ hr increase compared to the sample of Example No. 49b. As also reported in Table 7, the sample for Example No. 50b had a moisture vapor transmission rate of 277 $g/m^2/24$ hr, which was a 194 $g/m^2/24$ hr increase compared to the sample of Example No. 49a and a 190 $g/m^2/24$ hr increase compared to the sample of Example No. 49b.

Example 51

A control sample was prepared by mixing 0.4 g of AF-715 (an antifoaming agent available from Quaker Color) into 38 g of waterborne polyurethane dispersion IMPRAPERM® DL 5249 from Covestro. The mixture was mixed using an impeller at a rate of 500 rpm and allowed to stir for 5 minutes at room temperature. After the mixture was properly mixed, 0.6 g BORCHI® Gel L 75 N was added to increase the viscosity of the mixture and the mixture was allowed to mix for 5 minutes. The mixture was then coated using a Mathis LTE-S Labcoater coater onto a release paper and was dried at 75° C. for 10 minutes and at 100° C. for 10 minutes. The coating was then removed from the release paper to create a polyurethane film containing no protein.

After drying, the sample had a thickness of 0.08 mm. As reported in Table 7, the polyurethane film had a moisture vapor transmission rate of 338 g/m$^2$/24 hr.

Example 52

Two samples (Example No. 52a and Example No. 52b) were each prepared according to the following process. 5.3 g of SUPRO® XT 221D soy protein isolate was mixed with 30 g of water. The pH of the mixture was then increased using 1M NaOH until a pH of 8-9 was achieved. After adjusting the pH, Ultra-Fresh DW-56 (15 wt % based on the soy protein isolate mass) and AF-715 antifoaming agent (1 wt % based on solution weight) were added and to the mixture, and the mixture was stirred using an impeller at 500 rpm until the soy protein isolate was fully dissolved. Once the soy protein isolate was fully dissolved, 32 g of waterborne polyurethane dispersion IMPRAPERM® DL 5249 from Covestro was added to the protein solution and the solution was stirred using an impeller at a rate of 500 rpm for 10 minutes at room temperature. The protein solution was then coated onto a release paper using a Mathis LTE-S Labcoater and allowed to dry at 75° C. for 10 minutes and at 100° C. for 10 minutes.

Then a foam solution was prepared by mixing 5.3 g SUPRO® XT 221D soy protein isolate with 30 g of water. The pH of the mixture was increased using 1M NaOH until a pH of 8-9 was achieved. After adjusting the pH and once the soy protein isolate was fully dissolved, Ultra-Fresh DW-56 (15 wt % based on the soy protein mass), HeiQ Chemtex 2216-T (3 wt % based on solution weight), HeiQ Chemtex 2317 (3% based on solution weight), HeiQ Chemtex 2241-A (1% based on solution weight), HeiQ Chemtex 2243 (0.1% based on solution weight), 32 g of waterborne polyurethane dispersion IMPRAPERM® DL 5249 from Covestro were added to the solution, and the solution was stirred for 5 minutes at room temperature using an impeller at 500 rpm. This solution was then frothed to create a foamed solution with a wet density between 700 g/L and 900 g/L. The foamed solution was coated on the previously coated protein solution layer using the Mathis LTE-S Labcoater and allowed to dry at 75° C. for 10 minutes and at 100° C. for 10 minutes. After this first foamed coating was dried, a second foamed layer was coated on the first foamed coating using identical conditions After drying of the second foamed solution layer, the three-layer sample was removed from the release paper.

The three-layer sample for Example No. 52a had a thickness of 0.22 mm and the three-layer sample for Example No. 52b had a thickness of 0.23 mm. As reported in Table 7, the sample for Example 52a had a moisture vapor transmission rate of 626 g/m$^2$/24 hr and the sample for Example 52b had a moisture vapor transmission rate of 644 g/m$^2$/24 hr. For purposes of evaluating a change in moisture vapor transmission rate, these moisture vapor transmission rates for Example Nos. 52a and 52b can be compared to the moisture vapor transmission rate of Example No. 51 because all three samples included a non-foamed layer made using IMPRAPERM® DL 5249 and having substantially the same thickness. The foamed layers of Example Nos. 52a and 52b did not have a significant influence on the moisture vapor transmission rates for these samples because of their high degree of porosity. Compared to the sample of Example No. 51, the sample of Example No. 52a showed a 288 g/m$^2$/24 hr increase in moisture vapor transmission and the sample of Example No. 52b showed a 306 g/m$^2$/24 hr increase in moisture vapor transmission.

Example 53

A control sample was prepared by mixing 0.2 g of AF-715 (an antifoaming agent available from Quaker Color) into 38 g of waterborne polyurethane dispersion IMPRAPERM® DL 5249 from Covestro. The mixture was mixed using an impeller at a rate of 500 rpm for 5 minutes. After the mixture was properly mixed, 0.6 g BORCHI® Gel L 75 N was added to increase the viscosity of the mixture and the mixture was mixed again for 5 minutes. This polyurethane mixture was then coated onto a release paper using a Mathis LTE-S Labcoater and allowed to dry at 75° C. for 10 minutes and at 100° C. for 10 minutes.

Then a foam solution was then prepared by mixing waterborne polyurethane dispersion L3360 from Hauthaway with HeiQ Chemtex 2216-T (3% based on solution weight), HeiQ Chemtex 2317 (3% based on solution weight), HeiQ Chemtex 2241-A (1% based on solution weight), and HeiQ Chemtex 2243 (0.1% based on solution weight). This mixture was stirred for 5 minutes at room temperature using an impeller at 500 rpm. The mixture was then frothed to create a foamed mixture having a wet density between 700 g/L and 900 g/L. The foamed mixture was coated on the previously coated polyurethane layer using the Mathis LTE-S Labcoater and allowed to dry at 75° C. for 10 minutes and at 100° C. for 10 minutes. After this first foamed coating was dried, a second foamed coating layer made of the same L3360 foamed mixture was coated on the first foamed coating using identical conditions. After drying of the second foamed layer, the three-layer sample was removed from the release paper.

The three-layer sample for Example No. 53 had a thickness of 0.32 mm. As reported in Table 7, the three-layer sample of Example No. 53 had a moisture vapor transmission rate of 84 g/m$^2$/24 hr.

Example 54

A sample was prepared by mixing 5.3 g of SUPRO® XT 221D soy protein isolate with 30 g of water. The pH of the mixture was increased using 1M NaOH until a pH of 8-9 was achieved. After adjusting the pH, Ultra-Fresh DW-56 (15 wt % based on the soy protein isolate mass) and AF-715 antifoaming agent (1 wt % based on solution weight) were added and to the mixture, and the mixture was stirred using an impeller at 500 rpm until the soy protein isolate was fully dissolved. Once the soy protein isolate was fully dissolved, 53.7 g of waterborne polyurethane dispersion IMPRAPERM® DL 5249 from Covestro was added to the protein solution and the solution was stirred using an impeller at a rate of 500 rpm for 10 minutes at room temperature. The protein solution was then coated onto a release paper using a Mathis LTE-S Labcoater and allowed to dry at 75° C. for 10 minutes and at 100° C. for 10 minutes.

Then a foam solution was prepared by mixing 5.3 g SUPRO® XT 221D soy protein isolate with 30 g of water. The pH of the mixture was increased using 1M NaOH until a pH of 8-9 was achieved. After adjusting the pH and once the soy protein isolate was fully dissolved, Ultra-Fresh DW-56 (15 wt % based on the soy protein mass), HeiQ Chemtex 2216-T (3 wt % based on solution weight), HeiQ
Chemtex 2317 (3% based on solution weight), HeiQ Chem-
tex 2241-A (1% based on solution weight), HeiQ Chemtex
2243 (0.1% based on solution weight), 53.7 g of waterborne
polyurethane dispersion L3360 from Hauthaway were added
to the solution, and the solution was stirred for 5 minutes at
room temperature using an impeller at 500 rpm. This solu-
tion was then frothed to create a foamed solution with a wet
density between 700 g/L and 900 g/L. The foamed solution
was coated on the previously coated protein solution layer
using the Mathis LTE-S Labcoater and allowed to dry at 75°
C. for 10 minutes and at 100° C. for 10 minutes. After this
first foamed solution coating was dried, a second foam
L3360 layer was coated on the first foamed coating using
identical conditions After drying of the second foam solution
layer, the three-layer sample was removed from the release
paper.

Figure 23:
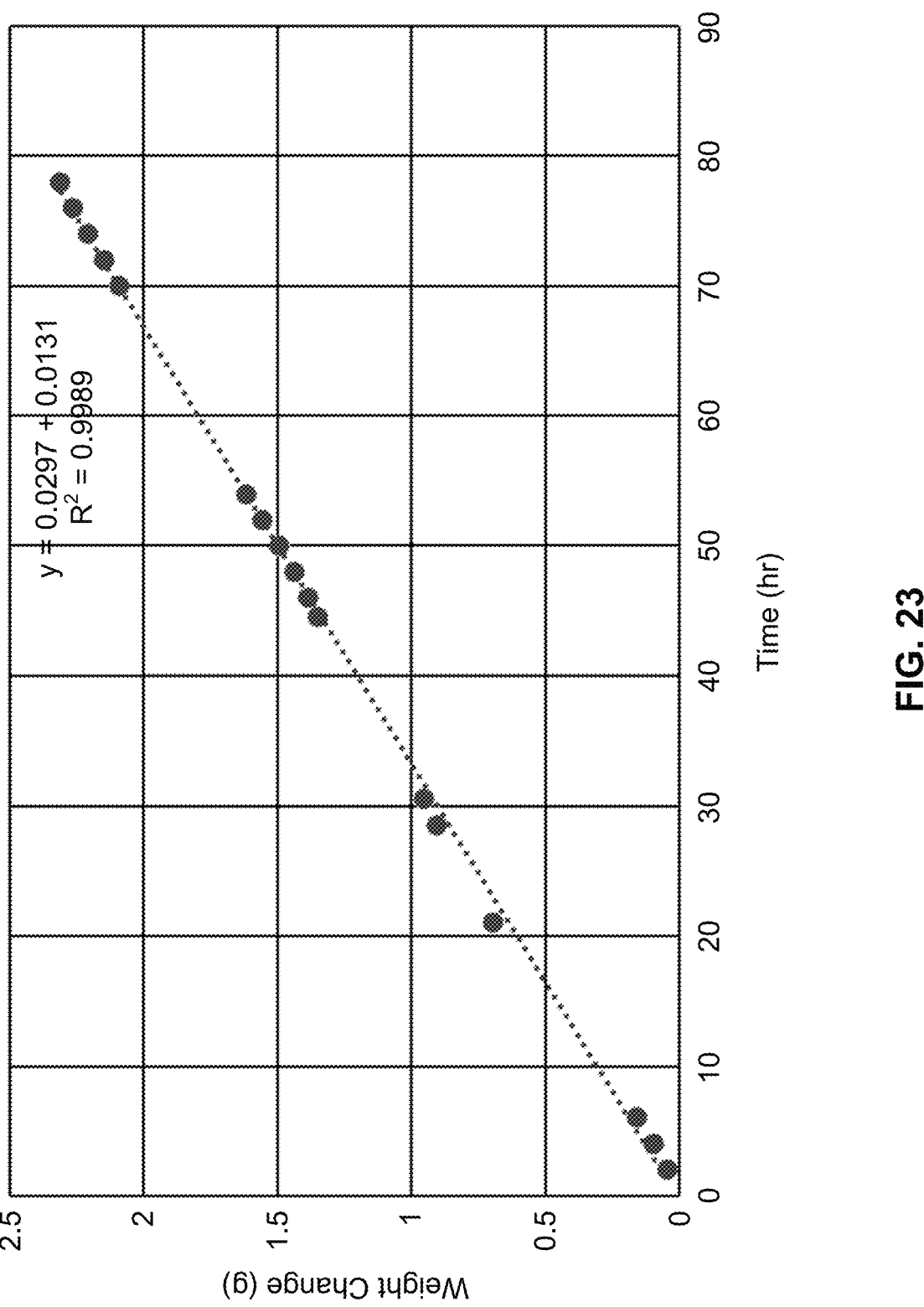
FIG. 23 is a graph measuring the weight of water transported through the construction as weight change versus time for a multi-layer protein polyurethane alloy according to some embodiments.

The three-layer sample for Example No. 54 had a thick-
ness of 0.32 mm. As reported in Table 7, the sample for
Example No. 54 had a moisture vapor transmission rate of
166 g/m²/24 hr, which was a 82 g/m²/24 hr increase com-
pared to the sample of Example No. 53. The graph of FIG.
23 shows that the breathability for the sample of Example
No. 54 is consistent over time. The amount of water trans-
ported through the sample increased linearly with time
during the breathability test. The graph of FIG. 23 shows
that the protein in the protein polyurethane alloy does not
cause any significant fluctuations in the alloy's breathability
over time.

Example 55

A control sample was prepared by mixing 0.4 g of AF-715
(an antifoaming agent from Quaker Color) into 38 g of
waterborne polyurethane dispersion composed of 25 wt %
IMPRAPERM® DL 5249 from Covestro and 75 wt %
L3360 from Hauthaway. The mixture was mixed using an
impeller at a rate of 500 rpm and allowed to stir for 5
minutes at room temperature. After the mixture was properly
mixed, 0.6 g BORCHI® Gel L 75 N was added to increase
the viscosity of the mixture and the mixture was allowed to
mix for 5 minutes. The mixture was then coated using a
Mathis LTE-S Labcoater coater onto a release paper and was
dried at 75° C. for 10 minutes and at 100° C. for 10 minutes.
The coating was then removed from the release paper to
create a polyurethane film containing no protein.

After drying, the sample had a thickness of 0.07 mm. As
reported in Table 7, the polyurethane film had a moisture
vapor transmission rate of 168 g/m²/24 hr.

74

Example 56

A sample was prepared by mixing 5.3 g of SUPRO® XT
221D soy protein isolate with 30 g of water. The pH of the
mixture was increased using 1M NaOH until a pH of 8-9
was achieved. After adjusting the pH, Ultra-Fresh DW-56
(15 wt % based on the soy protein isolate mass) and AF-715
antifoaming agent (1 wt % based on solution weight) were
added and to the mixture, and the mixture was stirred using
an impeller at 500 rpm until the soy protein isolate was fully
dissolved. Once the soy protein isolate was fully dissolved,
53.7 g of waterborne polyurethane dispersion composed of
25 wt % IMPRAPERM® DL 5249 from Covestro and 75 wt
% L3360 from Hauthaway was added to the protein solution
and the solution was stirred using an impeller at a rate of 500
rpm for 10 minutes at room temperature. The protein solu-
tion was then coated onto a release paper using a Mathis
LTE-S Labcoater and allowed to dry at 75° C. for 10 minutes
and at 100° C. for 10 minutes.

After drying, the sample had a thickness of 0.05 mm. As
reported in Table 7, the sample had a moisture vapor
transmission rate of 266 g/m²/24 hr, which was a 98 g/m²/24
hr increase compared to the sample of Example No. 55.

Example Tables

The following Tables 3-6 report the DMA and mechanical
property test results for Example Nos. 1-31. The "Sancure"
polyurethane in the tables is SANCURE™ 20025F, an
aliphatic polyester polyurethane dispersion at 47% solids in
water from Lubrizol. The "Impranil DLS" polyurethane is
IMPRANIL® DLS, an aliphatic polyester polyurethane with
50% solids content in water from Covestro. The "L2996"
polyurethane is an aliphatic polycarbonate polyurethane
dispersion with 35% solids content in water from Hautha-
way. The "Gelatin" protein is type A porcine skin gelatin
G2500 from Sigma. The "SPI" protein is soy protein isolate
IC90545625 from MP Medicals. The "Collagen" protein is
bovine collagen from Wuxi BIOT biology technology in
China. The "BSA" protein is bovine serum albumin 5470
from Sigma. The "rCol" protein recombinant bovine colla-
gen prepared in yeast from Modern Meadow. The "Albu-
min" protein is chicken egg white albumin A5253 from
Sigma. The "Pea" protein is pea protein powder MTX5232
from Bobs Red Mills. The "Peanut" protein is peanut protein
powder from Tru-Nut. Table 7 reports the moisture vapor
transmission rate test results for Example Nos. 45-56.

TABLE 3

Second DMA Modulus Transition Onset Temperatures

| Ex. No. | PU | Protein | Protein (wt %) | PU (wt %) | 2nd Modulus Transition Onset (° C.) | Delta 2nd Modulus Transition Onset |
|---|---|---|---|---|---|---|
| 1 | L3360 | None | 0% | 100% | 114.9 | — |
| 2 | UD-108 | None | 0% | 100% | 127.4 | — |
| 3 | UD-250 | None | 0% | 100% | 160.8 | — |
| 4 | UD-303 | None | 0% | 100% | 158.1 | — |
| 5 | Impranil DLS | None | 0% | 100% | 146.4 | — |
| 6 | Sancure | None | 0% | 100% | 49.6 | — |
| 7 | HD-2001 | None | 0% | 100% | 128 | — |
| 8 | L2996 | None | 0% | 100% | 186.2 | — |
| 9 | L3360 | Gelatin | 30% | 70% | 180.6 | 65.7 |
| 10 | UD-108 | Gelatin | 30% | 70% | 184.9 | 57.5 |

TABLE 3-continued

| | | | | | 2nd Modulus Transition Onset (° C.) | Delta 2nd Modulus Transition Onset |
|---|---|---|---|---|---|---|
| Ex. No. | PU | Protein | Protein (wt %) | PU (wt %) | | |
| 11 | UD-250 | Gelatin | 30% | 70% | 186.1 | 25.3 |
| 12 | Impranil DLS | Gelatin | 30% | 70% | 190.4 | 44 |
| 13 | UD-303 | Gelatin | 30% | 70% | 179.5 | 21.4 |
| 14 | Sancure | Gelatin | 30% | 70% | 188 | 138.4 |
| 15 | HD2001 | Gelatin | 30% | 70% | 184.9 | 56.9 |
| 16 | L2996 | Gelatin | 30% | 70% | 187.1 | — |
| 17 | L3360 | Collagen | 30% | 70% | 180.3 | 65.4 |
| 18 | L3360 | rCol | 30% | 70% | 175.4 | 60.5 |
| 19 | L3360 | Albumen | 30% | 70% | 168.4 | 53.5 |
| 20 | L3360 | BSA | 30% | 70% | 184.9 | 70 |
| 21 | L3360 | SPI (pH 10) | 30% | 70% | 186.6 | 71.7 |
| 22 | L3360 | Pea | 30% | 70% | 186.2 | 71.3 |
| 23 | L3360 | Peanut | 30% | 70% | 151.92 | 37 |
| 24 | L3360 | Gelatin | 50% | 50% | — | — |
| 35 | L3360 | Gelatin | 20% | 80% | 184 | 69.1 |
| 26 | L3360 | Gelatin | 15% | 85% | 138.3 | 23.4 |
| 27 | L3360 | Gelatin | 10% | 90% | 122.9 | 8 |
| 28 | L3360 | Gelatin | 5% | 95% | 134.2 | 19.3 |
| 29 | L3360 | Gelatin | 1% | 99% | — | — |
| 30 | L3360 | SPI raw | 10% | 90% | 133.9 | 19 |
| 31 | L3360 | SPI (pH 8) | 20% | 80% | 187.1 | 72.2 |
| 42 | L3360 | 50 KDa rCol | 30% | 70% | 177.8 | 62.9 |
| 43 | L3360 | Cellulase-RG | 20% | 80% | 153.1 | 38.2 |
| 44 | L3360 | Cellulase-IG | 20% | 80% | 122.1 | 7.2 |

TABLE 4

First DMA Modulus Transition Onset Temperatures & Soft Phase tan(δ) Peak Temperatures

| Ex. No. | PU | Protein | Protein (wt %) | PU (wt %) | Tan(δ) peak Temp. (° C.) | 1st Modulus Transition Onset (° C.) | Delta Tan(δ) Peak Temp. (° C.) | Delta 1st Modulus Transition Onset (° C.) |
|---|---|---|---|---|---|---|---|---|
| 1 | L3360 | None | 0% | 100% | −33 | −50 | — | — |
| 2 | UD-108 | None | 0% | 100% | −46 | −58 | — | — |
| 3 | UD-250 | None | 0% | 100% | −30 | — | — | — |
| 4 | UD-303 | None | 0% | 100% | −45 | −59 | — | — |
| 5 | Impranil DLS | None | 0% | 100% | −29 | −44 | — | — |
| 6 | Sancure | None | 0% | 100% | −39 | −50 | — | — |
| 7 | HD-2001 | None | 0% | 100% | −20 | −35 | — | — |
| 8 | L2996 | None | 0% | 100% | −20 | — | — | — |
| 9 | L3360 | Gelatin | 30% | 70% | −39 | −53 | −6 | −3 |
| 10 | UD-108 | Gelatin | 30% | 70% | −47 | −57 | −1 | 1 |
| 11 | UD-250 | Gelatin | 30% | 70% | −30 | — | 0 | — |
| 12 | Impranil DLS | Gelatin | 30% | 70% | −36 | −47 | −7 | −3 |
| 13 | UD-303 | Gelatin | 30% | 70% | −52 | −63 | −7 | −4 |
| 14 | Sancure | Gelatin | 30% | 70% | −46 | −55 | −7 | −5 |
| 15 | HD2001 | Gelatin | 30% | 70% | −20 | −36 | 0 | −1 |
| 16 | L2996 | Gelatin | 30% | 70% | | | | |
| 17 | L3360 | Collagen | 30% | 70% | −35 | −49 | −2 | 1 |
| 18 | L3360 | rCol | 30% | 70% | −33 | −49 | 0 | 1 |
| 19 | L3360 | Albumen | 30% | 70% | −36 | −52 | −3 | −2 |
| 20 | L3360 | BSA | 30% | 70% | −35 | −49 | −2 | 1 |
| 21 | L3360 | SPI (pH 10) | 30% | 70% | −38 | −53 | −5 | −3 |
| 22 | L3360 | Pea | 30% | 70% | −33 | −52 | 0 | −2 |
| 23 | L3360 | Peanut | 30% | 70% | −41 | −53 | −8 | −3 |
| 24 | L3360 | Gelatin | 50% | 50% | −38 | −52 | −5 | −2 |
| 25 | L3360 | Gelatin | 20% | 80% | −32 | −49 | 1 | 1 |
| 26 | L3360 | Gelatin | 15% | 85% | −34 | −51 | −1 | −1 |
| 27 | L3360 | Gelatin | 10% | 90% | −33 | −47 | 0 | 3 |
| 28 | L3360 | Gelatin | 5% | 95% | −34 | −49 | −1 | 1 |
| 29 | L3360 | Gelatin | 1% | 99% | — | — | — | — |
| 30 | L3360 | SPI raw | 10% | 90% | −36 | −49 | −3 | 1 |
| 31 | L3360 | SPI (pH 8) | 20% | 80% | −36 | −51 | −3 | −1 |

TABLE 4-continued

First DMA Modulus Transition Onset Temperatures & Soft Phase tan(δ) Peak Temperatures

| Ex. No. | PU | Protein | Protein (wt %) | PU (wt %) | Tan(δ) peak Temp. (° C.) | 1st Modulus Transition Onset (° C.) | Delta Tan(δ) Peak Temp. (° C.) | Delta 1st Modulus Transition Onset (° C.) |
|---|---|---|---|---|---|---|---|---|
| 42 | L3360 | 50 KDa rCol | 30% | 70% | −31 | −47 | 2 | 3 |
| 43 | L3360 | Cellulase-RG | 20% | 80% | −34 | −48 | −1 | 2 |
| 44 | L3360 | Cellulase-IG | 20% | 80% | −33 | −48 | 0 | 2 |

TABLE 5

Tensile Strength

| Ex. No. | PU | Protein | Protein (wt %) | PU (wt %) | Tensile Strength (MPa) | Delta Tensile Strength | % Delta Tensile Strength |
|---|---|---|---|---|---|---|---|
| 1 | L3360 | None | 0% | 100% | 12.9 | — | — |
| 2 | UD-108 | None | 0% | 100% | 19.4 | — | — |
| 3 | UD-250 | None | 0% | 100% | 26.4 | — | — |
| 4 | UD-303 | None | 0% | 100% | 16.7 | — | — |
| 5 | Impranil DLS | None | 0% | 100% | 15.1 | — | — |
| 6 | Sancure | None | 0% | 100% | 1.4 | — | — |
| 7 | HD-2001 | None | 0% | 100% | 33 | — | — |
| 8 | L2996 | None | 0% | 100% | — | — | — |
| 9 | L3360 | Gelatin | 30% | 70% | 19.8 | 6.9 | 53.8 |
| 10 | UD-108 | Gelatin | 30% | 70% | 23.1 | 3.7 | 19.1 |
| 11 | UD-250 | Gelatin | 30% | 70% | — | — | — |
| 12 | Impranil DLS | Gelatin | 30% | 70% | 17.9 | 2.8 | 18.5 |
| 13 | UD-303 | Gelatin | 30% | 70% | 23.2 | 6.5 | 38.9 |
| 14 | Sancure | Gelatin | 30% | 70% | 15.3 | 13.9 | 993 |
| 15 | HD2001 | Gelatin | 30% | 70% | 17.9 | −15.1 | −45.8 |
| 16 | L2996 | Gelatin | 30% | 70% | — | — | — |
| 17 | L3360 | Collagen | 30% | 70% | 17.3 | 4.4 | 34.4 |
| 18 | L3360 | rCol | 30% | 70% | 16.8 | 3.9 | 29.9 |
| 19 | L3360 | Albumen | 30% | 70% | 14.8 | 1.9 | 14.9 |
| 20 | L3360 | BSA | 30% | 70% | 11.7 | −1.2 | −9.1 |
| 21 | L3360 | SPI (pH 10) | 30% | 70% | 18.2 | 5.3 | 41.1 |
| 22 | L3360 | Pea | 30% | 70% | 15.3 | 2.4 | 18.4 |
| 23 | L3360 | Peanut | 30% | 70% | 11 | −1.9 | −14.5 |
| 24 | L3360 | Gelatin | 50% | 50% | — | — | — |
| 25 | L3360 | Gelatin | 20% | 80% | 17.2 | 4.3 | 33.5 |
| 26 | L3360 | Gelatin | 15% | 85% | 16 | 3.1 | 24.3 |
| 27 | L3360 | Gelatin | 10% | 90% | 16.8 | 3.9 | 29.9 |
| 28 | L3360 | Gelatin | 5% | 95% | 11.2 | −1.7 | −13 |
| 29 | L3360 | Gelatin | 1% | 99% | 11.8 | −1.1 | −8.7 |
| 30 | L3360 | SPI raw | 10% | 90% | 14.6 | 1.7 | 13.4 |
| 31 | L3360 | SPI (pH 8) | 20% | 80% | 18 | 5.1 | 39.3 |
| 42 | L3360 | 50 KDa rCol | 30% | 70% | 17 | 4.1 | 31.8 |
| 43 | L3360 | Cellulase-RG | 20% | 80% | 14.7 | 1.8 | 14 |
| 44 | L3360 | Cellulase-IG | 20% | 80% | 15.1 | 2.2 | 17 |

TABLE 6

Young's Modulus

| Ex. No. | PU | Protein | Protein (wt %) | PU (wt %) | Young's Modulus (MPa) | Delta Young's Modulus | % Delta Young's Modulus |
|---|---|---|---|---|---|---|---|
| 1 | L3360 | None | 0% | 100% | 59 | — | — |
| 2 | UD-108 | None | 0% | 100% | 23 | — | — |
| 3 | UD-250 | None | 0% | 100% | 557 | — | — |
| 4 | UD-303 | None | 0% | 100% | 27 | — | — |
| 5 | Impranil DLS | None | 0% | 100% | 13 | — | — |
| 6 | Sancure | None | 0% | 100% | 337 | — | — |
| 7 | HD-2001 | None | 0% | 100% | 20 | — | — |
| 8 | L2996 | None | 0% | 100% | – | — | — |

TABLE 6-continued

Young's Modulus

| Ex. No. | PU | Protein | Protein (wt %) | PU (wt %) | Young's Modulus (MPa) | Delta Young's Modulus | % Delta Young's Modulus |
|---|---|---|---|---|---|---|---|
| 9 | L3360 | Gelatin | 30% | 70% | 344 | 285 | 478 |
| 10 | UD-108 | Gelatin | 30% | 70% | 324 | 301 | 1308 |
| 11 | UD-250 | Gelatin | 30% | 70% | — | — | — |
| 12 | Impranil DLS | Gelatin | 30% | 70% | 326 | 313 | 2407 |
| 13 | UD-303 | Gelatin | 30% | 70% | 379 | 352 | 1304 |
| 14 | Sancure | Gelatin | 30% | 70% | 579 | 242 | 71.8 |
| 15 | HD2001 | Gelatin | 30% | 70% | 115 | 95 | 475 |
| 16 | L2996 | Gelatin | 30% | 70% | — | — | — |
| 17 | L3360 | Collagen | 30% | 70% | 226 | 167 | 280 |
| 18 | L3360 | rCol | 30% | 70% | 169 | 110 | 184 |
| 19 | L3360 | Albumen | 30% | 70% | 204 | 145 | 243 |
| 20 | L3360 | BSA | 30% | 70% | 174 | 114 | 192 |
| 21 | L3360 | SPI (pH 10) | 30% | 70% | 396 | 337 | 566 |
| 22 | L3360 | Pea | 30% | 70% | 163 | 104 | 175 |
| 23 | L3360 | Peanut | 30% | 70% | 87 | 28 | 47 |
| 24 | L3360 | Gelatin | 50% | 50% | — | — | — |
| 25 | L3360 | Gelatin | 20% | 80% | 129 | 70 | 117 |
| 26 | L3360 | Gelatin | 15% | 85% | 93 | 33 | 56 |
| 27 | L3360 | Gelatin | 10% | 90% | 71 | 11 | 19 |
| 28 | L3360 | Gelatin | 5% | 95% | 51 | −9 | −14 |
| 29 | L3360 | Gelatin | 1% | 99% | 54 | −5 | −9 |
| 30 | L3360 | SPI raw | 10% | 90% | 95 | 36 | 60 |
| 31 | L3360 | SPI (pH 8) | 20% | 80% | 223 | 164 | 275 |
| 42 | L3360 | 50 KDa rCol | 30% | 70% | 161 | 102 | 173 |
| 43 | L3360 | Cellulase-RG | 20% | 80% | 184 | 125 | 212 |
| 44 | L3360 | Cellulase-IG | 20% | 80% | 84 | 25 | 42 |

TABLE 7

Moisture Vapor Transmission Rate (MVTR)

| Ex. No. | PU | Protein | Protein (wt %) | PU (wt %) | MVTR (g/m$^2$/24 hr) | Delta MVTR | % Delta MVTR |
|---|---|---|---|---|---|---|---|
| 45a | HD-2001 | None | 0% | 100% | 30 | — | — |
| 45b | HD-2001 | None | 0% | 100% | 38 | — | — |
| 46a | HD-2001 | Gelatin | 30% | 70% | 180 | 142-150 | 374-500 |
| 46b | HD-2001 | Gelatin | 30% | 70% | 138 | 100-108 | 263-360 |
| 47a | L3360 | None | 0% | 100% | 23 | — | — |
| 47b | L3360 | None | 0% | 100% | 27 | — | — |
| 48a | L3360 | SPI | 30% | 70% | 117 | 90-94 | 333-409 |
| 48b | L3360 | SPI | 30% | 70% | 74 | 47-51 | 174-222 |
| 49a | L3360 | None | 0% | 100% | 83 | — | — |
| 49b | L3360 | None | 0% | 100% | 87 | — | — |
| 50a | L3360 | SPI | 30% | 70% | 268 | 181-185 | 208-223 |
| 50b | L3360 | SPI | 30% | 70% | 277 | 190-194 | 218-233 |
| 51 | Impraperm 5249 | None | 0% | 100% | 338 | — | — |
| 52a | Impraperm 5249 | SPI | 30% | 70% | 626 | 288 | 85 |
| 52b | Impraperm 5249 | SPI | 30% | 70% | 644 | 306 | 91 |
| 53 | Impraperm 5249 & L-3360 | None | 0% | 100% | 84 | — | — |
| 54 | Impraperm 5249 & L-3360 | SPI | 20% | 80% | 166 | 82 | 98 |
| 55 | Impraperm 5249 & L-3360 | None | 0% | 100% | 168 | — | — |
| 56 | Impraperm 5249 & L-3360 | SPI | 20% | 80% | 266 | 98 | 58 |

While various embodiments have been described herein, they have been presented by way of example, and not limitation. It should be apparent that adaptations and modi- fications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but can be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described can include a particular feature, structure, or characteristic, but every embodiment can not necessarily include the particular feature, structure, or characteristic. Moreover, such phrases are not necessarily referring to the same embodi- -continued

SEQUENCES

GEVGPAGSPGSNGAPGQRGEPGPQGHAGAQGPPGPPGINGSPGGKGEM

GPAGIPGAPGLMGARGPPGPAGANGAPGLRGGAGEPGKNGAKGEPGPR

GERGEAGIPGVPGAKGEDGKDGSPGEPGANGLPGAAGERGAPGFRGPA

GPNGIPGEKGPAGERGAPGPAGPRGAAGEPGRDGVPGGPGMRGMPGSP

GGPGSDGKPGPPGSQGESGRPGPPGPSGPRGQPGVMGFPGPKGNDGAP

GKNGERGGPGGPGPQGPPGKNGETGPQGPPGPTGPGGDKGDTGPPGPQ

GLQGLPGTGGPPGENGKPGEPGPKGDAGAPGAPGGKGDAGAPGERGPP

SEQUENCE LISTING

```
Sequence total quantity: 1
SEQ ID NO: 1          moltype = AA  length = 528
FEATURE               Location/Qualifiers
REGION                1..528
                      note = Human Collagen alpha-1(III) chain
source                1..528
                      mol_type = protein
                      organism = synthetic construct
SEQUENCE: 1
DVKSGVAVGG LAGYPGPAGP PGPPGPPGTS GHPGSPGSPG YQGPPGEPGQ AGPSGPPGPP  60
GAIGPSGPAG KDGESGRPGR PGERGLPGPP GIKGPAGIPG FPGMKGHRGF DGRNGEKGET  120
GAPGLKGENG LPGENGAPGP MGPRGAPGER GRPGLPGAAG ARGNDGARGS DGQPGPPGPP  180
GTAGFPGSPG AKGEVGPAGS PGSNGAPGQR GEPGPQGHAG AQGPPGPPGI NGSPGGKGEM  240
GPAGIPGAPG LMGARGPPGP AGANGAPGLR GGAGEPGKNG AKGEPGPRGE RGEAGIPGVP  300
GAKGEDGKDG SPGEPGANGL PGAAGERGAP GFRGPAGPNG IPGEKGPAGP RGAPGPAGPR  360
GAAGEPGRDG VPGGPGMRGM PGSPGGPGSD GKPGPPGSQG ESGRPGPPGP SGPRGQPGVM  420
GFPGPKGNDG APGKNGERGG PGGPGPQGPP GKNGETGPQG PPGPTGPGGD KGDTGPPGPQ  480
GLQGLPGTGG PPGENGKPGE PGPKGDAGAP GAPGGKGDAG APGERGPP               528
``` ment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

SEQUENCES

```
SEQ ID NO: 1: Human Collagen alpha-1 (III) chain
DVKSGVAVGGLAGYPGPAGPPGPPGPPGPGTSGHPGSPGSPGYQGPPGEP

GQAGPSGPPGPPGAIGPSGPAGKDGESGRPGRPGERGLPGPPGIKGPA

GIPGFPGMKGHRGFDGRNGEKGETGAPGLKGENGLPGENGAPGPMGPR

GAPGERGRPGLPGAAGARGNDGARGSDGQPGPPGPPGTAGFPGSPGAK
```

What is claimed is:

1. An aqueous protein polyurethane alloy formulation, comprising:
   water;
   a polyurethane;
   a protein dissolved within at least the polyurethane; and
   a foam stabilizer selected from the group consisting of: a nonionic surfactant, an anionic surfactant, a hydrophobically-modified ethylene oxide urethane, and a nonionic silicone dispersion,
   wherein the formulation comprises about 5 wt % to about 60 wt % of the protein and about 10 wt % to about 85 wt % of the polyurethane, based on the weight of protein and polyurethane.

2. The aqueous protein polyurethane alloy formulation of claim 1, wherein the foam stabilizer comprises a nonionic surfactant.

3. The aqueous protein polyurethane alloy formulation of claim 1, wherein the concentration of the protein in the formulation ranges from about 10 g/L to about 300 g/L.

4. The aqueous protein polyurethane alloy formulation of claim 1, comprising about 0.1 wt % to about 10 wt % of the foam stabilizer.

5. The aqueous protein polyurethane alloy formulation of claim 1, further comprising one or more colored dyes.

6. The aqueous protein polyurethane alloy formulation of claim 5, wherein the formulation comprises about 0.1 wt % to about 2 wt % of the one or more colored dyes.

7. The aqueous protein polyurethane alloy formulation of claim 5, wherein the one or more colored dyes are selected from the group consisting of: a fiber reactive dye and an acid dye.

8. The aqueous protein polyurethane alloy formulation of claim 1, further comprising a cross-linker selected from the group consisting of: an epoxy-based cross-linker, an isocyanate-based cross-linker, and a carbodiimide-based cross-linker.

9. The aqueous protein polyurethane alloy formulation of claim 8, wherein the cross-linker is a carbodiimide-based cross-linker.

10. The aqueous protein polyurethane alloy formulation of claim 1, wherein the formulation is a foamed formulation having a liquid density ranging from about 300 g/L to about 900 g/L.

11. A method of making a material, the method comprising:

applying the aqueous protein polyurethane alloy formulation of claim 1 to a textile such that the protein polyurethane alloy formulation is integrated into the textile; and drying the textile comprising the integrated protein polyurethane alloy formulation.

12. The method of claim 11, wherein the aqueous protein polyurethane alloy formulation is foamed before applying the formulation to the textile.

13. The aqueous protein polyurethane alloy formulation of claim 1, wherein the polyurethane is a waterborne polyurethane dispersion.

14. An aqueous protein polyurethane alloy formulation, comprising:

water;

a polyurethane;

a protein dissolved within at least the polyurethane;

a foam stabilizer; and a carbodiimide-based cross-linker.

\* \* \* \* \*